(12) United States Patent
Paiz

(10) Patent No.: US 7,809,659 B1
(45) Date of Patent: Oct. 5, 2010

(54) METHOD FOR PRESENTING OPTIMAL INTERNET KEYWORD BASED SEARCH RESULT SETS USING AN ENVIRONMENTAL BITMAP AND ENVIRONMENTAL BITMAP PYRAMID STRUCTURE

(76) Inventor: Richard S. Paiz, 16558 NE. 26th Ave., Apt. 2-F, North Miami Beach, FL (US) 33160

( * ) Notice: Subject to any disclaimer, the term of this patent is extended or adjusted under 35 U.S.C. 154(b) by 560 days.

(21) Appl. No.: 11/584,941

(22) Filed: Oct. 23, 2006

Related U.S. Application Data

(63) Continuation-in-part of application No. 10/852,394, filed on May 24, 2004, now abandoned, which is a continuation-in-part of application No. 10/603,963, filed on Jun. 25, 2003, now Pat. No. 6,842,511, which is a continuation-in-part of application No. 09/544,238, filed on Apr. 7, 2000, now Pat. No. 6,614,893.

(60) Provisional application No. 60/184,537, filed on Feb. 24, 2000.

(51) Int. Cl.
G06E 1/00 (2006.01)
G06F 15/18 (2006.01)
(52) U.S. Cl. ............................. 706/20; 706/45; 706/16

(58) Field of Classification Search ...................... None
See application file for complete search history.

(56) References Cited

OTHER PUBLICATIONS

Zamir et al., O., "Grouper: A Dynamic Clustering Interface to Web Search Results", 1999.*
Robertson et al., G., "Cone Trees: Animated Visualization of Hierarchical Information", 1991.*
Hearst et al., M., "Cat-a-Cone: An Interactive Interface for Specifying Searches and Viewing Retrieval Results using a Large Category Hierarchy", 1997.*
Dumais et al., S., "Hierarchical Classification of Web Content", 2000.*
Wen et al., J., "Clustering User Queries of a Search Engine", 2001.*

\* cited by examiner

*Primary Examiner*—Donald Sparks
*Assistant Examiner*—Adrian L Kennedy
(74) *Attorney, Agent, or Firm*—Gold & Rizvi, P.A.; Glenn E. Gold; H. John Rizvi

(57) ABSTRACT

A method for simulating the entire superset of potential valid keyword regular expression requests constructed during an Internet browser search and converting the result sets into Environmental Bitmap data to enable efficient and accurate searching without requiring Browser Engine supercomputer cluster searching capabilities.

11 Claims, 95 Drawing Sheets

Figure 1:
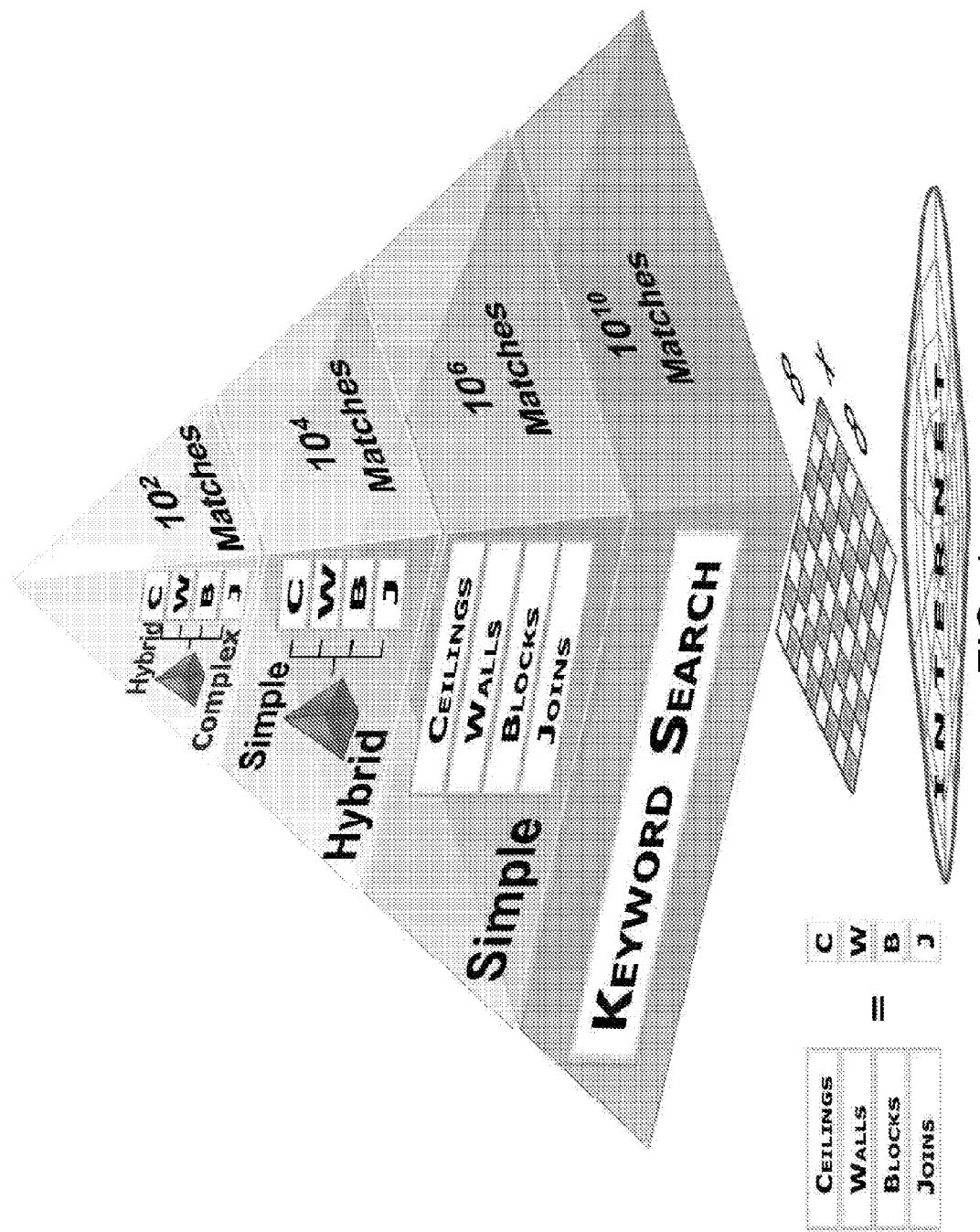

Information portal prior art prior art prior art

If no synergy exists and lateral integration among the components does not apply, then 5,000 excess records are sent to the HQ3.
The HBS moves and shifts resources for maximun efficiency, thus a 5,000.
Buffer exists which is used to remove the 5,000 excess.

prior art

The system finds that (41) the global supplier warehouse has the lowest price.

prior art

These warehouses have inventory in hand.
$ Z, $ Z 2    Retailers
$ Y           Wholesalers
$ X           Suppliers
$ W           UCommerce warehouse prior art

(41) + 100 units
(31) + 75 units
(21) + 125 units
(11) (14) (17) (23) + 50 units Inventory is placed as pending until physical received.

prior art

FIG. 17
System determines the best prices from given sibling groups.
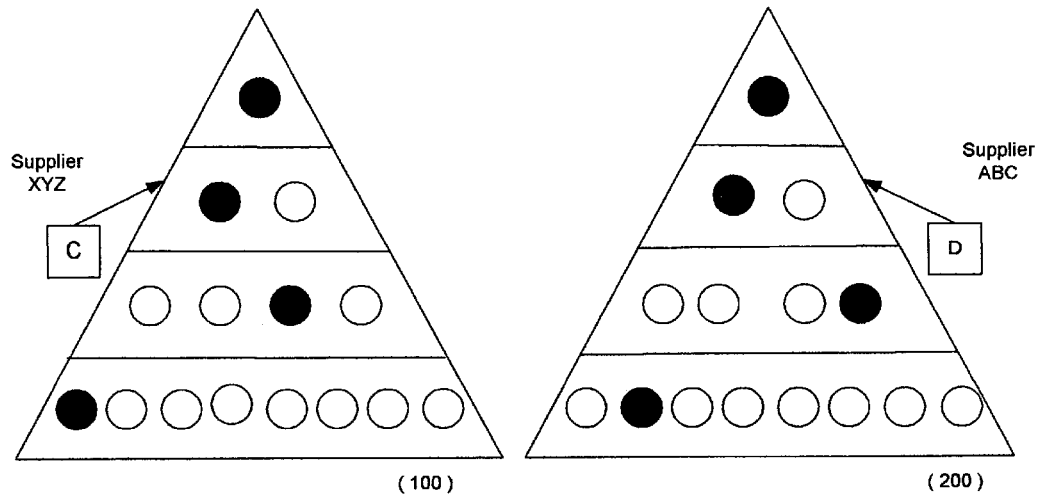
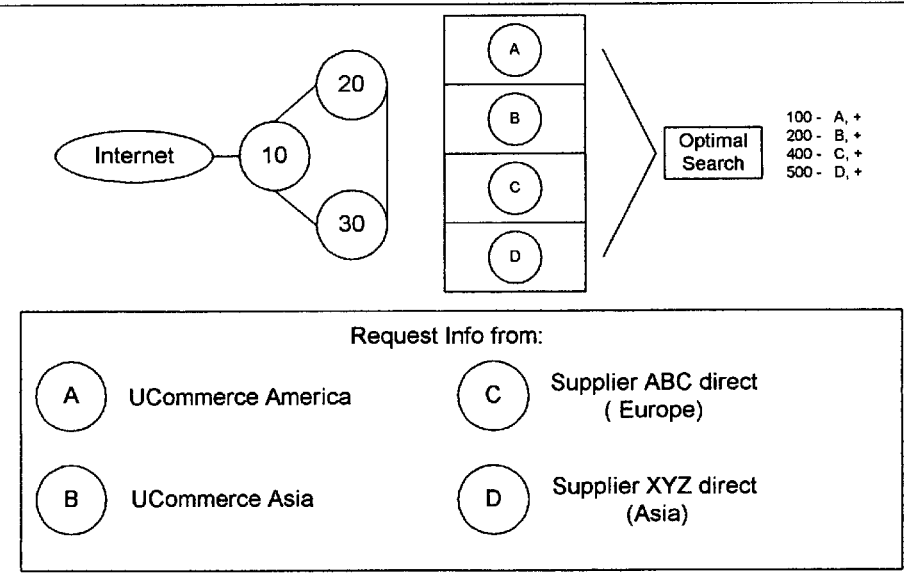
prior art 1- Determine the shortest path to destination, after applying UCommerce guidelines. TX = 16 days.
2 - Subtract TX from the Delay and use X_FOB constant.
3 - Lowest value applies $20 a day per $10,000.

prior art

* Requests must be satisfied with 20 Hrs.
* All merchandise is assumed to be available.
* All delays are multiplied by 1.15 since they are gold label.

prior art

Legend

V: Vector.
10: System.
20: Simulation Network.
24: Process power support computers.
26: Parent simulation computers.
28: User interface computers.
30: Telecommunications Network.
32: Junction point of the simulation computers.
34: Telecommunications Network junction point of the computers.

prior art

Figure 28:
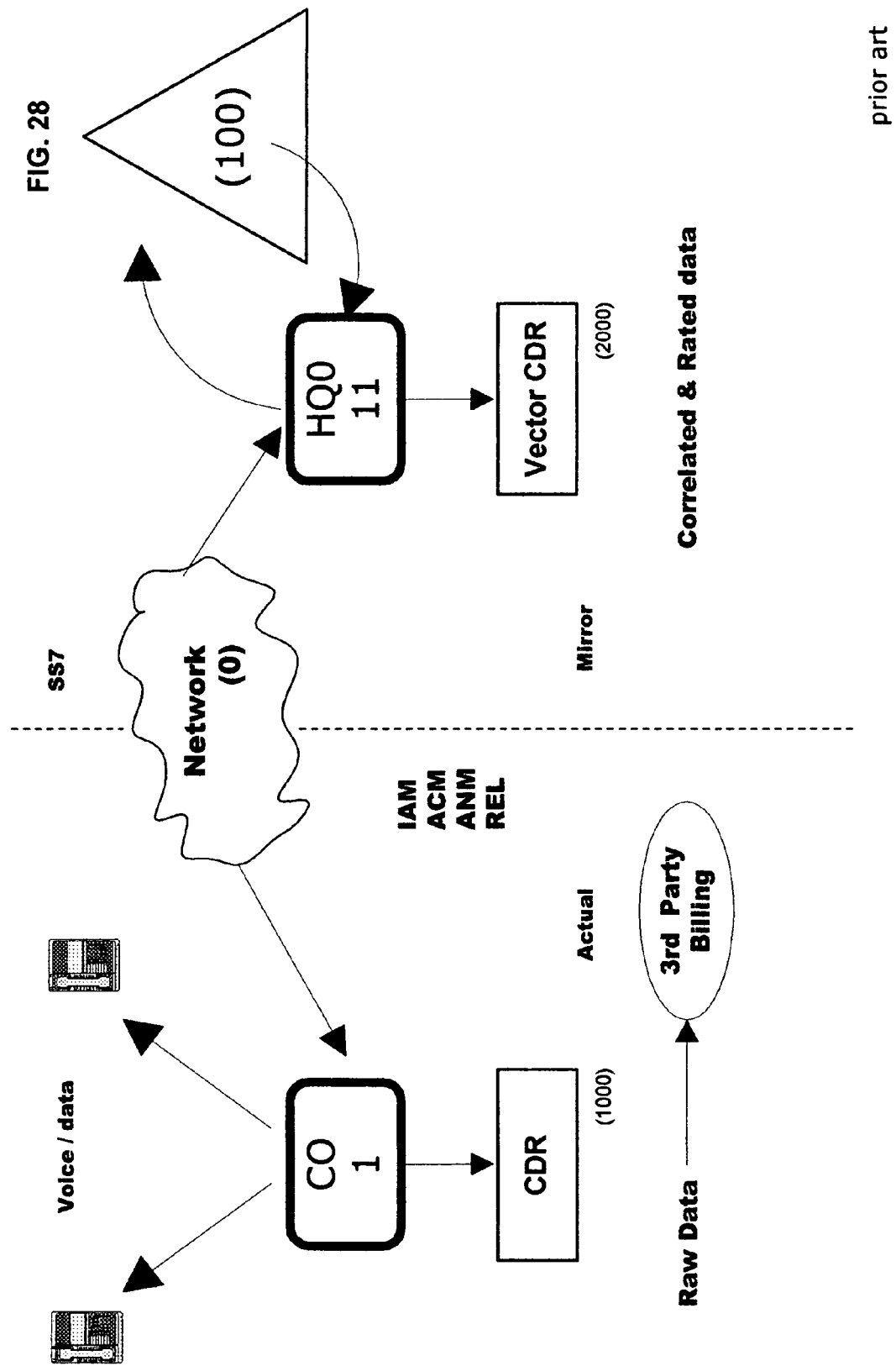

FIG. 28 — prior art prior art

FIG. 63
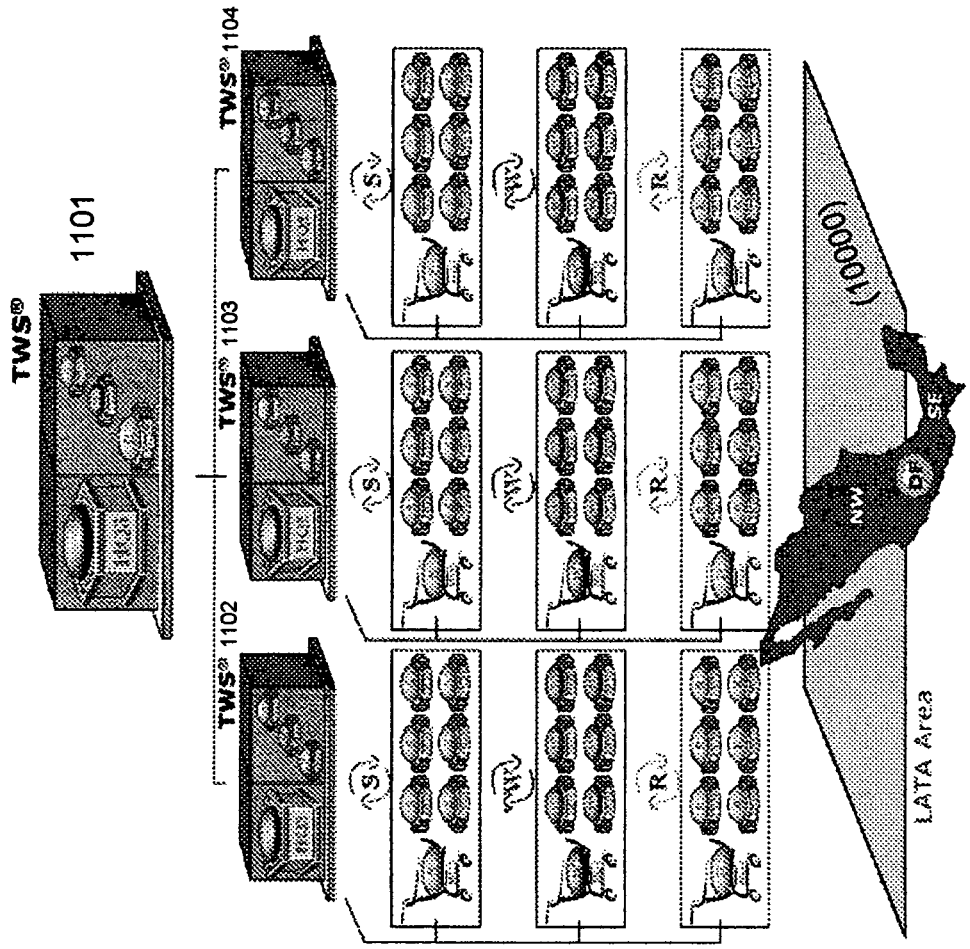
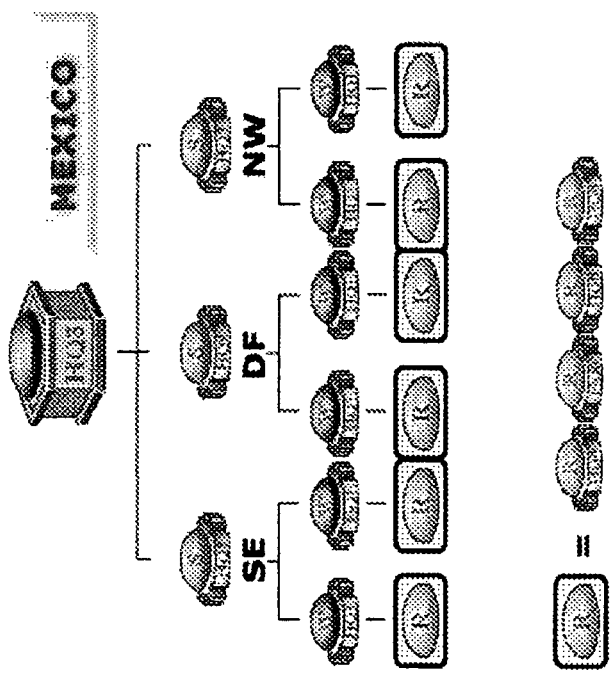

TWS®

Cluster configuration to valorize KEYWORD and then match/merge a browser result.

Controls a discrete amount of discrete KEYWORDS

Controls a discrete amount of satisfying KEYWORDS

Controls Simple Pyramid KEYWORD structures.

HQ0
HQ1
HQ2
HQ3

Workhorses perform 90% of the computational tasks.

FIG. 86

Ⓐ $X # of matches of Objects after Joins and Blocks.

Ⓑ $X > [6] will have less than 1,000,000

Ⓒ $X <= [6] will derive TOP 1,000,000 entries

[KEYWORD] has 1,000,000 matches

Wall collection Filtering

Analyze data against matches of TOP [WALL] until object is Full. Last [WALL] will have the remainder.

W = Wall

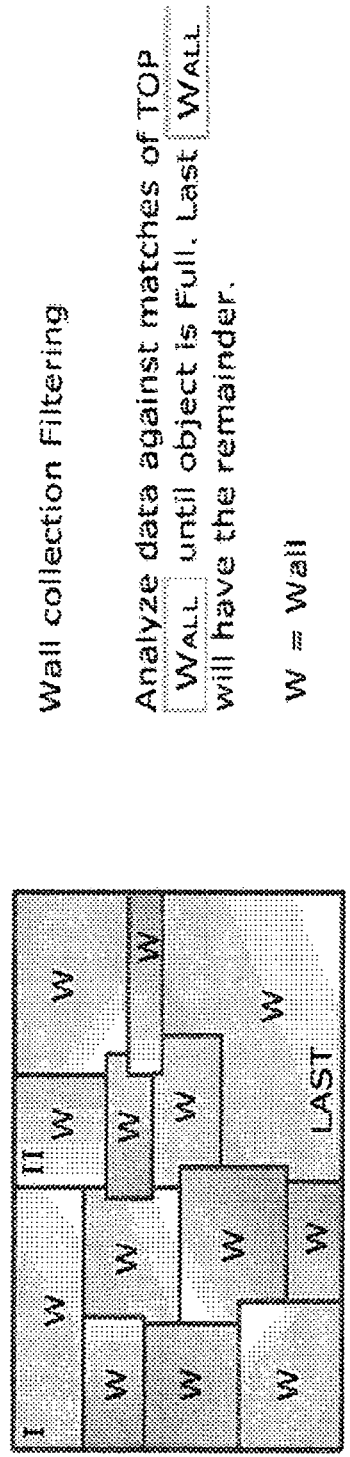

[$Y = $X - 1,000,000]

A wall is a Subdivision of an object.
A wall can affect multiple pages.
This method helps identify the (I) TOP 100 and (II) 10,000 and creates Simple Pyramids.

If all the [WALLS] are congruent, then the system can associate them as attributes.

Object

Further reduce, with higher value words.

A Simple Pyramid Structure is an object that has magnitude = 7.

That gathers the natural KEYWORDS or JOIN or BLOCKS or WALLS and recalculates them to eliminate half, this time with CEILINGS.

Using CEILINGS list identify the top 500,000 links or associate via WALLS.

FIG. 93

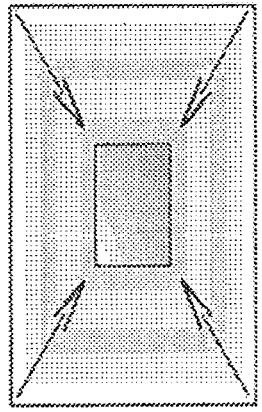

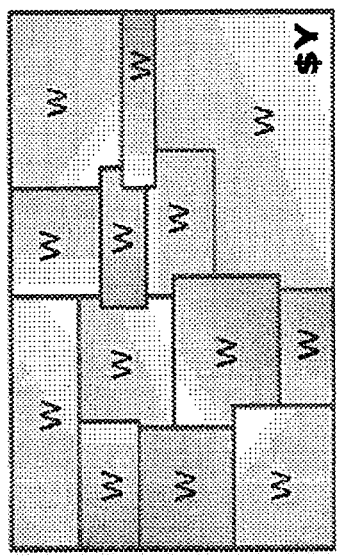

Ⓐ $X = # of matches of Objects after Joins and Blocks.

Ⓑ $X > 10 will have less than 10,000

Ⓒ $X <= 10 will derive TOP 10,000 entries

KEYWORDS have 10,000 matches

W = Wall

[ $Y = $X - 10,000 ]

A wall is (object and wall).
A wall can affect multiple links.
This method helps identify the TOP 10 and TOP 100 and TOP 5,000 Pages.

Using KEYWORDS or JOINS or BLOCKS or WALLS or CEILINGS of a Hybrid Pyramid associate the TOP 5,000 Pages.

Analyze data against matches of TOP WALL until object is Full. Last WALL will have the remainder.

If all the WALLS are congruent, then the system can associate them as attributes.

FIG. 94

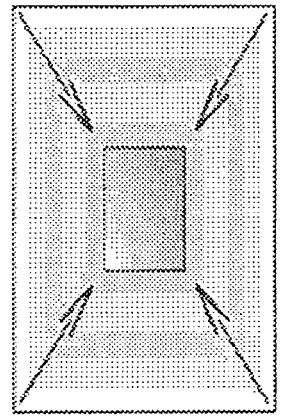

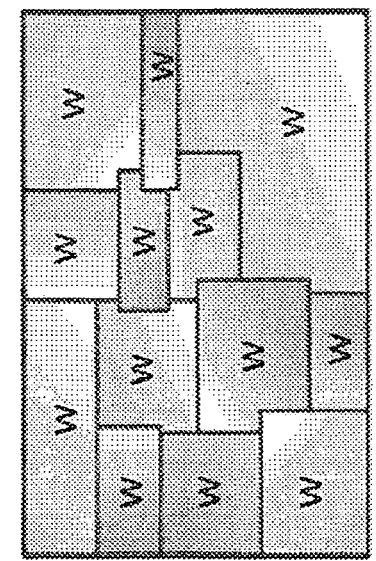

Ⓐ $X # of matches of Objects after Joins and Blocks.

Ⓑ $X > 14 will have less than 100

Ⓒ $X <= 14 will derive TOP 100 entries

KEYWORDS have 100 matches

Using KEYWORDS or JOINS or BLOCKS or WALLS or CEILINGS of a Hybrid Pyramid associate the TOP 50 Links.

Analyze data against matches of TOP WALL until object is Full. Last WALL will have the remainder.

W = Wall

[ $Y = $X - 100 ]

A wall is (object and wall).
A wall can affect multiple links.
This method helps identify the most satisficing TOP and creates a Complex Pyramid.

METHOD FOR PRESENTING OPTIMAL INTERNET KEYWORD BASED SEARCH RESULT SETS USING AN ENVIRONMENTAL BITMAP AND ENVIRONMENTAL BITMAP PYRAMID STRUCTURE

CROSS REFERENCE TO RELATED APPLICATIONS

This application is a continuation-in-part of patent application Ser. No. 10/852,394, filed on May 24, 2004 now abandoned, which is a continuation-in-part of patent application Ser. No. 10/603,963, filed Jun. 25, 2003 now U.S. Pat. No. 6,842,511, which is a continuation-in-part of patent application Ser. No. 09/544,238 (now U.S. Pat. No. 6,614,893), filed Apr. 7, 2000, which relates to the same subject matter as provisional patent application Ser. No. 60/184,537, filed by the same inventor on Feb. 24, 2000. This application claims the Feb. 24, 2000, Apr. 7, 2000 and Jun. 25, 2003 filing dates as to the common subject matter.

BACKGROUND OF THE INVENTION

1. Field of the Invention

The present invention relates generally to the field of financial resource management, inventory control and online purchasing between customers, retailers, suppliers and wholesalers. More particularly, the present invention relates to a system of computers linked to form a Supercomputer subdivided into multiple hierarchical neural sub-components having neural elements residing at remote sites. The Supercomputer updates, validates and verifies the flow of environmental messages, allowing the end users to find the lowest FOB, C&F, CIF, CDF and CDIF price for goods and services. The system manages the production rate for the supplier by purchasing at optimal cost order quantities and shipping maximal discount rate. By coordinating the resources of multiple customers through the same suppliers and financial institution, the system will use economies of scale to lower transactional service charges and the suppliers' best price to the consumer. Furthermore, this invention also relates to the field of searching engines by cleaning, standardizing, organizing, transforming, analyzing and then evaluating the massive amount of data thus placing harmony, balance and proportion to the chaos and anarchy of the Internet, identifying keywords that use eigenvectors giving a value or a rank to each link of the world wide web. The system is comprised of computers configured, linked and otherwise arranged to form a Supercomputer subdivided into multiple hierarchical neural-like subcomponents, having neural elements residing at remote sites.

The present invention also relates generally to the field of Telecommunications, using parallel cluster computers to create a very fast and inexpensive Supercomputer that allows the integration of the Internet as a large and complex Telco Network. The application is meant to further clarify and elucidate the reader with the intellectual property contained in U.S. Pat. Nos. 6,614,893, 6,842,511 and 7,058,601 by expanding from simple ILEC to national carriers, global IP Telephony and Wireless Telecommunications Real Time billing. The concept of vector CDR is further expanded to include roaming surcharges and multi-organization calls. The invention solves intrinsic drawbacks of clusters by dividing them into a grid of nodes that are able to move large amounts of data, and can perform decisions on their own absent of the centralized Symmetric Multiprocessor (SMP).

The system is thus a parallel cluster Supercomputer with at least one teraflop of bandwidth calibrated to move organizationally the equivalent of one terabyte per minute (TB/min) of raw data. The Intelligent Components analyze, gather and distill the messages of the environment created by each telephone call, and then prime, rate and match/merge the plurality of CDR into a correlated billing entity that, in turn, is stored at the insertion rate of one million transactions per minute. The technology has evolved into a mission critical system that is commercially known as the Managerial Pyramid Switch® (hereinafter MPS®), that is designed to simulate and plot circuit by circuit all of the telecommunications networks of a PTT. The commercial version of the MPS® is designed to handle a small Telco such as 'Instituto Costarricense de Electricidad' (hereinafter ICE). ICE network consists of 1,160,000 fixed, 1,000,000 wireless and 100,000 IP Telephony subscribers, covering the entire 506 Area Code (or Costa Rica). A second 'massive' volume system utilizing a XLDB (Extremely Large Database) can handle a large Telco. For example: the Massive Mission Critical MPS® can cover France Telecom with 34,900,000 fixed; 48,100,000 wireless; 6,000,000 ADSL, 4,000,000 IP subscribers or the Internet with 1,000,000,000+ users.

Finally, the technology uses fuzzy math to measure the quality, performance and strength of the traffic traveling through the environment, so that human intelligence can perform strategic planning, and using Business Intelligence programs better understand the needs of the end users. By incorporating the MPS® into a UCommerce method and system, the supplier system will be able to identify inefficiencies, match/merge multiple quotes to take benefit of economies of scale, perform savings optimizing the traffic patterns of the movement of merchandise from Leg A (origin) to Leg B (destination) using X_FOB and Y_CDIF, and convert all of the suppliers, wholesalers, retailers, warehouses and links to possess geospatial, demographic and debit card functionalities to improve product, quality and service.

2. Description of the Prior Art

With the advent of the Internet and related technologies, electronic commerce and related online services have become ones of the fastest growing segments of the economy. Organizational data networks gather, validate, verify and exchange end users' information in an effort to understand, for example, the kinds of products, services and qualities consumers value most, and how and why they make such determinations.

With regard to the electronic trade (or E-Trade) industry, there have long been individual computers loaded with programs for performing online purchasing, inventory control and accounting functions to manage resources. Electronic trade systems rely on the processing power and data storage of a SMP or mainframe. A problem with these single computer applications has been that more processing power and data access capability was needed, as well as reduced bandwidth usage coupled with web and virtual world access.

Another related problem is that each transaction must be paid in full before goods and services are shipped, which particularly complicates matters for consumers who must obtain funds through financial institutions. Solutions to these problems are presented in the published doctoral dissertation of the present inventor, entitled "*Designing Hot billing Systems for Large Volume and/or Complex Network*", submitted for the degree of Doctor of Philosophy in Management at California Coast University in November of 1999, the entire content of which is incorporated herein for reference.

Accordingly, UCommerce is an integrated real time Financial Resource Management, Online Purchasing and Inventory Control system that overcomes the shortcomings, limitations and drawbacks of the existing prior art.

It is thus an object of the present invention to provide a computer network system operating in parallel and simulating a network of existing retailers, wholesalers and suppliers, wherein the system has the capability to produce, sell or transfer goods and/or services without taxing the capacity of the existing network.

It is another object of the present invention to provide such a computer network system configured to instantaneously generate, plot and update a lowest price and optimal shipping cost trajectory between two geographical locations for each user's request, immediately upon scanning the user's initial network message.

It is still another object of the present invention to provide such a computer network system which plots the optimal shipping trajectory, providing the lowest cost and delay time for a particular transaction. Where the purchase order contains pricing data that enables billing to commence, the moment of the financial resources are made available and updated or continued in real time as the transaction progresses.

It is yet another object of the present invention to provide such a computer network that minimizes bandwidth usage by performing scheduled and synchronized supplier and wholesaler "available inventory" calculations and updates throughout the network. The computers are networked together to function as a Supercomputer, which can accurately project future resource requirement trends in order to update end user's software to avoid system congestion. Preferably, a Summit Tier and functions are provided to update all of the components by sending only summarized information packets to their organizational subordinates.

It is still a further object of the present invention to provide such a network system that maximizes network-processing power by shunting calls from computers momentarily operating at or near capacity, and thus having smaller buffers to less-taxed computers having larger buffers. Preferably, this process of sharing available resources between members of the systems mimics lateral and vertical synergy in human organizations.

It is yet a further object of the present invention to provide such a network system having the flexibility to operate in conjunction with antiquated financial institutions and supplier technologies, so that existing equipment is not wasted and the cost of updating is minimized.

It is yet another object of the present invention to provide such a network system, wherein the system performs network troubleshooting functions to minimize down time and platform failure by warning a repair crew, almost immediately of the nature and location of a problem. Preferably, in this manner, the system is maintained via a proactive and preventative maintenance program.

It is still another object of the present invention to provide such a system that enables customers and multiple suppliers to collectively and partially satisfy an entire purchase order.

It is still another object of the present invention to provide such a system, which is relatively redundant and inexpensive to assemble and operate.

It is still another object of the present invention to convert the prior art to the UCommerce architecture into a Managerial Pyramid Switch®.

It is still another object of the present invention to partition the main cluster or superset into sets, subsets and elements, that are placed in a distributed manner for better efficiency and effectiveness of handle tasks.

It is still another object of the present invention to add geospatial components to X_FOB and Y_CDIF methods and multi transport dimensioning to permit more sophisticated logistic planning of resources from origin to destination (or Leg A to Leg B).

It is still another object of the present invention to create a method, commercially known as XCommerce, that converts the 'massive' amounts of electronic information of the Internet by transforming the content into basic language business blocks and then stores its mathematical values into Environmental Bitmaps Data Structures, so that Inventory Control Systems can quantify, qualify and match/merge the best satisfying results of an end user KEYWORD request.

It is still another object of the present invention to create a method that identifies the best cost at the local, regional and global scope, commercially known as Z_PRICE, pronounced as 'The Price'.

It is still another object of the present invention to be able to match/merge a plurality of quotes into a macro quote with several transport and time sensitive dimensions.

It is still another object of the present invention to give vector characteristics to the geospatial information into traffic patterns that permit the optimal distribution of goods and services.

It is still another object of the present invention to transform the Summit Tier or Managerial Pyramid Switch® into a global domain Superset cluster.

It is still another object of the present invention to transform the Middle Tier or Synergy Interface Switch® into a regional domain set cluster.

It is still another object of the present invention to transform the Lower Tier or Team Work Switch® into a local or LATA domain subset cluster.

It is still another object of the present invention to transform local warehousing means that can accommodate retailers, wholesalers and suppliers organizations, UCommerce, Free Trade Zone and customs warehouses.

It is still another object of the present invention to transform each node member of a search engine cluster of 64+ nodes into an element, that owns a discrete number of links and has the means to valorize each of them as they become apparent through means of a web crawler ability to filter, analyze and distill the environment.

It is still another object of the present invention to optimize transport dimensions using X_FOB and Y_CDIF to comply with Z_PRICE optimizations.

It is still another object of the present invention to optimize the search engines dimensions using W_RANK environmental bitmap data.

It is still another object of the present invention to integrate a database XLDB (or Extreme Large Database) with Business Intelligence capabilities that control, coordinate, partition, replicate and maintain the vector patterns information that is redundant and robust.

It is still another object of the present invention to convert all of the physical and electronic information into environmental bitmap multi dimensional and geospatial inventory.

It is still another object of the present invention to create the means to store a summary of the traffic of behavior of the end user as patterns of behavior that are used to give value to links.

It is still another object of the present invention to apply the process of LATIN or cleaning and standardizing the environmental spaghetti, and enabling a lingua franca interface to distribution and storages means of goods and services converting all of the data into a superset Y. Superset Y=(O, R, ~R, S, ~S, W, ~SW, U, ~VU) has several sets R=Retailers, S=Suppliers, W=Wholesalers, and U=UCommerce Warehouses. The tilde symbol or ~ represents waste. Each set A has real data and ~A duplicate or garbage data. In large networks, ~ or garbage grows geometrically as a network grows in complexity. Once the system data integrity exceeds a critical mass, the information with the environment suffers from the 'Spaghetti Phenomena' and then becomes confounded or useless.

It is still another object of the present invention to apply the process of cleaning, mapping, organizing, standardizing and transforming the content of the electronic files of the Internet into unique elements belonging to the Superset (U). The Superset U=(0, I, ~I, J, ~J, K, ~K, T, ~T) and has the independent variables (I, J, K) that measures content value, and the dependent variable (T) consists of the time dimension.

It is still another object of the present invention to give Y_LATIN or transforming and organizing the spaghetti of global traffic and availability of merchandise that is delivered door to door. This is the process where the MPS® removes all of the anarchy, chaos, redundancy and saturation, and in turn, reduces ~R, ~S, ~U, and ~W to 0 as Information Entropy is achieved.

It is still another object of the present invention to associate, coordinate, control, optimize and synchronize a plurality of independent searches request without saturation, with Informational Entropy and minimal latency or system tax burden. ~I, ~J and ~K are eliminated as the system creates Simple, Hybrid and Complex Search Structure Searches that quantify and qualify with certitude the value of the content of a link. ~T is eliminated once the system is able to gather, distill and analyze real time events of the environment.

It is still another object of the present invention to create the Z_PRICE method that analyzes and evaluates the spaghetti of the logistical queue of traffic in order to identify the lowest cost and time delays associated with the transportation of goods and services door to door by using optimal X_FOB and Y_CDIF prices from the local, regional and global scope points of view.

It is still another object of the present invention to create the W_RANK method that analyzes and evaluates the Internet's environmental spaghetti to associate, coordinate, control, optimize, synchronize and then match/merge a plurality of independent searches into higher informational quality results.

It is still another object of the present invention to teach how to build a Simple Pyramid Search valorization method for search engine keywords.

It is still another object of the present invention to teach how to build a Hybrid Pyramid Search valorization method for search engine keywords.

It is still another object of the present invention to teach how to build a Hybrid Pyramid Search valorization method for search engine keywords. The top valued W_RANK bitmaps are used as display means to end users.

It is still another object of the present invention to incorporate the latest techniques of X_FOB, Y_CDIF and Z_PRICE methods to deliver products and services door to door at optimal time and cost.

It is still another object of the present invention to incorporate the latest techniques of W_PRICE methods to quickly deliver the highest quality of content to a browser search request.

It is still another object of the present invention to incorporate the latest techniques of W_PRICE methods to quickly deliver the highest quality of content to a browser search request.

It is still another object of the present invention to incorporate, validate, valorize, analyze, read and distill the content of a link to improve the W_RANK.

SUMMARY OF THE INVENTION

The present invention overcomes the aforementioned limitations of the prior art, and accomplishes the above-stated objectives as well as others as may be determined by a fair reading and interpretation of the entire specification.

An expert system Supercomputer, commercially known as UCommerce, is provided to incorporate a plurality of independent nodes, also referred to herein as intelligent components which work together in an organized and hierarchical manner to represent all of the network platform components, the human resources of an organization and the consumers interactions with the system.

An expert system Supercomputer is provided to incorporate a plurality of independent nodes, also referred to herein as Intelligent Components which work together in an organized and managerial hierarchical manner to represent all of the products, services, human resources and consumers of the organization. The system will assimilate a plurality of concurrently working sovereign distribution centers, such as Retailers, Suppliers, Wholesalers and UCommerce warehouses. This concept is further expanded to integrate geospatial components to each message from the environment, and allows each network to interact with the MPS®. The technology utilizes business rules to determine, based on traffic volumes and available resources, the node of the system that performs the match/merge. Therefore, Intelligent Components make decisions using business rules, permitting them to perform complex tasks once the Quote or Order Owner builds the Vector CDR, and they have all of the Partial Vector components. This ability of the lower nodes of the hierarchy to complete most tasks permits the system to avoid unnecessary and redundant activities. This permits the system to work independently at a lower throughput when the centralized SMP is absent. The HQ leader of each Switch has the ability and authority to create an environmental bitmap that consists of a summary data of their entire organization. The highest HQ leader gathers, distills and disseminates the environmental data, so it can assign, control, coordinate and synchronize directives to its entire organization to process tasks. The solution of large and/or complex networks requires geospatial data which denotes a 3D mentality, the hierarchy organization and plurality of networks were transformed into a Pyramid like structure, since it constitutes a better representation of the reality and elucidates the magnitude of the problem that is being solved.

An expert system Supercomputer, commercially known as XCommerce, works in an organized and hierarchical manner to represent all of the links, content of the Internet and the massive traffic volumes derived from the consumers interactions with the environment.

Evolution of the Invention

The original Ph. D. dissertation was interested in solving the dilemma of having real time billing entities for a network, the size of Telecom Italia with all of its complexity and associated environmental spaghetti. The invention was designed to work outside of the Legacy System by using school of management techniques, quality assurance and integrated bundled mechanism of data migration, match/merge algorithms to correlate tariff billing entities and a billing engine that would make the information immediately available, so to stop the 2 month billing cycle in arrears that had a net result of costing the organization between $200 and $400 million USD per year, depending on severity of fraud. Fraud occurs when the bureaucratic Legacy System is unable to react in a proactive or reactive manner to the changing conditions of the environment, and possesses implicit inefficiencies and limitations. By simulating the data flow of messages from the environment through means of simulation, the results will elucidate pitfalls/conditions of the networks that clog or saturate the system: first, arrange the resources of the system to coordinate the flow of data to handle a specific rated capacity; then, test the system when traffic approaches the critical mass or specific asymmetric conditions occur. As the volume increases arithmetically, the 'tax burden' on the available throughput increases exponentially, complexity is directly proportional with the number of layers required to gather environmental information. The 'Tax burden' phenomena becomes apparent once the critical mass is exceeded or traffic volumes are greater than 5% of the rated capacity. Under these dire conditions, the unmanaged flow of traffic, massive quantities of data moved and net effects of the 'tax burden' of the system concurrently deteriorate and saturate the network. In a nutshell, this technology optimal manages and coordinates throughput to avoid saturation during dire traffic conditions:

a) Unmanaged systems get clogged quicker than managed ones do, alternatively if they are managed into single nodes they decay as the number of nodes increase. Ex.: for 1,024 nodes, unmanaged nodes require 200 minutes to perform a synchronized network wide CO flush; whereas 1,024 managed nodes will perform the same task in 17 minutes.

b) The mechanism to distribute information to the centralized Symmetric Multiprocessors (SMP) further augmented the cost of throughput to perform a correlated billing entity, increases geometrically with the number of dependent tiers. In this case, the Legacy System uses the first tier of monitors to read and filter information, the second tier to perform data manipulation, and the summit tier to match/merge correlated billing entities. The Modern System uses the first tier to read, filter information and perform data manipulation, and onwards to match/merge correlated billing entities. The GES™ or MPS® performs all of the tasks from the first tier onwards. The Legacy System has two dependent tier layers, the Modern System and the MPS®.

c) The log of the lowest common denominator of grid unmanaged Network Platform Equipment is variable Z. This is described in the ratio of actual monitoring CPU to SMP. In this case, the Legacy System has about 64 nodes per SMP; the Modern System has about 16 nodes per SMP; whereas the GES™ has 1 node that behaves as a SMP.

Accordingly after revamping the gathering means of the existing architectures, the Legacy System would be able to perform data mitigation and the billing cycle in days and weeks instead of 2 months. Through means of a Modern System, the process of data mitigation and the billing cycle were reduced by one magnitude level to hours and days, whereas the commercial version of the GES™ (known in the dissertation as the Hot Billing System) reduced the magnitude by another level to minutes and hours, and the Massive Mission Critical MPS® further reduced the magnitude by another level to seconds and minutes! As per conclusions of the dissertation, Real Time Billing was just one step away.

U.S. Pat. No. 6,614,893 introduces the method of further programming the Intelligent Components not to just understand the proprietary multinational CDR obtained by the Black Box, but instead to actually perform data mitigation and billing cycle through means of reading the SS7 signal packets IAM, ACM, ANM and REL messages. This improvement was the necessary step required to perform Real Time Billing reducing the magnitude by another level to seconds and minutes, which constitutes the technological advantages of the Massive Mission Critical MPS®. New methods were added to the managerial hierarchical system by granting each node the ability to share tasks with parents/siblings/subordinates with lateral and vertical synergy. The primary advantages are as follows:

a) Pseudo Real Time Billing technologies match/merge occurs after the fact using CDR information. Results show at best the data mitigation and billing cycle is made available within minutes and hours. These delays, in gathering data, can produce dire consequences on throughput of the system.

b) Through means of lateral and vertical synergy, the tax burden phenomena was virtually eliminated and contained within tolerable levels.

c) The NEW definition of 'Real Time' starts from the incipiency of a call as a SS7 IAM packet generated by the Network Platform Equipment and continuously changes the transactional fuzzy states as better data is obtained. The system updates the fuzzy state of the call as ACM packets notify a connected call, ANM packets an active call and REL packets instruct the NPE that a call has terminated and to immediately discharge used resources.

U.S. Pat. No. 6,842,511 introduces the concept of reflecting a Telecommunications network, and thus competitors and their usage of the system resources were contemplated, still within the framework of a large fixed network. The primary advantages are the ability to create a Vector CDR that belongs to $3^{rd}$ parties and to integrate the organization and its resources to the GES™ system and method.

CIP #2 develops the notion that the spaghetti of the Legacy System is transmitted as an echo of the environment to a mirror. This mirror, that consists of the GES™, mimics, replicates and simulates the activities of each NPE, and in turn, organizes the information based on geospatial (X, Y, Z) coordinates into geographical areas that are known as blocks. These blocks are responsible for standardizing all of the messages into a lingua franca, simplifying the pits falls of the spaghetti through means of normalization, and transforming the data into correlated billing entities with tariffs. The system further organizes and arranges a plurality of informational blocks into larger objects that resemble 3D pyramids like structures that are autonomous, independent and having ownership of a specific geographical domain belonging to the superset (U). For the basis of the building blocks, the NPE object is used for determining the ownership of the CPE and their associated subscribers. For the basis of the building blocks, the NPE is used as the point of reference for all of the CPE of its subordinate subscribers.

The hierarchical structure was incremented to accommodate global networks with HQ0 to HQ12 pyramid structures. It added the concept of having fixed and wireless networks working in parallel within the same framework, and introduced the XO for cell sites. Within a territory an additional level of hierarchy was added to match/merge the loose ends of calls that use both fixed and wireless networks, that we named Hybrid Calls. Thus two concurrent running HQ0 to HQ5 would solve the issues of the ILEC territory, and the newly added HQ6 tier would resolve hybrid calls.

Two additional groups of tiers were added to the traditional ILEC hierarchy to solve national long distance calls, HQ7 to HQ9, and international calls, HQ10 to HQ12. Finally, the concept of Complex Calls was added. This is to satisfy calls that have classical characteristics: Leg A, point of origin, and Leg B, point of destination format, with Leg X, billable point of origin, and Leg Y, billable point of destination, and several tandem circuits such as Legs (T, U). This call consists of two or more calls to instantiate a single call. For example, a person that has a global network AT&T Italia phone with a billing address of Rome, Italy; originates a call from Miami, USA, to a person that has a global network Nextel phone with a billing address in Buenos Aires, Argentina, that presently is in New York City, USA. At least three calls must be tagged to make the connection.

One Vector Path could use AT&T local long distance between Miami and New York City.

One Vector Path could use AT&T international call between Miami and Rome for billing purposes only, and/or physically if required.

One Vector Path could use Nextel international call between New York City and Buenos Aires for billing purposes, and/or physically if required.

For a complex call, the origin and destination don't belong to the same network. Match/Merging calls with missing gaps of information substantially lower informational entropy. If the originating person dials 01154#######, the call is an outbound from Miami to Argentina where Nextel rebroadcasts the call to New York City, since the caller is registered to have a global plan; it is possible that the Miami to Rome call will be symbolic and used for a billing purpose only, the system will be able to route a domestic USA call and assign the international roaming surcharge.

CIP #3 was further updated and revamped to satisfy the needs of a commercial version as a Product in ICE, Costa Rica, and the first encounter was that four dimensions of telecommunications traffic are required: 1) Fixed, 2) IP, 3) Wireless, and 4) International wireless competition. To take advantage of cluster and grid technologies, the basic pyramid structures evolved into sector, regional and domain Switches. Thus the GES™ had a substantial evolution to the MPS® that consists of a hierarchy of tiers of parallel cluster nodes, to discrete segments of clusters that behaved like grids and covered a predefined geographical area and all of the NPE, with the corresponding CPE based on the assigned geospatial (X, Y, Z,) location. Note: an object can only belong to a specific block and Switch like object.

Thus the basic Switch became to fruition by allowing clustering computer software with a modified Unix Shell, to launch scripts based on predefined time intervals or socket ID instances and to begin integrating all the incompatible data structures, protocols and technologies. Each CPE belonging to a specific NPE has geospatial, demographic and financial characteristics. The Switch can instantiate, block, kill and listen to calls, perform data mining, data warehousing, fault management, provisioning, routing and network trending, in real time. Based on the size of the PTT, the organization will be broken down into three geographical depending tiers as follows:

a) The Managerial Pyramid Switch® interacts with the Senior Management of the organization to allow it to control all of the human and NPE organizational resources to make strategic decisions derived from live network wide data. This Switch covers the entire domain of the organization, or can be distributed amongst a cluster of these Switches for larger PTT. (international and complex traffic)

b) The Synergy Interface Switch® interacts with the Middle Management of the organization to allow it to control all of the human and NPE organizational resources to make decision support and operating support decisions derived from live regional data. This Switch covers the entire region of the organization that covers an NPA (Numbering Plan Area) or LATA (Local Access and Transport Area). (long distance traffic)

c) The Team Work Switch® interacts with Engineering, Field Crews and MIS, to manage and control the integrity and stability of the different technologies NPE to deliver to the end user the best quality, product and service. This Switch covers a sector of the organization that covers a plurality of CO, XO and ISP within an Exchange (NXX) or NPA. (local traffic)

All of the components work collectively and independently from each other, and still simultaneously perform the task analyzing, evaluating, gathering and processing information from the environment, in real time. New messages occur at the moment of incipiency of receiving the fuzzy logic IAM, ACM, ANM or REL messages from the environment. Intelligent Components are the basic elements of the system. These are new attributes to them that supersede previous Business Rules:

a) Each Intelligent Component is also an independent working entity.

b) Intelligent Components can mimic, replicate and simulate Fixed, IP, VOIP and/or Wireless Network Platform Equipments.

c) Each Intelligent Component is assigned a primary function with their Switch to control the NPE. When nodes match/merge calls that belong to their primary functions, they can complete a Vector CDR as if one level higher in the hierarchy. For example, a primary function fixed HQ0 can complete a Vector CDR that is Intra CO and Intra NXX calls.

d) Each Intelligent Component determines if a call is Simple, Hybrid or Complex.

e) For Simple Calls, having Legs (A, B, T) belonging to a single network, the system determines the Leg A owner, which in turn assigns the Vector CDR owner.

f) For Simple Calls, if the Call Ownership is deemed to belong to the Synergy Interface Switch® domain by the system, the Team Work Switch® Leg A owner will complete the Vector CDR. If the Leg A owner TWS® does not have Leg B data, it creates Partial Vector Legs (A, T) information and requests the owner of the leg B owner TWS® to send the partial Leg B. Then the TWS® Leg A owner has to match/merge Partial Vector Legs (A, B, T) to create the resultant Vector CDR that possesses the entire vector trajectory path.

g) For Simple Calls, if the Call Ownership is deemed to belong to the Managerial Pyramid Switch® domain by the system, the Synergy Interface Switch® Leg A owner will complete the Vector CDR. If the SIS® Leg A owner does not have Leg B data, it creates all of the Partial Vector Legs (A, T) information, and requests the owner of the leg B owner SIS® to send the partial Leg B. Then the SIS® Leg A owner has to match/merge Partial Vector Legs (A, B, T) to create the resultant Vector CDR that possesses the entire vector trajectory path.

h) Hybrid Calls, having Partial Vector Legs (A, B, T, U, X, Y, I, J, K), belong to the exact two networks. The system determines the Leg A owner, which in turn assigns the Vector CDR owner.

i) The system will create two Sub Vectors CDR, where each has complete Legs (A, B) side information of a call from the point of view of a single network. Thus a Hybrid Call will have exactly two Sub Vectors CDR and Complex calls more than three.

j) By means of the Vector CDR and its corresponding data structure bitmap information, the system will know that the Hybrid Call had a total cost by adding (origin, tandem and destination) components Sub Vector CDR.

k) For Hybrid Calls, if the Call Ownership is deemed to belong to the Team Work Switch® domain by the system, the Team Work Switch® Leg A owner node will complete the Vector CDR. If Leg A owner node does not have Leg B data, it creates Partial Vector Legs (A, T) information that belongs to the same network, which sends it to the partial Leg A node of its superior TWS®, and requests the owner of Leg B owner node to send the Partial Vector Leg B that belongs to the other network. Then the TWS® has to match/merge Partial Vector Legs (A, B, T) to create the resultant Vector CDR that possesses the entire vector trajectory path, and the two complete Sub Vectors CDR that belong to each network.

l) For Hybrid Calls, if the Call Ownership is deemed to belong to the Synergy Interface Switch® domain by the system, the Team Work Switch® Leg A owner node will complete the Vector CDR. If Leg A owner node does not have Leg B data, it creates Partial Vector Legs (A, T) information that belongs to the same network and to the Partial A function of its superior SIS®, and requests the SIS® superior of Leg B owner node to send the Partial B function that belongs to the other network. Then the SIS® Leg A owner has to match/merge Partial Vector Legs (A, B, T) to create the resultant Vector CDR that possesses the entire vector trajectory path, and the two complete Sub Vectors CDR that belong to each network.

m) For Hybrid Calls, if the Call Ownership is deemed to belong to the Managerial Pyramid Switch® domain, the Synergy Interface Switch® Leg A owner node will complete the Vector CDR. If Leg A owner node does not have Leg B data, it creates Partial Vector Legs (A, T) information that belongs to the same network, which sends it to the Partial A function of its superior SIS®, and requests the SIS® superior of Leg B owner node to send the Partial B function that belongs to the other network. Then the MPS® Leg A owner can match/merge Partial Vector Legs (A, B, T) to create the resultant Vector CDR that possesses the entire vector trajectory path, and the two complete Sub Vectors CDR that belonged to each network.

n) For larger and complex networks, a 'CORE' MPS® might exist to load balance a plurality of MPS® and to allow a smoother transition of information between the system and the power users.

o) The SIS® performs the match/merge task for regional and global domain Hybrid Calls.

p) Complex Calls, that possess Partial Vector Legs (A, B, T, U, X, Y, I, J, K, V, W, C, D), belong to a plurality of networks. The system determines the Leg A owner, which in turn assigns the Vector CDR owner.

q) The Sub Vector CDR, within its bitmap data structure, has all of the associated components to reverse engineer a Complex Call from origin to destination within a network environment (F), (I) or (W).

r) Leg A side Switch owner can match/merge Sub Vectors CDR Leg A.

s) Leg B side Switch owner can match/merge Sub Vectors CDR Leg B.

t) Each Switch has a specialized Parser Function that distributes the flow of IAM, ACM, ANM and REL messages to the appropriate node with the new rules mentioned above.

u) To block or kill a call, Leg A owner instantiates REL messages and forward chains through the system.

v) To instantiate a call, Leg A owner instantiates a Wireless call through the optimal resource route.

w) To communicate with a Customer Service Representative through a specific ANI, the system will send a message to the NPE to play a specific voice message.

x) The Customer Service Representative can then call a specific ANI to interact with the system, or alternatively instantiate a new call using specialized software that creates network packets.

y) Intelligent Data Warehouse HQ2 or + has large data repositories, and uses parts of the throughput to perform specialized Data Mining and Data Warehousing activities through means of the integrated $3^{rd}$ party licensed Database.

z) The Parser Function directly receives through the GNOC centers an echo of a plurality of trunks and circuits that belong to a specific Sector or Region, and can be mapped directly to a specific NPE. These nodes are directly connected via fiber to each of the nodes, so latency is minimized. When an Intelligent Component wants to communicate to the network, this node is the one that performs the live Central Office rerouting, block or killing of calls, and instantiation of new calls.

The 'CORE' MPS® is the means by which the power users of the system can perform real time changes to the system, and can request system integrity and performance updates to better make tactical and strategic decisions. End users that want to monitor their available credit as a call progresses via ADSL can do so through this node.

The Internet is considered a global telecommunications network with 1,000,000,000 subscribers, and thus most of the business rules apply. UCommerce and XCommerce are business intelligence applications designed to give the end users the latest information. In order to eliminate redundancy, raw data must be converted by a Supercomputer into primed data with patterns of behavior for real time financial evaluation to dynamically adapt to the changes of the environment.

DETAILED DESCRIPTION OF THE PREFERRED EMBODIMENTS

Reference is now made to the drawings, wherein like characteristics and features of the present invention shown in the various figures are designated by the same reference numerals.

FIG. 1: is a schematic representation of the Information Pyramid Structure that interacts with the environment or Internet. The supplier system simulates the entire superset of valid KEYWORD regular expression requests, and converts the results in Environmental Bitmap map data, so that future request are made absent of the Browser Engine supercomputer (8×8) cluster searching capabilities. The system measures each KEYWORD regular expression magnitude or quantity of hits belonging to a query. For a vague KEYWORD search the system assumes, that a large # of valid hits implicitly exists such as 10,000,000,000 making the value of the response meaningless. For a vague KEYWORD search, the system associates them to a Simple Pyramid Structure search that filters down the magnitude of vagueness by a factor of 10,000. The process of improving the Informational Entropy begins by filtering the vague KEYWORD search by reading, comparing validating the semantic structure of the content of the all the responses and not just the highest page ranks. The supplier system measures the value of the content by comparing the quantity and quality of Simple Joins, Blocks, Ceiling and Walls, which are another name for collections of words and grammatical rules that are used to write properly in a given language.

For a concise KEYWORD search the system assumes, that a medium # of valid hits implicitly exists such as 1,000,000 making the value of the response virtually meaningless. For a concise KEYWORD search, the system associates them to a Hybrid Pyramid Structure search that filters down the magnitude of vagueness by a factor of 100. The process of improving the Informational Entropy continues by filtering the concise KEYWORD search by further reading, comparing validating the semantic structure with their association to higher magnitude words. The supplier system further measures the value of the content by comparing the quantity and quality of Hybrid Joins, Blocks, Ceiling and Walls, which consists of less common word collections, geospatial data, antonyms and synonyms.

For a precise KEYWORD search the system assumes, that a small # of valid hits implicitly exists such as 10,000 making the value of the response discrete. For a precise KEYWORD search, the system associates them to a Complex Pyramid Structure search that filters down the magnitude of vagueness by a factor of 100. The process of improving the Informational Entropy continues by filtering the precise KEYWORD search by further reading, comparing validating the semantic structure with their association to higher magnitude words. The supplier system further measures the value of the content by comparing the quantity and quality of Complex Joins, Blocks, Ceiling and Walls, also analyzes all the HTML information, and associated links to make sure the content is not a spam or viral contamination. Then system finds the optimal KEYWORD search by using the content, page and security value achieve Informational Entropy and derive the top 10 most satisfying results.

Figure 2:
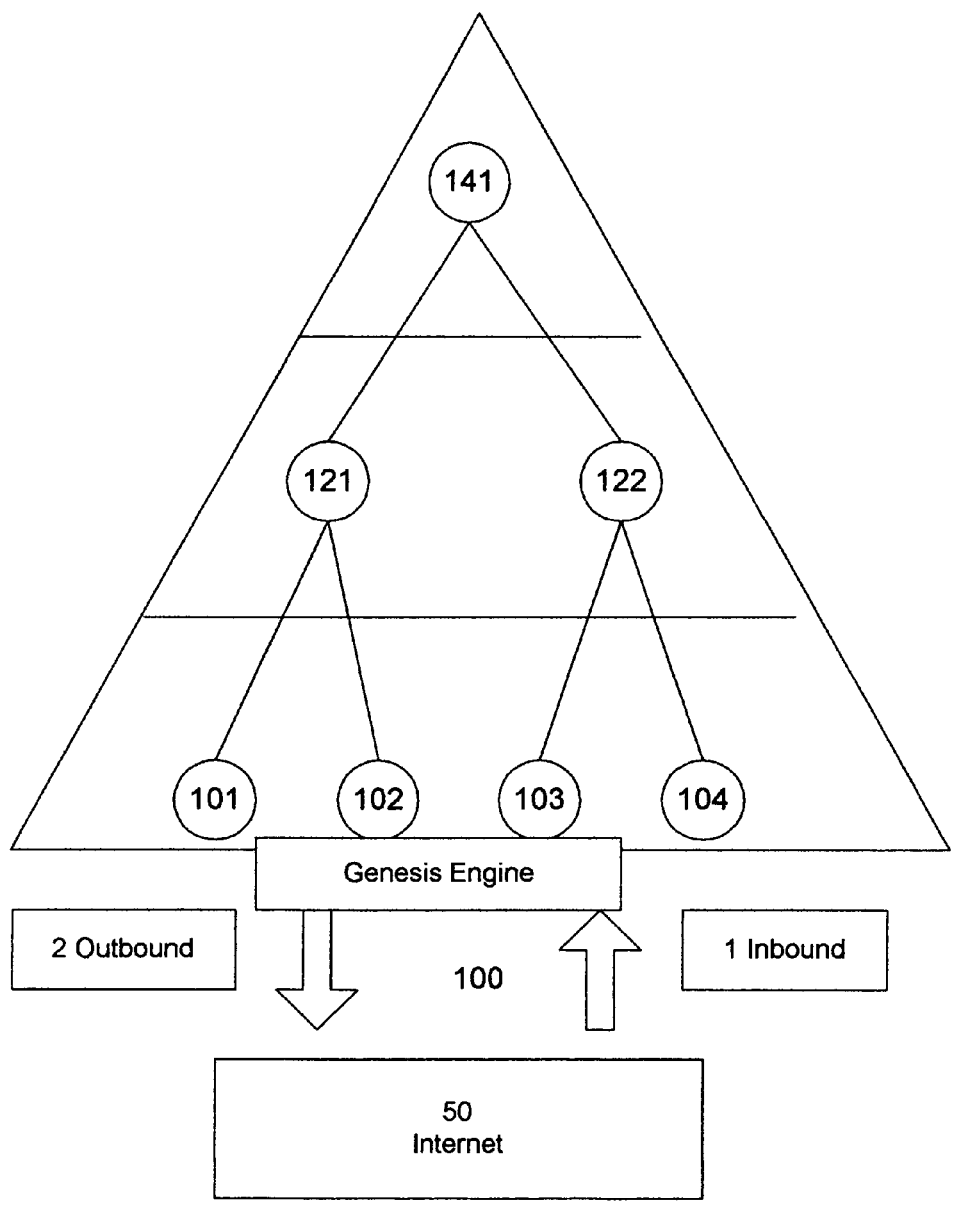

FIG. 2: shows how the multi-tiered components work together to build a (100) supplier system. The system can consist of the summit tier (141) Intelligent Data Warehouse that is parent of all of the components. The middle tier (121-122) manages and controls all of the activities for financial institutions, retailers, suppliers and wholesalers, and helps the parent (141) component to coordinate and manage all of the available resources. Each middle tier (121-122) manages multiple lower tier Intelligent Components (101-104). Any of these elements can perform synergy (lateral and vertical) to finish pending tasks with unused bandwidth. Synergy consists of allowing components based on specified protocols to share the resources of lesser-taxed subordinates, group members or their parents. The supplier system (100) interacts with the consumer (50) preferably via the Internet; in essence the summit tier (141) updates the latest inventory information of supply, whereas the Genesis Engine Drone (101-104) matches and merges multiple end users requests to use economy of scale to lower to purchase goods at the lowest available price. Alternatively, through the end users (50) criteria, the Genesis Engine Drone must accommodate particular needs and offer door to door service by including domestic and international rush shipping options.

Figure 3:
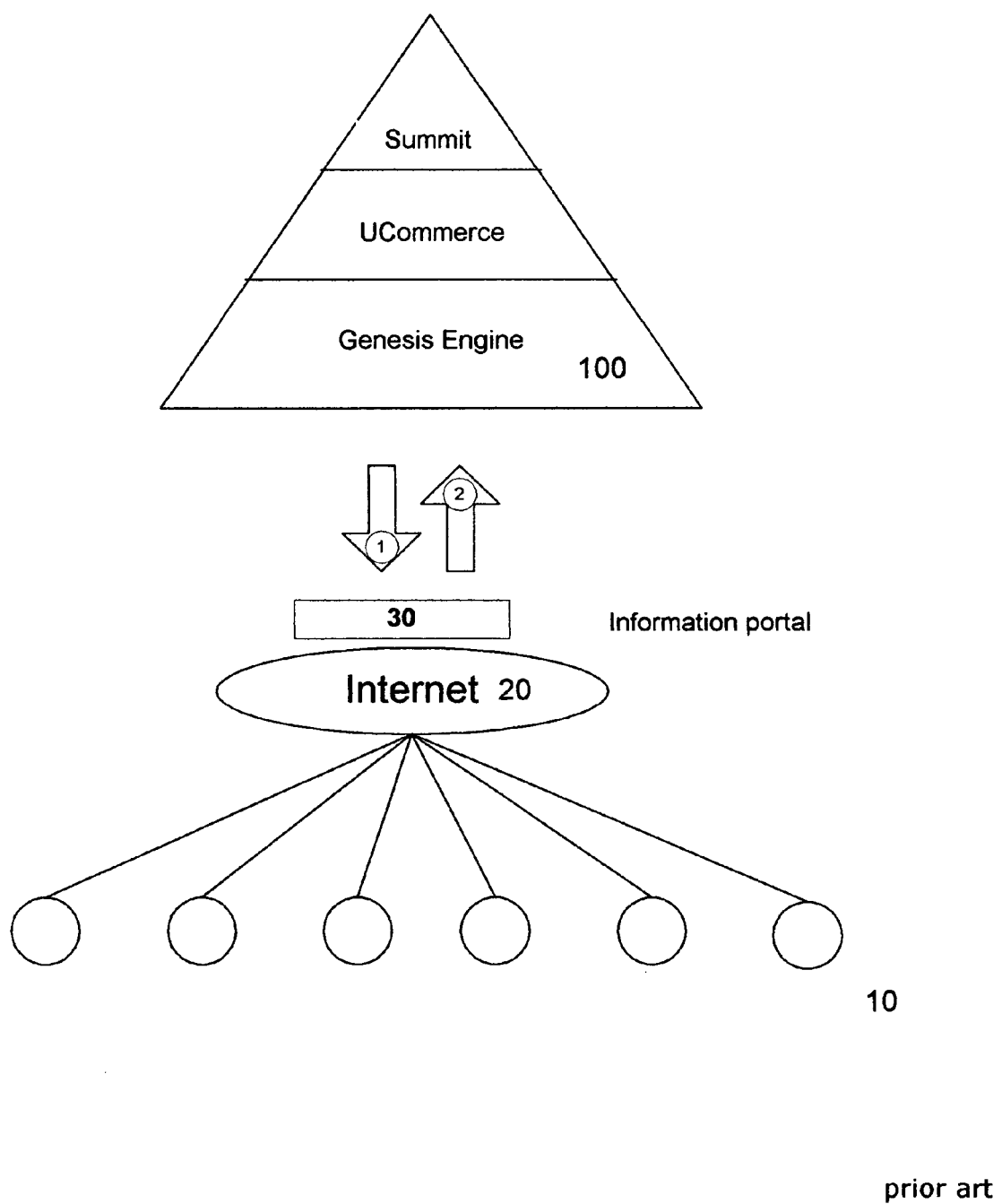
Figure 4:
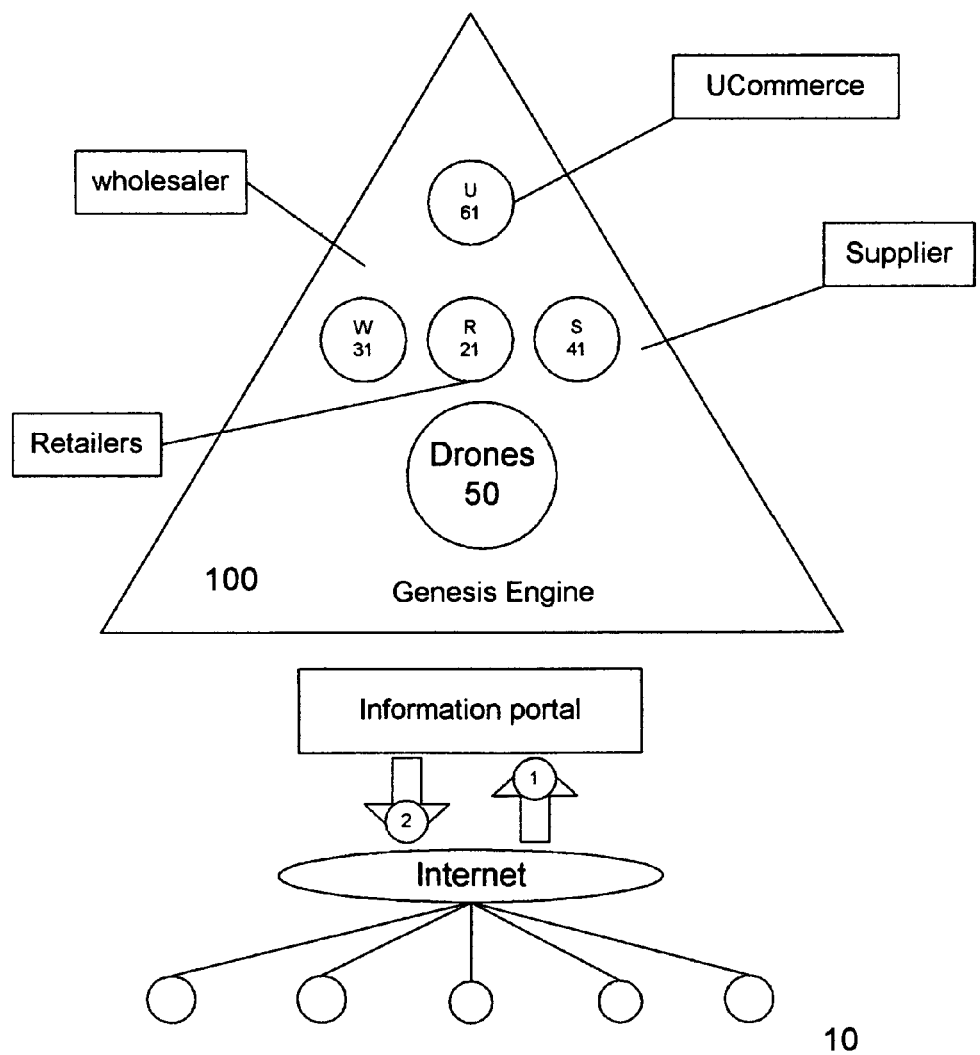
Figure 5:
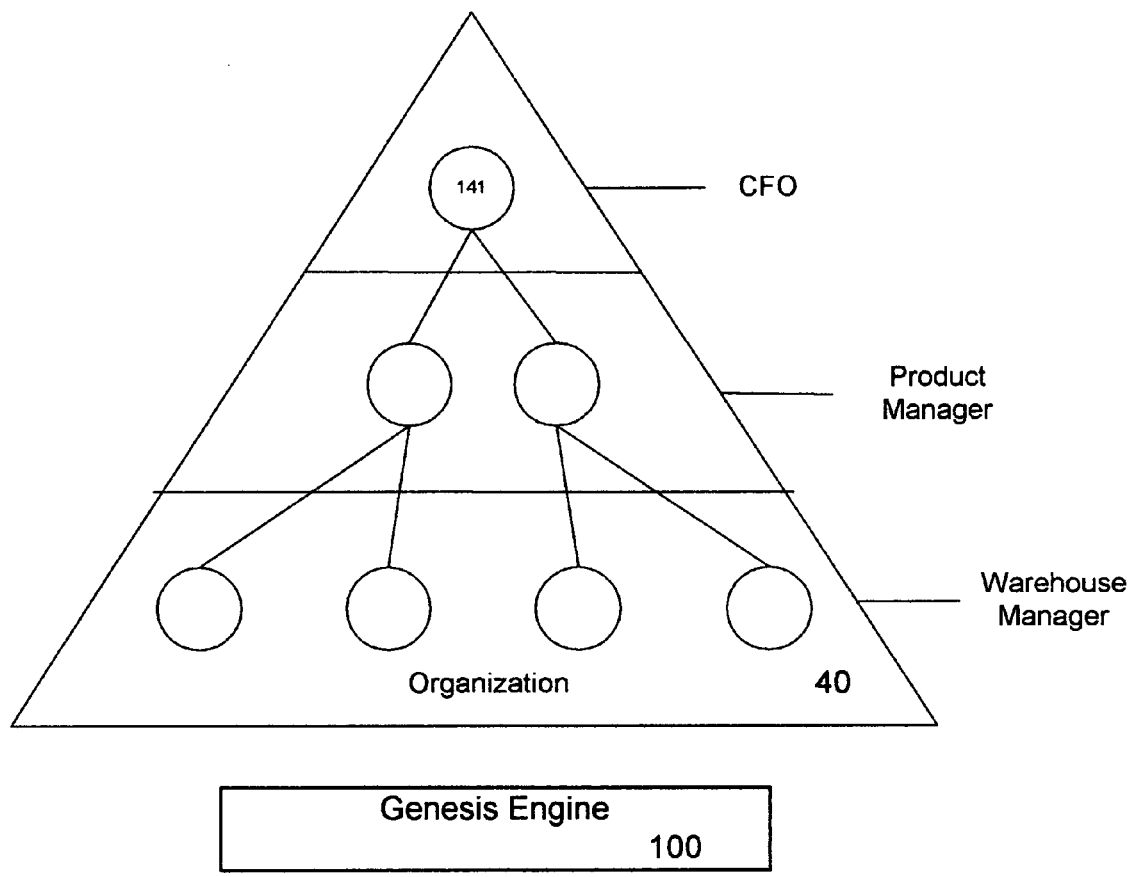
Figure 6:
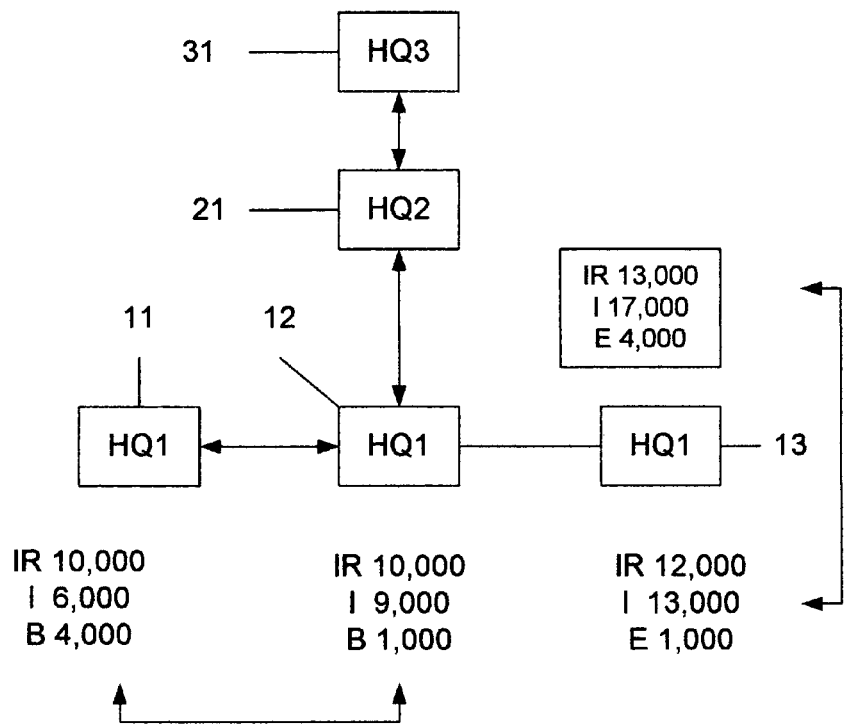

FIG. 3: shows how the consumer can have immediate access to their data in real time from the Supercomputer or supplier system (100) via the (20) Internet. Since an organization is more than just assets, buildings and network equipment; it must have the ability to communicate with the outside environment and allow the (10) customer to have access to their own information. The (30) Information Manager receives requests and replies and converts these messages into computer mathematical variables, and then the system can find the required information and respond in the form of a system response or written report;

FIG. 4: shows the continuous proactive scanning of the (100) Supercomputer system of the (50) E-Trade Network. Each Intelligent Component mimics the activity of each inbound (1) and outbound (2) protocol messages, and then analyzes the information to better understand what is going on in the environment to make a decision. Subordinate elements update their parents until the summit tier components are reached, so when the summit node simulating the organizational domain analyzes the information of its subordinates, it can create a network wide response, so that all of the intelligent components can work in a coordinated, organized and synchronized manner, based on the current network conditions. To increase bandwidth, the system resources can be subdivided into geographic regions and district domain elements that can further adjust the message as it reaches individual subordinates. Each Intelligent Component has the opportunity to compete and bid for each end user purchase on its own since it has up to date organization domain in real time. (161) UCommerce nodes communicate with supplier system inventory warehouses, (141) supplier organizations, (131) wholesalers distributors, and (121) retailers;

FIG. 5: shows the continuous proactive interaction of the (100) Supercomputer system with the (40) organizations management and labor. The Intelligent Components serve the organization human resources by helping individual to make decisions with real time information. Since, human beings are better able to understands and survive to the conditions of the environment they can supply the system with vital information, conditions and parameters, so that decisions made reflect this experience. Where the CFO of an organization might interact with the summit tier of the organization to determine overall sales, the product manager can use the middle tiers of the system to update prices and inventory, and the warehouse manager can interact with the lower tiers or Genesis Engine Drone to notify or update a sales order, purchase order and/or quote;

FIG. 6: is an example of Intelligent Components management synergy. If no synergy exists and lateral integration among the components does not apply, then 5,000 excess records are sent to the (31) HQ3. Since, (21) HQ2 can manage and control its own resources and those of its (11-13) subordinates. Consequently, it can move and shift resources for maximum efficiency, thus a 5,000 buffer exists which is used to remove the 5,000 excess records.

Figure 7:
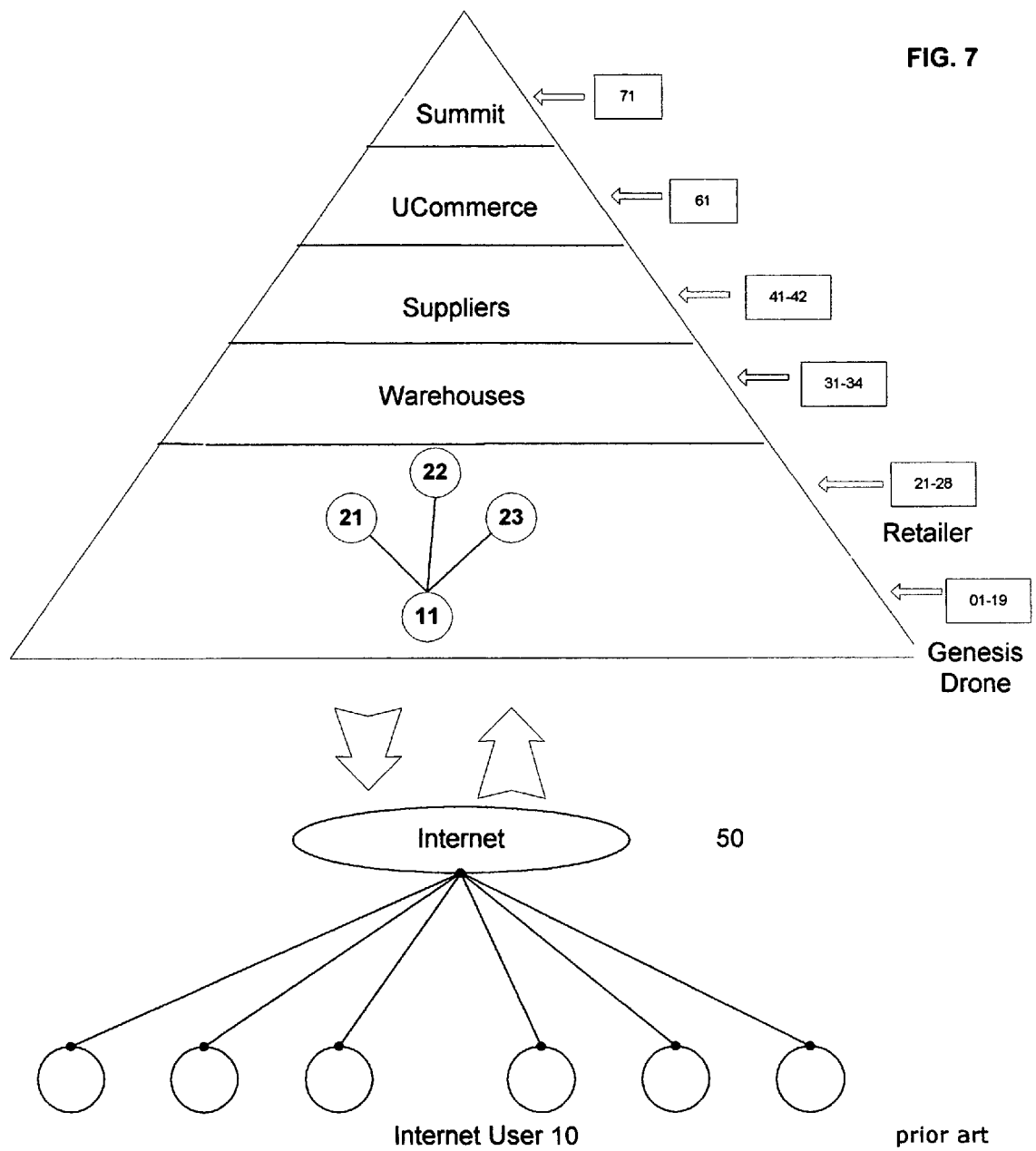

FIG. 7: is a diagram of the interaction of the consumer (10) and retailers (21-28). The end user using the software connects to the supplier system and then the quote transaction is assigned to a predefined Genesis Engine drone. In this case the end user wants immediate pickup of merchandise from a local retailer. The system scans by making requests to each of the retailer nodes (21-28) that has Inventory In Hand and the lowest price, and in turn notifies the end user.

Figure 8:
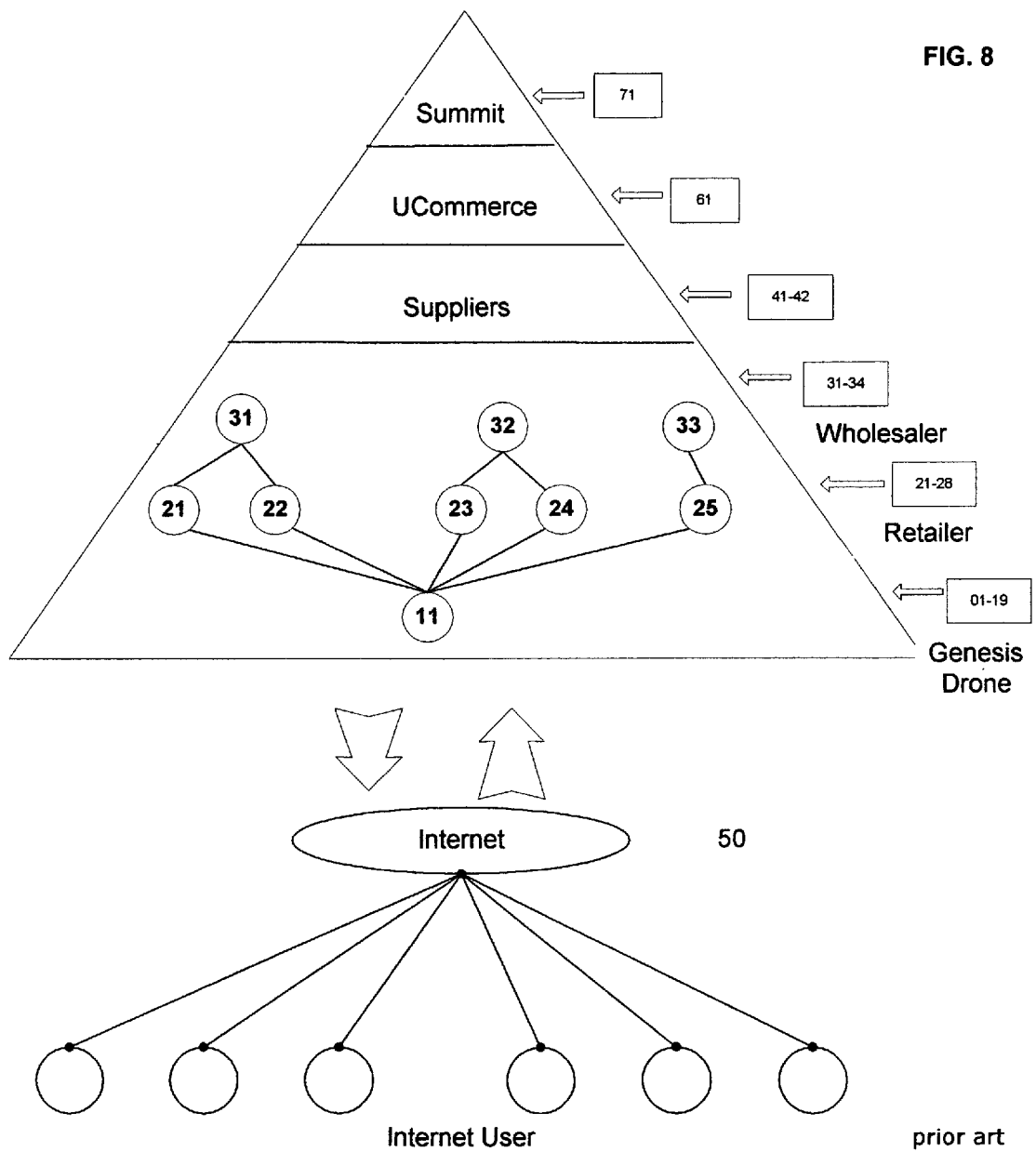
Figure 9:
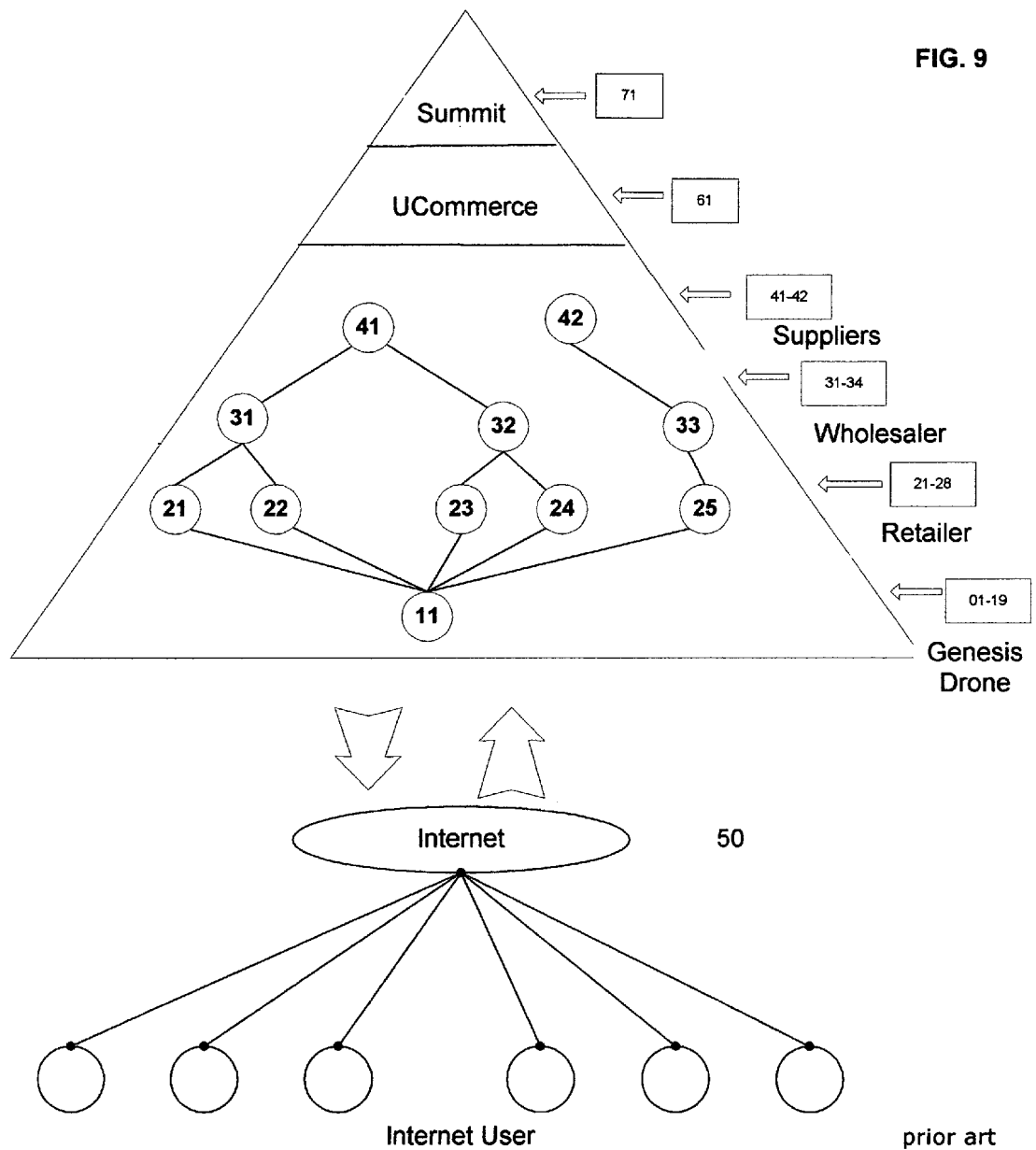

FIG. 8: is a diagram of the interaction of the consumer (10) and wholesaler (31). The system scans by making requests to each of the retailer nodes (21-28) and (31-34) wholesaler nodes that have Inventory In Hand and the lowest price, and in turn notifies the end user. The (31) wholesaler is a regional provider of goods and services to the consumer where shipping is CIF and FOB. The (31) wholesaler satisfies the end users' requests, since both local retailers (21-28) and wholesalers (32) are unable to delivery goods and services at optimal conditions;

FIG. 9: is a diagram of the interaction of the consumer (10) and supplier (41). The system scans by making requests to each of the retailer nodes (21-28), wholesaler nodes (31-34) and supplier nodes (41-42) that have Inventory In Hand and the lowest price, and in turn notifies the end user. The (41) supplier is a manufacturer of goods and services and interacts with (51) UCommerce to deliver the lowest price where time is not necessarily the essence for CIF shipping, allowing the supplier (41) to sell its inventory optimally. The (41) supplier node satisfies the end users' requests, since all of the local retailer (21-28), the regional wholesaler (31-34) and supplier nodes (42) are unable to delivery goods and services.

Figure 10:
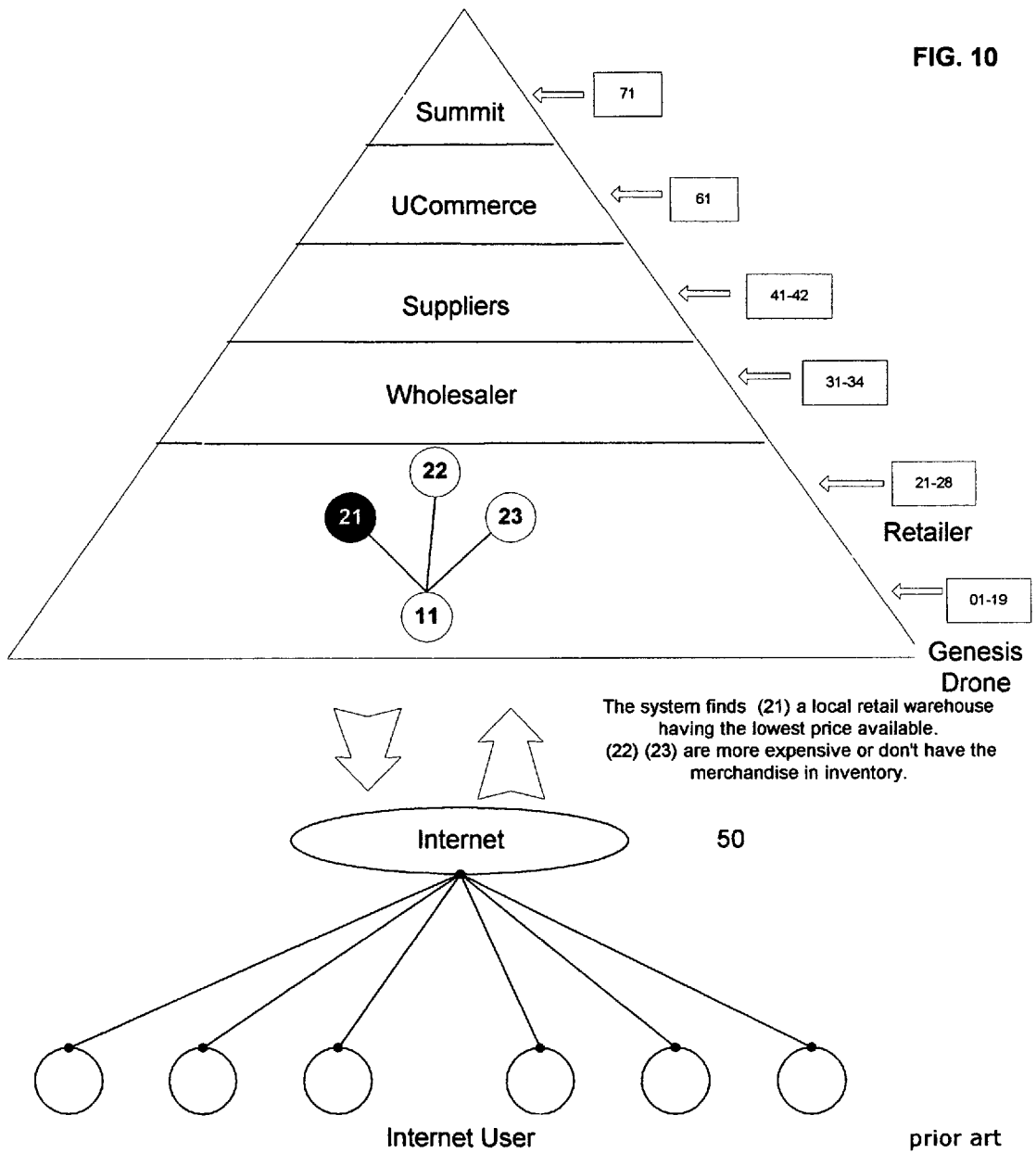

FIG. 10: is a schematic representation of how UCommerce (51) identifies the needs of a customer and uses a retailer (21) (local warehouse). The system identifies if a retailer (21) has stock in hand for the consumer within the cost, financing and time constraints of purchase order;

In this case (22) the retailer with the best cost is selected. The consumer uses the local retailer when the specific product is required immediately; In this case the Genesis Engine drone, in charge of the transaction, performs the following steps without requesting any information from any of the higher tiers:

a) As per the last approved synchronization by the summit tier, which retailers carry said inventory. In this case retailer nodes (22, 25, 27 and 28) carry the item.

b) The system compares with known Inventory levels, which retailer nodes have enough Inventory In Hand to satisfy the requests. In this case, only retailer nodes (22 and 27) have a greater or equal Inventory In Hand to satisfy the requests.

c) The system uses the information from the Intelligent Inventory Rules Algorithm to determine the best price. In this case, the supplier system has assigned a retailer node (27) with the best price value.

d) Then the program compares the best price against the UCommerce warehouse prices of the same local geographical area. The system will dispatch the best price, lowest delay and most reliable shipment route from origin to destination.

Thus, the Genesis Engine drone was able to find the best price without having to chain thousands of requests and responses that would only clog the system, and are inherit to a centralized or mainframe based system. In sharp contrast, the Supplier System is a distributed parallel clustered architecture that, by means of system and how Intelligent Components are arranged and given hierarchy status and responsibility and method pre-calculated inventory calculations, designs to minimize bandwidth usage and allows the system to always work at its maximal rated capacity.

Figure 11:
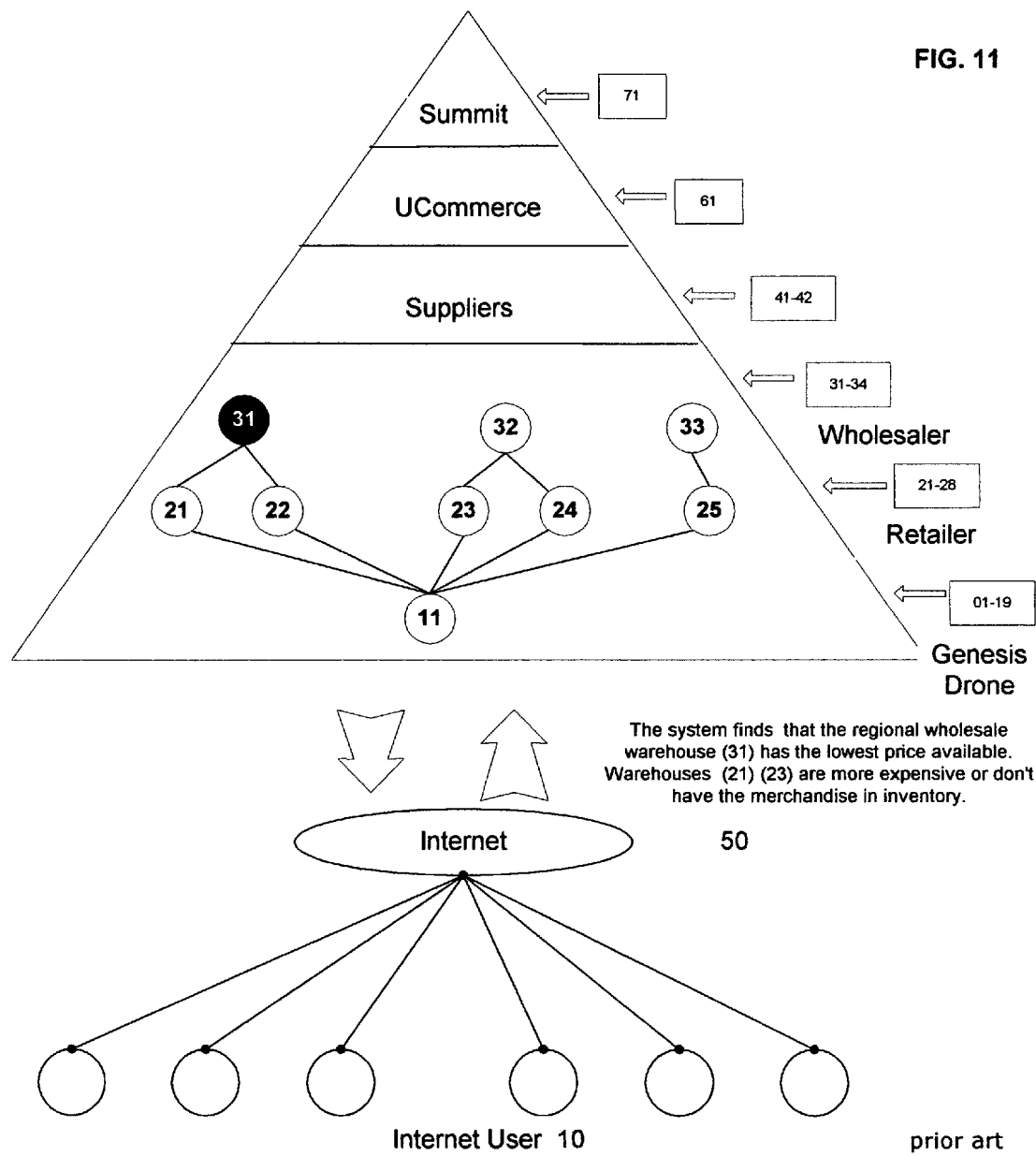

FIG. 11: is a schematic representation of how UCommerce (51) identifies the needs of a customer and uses a wholesaler (31) (UCommerce warehouse). The system identifies if a wholesaler (31) has stock in hand, in queue or can order to a regional supplier for the consumer within the cost, financing and time constraints of purchase order;

To explain this example, we will assume that the end user has allowed enough time for all of the regional wholesalers to satisfy the request with the allotted time, and second that wholesaler prices are lower than retailer ones.

In this case, the Genesis Engine drone, in charge of the transaction, performs the following steps without requesting any information from any of the higher tiers:

a) The system uses Intelligent Inventory Delivery to determine the best retailer node price, in this example, retailer node (27) has the best price from FIG. 10.

b) The system compares with known Inventory levels, which wholesaler nodes have enough Inventory In Hand to satisfy the request. In this case, only retailer nodes (32 and 33) have a greater or equal Inventory In Hand to satisfy the request.

c) The system uses the information from the Intelligent Inventory Rules Algorithm to determine the best price. In this case, the supplier system has assigned a wholesaler node (32) with the best price value.

d) The program will sell products from wholesaler node (32) if the price is lower than the retailer node one (27).

Then, the program compares the best price against the UCommerce warehouse prices of the same regional area. The system will dispatch the best price, lowest delay and most reliable shipment route from origin to destination.

Figure 12:
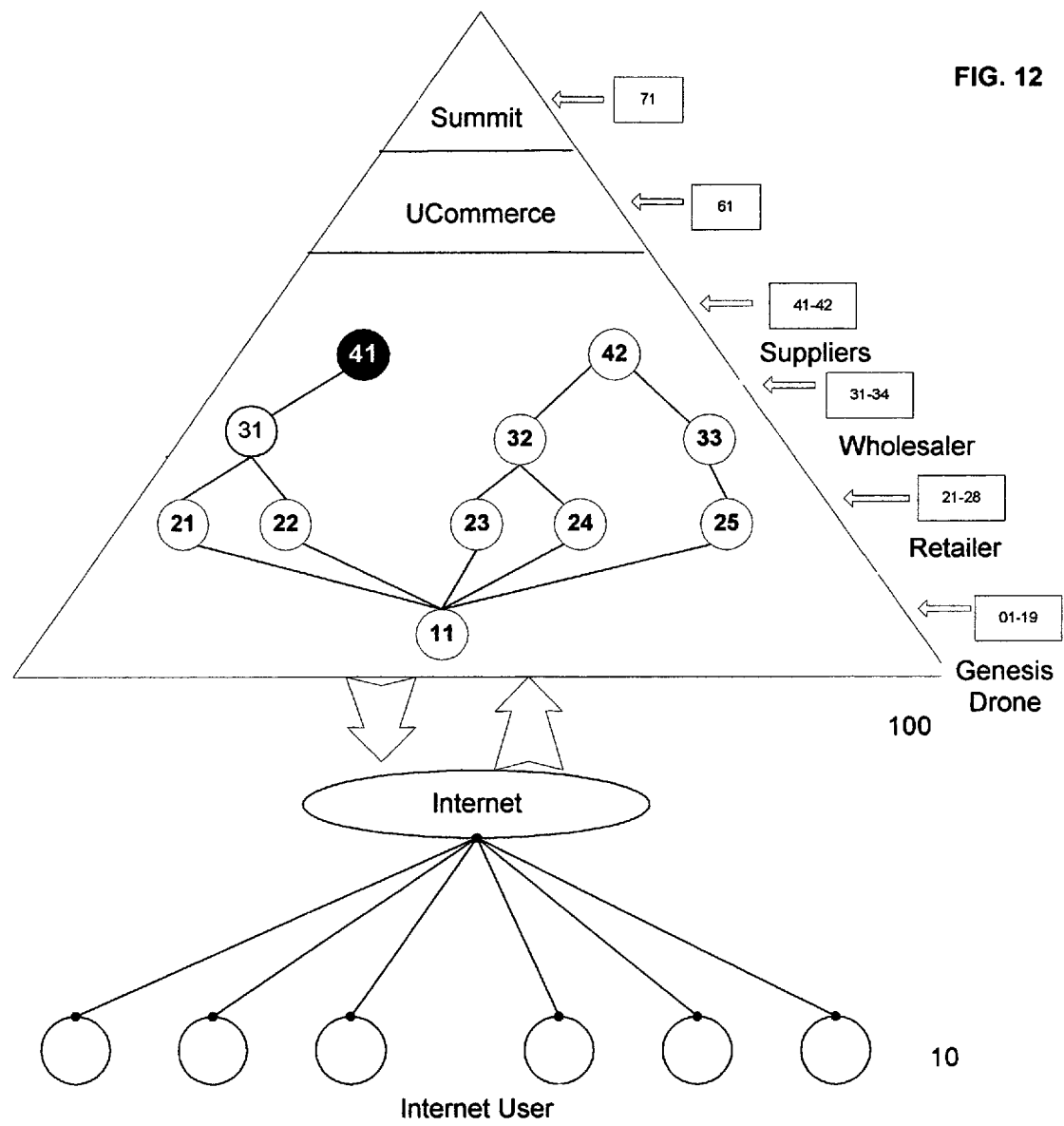

FIG. 12: is a schematic representation of how UCommerce (51) identifies the needs of a customer and uses a wholesaler (41) (UCommerce warehouse). The system identifies if a supplier (41) (global domain warehouse) has stock in hand, in queue or under production for the consumer within the cost, financing and time constraints of the purchase order;

To explain this example, we will assume that the end user has allowed enough time for global suppliers to satisfy the request with the allotted time, and second that supplier prices are lower than retailer and/or wholesaler.

In this case, the Genesis Engine drone, in charge of the transaction, performs the following steps without requesting any information from any of the higher tiers:

a) The system uses Intelligent Inventory Delivery to determine the best retailer node price, in this example, retailer node (27) has the best price from FIG. 10.

b) The system uses Intelligent Inventory Delivery to determine the best wholesaler node price, in this example, wholesaler node (32) has the best price from FIG. 11.

c) The system compares with known Inventory levels, which wholesaler nodes have enough Inventory In Hand to satisfy the request. In this case, only retailer nodes (41 and 42) have a greater or equal Inventory In Hand to satisfy the request.

d) The system uses the information from the Intelligent Inventory Rules Algorithm to determine the best price. In this case, the supplier system has assigned a wholesaler node (41) with the best price value.

e) The program will sell products from suppliers (41) if the price is lower than retailer node (27) and/or wholesaler node (32). The system uses X_FOB and Y_CDIF multipliers for time sensitive requests.

Then, the program compares the best price against the UCommerce warehouse prices if applicable. The system will dispatch the best price, lowest delay and most reliable shipment route from origin to destination.

Figure 13:
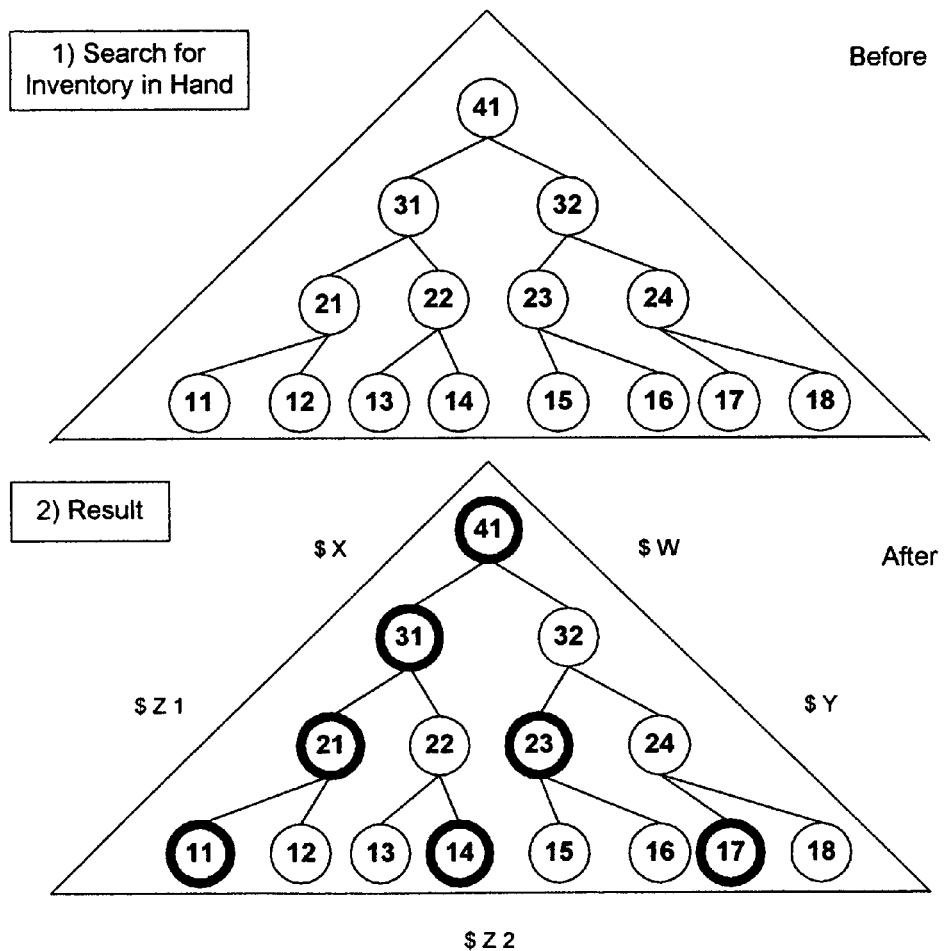
Figure 14:
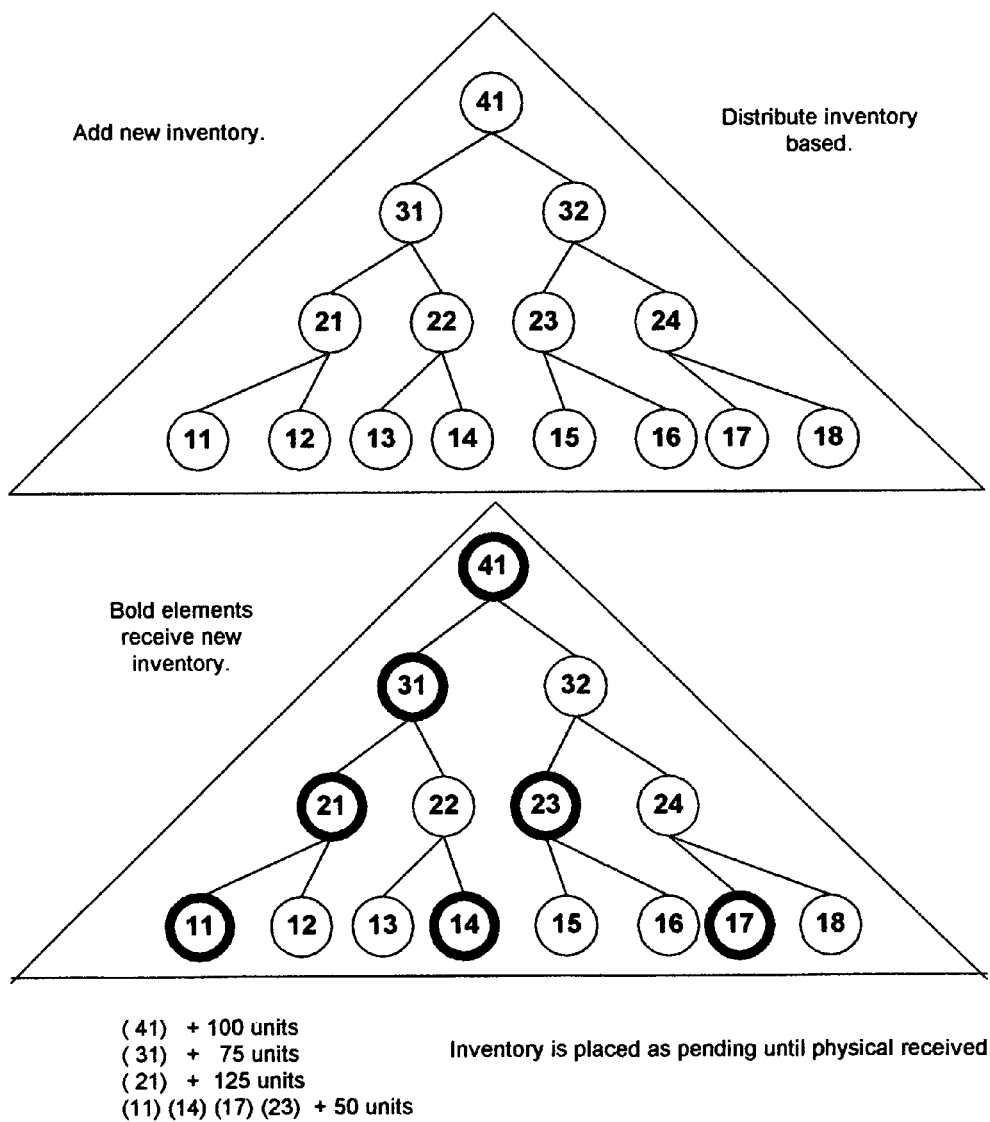

FIG. 13: is a schematic representation of how UCommerce (51) identifies the needs of a customer and uses retailers (21), suppliers (41) and/or wholesalers (31) (UCommerce warehouse). The system negotiates with different participating retailers (21), suppliers (41) and wholesalers (31) that have Inventory In Hand or merchandise in queue or under construction to determine if their resources can satisfy the end users' requests within the specified contractual terms and conditions such as cost, financing and time constraints with regards to each purchase order. The system also offers same day, red and blue label express services that will be applied to the FOB, C&F or CDF prices as to offer the consumer an efficient delivery method;

FIG. 14: shows how a supplier restocks physical merchandise in their warehouse or computer databases, and how it affects the supplier system inventory in hand, shipped inventory and reorder inventory levels that are adjusted.

Figure 15:
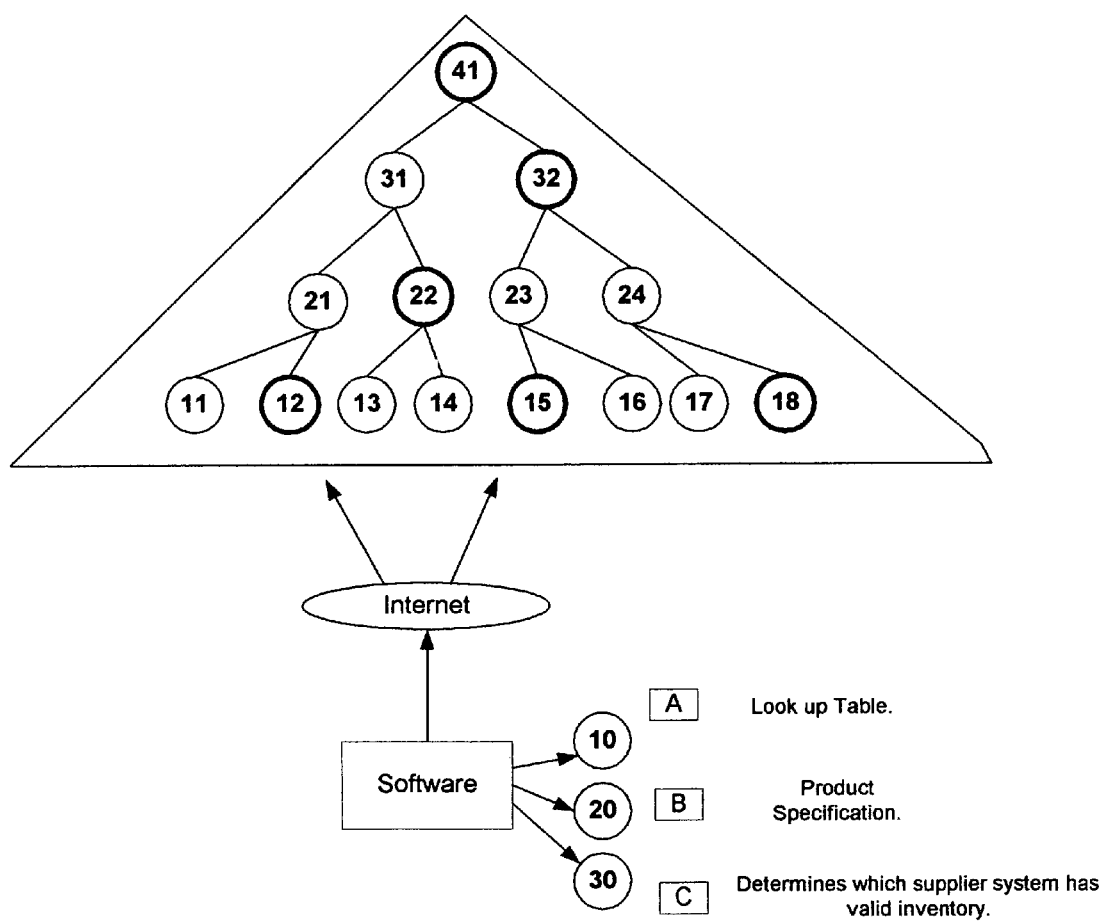

FIG. 15: shows how the (10) client software uses the (20) lookup product information files and (30) product specification data files. The system uses UCommerce algorithms to derive the search pattern based on the end user criteria. The client coordinates with the supplier system components that are responsible for the given supplier products. The retailers (41-48), wholesalers (51-54), suppliers (61-62) and the UCommerce continent-region warehouse (71) notify the availability and pricing of existing inventory to the end user.

Figure 16:
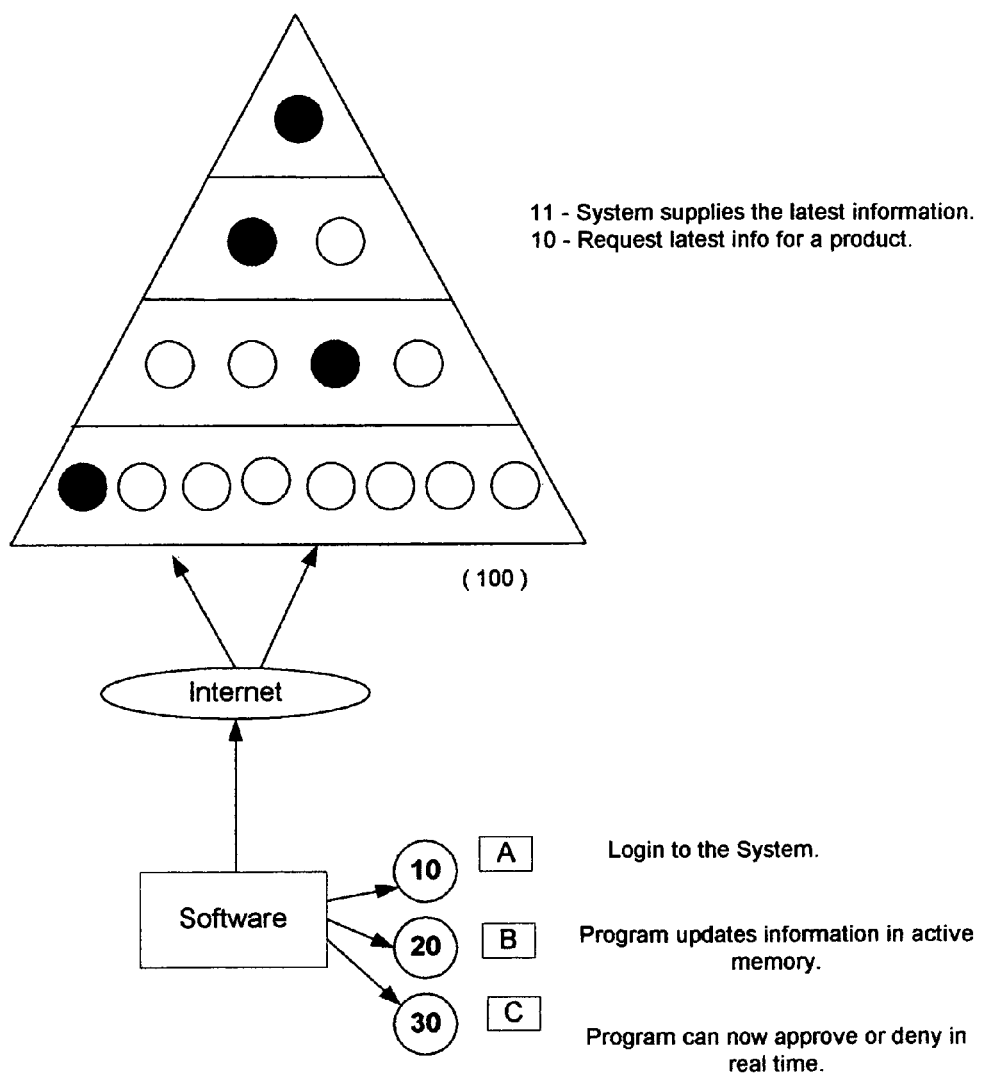

FIG. 16: shows how each Intelligent Component interfaces with a SQL database and a $3^{rd}$ party interface to get the latest data. Once the Intelligent Component has the latest information and updates via data base queries to its active memory to approve or deny an order, to give prices to an end user, and to assign by country the UCommerce value for their inventory. Parent Intelligent components can alternatively only validate the information of a given group of sibling intelligent components that have the highest UCommerce value to a given continent, region and/or country.

FIG. 17: describes how the supplier system takes advantage of its distributed architecture to have a search of products and inventory availability. The end user (10a) uses the lookup tables (20) and data specification files (30) to properly validate and verify the partial search commands. Then, the client (10b) derives the optimal solution to the used Supercomputer hierarchy by analyzing the latest information of the entire network. In this example, the end user is requesting products from ABC (61) and XYZ (161) suppliers. The system of components (41-71) represents the American continent region, whereas (141-171) represents the Asian continent region. The end users geographical UCommerce warehouses are located in Miami and all of the FOB, FOB rush, C&F, C&F rush and CDF prices are calculated from there. All of the inbound prices from Asia are quoted from Osaka, Japan. Note: Gold Label services are coordinated by the summit tier of the Genesis Engine, since this Intelligent Component has the authority to administer, control, coordinate, delegate and prioritize tasks from all of its subordinates.

Figure 18:
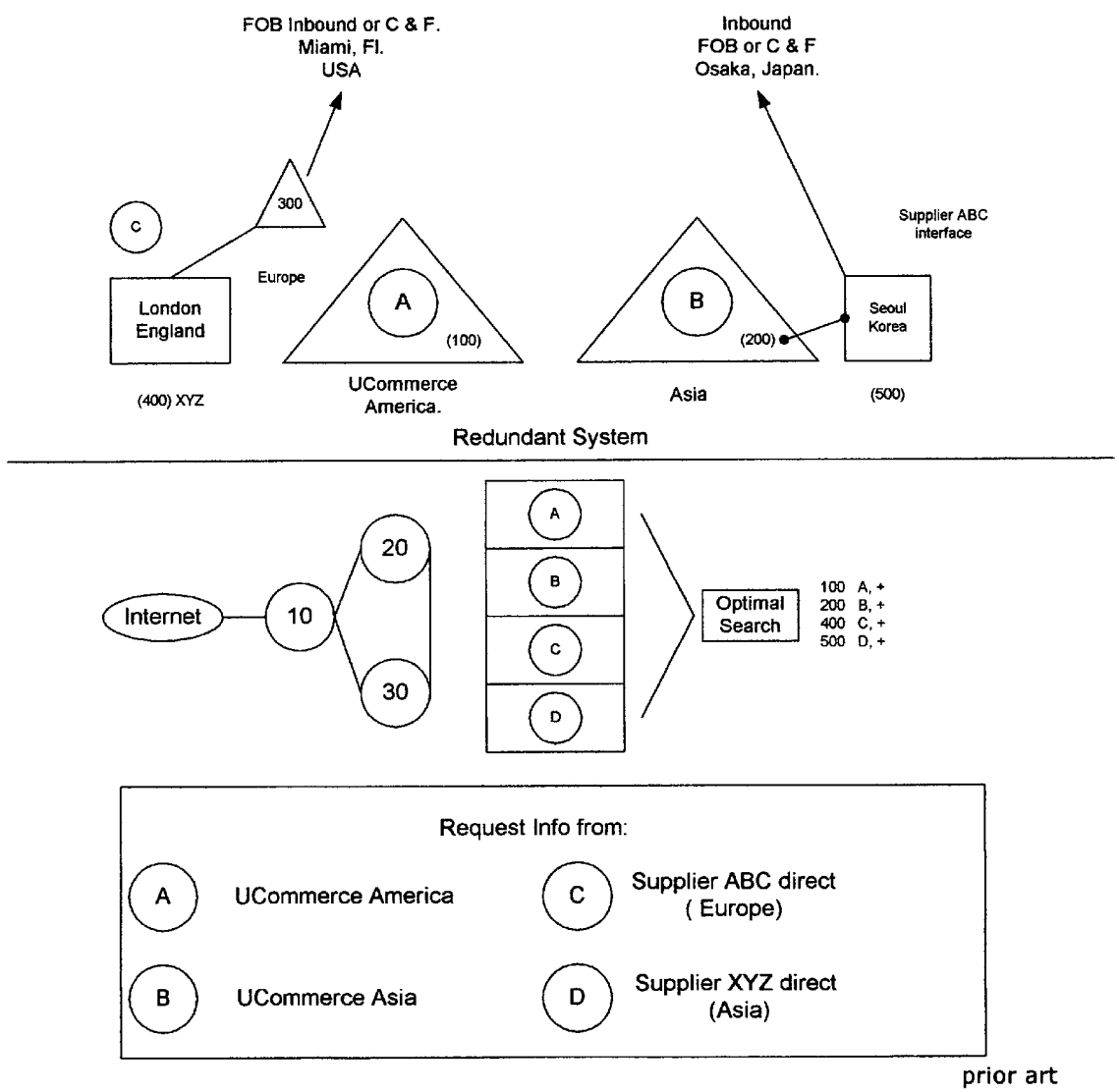

FIG. 18: UCommerce retailers (41-48), wholesalers (51-54), suppliers (61-62) and the (71) geographic UCommerce warehouse have the ability to update previously their quote to all of the clients by updating the intelligent components HQ0 that monitor the task of each independent end user. The system detects that (71) Miami, USA warehouse and (171) Osaka, Japan have active users requesting information of a given supplier. The retailers, wholesalers and suppliers update all of the previous quotes that are still pending. The intelligent components verify the new information and notify the independent end user client with the latest prices and inventory availability. The end user is notified via a message signal that its quote data has been optimized. The system displays the newly optimal data in the screen.

Figure 19:
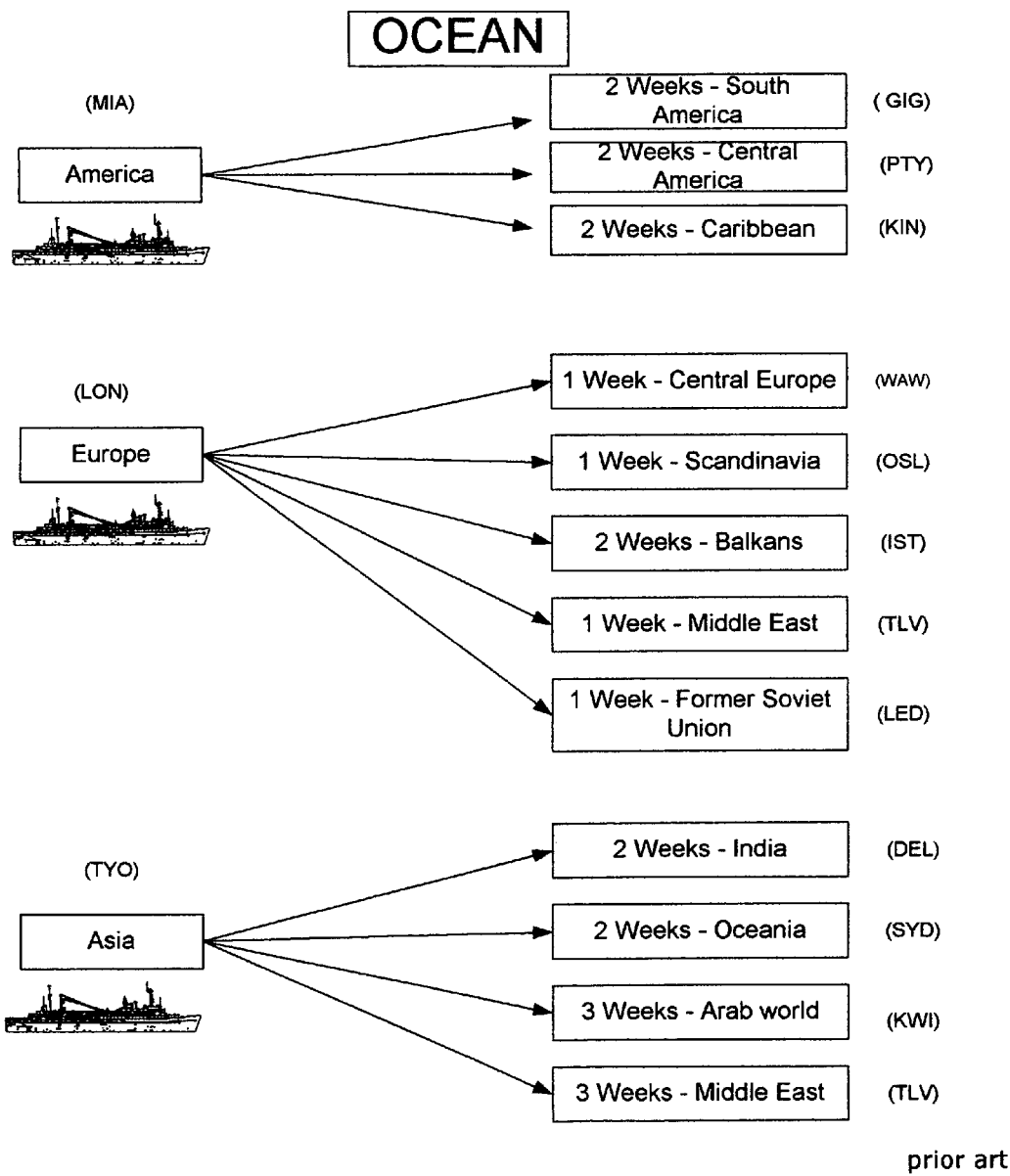

FIG. 19: shows the primary logistical links commerce that the origin and destination belong to the same continent. In each case, the point of origin is located within the Supra Region=1 and then shows the associated time delays for X_FOB shipping to different continental regions.

Figure 20:
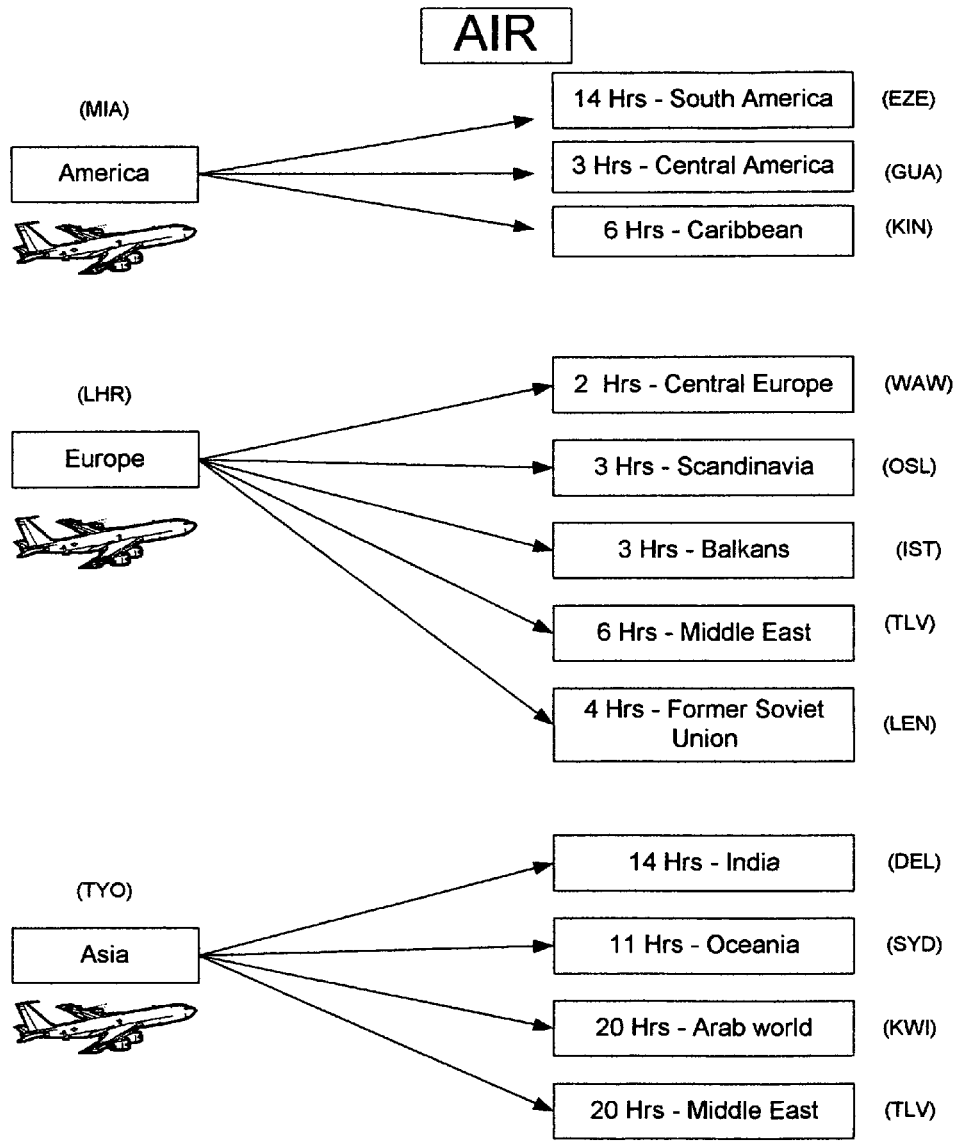

FIG. 20: shows the primary logistical links commerce that the origin and destination belong to the same continent. In each case, the point of origin is located within the Supra Region=1 and then shows the associated time delays for Y_CDIF express shipping to different continental regions.

Figure 21:
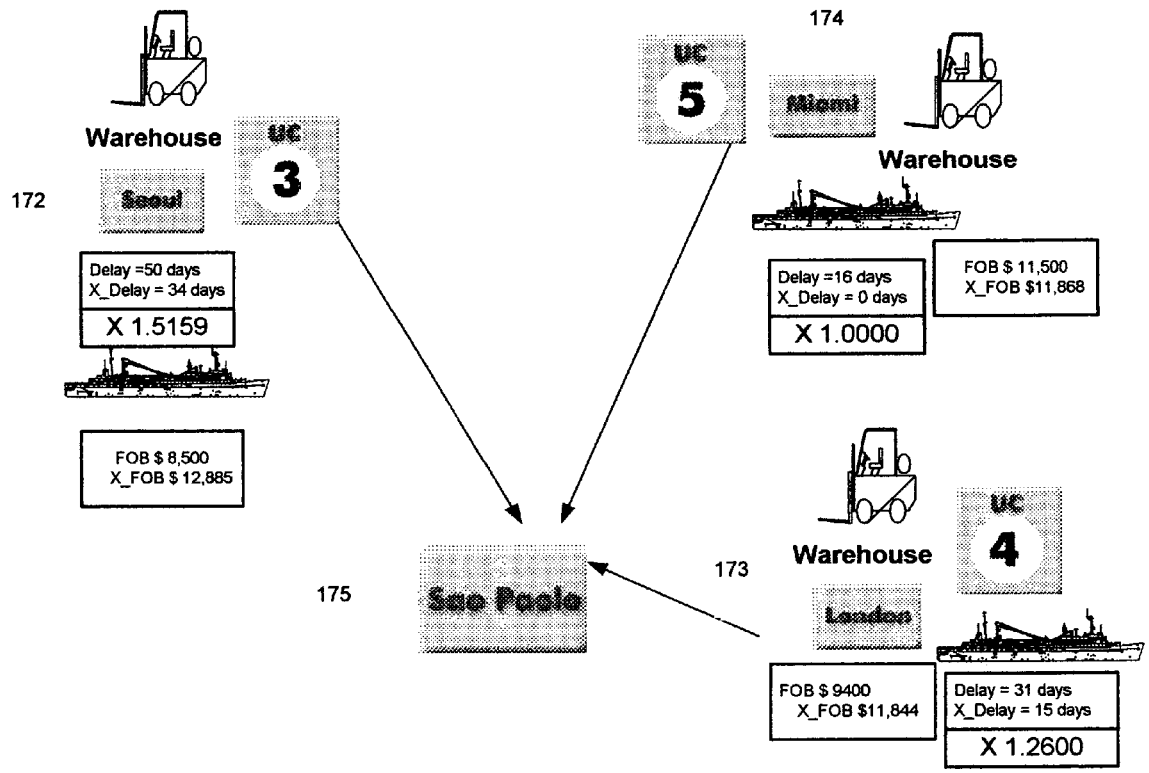

FIG. 21: shows how the system determines the X_FOB price. First, determines the shortest delay path to Sao Paolo, Brazil. In this example, the lowest delay=16 days Miami to Sao Paolo. Second, subtract from each delay value 16 days. The X_FOB is only useful when then end user wants the merchandise to arrive ASAP via Ocean. In this example if the end user has no immediate need for delivery. The optimal solution consists of C&F from Seoul (173) to Sao Paolo (175) @ $8,500 FOB P/U delivered in 50 days. While the best satisfying solution where delivery is ASAP is Miami (174) to Sao Paolo (175) @ $11,844 X_FOB P/U delivered in 31 day. Note: the end user can adjust the X_FOB multipliers with the following criteria, in this example, none of the warehouses have Inventory In Hand and must request merchandise from local suppliers.

Lowest Delay=16 days and X_FOB constant of $320 applied to Miami.

Delay is expressed in days.

FOB Pickup multiply delay * 0.5.

Figure 22:
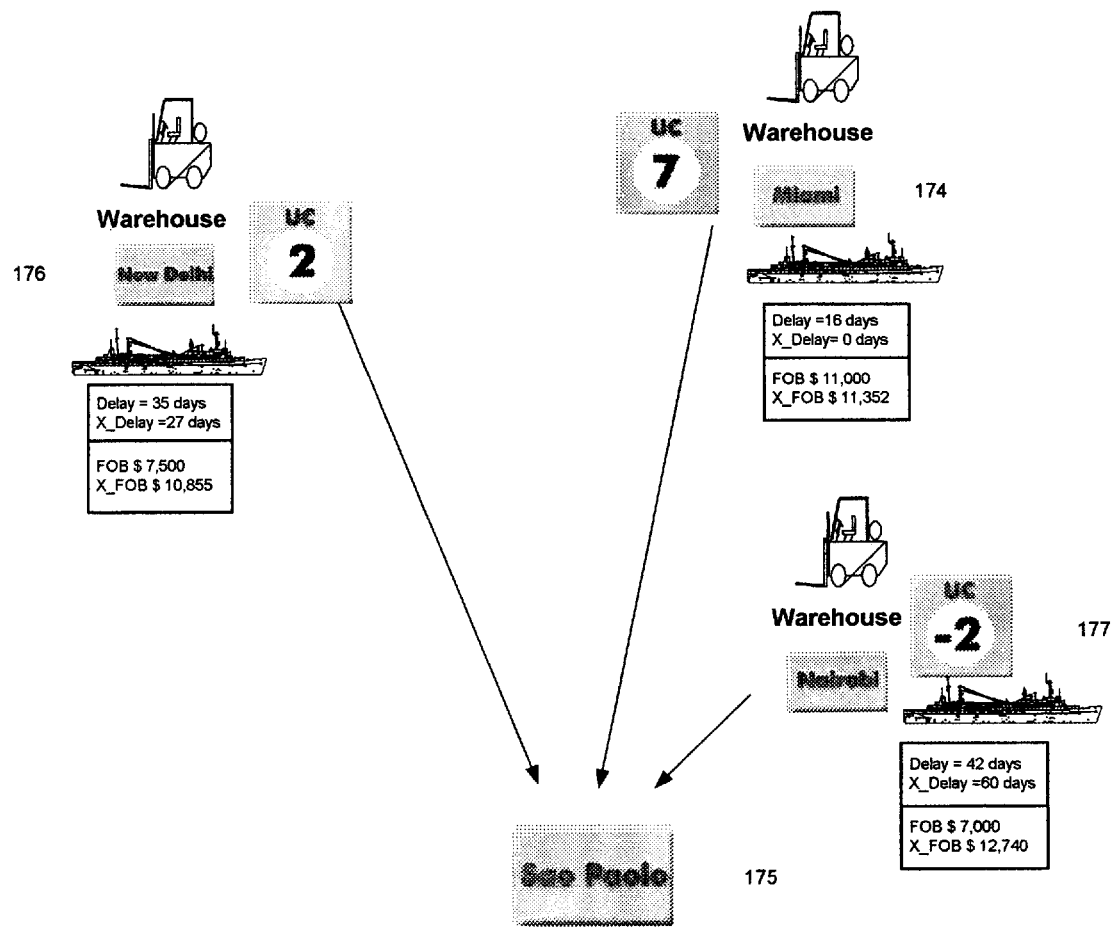

FIG. 22: shows how the UCommerce supplier system uses X_FOB calculations to determine the most cost and time efficient method of delivering goods and services from different origination ports, such as New Delhi, India; Miami, USA and Nairobi, Kenya. The system identifies the safest route to be between Miami, USA and Sao Paolo, Brazil. The system will recommend the New Delhi, India route since it is the most cost efficient. X_FOB calculates routes via ocean shipping method. In this example, none of the warehouses have Inventory In Hand and must request merchandise from local suppliers.

Lowest Delay=16 days and X_FOB constant of $320 applied to Miami.

Figure 23:
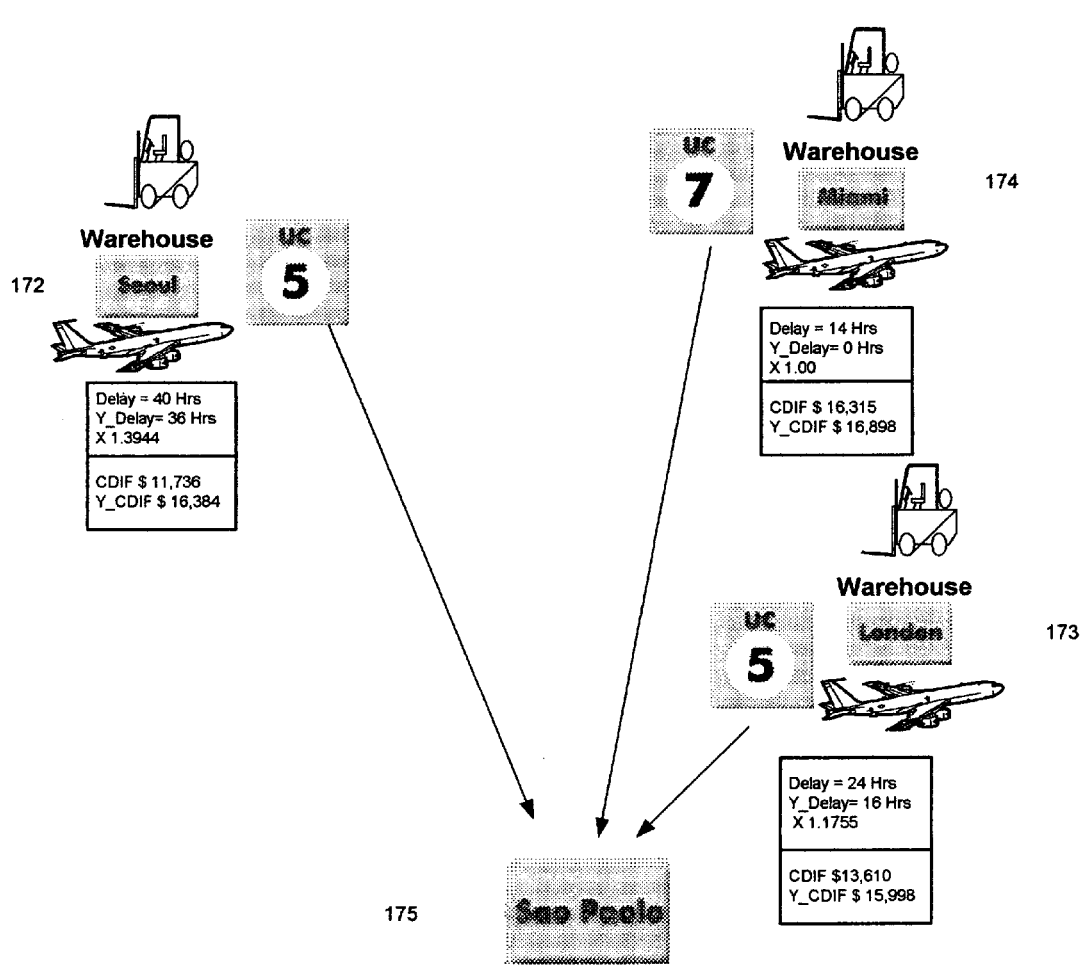

FIG. 23: shows how the UCommerce supplier systems determine the best Y_CDIF calculation using Black Label Next Flight service from Seoul, Korea; Miami, USA and London, UK to the destination point of Sao Paolo, Brazil. In this case, the fastest method is Miami-Sao Paolo with an intrinsic delay of 14 hrs. The system selects to ship the goods and services from UK since it has the lowest price of Y_CDIF value of $15,998 after paying duties and insurance.

Delay is expressed in hours.

Lowest Delay=14 hrs and Y_CDIF constant of $583 applied to Miami.

Available and Inventory In Hand are daily modifier per $10,000.

|  | Delay Multiplier | Available | Inventory In Hand |
|---|---|---|---|
| Ocean | 0.35 | $35 | $25 |
| White Label | 0.60 | $75 | $50 |
| Green Label | 0.85 | $150 | $100 |
| Blue Label | 0.95 | $250 | $200 |
| Red Label | 1.00 | $500 | $400 |
| Black Label | 1.05 | $1,000 | $850 |
| Gold Label | 1.15 | $1,500 | $1,000 |

Figure 24:
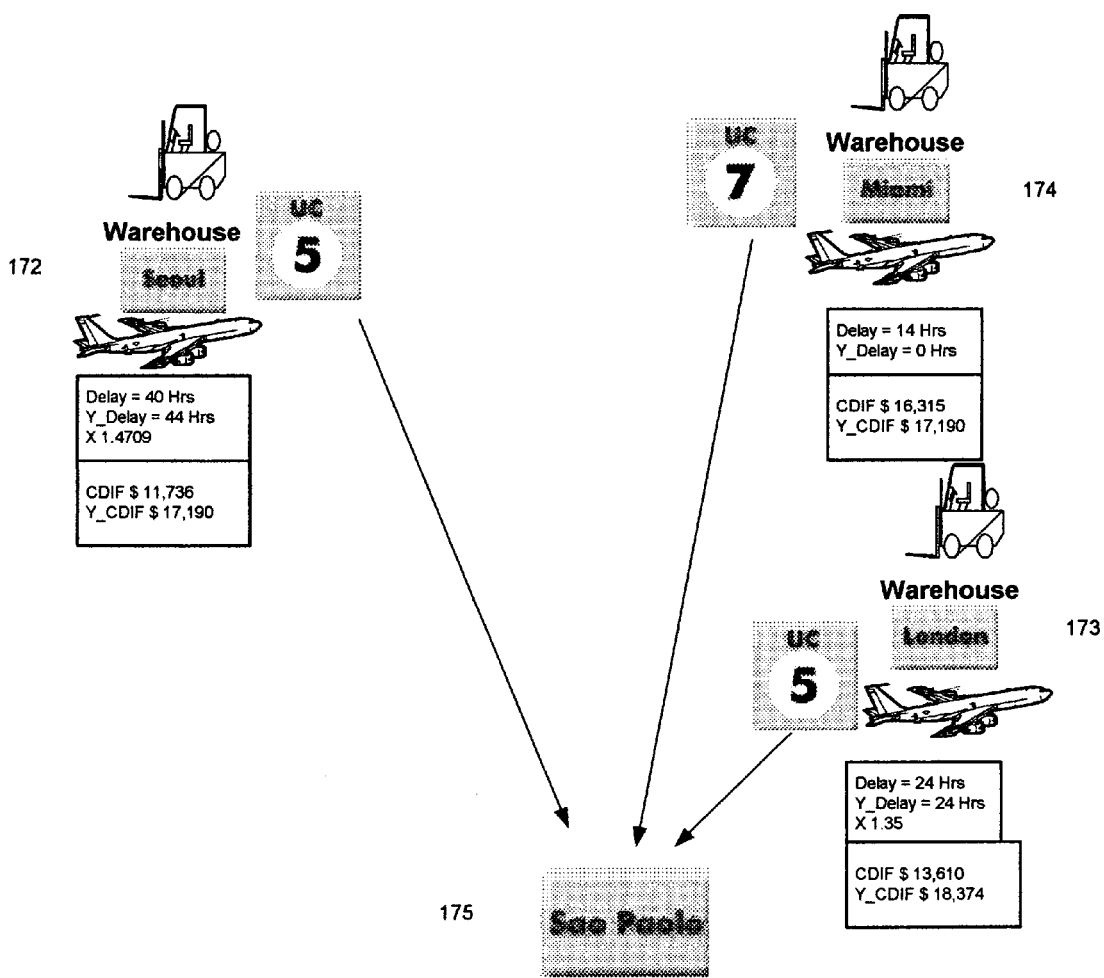

FIG. 24: shows how the UCommerce supplier system determines the best Y_CDIF calculation using Gold Label Emergency Spare Part service from Seoul, Korea; Miami, USA and London, UK to the destination point of Sao Paolo, Brazil within 36 hrs. In this case, the fastest method is Miami-Sao Paolo with an intrinsic delay of 14 hrs. The system selects to ship the goods and services from Miami, Fla., USA since it allows the Emergency Spare Part to be delivered to the end user door to door. Shipments from Korea are made non-applicable since their delay value exceeds 36 hrs. Note: in the same example should all of the warehouses have Inventory In Hand, then Korea's Y_Delay would be 40 hrs and the system would select to ship the goods from Seoul, Korea to Sao Paolo, Brazil.

Delay is expressed in hours.

Lowest Delay=14 hrs and Y_CDIF constant of $875 applied to Miami.

Figure 25:
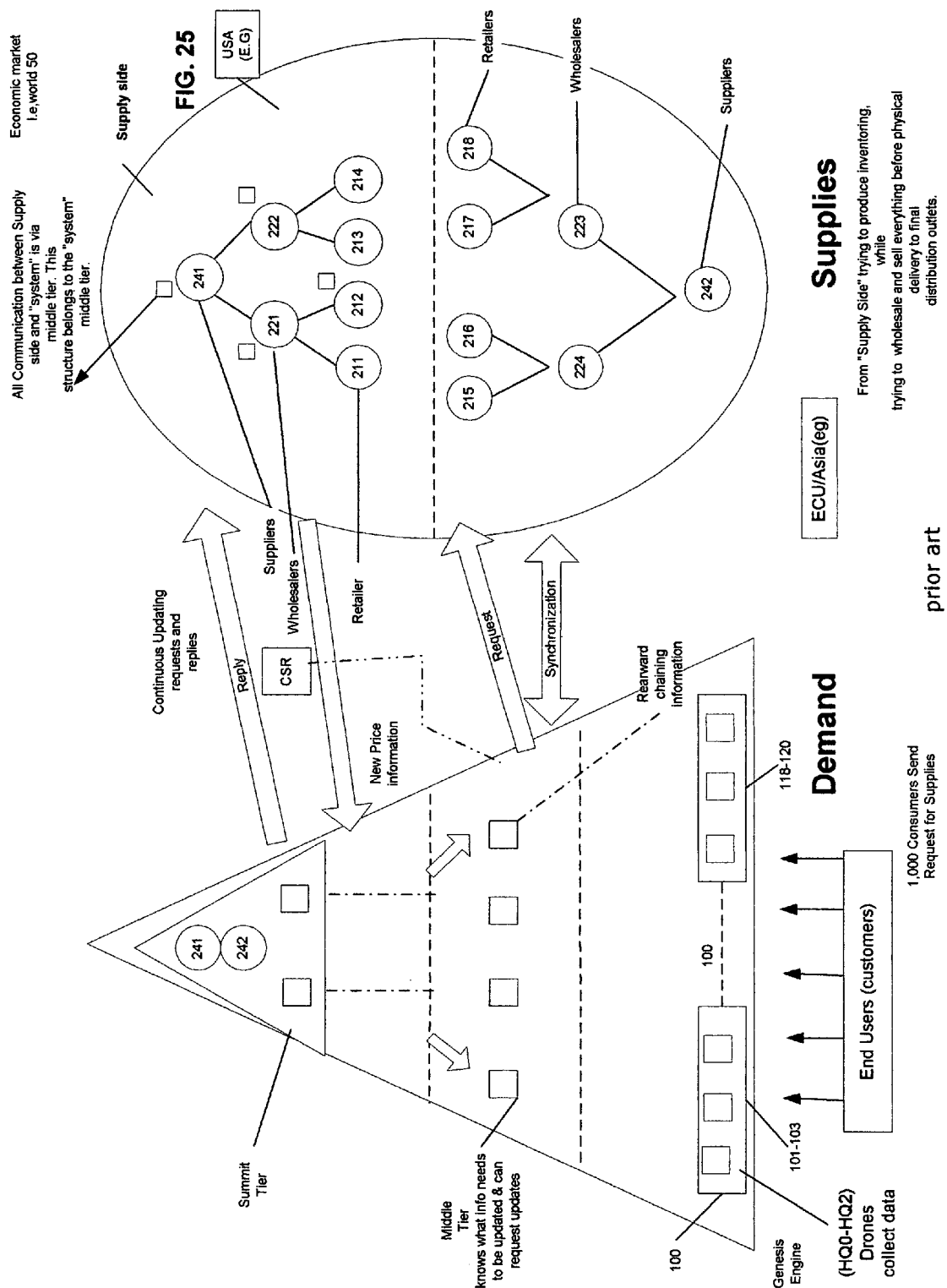

FIG. 25: Overall UCommerce supplier system architecture: the system is divided into the following main section:

a) (100) that consists of the supplier system b) (200) Retailers, Wholesalers and Suppliers located in different geographical locations. The end users interact with both the supplier and organizational provisioning systems.

c) (50) The Internet is the medium choice of communication of the environment.

Based on supply side economics then end users collectively constitute "demand" and the supplier system tries to identify critical path conditions to deliver goods produced by manufacturers, which constitute "supply". The system, by using Intelligent Inventory Delivery method, has access to the information of the entire inventory of each node. UCommerce reviews multiple common denominator orders with the same Tandem or destination to make economies of scale purchase, and thus lowering the overall cost to the consumer. As the system (100) gathers changes in the environment with regards to supply (200), the appropriate retailer, wholesaler and/or supplier node information gets updated.

Figure 26:
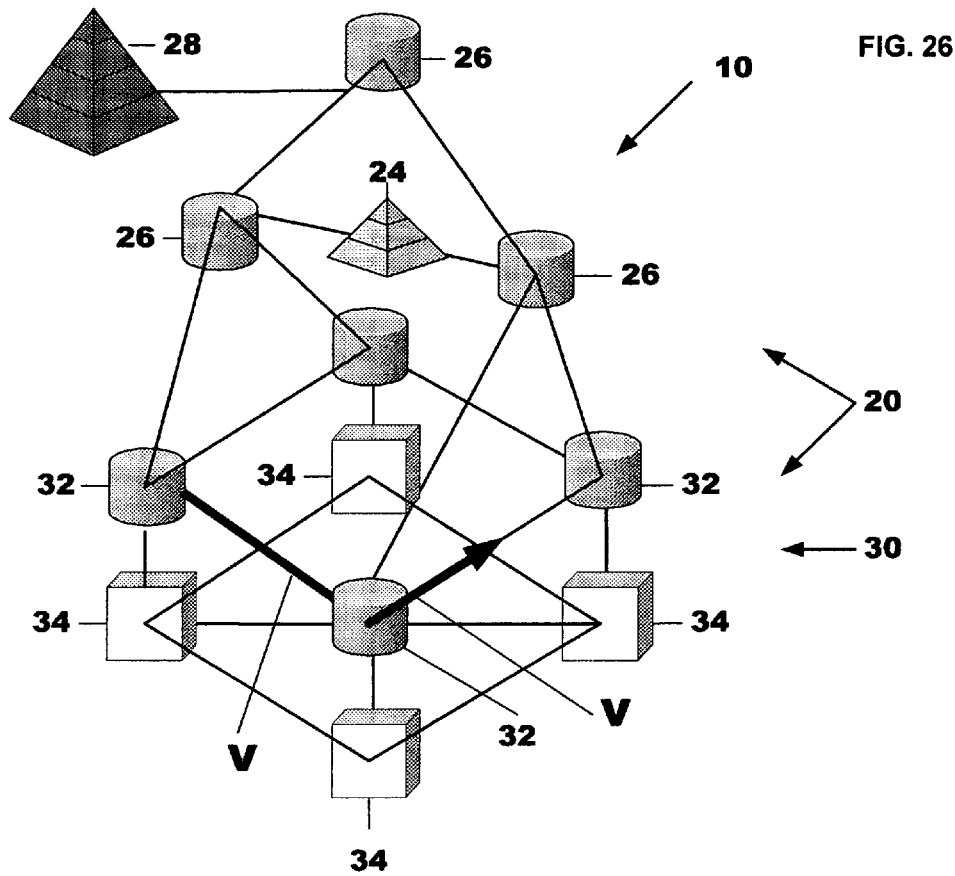

FIG. 26: is a diagram of a Parallel Telecommunications and Simulation Network that consists of a system (10) that mimics and replicates the inbound and outbound messages of the environment of a Telecommunications Network (30) and junction point computers (34). The raw information of the environment is gathered, analyzed and primed by the Simulation Network by means of the Junction point simulation computers (32) in unison with the Parent Simulation computers (26) and Processing Power Support Computers that allow human resources to have direct access to the latest billing information and statistics trends by means of the User Interface Computers (28). For each call, the Simulation Network maps circuit by circuit the vector plot trajectory of the calls, which is stored by a plurality of specialized computers that perform Partial Billing and then send the information to an assigned Call Owner that creates an unique ID Vector (V) that in turn is converted to a correlated Vector CDR that is a single version of the truth with all of the associated charges and costs. The Vector CDR is created as a call is connected and updated systematically until released.

Figure 27:
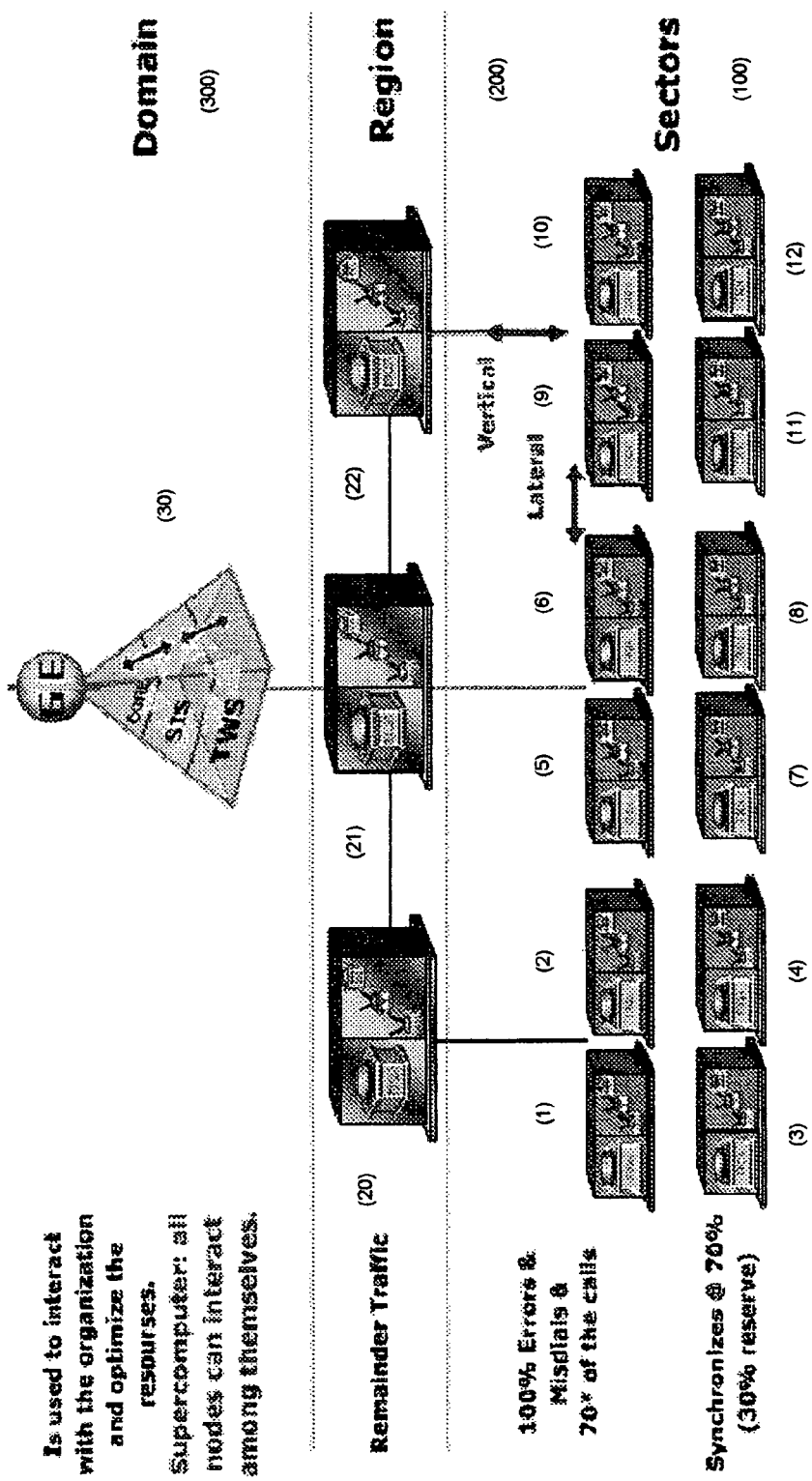

FIG. 27: is a diagram of the Genesis Engine Supercomputer™ (GES™) Architecture and shows how a Telecommunications network domain (300) is subdivided in a plurality of Regions (200) that are further partitioned in Sectors (100). For each Sector (100) of the network a Team Work Switch® (TWS®) (1 to 12) consists in a plurality of nodes that map and simulate all of the activities of the Fixed, IP Telephony, and Wireless Network Platform Equipment that performs local traffic for a PTT. In this case, the TWS® working at 70% kept 30% of their resources to perform lateral and vertical synergy and is responsible for accounting all of the errors, misdials and 70% of the connected calls, in particular all of the Intra LATA calls. For each Region (200) of the network, a Synergy Interface Switch® (SIS®) (20 to 22) consists in a plurality of nodes that match/merge all of the calls within a specific network such as Fixed, IP Telephony or Wireless and any Regional Inter LATA hybrid call. For the entire Domain (300), a Managerial Pyramid Switch® (MPS®) (30) is used to optimize resources of the system and connect the complex and international calls. The MPS® summit node has an exact duplicate that is used to fetch all of the end users with the latest information of the organization telecommunications network domains.

FIG. 28: shows the CO Spaghetti Simplification where each Class 5 Central Office (1) connects calls with data and voice, and then creates a Call Detail Record (1000) from INBOUND and OUTBOUND calls made by one of its POTS. The infrastructure of the Fixed Network Spaghetti is simplified by using 3D GIS mapping to virtual know where each equipment is located. Each CO (11) of the system then converts IAM, ACM, ANM and REL SS7 messages to create a Vector CDR (2000). The Vector CDR has seven main components:

1) Vector Owner.

2) Leg A owner.

3) Leg C owner.

4) Tandem routes.

5) Leg X Owner.

6) Leg Y Owner.

7) Complex Tandem routes.

Figure 29:
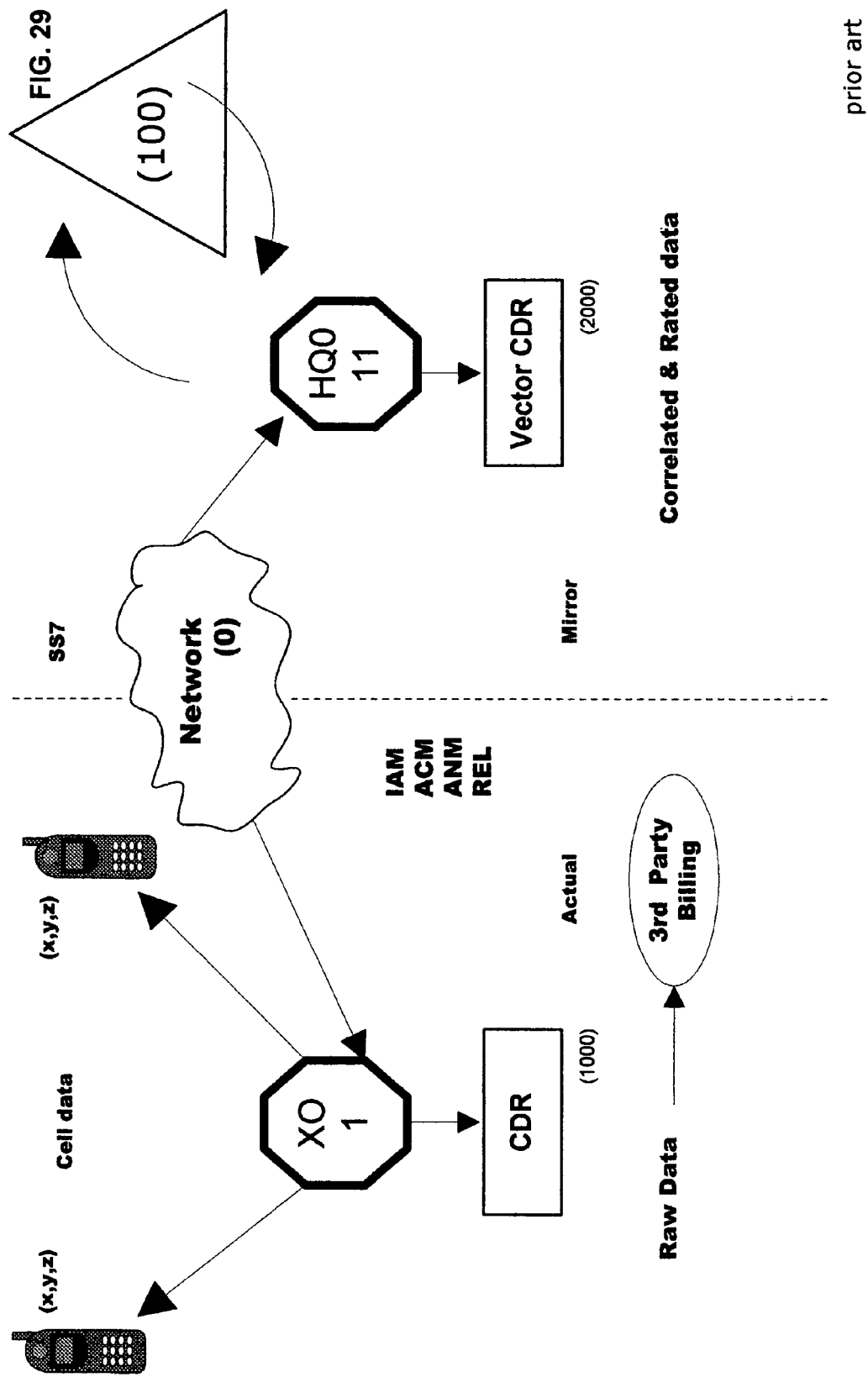

FIG. 29: shows the XO Spaghetti Simplification where each Mobile Telephone Subscriber Office (1) connects calls with data and voice, and then creates a Call Detail Record (1000) from INBOUND and OUTBOUND calls made by one of its wireless devices. The infrastructure of the Wireless Network Spaghetti is simplified by using 3D GIS mapping to virtual know where each equipment is located by triangulating and approximating the origin and destination signal. Each XO (11) of the system then converts IAM, ACM, ANM and REL SS7 messages or Voice over IP messages to create a Vector CDR (2000). The Vector CDR has four or eight main components: Vector Owner (A), Leg A owner (B), Leg B owner (C) and Tandem routes (D). The Complex Vector CDR has eight components: Leg X Owner (E), Leg Y Owner (F) and Complex Tandem routes (G-H).

Figure 30:
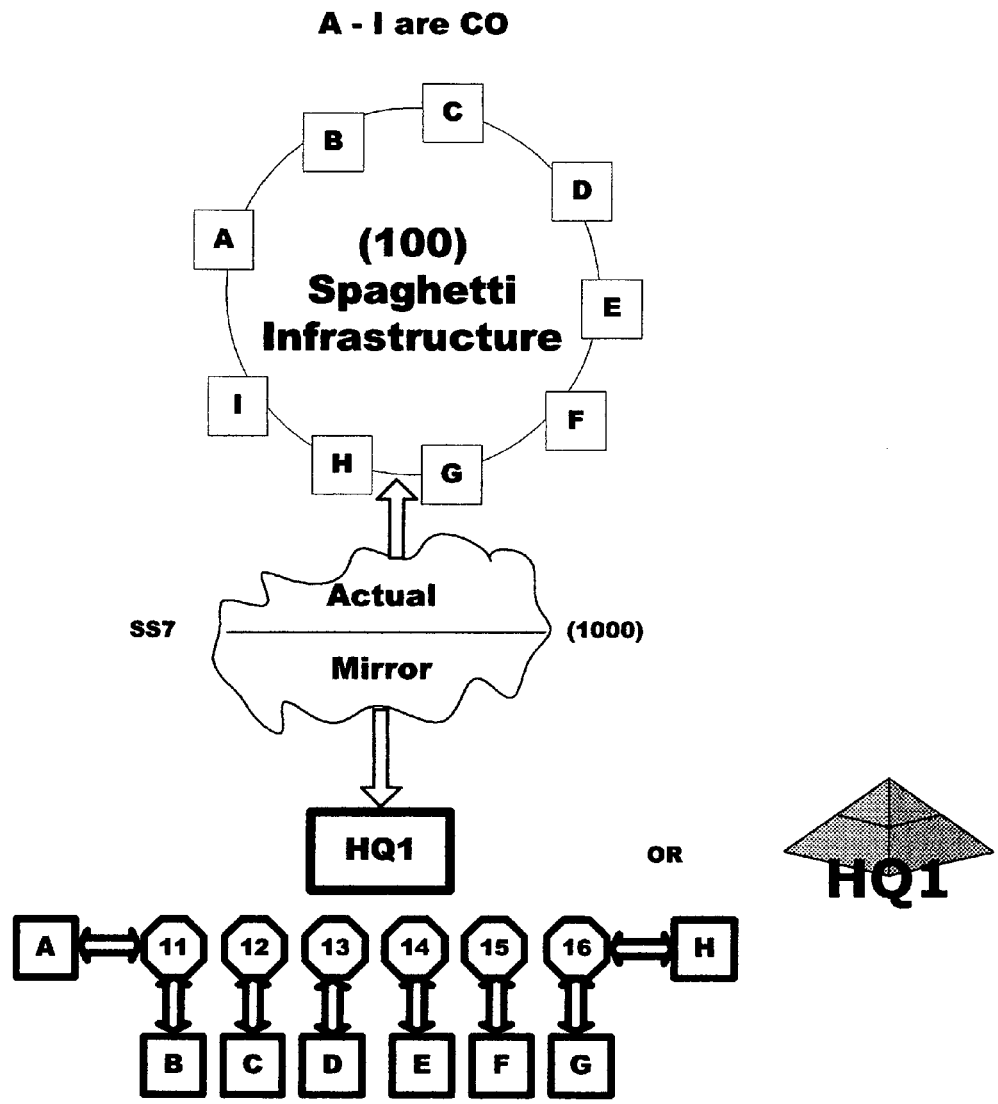

FIG. 30: is a schematic representation of how by organizing the NXX Spaghetti Infrastructure (100) an Intelligent Switch controls the flow of traffic within Fixed Exchange SONET. By receiving a copy of each SS7 packet (1000), the system is able to create a Virtual Reality mirror of the actual physical networks and replicate its associated environmental conditions. Each subordinate CO (11-16) controls one or a plurality of Class 5 Central Office switches (A-I). For simplicity, each HQ1 controls approximately 250,000 ports.

Figure 31:
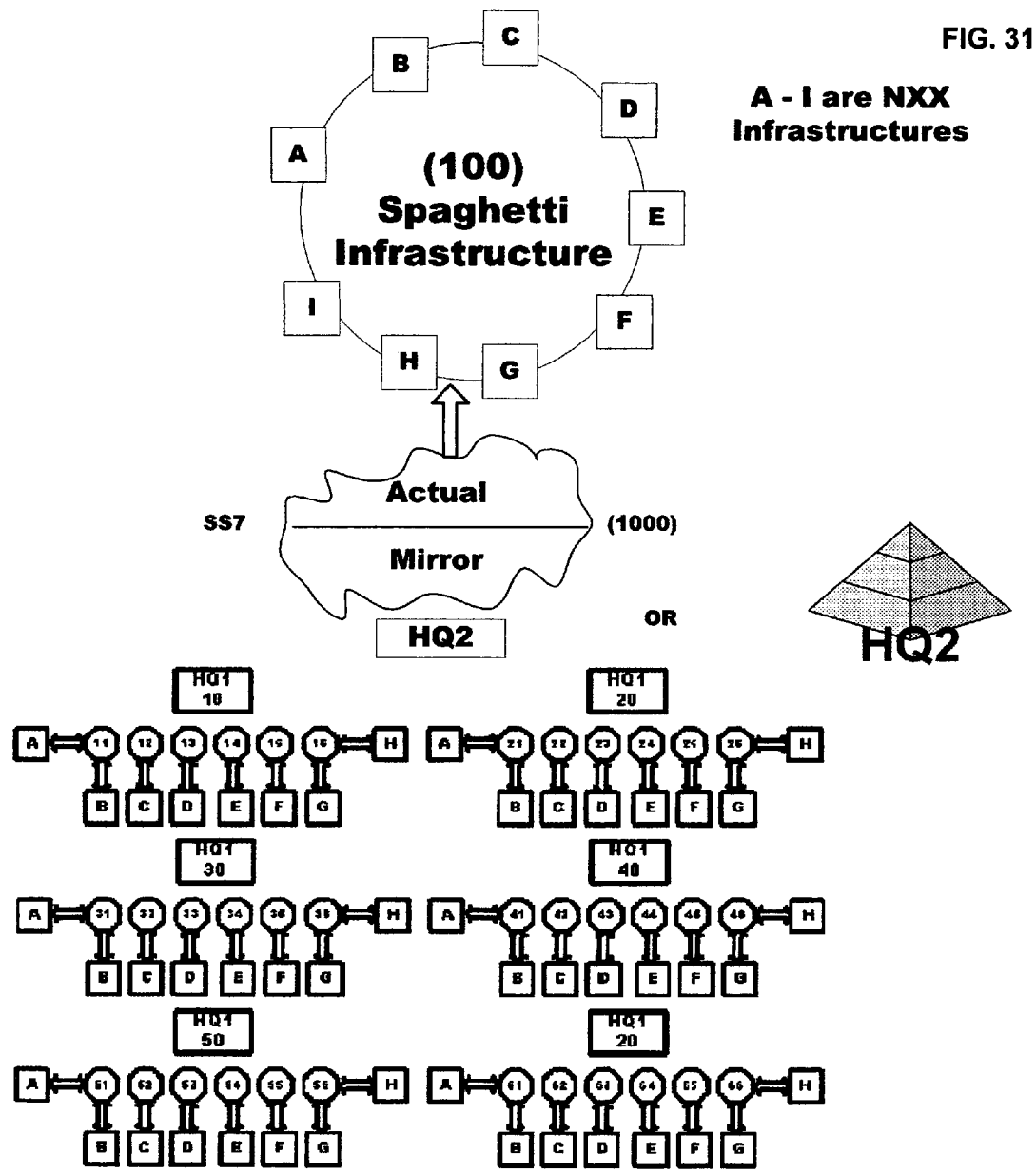

FIG. 31: is a schematic representation of how by organizing the NPA Spaghetti Infrastructure (100) an Intelligent Switch controls the flow of traffic within Fixed Exchange SONET. By receiving a copy of each SS7 packet (1000), the system is able to create a Virtual Reality mirror of the actual physical networks and replicate its associated environmental conditions. Each HQ2 structure has several subordinates HQ with their corresponding CO (11-66) that control one or a plurality of Class 5 Central Office switches (A-I). For simplicity, each HQ2 controls approximately 1,000,000 ports.

Figure 32:
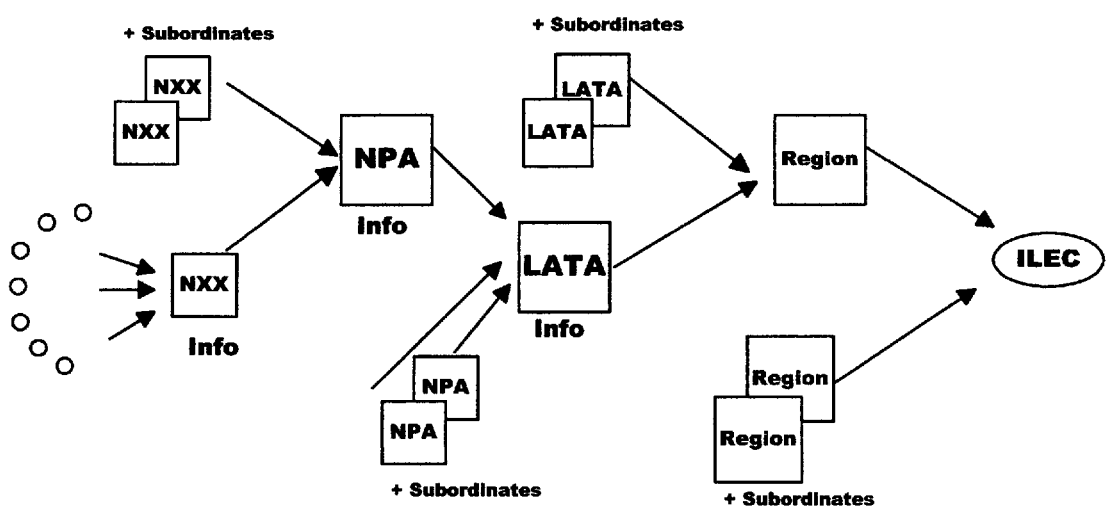

FIG. 32: is a schematic representation of the Synchronization of Resources that permits the system to have network wide environment information. Starting from left, a plurality of Central Office Switches performs a statistical analysis of traffic that is outside the norm to their parents NXX nodes. Each NXX node, from their own perspective, does the same analysis and communicates the results to the NPA. The process of moving information from a plurality of child nodes to the parents is continued until the summit tier is reached. Note: if all of the data is within the norm, the summit node will receive an empty message since there is no need to resubmit known information. Each node can send a plurality of different reports to the summit tier such as connection rates, error rates, faults, trunks bandwidth.

Figure 33:
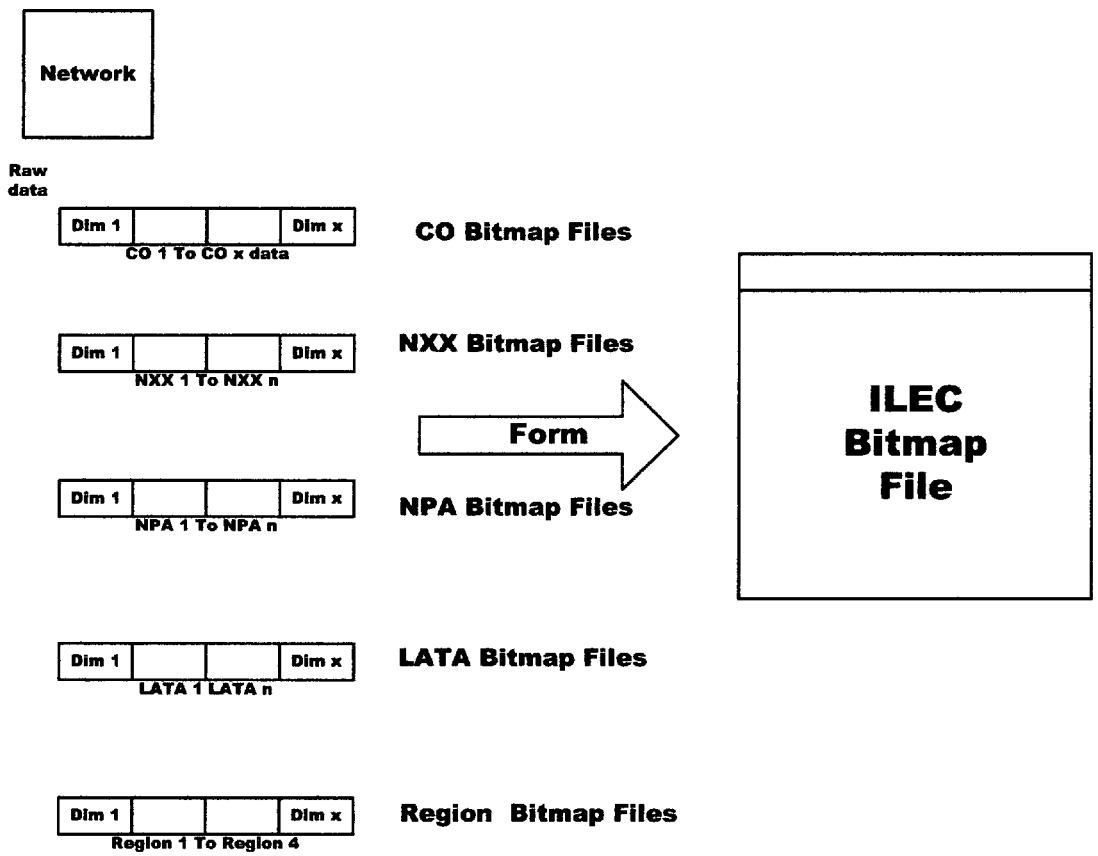

FIG. 33: is a graphical representation of how to build a NXX Bitmap File by allowing a plurality of Central Office Switches migrates several dimensions of statistical information to the NXX node. The NXX node analyzes, complies and normalizes the latest data. If any specific NXX Bitmap field information is significant and the condition of the environment is notified, otherwise no message is sent since the data is an empty set.

Figure 34:
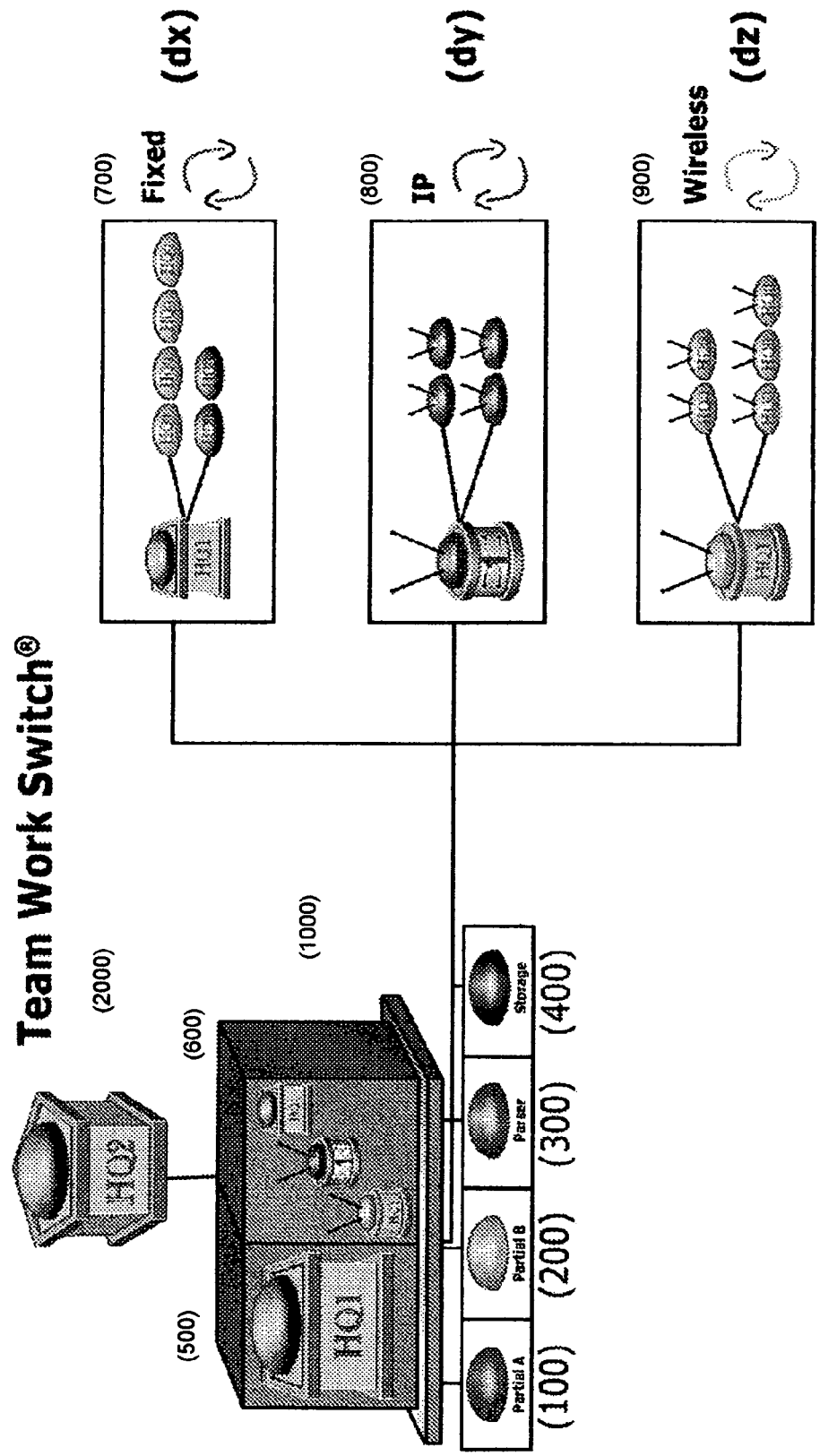

FIG. 34: is a diagram of a Team Work Switch® (1000) that is part of a greater cluster GES™ (2000). The TWS® can be divided into nine separate parts:

Partial Leg A node (100) and partial Leg B node (200) that consist of Artificial Intelligence Business rules that utilize specific database triggers and stored procedures to fill the missing gaps of information.

The Parser function node (300) is responsible for converting all of the INBOUND messages of the environment into a lingua franca, and the OUTBOUND messages to the appropriate NPE packet protocol.

Is a terabyte Storager function node (400) system, designed to load balance and to distribute tasks through means of placing information in different directories, so that the nodes can scan for new activities and upon detecting new messages execute predefined task. For example: IAM messages instantiate a new record and SSN, which the assigned Call Owner must create.

The Summit Grid Node (500) is responsible for all of the activities of the TWS®. This node can match/merge as its parent Synergy Interface Switch® when creating regional calls, once it has determined its own Leg A or its equivalent, since subscribers might reside outside of the domain of the Telecommunications organization networks.

Partial Summit Grid Node (600) is responsible for correlating Partial Vector Legs (B, T) data of a call, so that the Summit Grid Node of the partial Leg A can match/merge the different Partial Vector CDR into a single billing entity.

Fixed Layer Nodes (700) mimic, monitor, replicate and simulate the activities of the messages of the fixed networks, and convert the raw and redundant data into normalized and primed data, so that other grid and cluster nodes can use them.

Wireless Layer Nodes (800) mimic, monitor, replicate and simulate the activities of the messages of the Wireless network, and use mathematical algorithms to determine the best location of each circuit and CPE, and then convert the raw and redundant data into normalized and primed data, so that other grid and cluster nodes can use them.

IP telephony Layer Nodes (900) mimic, monitor, replicate and simulate the activities of the messages of the IP Telephony network using special packet signature search algorithms, and then use mathematical formulas to determine the best location of each circuit and IP Address, and finally convert the raw and redundant data into normalized and primed data, so that other grid and cluster nodes can use them.

The main problem with the classical method of FIG. 28 is that 98% of the calls use more than one NPE to create a single version of the truth billing entity, and to further exacerbate the situation as Wireless becomes the dominant player of the globe with respect to telecommunications, up to 50% of the calls will become Hybrid, and 5% complex.

For these reasons, an improvement with regards to the existing patents was required:

The concept of Genesis Engine Drone was evolved to a Team Work Switch® (TWS®) that behaves as a macro switch that assimilates all of the Fixed, IP Telephony and Wireless messages within a geographical location such as a NXX for a Small network, like ICE, Costa Rica, with 2 million subscribers, NPA for medium networks such as Bell South Telecommunications with 16 million subscribers, and LATA Regions or the equivalent for large networks such as Telecom Italia and France Telecom with more than 60 million subscribers each.

The TWS® Commercialization Prototype Design as per ICE, Costa Rica, consists in a plurality of concurrently working grids of nodes with the following:

Each Fixed network Central Office Switch and CPE is simulated.

Each wireless network XO and wireless phone is simulated and the location of the end user is optionally triangulated or estimated to a specific location based on organizational Business Rules.

IP Telephony Intelligent Component monitors the packet streams of specific equipment to determine the total weight of the volume of the calls, and by means of software receives the missing DTMF information or alternatively by placing a special signature to DTMF content packets like the music industry does to protect their copyrighted materials.

Parser function Node is responsible for interfacing with the environment, and converting all of the information into a lingua franca and assigning it to the correct directory. Then Intelligent Components can begin to create the appropriate forward and rearward chained updates to the system, the assignment of unique ID, and the different distinct call elements Legs (A, B, T, X, Y, W) and Call Owner.

Storager function Node is responsible for Deleting, Inserting, Load Balancing, Replicating and Updating Data that is pertinent to the system. Storager function nodes contain the information of each circuit and subscriber belonging to the system, and have special scripts to follow the organization Business Rules to determine the acceptable location of each circuit of the call. Note: the system by means of the Business Rules by design cannot have two or more circuits in the same exact location. In the case of duplicating locations, an algorithm estimates the GIS (X, Y, Z) coordinates of the conflicting circuits.

Partial A function Node is responsible for determining that the call originates (Leg A), resides within the local domain of the Team Work Switch®, then gathers all of the information from the point of view of a specific Telecommunications network, and creates a bitmap packet with Legs (A and/or T) information, so that the HQ can match/merge Partial Vector CDR information.

Partial B function Node is responsible for determining that the call destination (Leg B) resides within the local domain of the Team Work Switch®, then gathers all of the information from the point of view of a specific Telecommunications network, and creates a bitmap packet with Legs (B and/or T) information, so that the HQ can match/merge Partial Vector CDR information.

Summit Grid Node controls the local domain in the form of a cluster of computers grid that is a sub division of the entire Genesis Engine Supercomputer™ cluster. This HQ integrates the flow of information of the Fixed, IP Telephony and Wireless nodes, so that they can work together using lateral and vertical synergy, and the missing gaps of information can be logically created by following organizational Business Rules.

The SIS® summit node can act as its parent when it knows that an entire call is within the domain of a single network, and the ownership of the call resides within its organization. This upgrade improvement process was created to eliminate the unnecessary flow of data upwards towards the summit tiers that tend to saturate the system. This node uses lateral synergy with the Leg B owner TWS®, so that the Legs (A, B, T) Partial Vector CDR are summed as integrals from A to T to derive the final Vector CDR.

Partial B Functionality of the Synergy Interface Switch® Leg B owner permits its summit node to handle the Leg B side of a Hybrid or Complex Call. The Intelligent Component uses business rules to determine if the Leg B side vector trajectory is within the geospatial area of coverage of its organization. The SIS® summit node then sends the Leg B information to the Call Owner, so it can match/merge the Vector CDR since it possesses all of the Partial Vector components.

The TWS® belong to the clusters of parallel distributed nodes that comprise the Genesis Engine Supercomputer™ and are linked together through means of operating system configuration, artificial intelligence scripts and Myrinet Switch™ fiber cards.

The use of Partial Differential Equations permits the system to handle two or more independent calls, eliminating the unnecessary flow of data upwards towards the summit tiers that tend to saturate the system. Once the geospatial data is normalized and plotted, the summit tier uses routing algorithms to fill the missing gaps of information to match/merge the Vector CDR without placing any burden to the summit tiers. The ability to distribute the tasks gives the "HIVE" greater latency, redundancy and robustness, which is the basic requirement for mission critical systems. The MPS® model coordinates, controls, delegates, distributes and synchronizes the activities of the environment by using the Vector CDR methods and a system that eliminates redundancy. In other words, the MPS® works at optimal throughput levels by removing the erroneous tendency of delegating all of the activities to the unmanaged centralized Symmetric Multiprocessor Platform that clogs the system once the traffic volume exceeds 5% of the rated capacity. Another feature is to partition geographically the organization (X_LATIN), so that traffic can be load balanced which is critical for the purpose of billing and identifying the exact location of each circuit. Information that is transformed and normalized into lingua franca geospatial data (LATIN) permits the system to simulate, recreate and render the vector trajectory of each call at incipiency.

Figure 35:
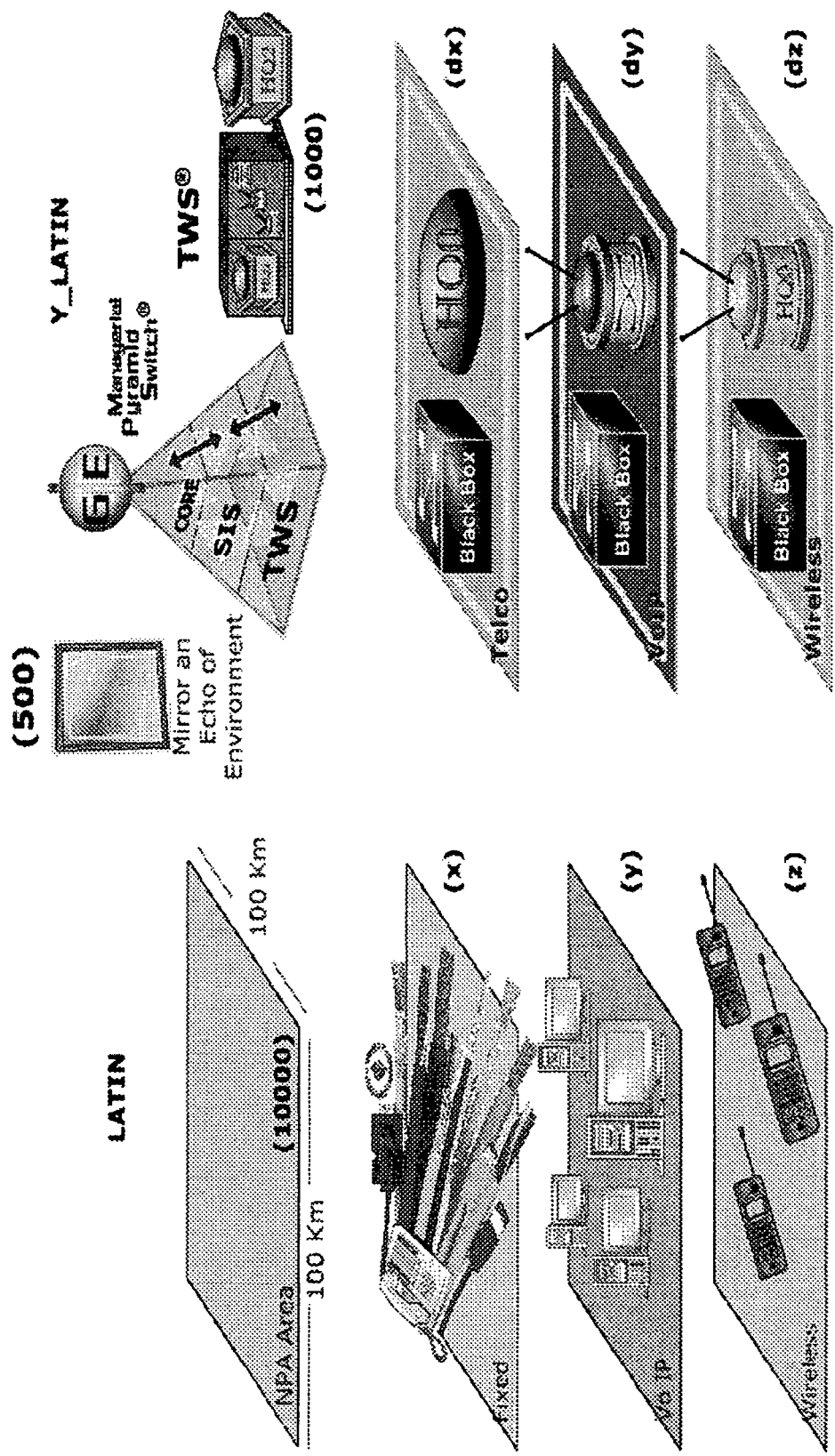

FIG. 35: Converting and Simplifying the NPA Spaghetti by transforming existing NPA Area environment (10000), such as Area Code 305 that covers Dade County Florida comprised of Fixed (dx), Wireless (dy) and Vo IP (dz) networks that work in parallel to deliver Telecommunications services. The system mirrors (500) an echo of all of the activities of the NPA Area environment into the appropriate TWS® (1000), assigning messages with 3D geospatial data and then converting them into a standard format, commercially known as LATIN or Y_LATIN. The system continuously mimics, monitors and simulates the environment, and transfers controls to the appropriate Intelligent Component Fixed (dx), Wireless (dy) and Vo IP (dz) based trajectory path.

The system integrates a plurality of unmanaged raw messages received from the environment, and integrates them into a correlated Vector CDR that is redundant, standard and unique, based on the Business Rules for a call where origin and destination are within the NPA Area environment. At this point, the TWS® builds Simple, Hybrid and Complex Calls by associating Legs (A, B) side information, roaming surcharges and identifying the missing gaps of information.

Figure 36:
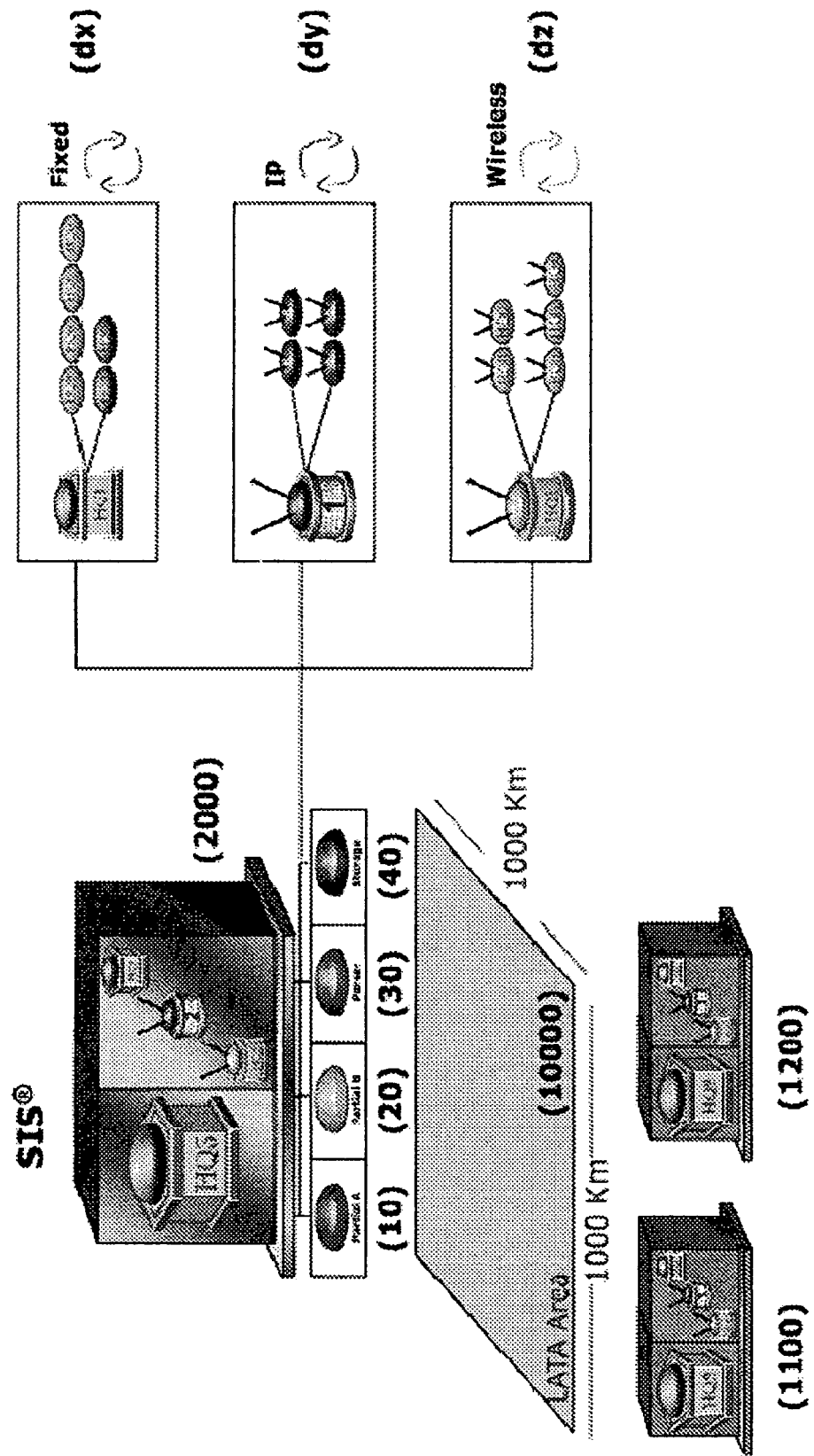

FIG. 36: Normalizing and Organizing a LATA (SIS®) by gathering the information from a Subset of the environment, in this case a given LATA Area (10000). The LATA is broken into independent Subsets, one per NPA Area. The LATA Area HQ3 SIS® (2000) has its own independent NPA Area HQ2 TWS® (1100 to 1300) domains with all of its corresponding subordinate managerial hierarchical organization. The LATA Area HQ3 SIS® processes an echo of the network messages that begins, ends or travels through this geographical area and immediately standardizes and converts each message into geospatial data, and associates cost to each component, so that a mirror image of the existing conditions of the environment is rendered. The SIS® is responsible for identifying Legs (A, B) and Call Owner Intelligent Components, and then takes the appropriate action depending on the network type: Fixed (dx), IP (dy) and Wireless (dz). Each node continuously gathers the information from their assigned Subset of the environment, in particular the NPE assigned to them. The system integrates a plurality of unmanaged raw messages received from the environment, and integrates them into a correlated Vector CDR that is redundant, standard and unique, based on the Business Rules for a call where origin and destination are within the LATA Area environment. At this point, the SIS® has all of the components required to build Simple, Hybrid and Complex Calls by associating Legs (A, B) side information, roaming surcharges and identifying the missing gaps of information.

LATA calls have at least Partial Vector Legs (A, B, T).

Simple Calls are processed by the Leg A Owner NPA Area HQ2 TWS®, and Hybrid and Complex Calls by the LATA Area HQ3 SIS® using the Partial A function (100) and Partial B function (200) to match/merge a correlated Vector CDR, and then Storager function (400) saves the information into a database.

Figure 37:
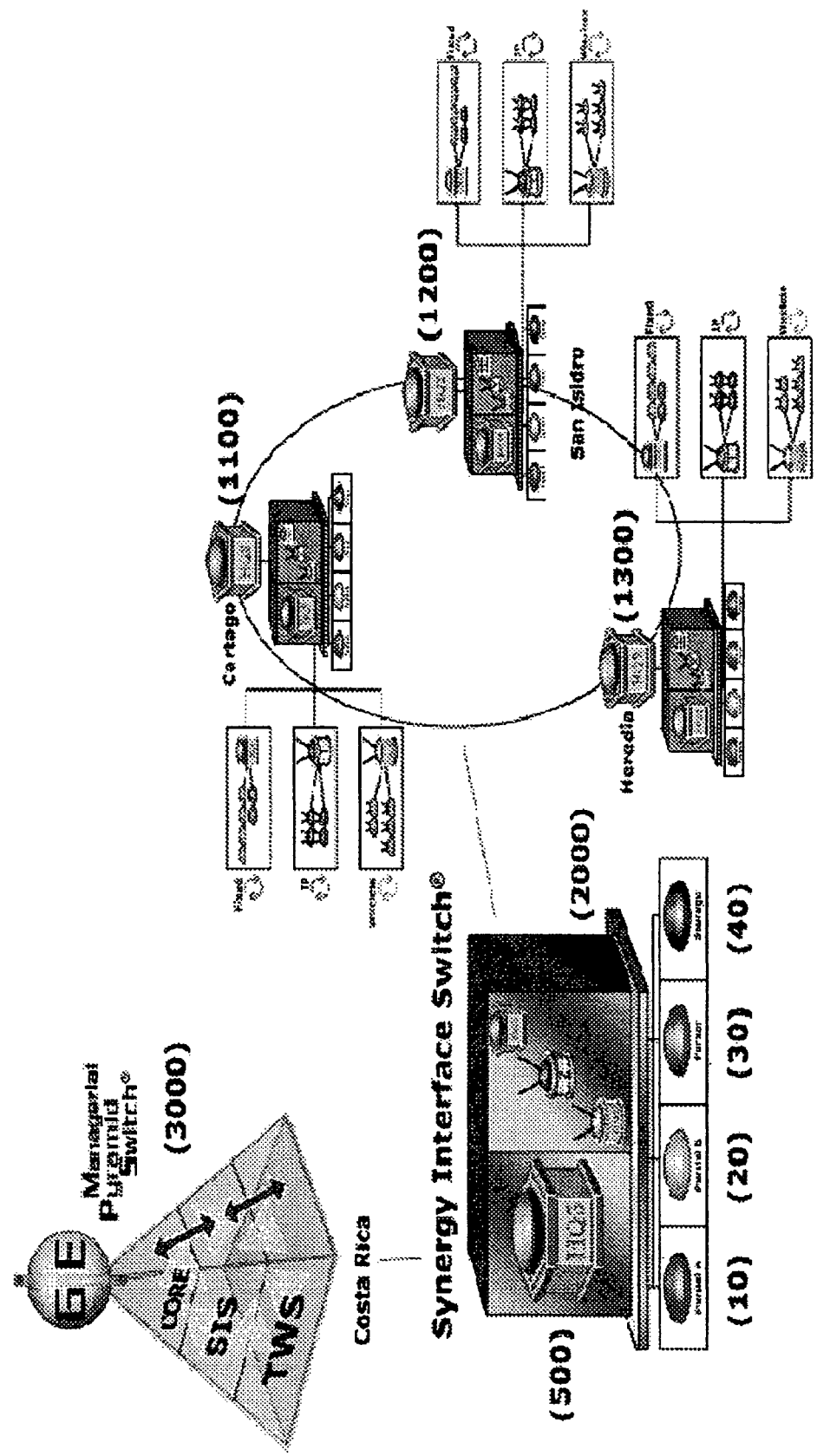

FIG. 37: is a diagram of a Synergy Interface Switch® (2000) and its subordinate Team Work Switch® (1100), (1200) and (1300) that is part of the 'HIVE'. The SIS® can be divided into the following:

Partial A function (10) and Partial B function (20) use Business rules, database triggers and stored procedures to fill the missing gaps of information required for Hybrid and Complex Calls that originate in the coverage area of a subordinate TWS®.

The Parser function (30) converts INBOUND messages of the environment into a lingua franca, and translates OUTBOUND messages to the appropriate packet protocols to communicate with the NPE.

Storager function (40) load balances and distributes tasks through means of placing information in different directories, so that the nodes can scan for new activities and upon detecting new messages executes predefined tasks. For example: An IAM message instantiates a new record and SSN which the assigned Call Owner must create.

The Summit Grid Node (50) is responsible for all of the activities of the SIS® and its subordinate TWS®. This node can act as its parent Synergy Interface Switch® to match/merge regional calls, once it has determined it own Leg A or its equivalent since some subscribers might reside outside of the domain of the Telecommunications organization networks.

The main problem with the classical method of FIG. 28 is that 98% of the calls use more than one NPE to create a single version of the truth billing entity, and to further exacerbate the situation as Wireless becomes the dominant player of the globe with respect to Telecommunications, and up to 50% of the calls will become Hybrid and 5% complex.

For these reasons, an improvement with regards to the existing patents was required:

The concept of Genesis Engine Drone was changed to a Team Work Switch® (TWS®) that behaves as a macro switch that assimilates all of the Fixed, IP Telephony and Wireless NPE within a geographical location, such as a NXX for a Small network, like ICE, Costa Rica with 2 million subscribers, NPA for medium networks such as Bell South Telecommunications with 16 million subscribers, and LATA Regions or the equivalent for large networks such as Telecom Italia and France Telecom with more than 60 million subscribers each.

The SIS® as per ICE, Costa Rica Commercialization Prototype Design consists in a plurality of concurrently working grids of nodes distributed in several layers of switches that perform the following:

Subordinate TWS® (1100, 1200 and 1300) must resolve all of the Simple and Hybrid calls that begin and end within their assigned geographical area.

Parser function (30) interacts with the environment and converts all of the information into a lingua franca assigning them to the correct directory, so that the Intelligent Components can begin to create the appropriate forward and rearward chain updates to the system, the assignment of unique ID, the different distinct call elements Partial Vector Legs (A, B, T, U, X, Y, W) and the Call Owner.

Storager function (40) deletes, inserts, load balances, replicates and updates information that is pertinent to the system. Storager function has readily available information of each circuit and subscriber belonging to the system, and uses special scripts to follow the organization Business Rules to determine the acceptable location of each circuit of the call.

Partial A function (10) can match/merge Leg A side Partial Vector Legs (A, T, X) scanned by subordinate nodes belonging to the originating Leg A TWS®, using the organizational business model of the network that is simulated, so that Leg A HQ0 can match/merge Partial Vector CDR information.

Partial B function (20) can match/merge Leg B side Partial Vector Legs (B, U, Y) scanned by subordinate nodes belonging to the originating Leg B TWS®, using the organizational business model of the network that is simulated, so that Leg B HQ0 can match/merge Partial Vector CDR information.

Summit Grid Node (50) controls the regional domain in the form of a cluster of computers grid that is a sub division of the "HIVE". This HQ integrates the flow of information of the Fixed, IP Telephony and Wireless nodes, so that they can work together using lateral and vertical synergy, and the missing gaps of information can be logically created by following organizational Business Rules.

The Summit Grid Node can act as a Managerial Pyramid Switch® (MPS®) and as its parent when it knows that an entire call is within the domain of a single network, or requires lateral synergy with another SIS® to build a Complex or Hybrid Call. This upgrade improvement process was created to eliminate the unnecessary flow of data upwards towards the summit tier that tends to saturate the system. This node uses lateral synergy with the Leg B owner SIS®, so all of the circuit components Partial Vector Legs (A, B, T, U, X, W, Y, Z) are summed to derive the final Vector CDR.

Cluster Nodes consist of a SIS® managerial hierarchy organization, including their Subset TWS® that collectively comprises a Set of the Superset "HIVE", and are linked together through means of operating system configurations, artificial Intelligent Component scripts and network interface means.

Figure 38:
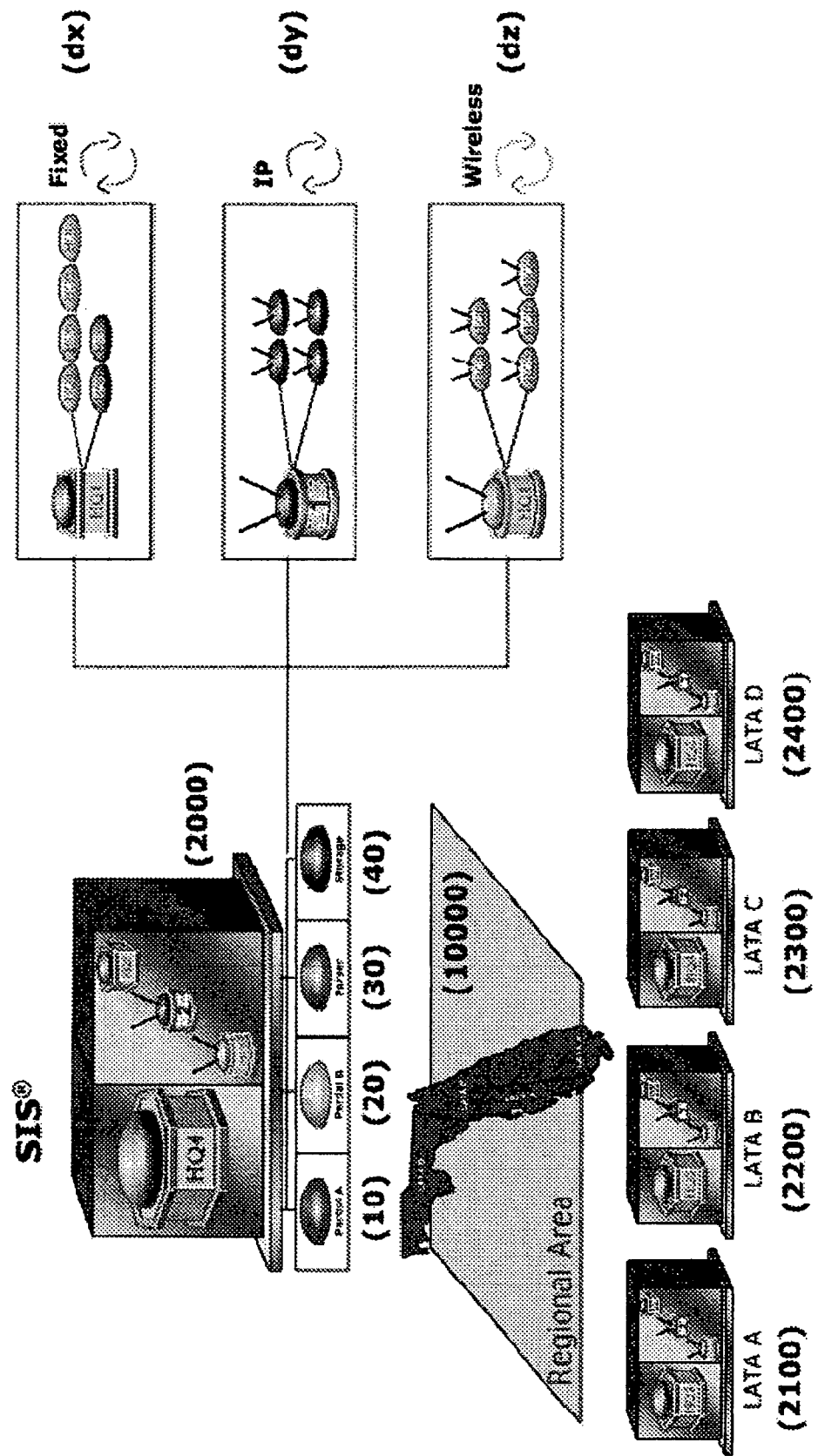

FIG. 38: Normalizing and Organizing a Region (SIS®) by gathering information from a Subset of the environment, in this case a given Region Area (10000). The Region is broken into independent Subsets, one per LATA Area, that are further subdivided into NPA Areas. Each LATA Area HQ3 SIS® (1100 to 1400) has its own plurality of independent NPA Area HQ2 TWS® domains with all of its corresponding subordinate managerial hierarchical organization. The Regional Area HQ4 SIS® (2000) processes an echo of the network messages that begins, ends or travels through this geographical area, and immediately standardizes and converts each message into geospatial data, and associates cost to each component, so that a mirror image of the existing conditions of the environment is rendered. The Parser function (30) is responsible for identifying all of the Legs (A, B, T, U) side components using Fixed (dx), IP (dy) and Wireless (dz) networks. Each node continuously gathers information from their Subset of the environment, in particular the assigned NPE. Then the HQ4 SIS® gathers, distills and disseminates messages from the environment, and then appends existing Vectors CDR or instantiates new ones once the exact trajectory path has been derived, and then the system converts, plots and renders circuit components into geospatial data. SIS® Building Guidelines are in effect, since the entire trajectory path is bound within the Regional Area that is a Set of the environment.

Regional calls have at least Partial Vector Legs (A, B, T).

Simple Calls are processed by the Leg A Owner NPA Area HQ2 TWS®, and Hybrid and Complex Calls by the Regional Area HQ4 SIS® using the Partial A function (10) and Partial B function (20) to match/merge a correlated Vector CDR, and then Storager function (40) saves the information into a database.

Figure 39:
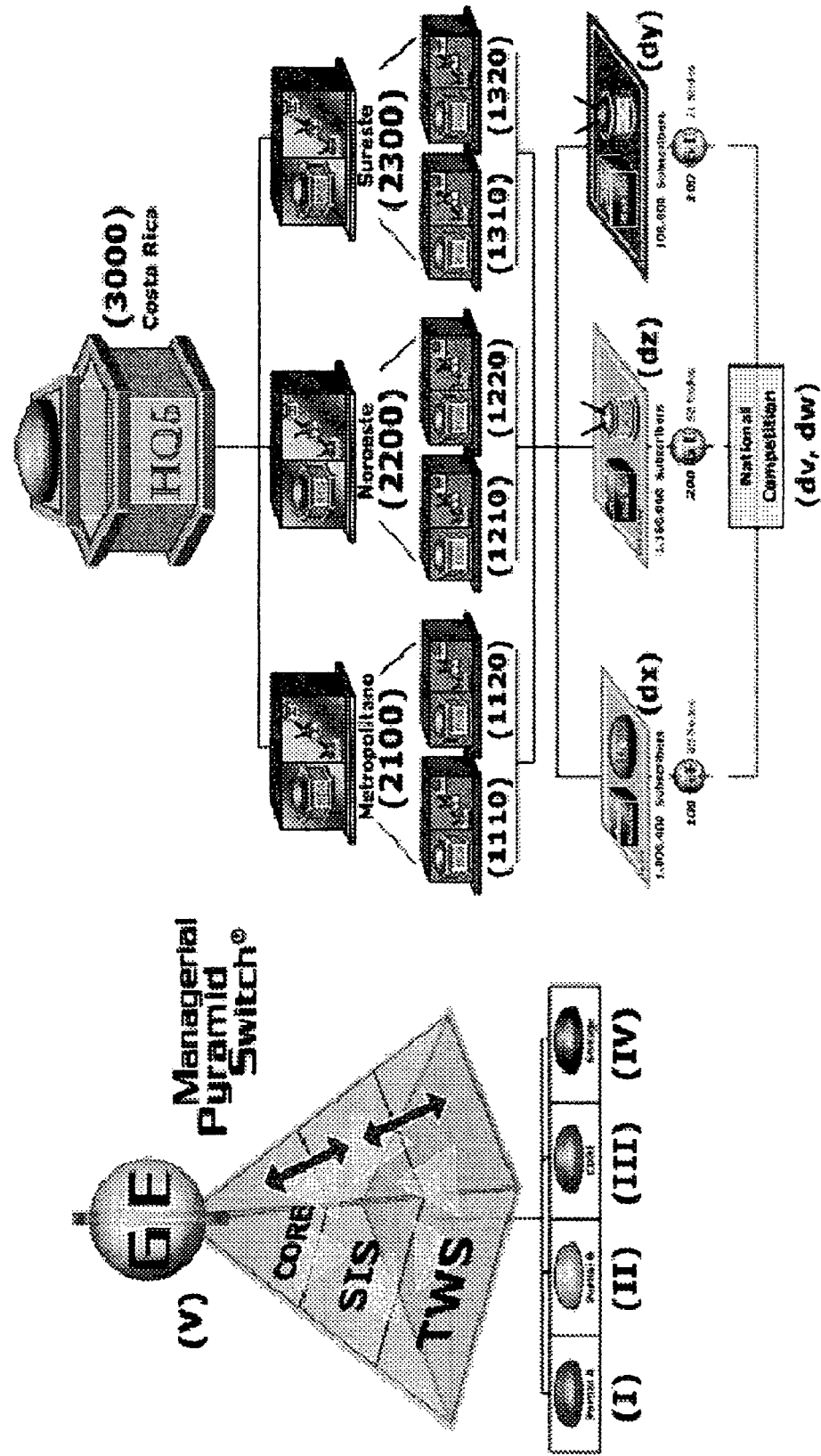

FIG. 39: is a diagram of the Managerial Pyramid Switch® (3000) and its subordinate Team Work Switch® (2100), (2200) and (2300) that are part of the greater 'HIVE'. Using Latin nomenclature the MPS® is divided into the following:

Partial A function (I) and Partial B function (II) consist of Business Rules, specific database triggers and stored procedures to fill the missing gaps of information required for Complex Calls originated from the subordinate TWS®.

The Parser function (III) converts the messages of the environment that none of its subordinates has processed. Ideally, the roaming component of a Complex call is the information that is distilled, analyzed and disseminated.

Storager function (IV) load balances, normalizes and distributes tasks through means of placing information in different directories and real time information to the organization.

The Summit Node (V) is the main node of the "HIVE" and is responsible for all of the activities of the MPS® and its subordinates SIS® and TWS®. This node ideally is used to interact with the resources of the organization, permitting the MPS® to work at a cost of throughput absent of the Russian centralized (communist) model.

The MPS® as per ICE, Costa Rica Commercialization Prototype Design consists of a summit grid with the following layers:

Having a plurality of networks: Fixed (dx), IP (dy), Wireless (dz), ALEC (dv) and CLEC (dw).

The subordinate SIS® (2100, 2200 and 2300) must resolve all of the Hybrid calls that begin and end within their assigned geographical area.

The subordinate TWS® (1110, 1120, 1210, 1220, 1310 and 1320) must resolve all of the Hybrid calls that begin and end within their assigned geographical area.

Parser function (III) interacts and converts messages into a lingua franca, and assigns them to the correct directory, so that the Intelligent Components can begin to create the appropriate forward and rearward chain updates to the system, the assignment of unique ID, the different distinct call elements Partial Vector Legs (A, B, T, U, W, X, Y, Z) and the Call Owner.

Storager function (IV) deletes, inserts, load Balances, Replicates and Updates information that is pertinent to the system. Storager nodes contain the information of each circuit and subscribers belonging to the system, and have special scripts to follow the organization Business Rules to determine the acceptable location of each circuit of the call.

Partial A function (I) can match/merge Partial Vector Legs (A, T, X) scanned by subordinate nodes belonging to the originating Leg A TWS®, using the organizational business model of the network that is simulating, so that Leg A HQ0 can match/merge Partial Vector CDR information.

Partial A function Node (II) can match/merge Partial Vector Legs (B, U, Y) scanned by subordinate nodes belonging to the originating Leg B TWS®, using the organizational business model of the network that is simulating, so that Leg B HQ0 can match/merge Partial Vector CDR information.

Summit Grid Node (V) controls the national or worldwide domain in the form of a cluster of computers grid that is a sub division of the entire Genesis Engine Supercomputer™ cluster, "HIVE" or Superset. This HQ integrates the flow of information of the Fixed, IP Telephony and Wireless nodes, so that they can work together using lateral and vertical synergy, and the missing gaps of information can be logically created by following organizational Business Rules.

The Summit Grid is the parent node that controls and coordinates all of the network resources. This node uses lateral synergy with the Leg B owner SIS®, so all of the circuit components Partial Vector Legs (A, B, T, U, X, W, Y, Z) are summed to derive the final Vector CDR.

Figure 40:
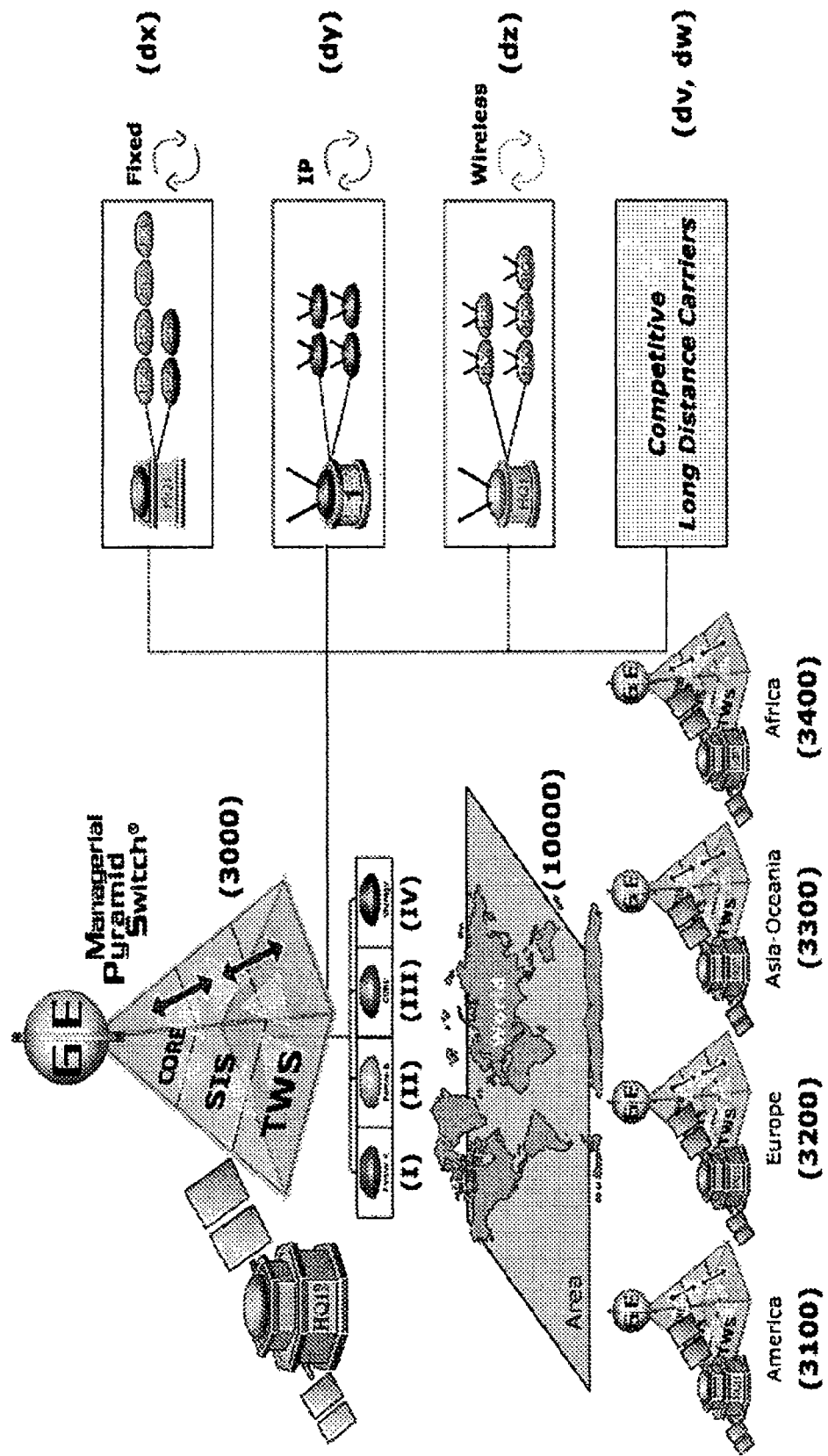

FIG. 40: Normalizing and Organizing a Global Area (MPS®) by gathering information from a Subset of the environment, in this case the Worldwide Area (10000) that consists of America, Europe, Asia-Oceania and Africa. The Worldwide Area is broken into four independent continents areas: America (3100), Europe (3200), Asia-Oceania (3300) and Africa (3400), which are subdivided by Sub Continent, Country, LATA and discrete NPA Areas. The America Area HQ11 MPS® (3000) is subdivided into Sub Continental HQ10 MPS® domains with all of their corresponding subordinate managerial hierarchical organization. The America Area HQ11 MPS® processes an echo of the network messages that begins, ends or travels through this geographical area, and immediately standardizes and converts each message into geospatial data, and associates cost to each component, so that a mirror image of the existing conditions of the environment is rendered. The Parser function (III) is responsible for identifying all of the Legs (T, U, W, X, Y, Z) side components messages using the Fixed (dx), IP (dy), Wireless (dz) and Competitive Long Distance Carriers (dv, dw) networks. Each node continuously gathers information from their Subset of the environment, in particular the assigned NPE. Then the Intelligent Components belonging to the World Area HQ12 MPS® gather, distill and disseminate messages from the environment, and then append existing Vectors CDR or instantiate new ones once the exact trajectory path has been derived, and then the system converts, plots and renders circuit components into geospatial data. The SIS® and TWS® Building Guidelines are in effect, since the entire trajectory path is bound within the World Area that is the environmental Superset or U.

International calls have at least Partial Vector Legs (A, B, T, U).

All of the Simple calls are processed by the Leg A Owner LATA Area HQ3 TWS®, Hybrid by the Leg A owner Multi LATA Area HQ6 SIS®, and Complex Calls by the Leg A owner USA Area HQ9 SIS®. Each HQ, that disseminates a call, uses the Partial A function (10, or I) and Partial B function (20, or II) to match/merge a correlated Vector CDR, and then Storager function (40, or IV) saves the information into a database.

The World Area HQ12 performs no match/merge. The Continental Area HQ11 correlates the Vector CDR based on Inter LATA communications that their subordinate the Sub Continental Area HQ10 and their organization are unable to process. In particular, the Sub Continental Area HQ10 would process preemptively all of the Simple and Hybrid Calls, leaving Complex Calls to the Continental Area HQ11. This leaves the HQ12 resources for planning and coordination of resources, and processing calls to avoid system clog in behalf of their subordinates.

Figure 41:
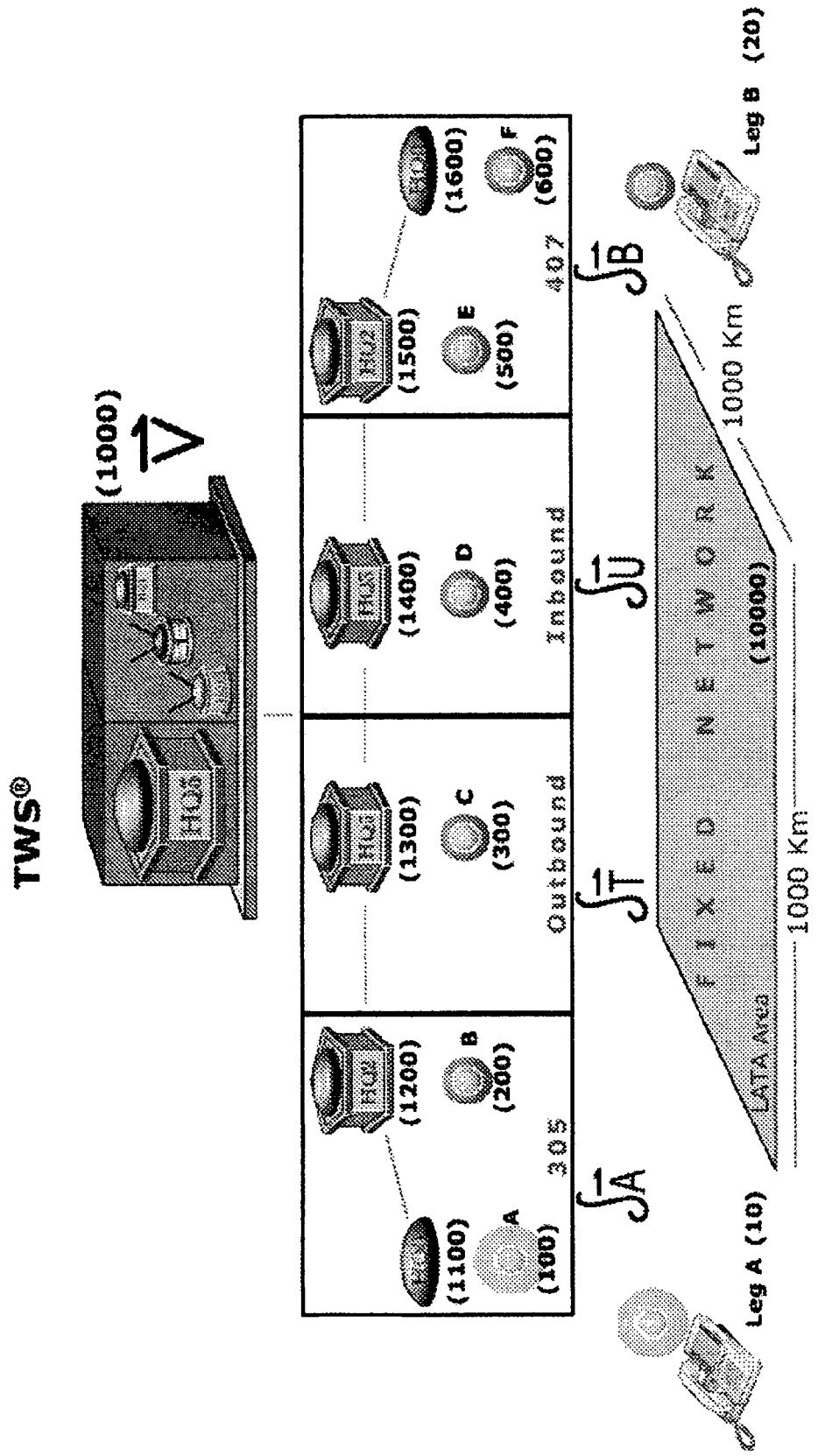

FIG. 41: Building a TWS® Intra LATA Fixed Call is a schematic representation of generating a correlated resultant Vector CDR from a call that resides within the domain of a LATA Area (10000). The connected call uses at least four components: Leg A (100), the origin, Leg B (600), the destination, POP Leg A (200) and POP Leg B (500), and Partial Vectors: Leg T (300) and Leg U (400) that represent the transport segments. The TWS® uses five Intelligent Components: HQ0 Leg A (1100), HQ0 Leg B (1600), HQ2 Leg A (1200), HQ2 Leg B (1500) and HQ3 LATA (1300/1400). In this case, (1300/1400) represents distinct functions of the same node. HQ2 POP Leg A node owns the call since it is a Simple Call, and is responsible for generating the Vector Resultant CDR after validating at least four CDR and a plurality of Partial Vectors. As the vector trajectory is being built via the forward and rearward packet messages, the following nodes must gather the missing gaps of information, validate, verify and then complete their corresponding components, in this case Partial Vectors: Leg A by (1200), Leg B by (1500) and Legs (T, U) by (1300/1400), required to match/merge the Vector CDR.

Figure 42:
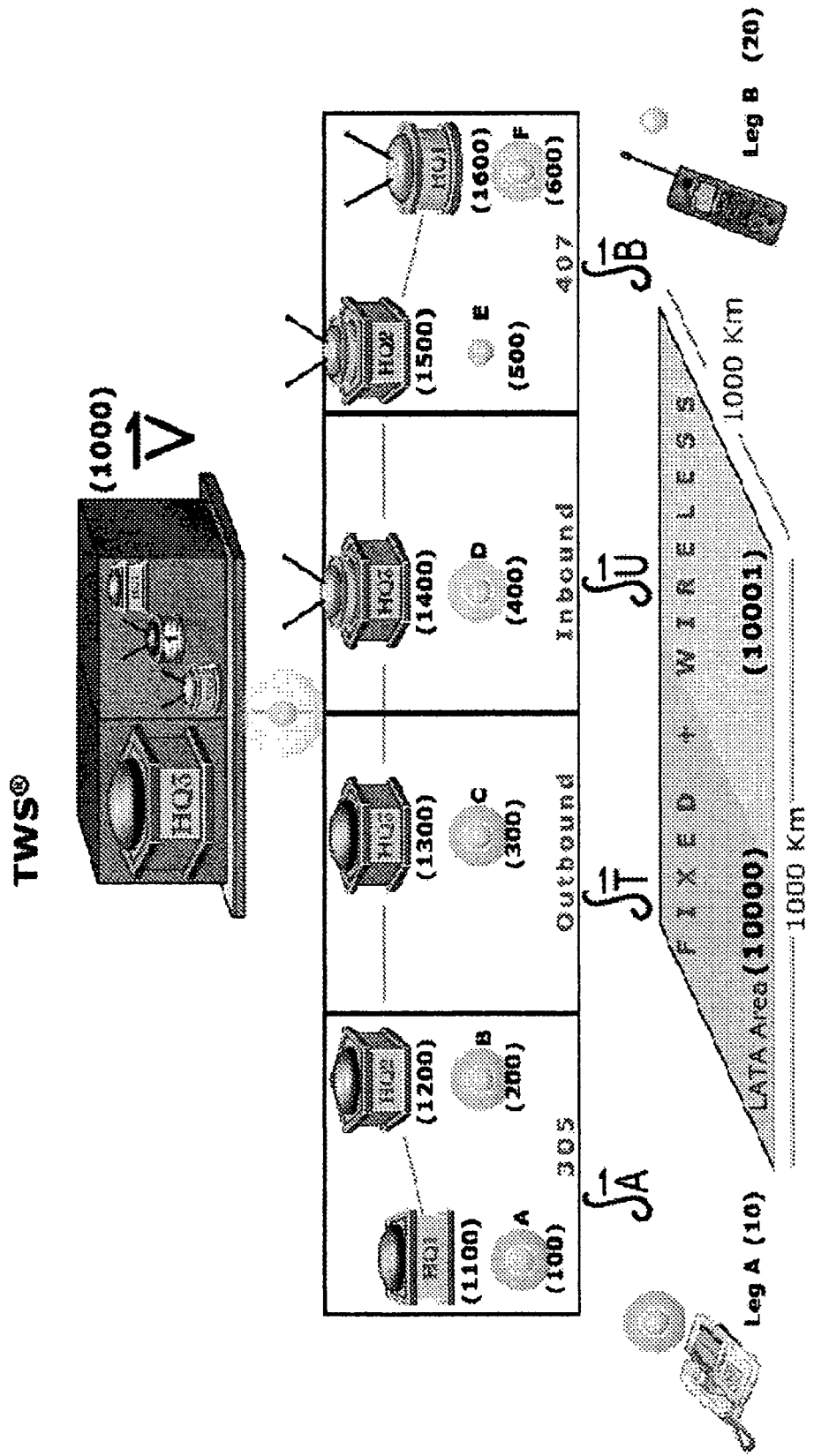

FIG. 42: Building a TWS® Intra LATA Hybrid Call is a schematic representation of generating a correlated resultant Vector CDR (1000) from a call that resides within the domain of a Fixed/Wireless LATA Area (10000/10001). Leg A (10) belongs to a Fixed Network, whereas Leg B (20) to a Wireless Network. The connected call uses at least four NPE: Leg A (100), the origin, Leg B (600), the destination, POP Leg A (200) and POP Leg B (500), and Partial Vectors: Leg A (200), Leg B (500), Leg T (300) and Leg U (400) that represent the network transport segments. The TWS® uses five Intelligent Components: HQ1 Leg A (1100), HQ1 Leg B (1600), HQ2 Leg A (1200), HQ2 Leg B (1500) and HQ3 LATA (1300/1400). HQ3 LATA node owns the call since it is a Hybrid Call and is responsible for generating the Vector Resultant CDR after validating at least four CDR and a plurality of Partial Vectors. In this case, (1300/1400) represents distinct functions of the summit node of the TWS® that performs the match/merge. As the vector trajectory is being built via the forward and rearward packet messages, the following nodes must gather the missing gaps of information, validate, verify and then complete their corresponding components, in this case Partial Vectors: Leg A by (1200), Leg B by (1300), Leg T by (1300) and Leg U by (1400), required to match/merge the Vector CDR.

Figure 43:
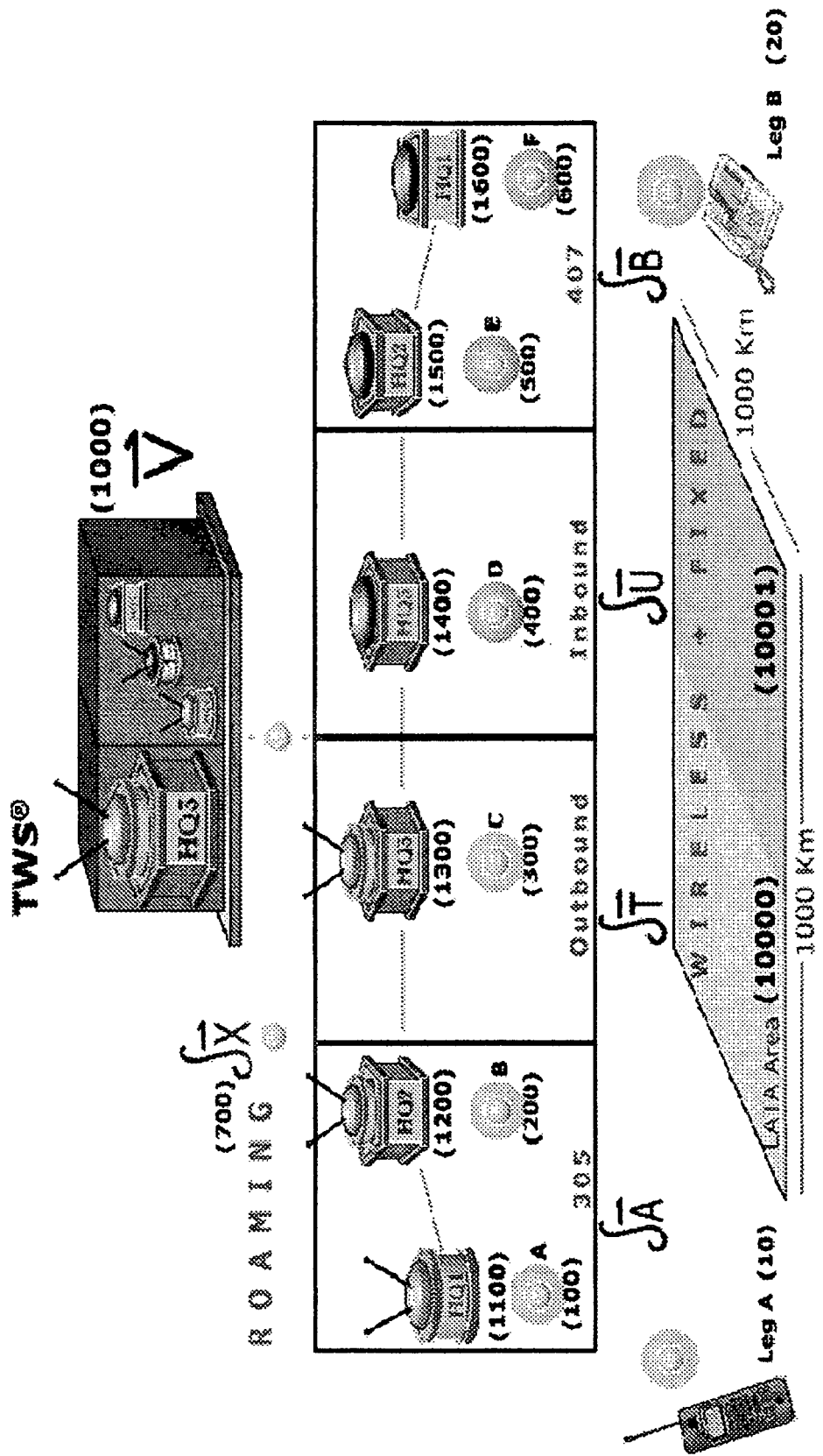

FIG. 43: Building a TWS® Intra LATA Complex Call is a schematic representation of generating a correlated resultant Vector CDR (1000) from a call that resides within the domain of a LATA Wireless/Fixed Area (10000/10001). Leg A (10) belongs to a Wireless Network, whereas Leg B (20) to a Fixed Network. The connected call uses at least four NPE: Leg A (100), the origin, Leg B (600), the destination, POP Leg A (200) and POP Leg B (500), and Partial Vectors: Leg A (200), Leg B (500), Leg T (300), and Leg U (400) that represent the network transport segments, and Leg X (700) the roaming segments. The TWS® uses five Intelligent Components: HQ1 Leg A (1100), HQ1 Leg B (1600), HQ2 Leg A (1200), HQ2 Leg B (1500) and HQ3 LATA (1300/1400). HQ3 LATA node owns the call since it is a Hybrid Call and is responsible for generating the Vector Resultant CDR after validating at least four CDR and a plurality of Partial Vectors. In this case, (1300/1400) represents distinct functions of the same node of the TWS® that performs the match/merge. As the vector trajectory is being built via the forward and rearward packet messages, the following nodes must gather the missing gaps of information, validate, verify and then complete their corresponding components, in this case Partial Vectors: Leg A by (1200), Leg B by (1300), Leg T by (1300), Leg U by (1400) and Leg X by (1100), required to match/merge the Vector CDR.

Figure 44:
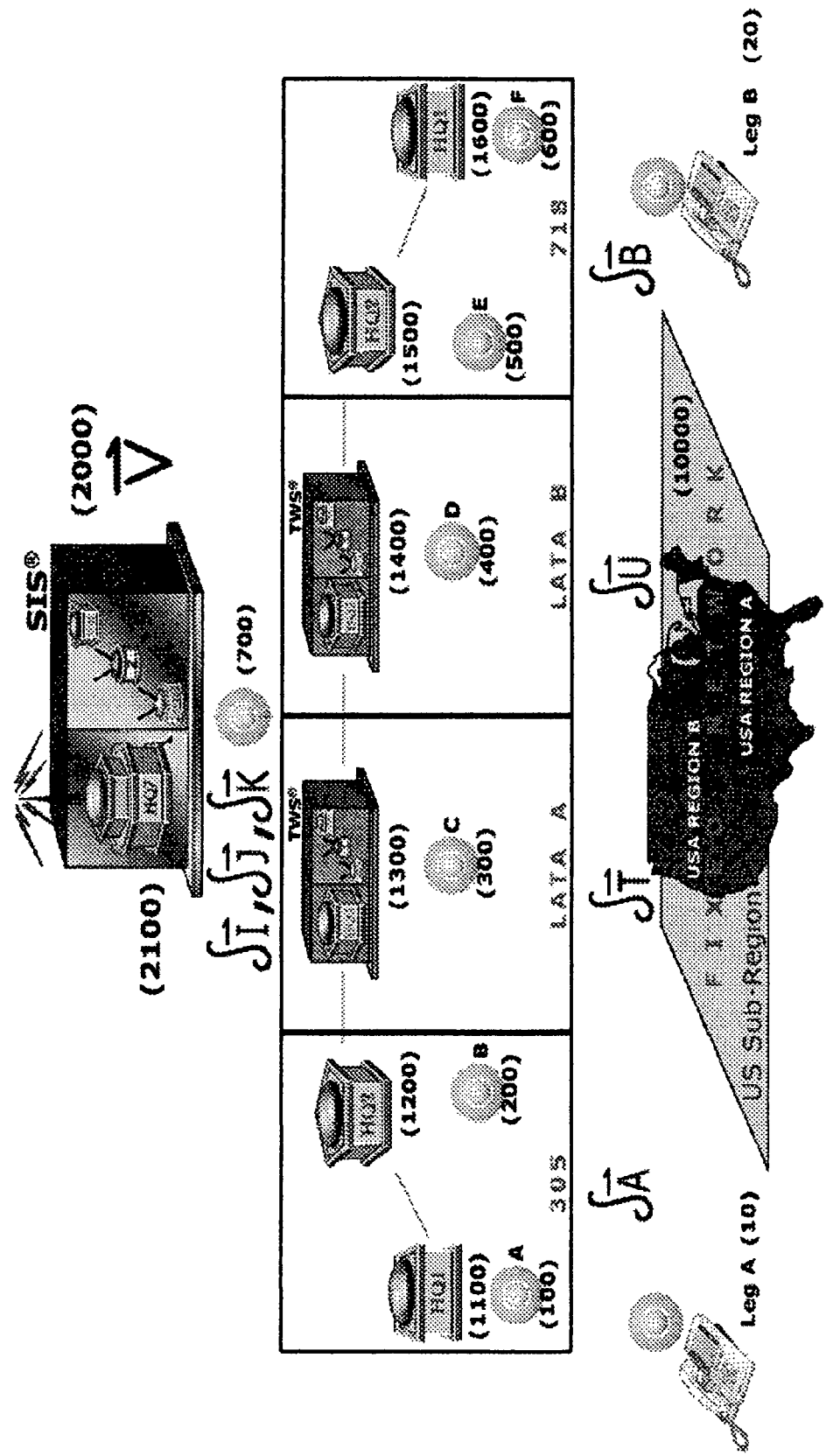

FIG. 44: Building a SIS® US Sub Region Simple Call is a schematic representation of generating a correlated resultant Vector CDR from an Inter LATA Fixed Simple call that resides within the domain of a plurality of LATA Areas (10000), in this case East USA. The connected call uses at least four NPE: Leg A (100), the origin, Leg B (600), the destination, POP Leg A (200) and POP Leg B (500), and Partial Vectors: Leg T (300), Leg U (400) and Legs (I, J, K) (700) that represent transport segments that bind them within the plurality of LATA Areas. The SIS® uses seven Intelligent Components: HQ1 Leg A (1100), HQ0 Leg B (1600), HQ2 Leg A (1200), HQ2 Leg B (1500), TWS® Leg A (1300), TWS® Leg B (1400), and HQ7 SIS® (2100). TWS® LATA Leg A node (1300) owns the call since it is a Simple Call and is responsible for generating the Vector Resultant CDR after validating at least four CDR and a plurality of Partial Vectors. As the vector trajectory is being built via the forward and rearward packet messages, the following nodes must gather the missing gaps of information, validate, verify and then complete their corresponding components, in this case Partial Vectors: Leg A by (1200), Leg B by (1500), Leg T by (1300), Leg U by (1400) and Legs (I, J, K) by (2100), required to match/merge the Vector CDR.

Figure 45:
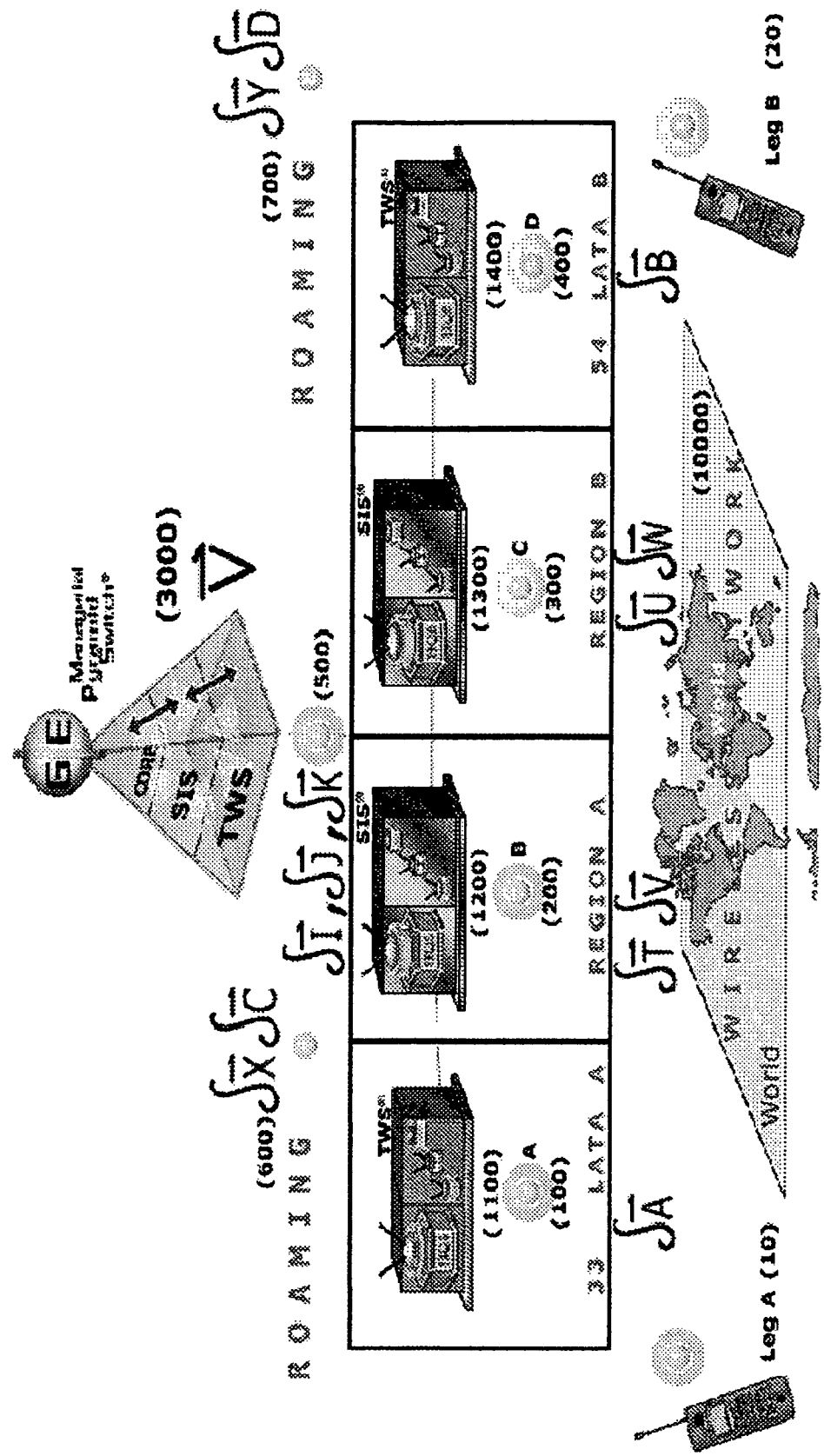

FIG. 45: Building a MPS® International Complex Call is a schematic representation of generating a correlated resultant Vector CDR from a call that resides within the domain of a plurality of Wireless LATA Areas (10000/10001), in this case the world. This call is the worst case scenario illustration that tags at least four calls. The connected call uses at least two NPE: POP Leg A (100), the origin, and POP Leg B (400), the destination, and Partial Vectors: Legs (T, V) (300), Legs (U, W) (400) and Legs (I, J, K) (700) that represent transport segments, and Legs (X, C) (800) and Legs (Y, D) (900) roaming segments. The MPS® uses five Intelligent Components: TWS® HQ3 Leg A (1100), TWS® HQ3 Leg B (1400), SIS® HQ5 Leg A (1200), SIS® Leg B (1300) and MPS® HQ11 (3100). SIS® HQ9 North America or SIS® HQ7 East USA (not shown in the figures) and/or TWS® LATA Leg A (1300) nodes may own the Complex Call depending on available resources when the call instantiated, and are responsible for generating the Vector Resultant CDR after validating at least four CDR and a plurality of Partial Vectors. As the vector trajectory is being built via the forward and rearward packet messages, the following nodes must gather the missing gaps of information, validate, verify and then complete their corresponding components, in this case Partial Vectors: Legs (X, C) by (1100), Legs (Y, D) by (1600), Leg A by (1200), Leg B by (1500), Legs (T, V) by (1300), Legs (U, W) by (1400) and Legs (I, J, K) by (2100), required to match/merge the Vector CDR.

Figure 46:
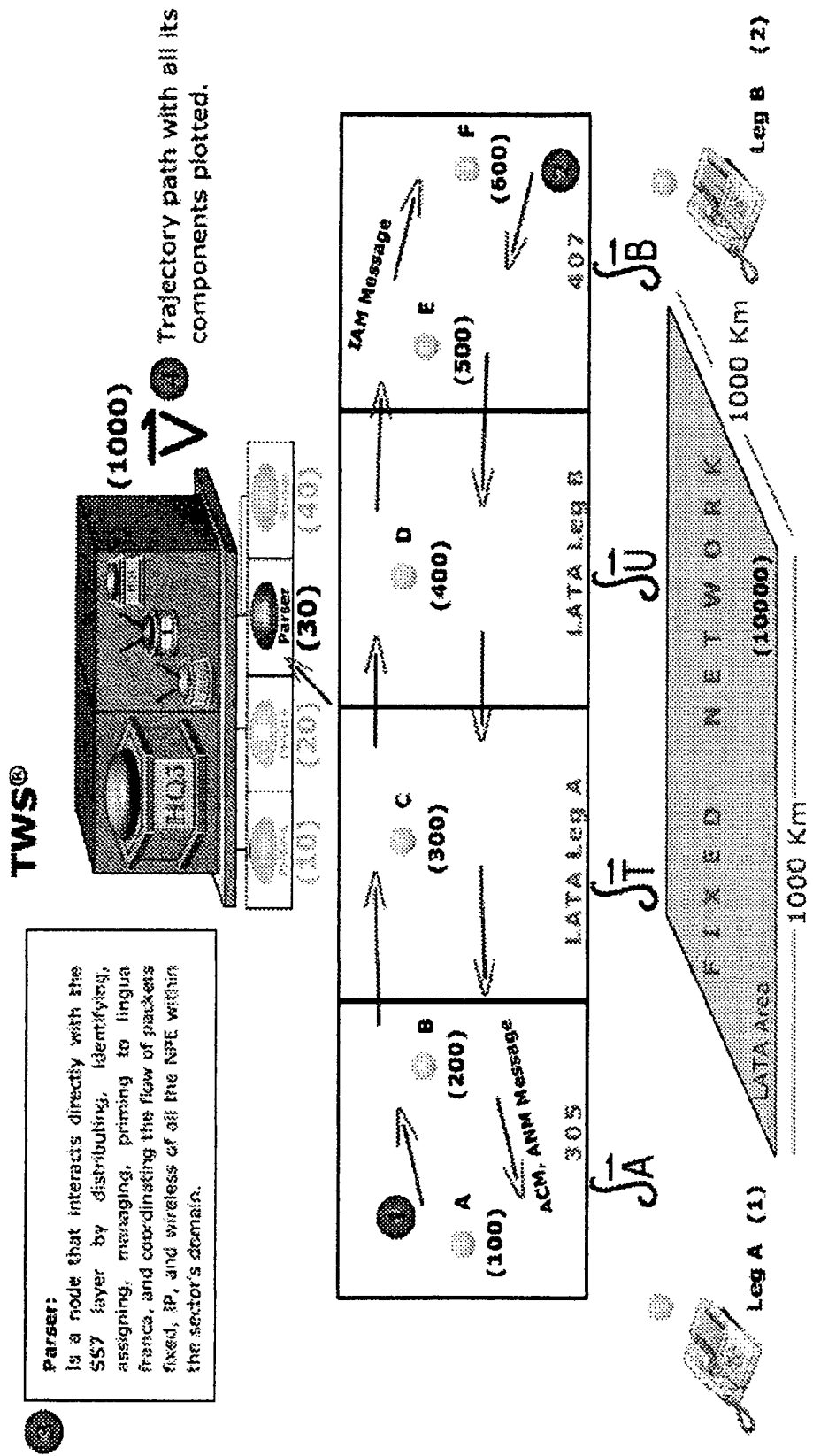

FIG. 46: The TWS® Parser function is a schematic representation of detecting through the environment (10000) all of the circuits required to map and plot the call trajectory. When a given call instantiates an (1) IAM message, it is transmitted circuit by circuit through the environment domain of a TWS® (1000) from Leg A (10), the origin, to Leg B (20), the destination. This permits the Parser function (30) to determine the vector trajectory path, HQ Call Owner and also Legs (A, B) geospatial location. Once (2) ACM and ANM messages are received as the NPE connects the call, the system's artificial intelligent nodes follow business rules and deductive logic (3) to further find the missing gaps of information, known as the Partial Vectors or δ Leg A, δ Leg T, δ Leg U and δ Leg B that allow the Call Owner to reach optimal information entropy, once the circuit information is validated and verified with certitude, and the exact trajectory path (4) is obtained instantiating a Vector CDR.

Figure 47:
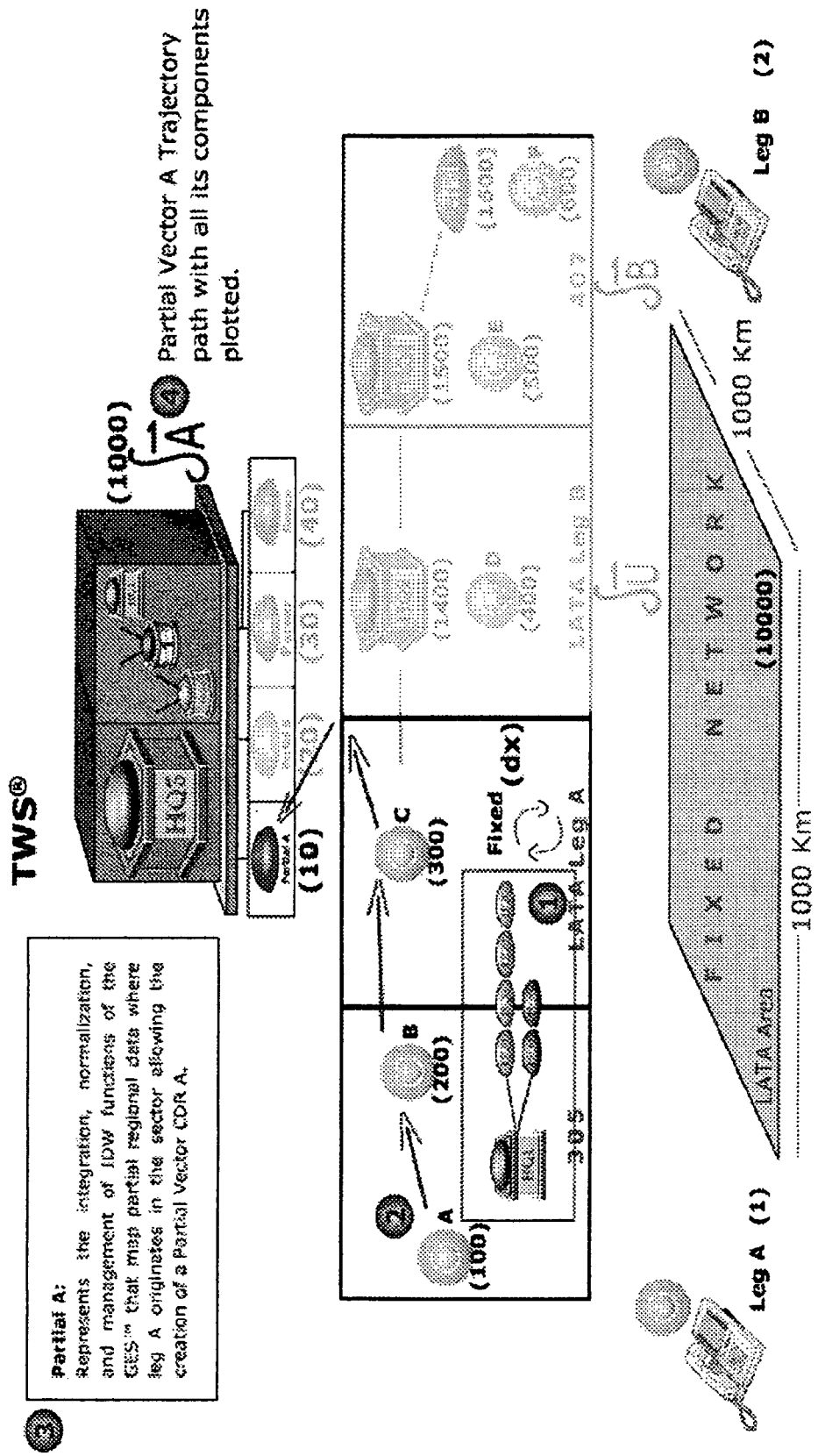

FIG. 47: The TWS® Partial A function is a schematic representation of detecting through the environment (10000) the different circuits (100), (200) and (300) of the call required to plot the trajectory, in particular Leg A side components. The system detects messages from the echo of the wireless environment (dz) that are (1) immediately converted into lingua franca messages. Then the call is determined to exceed (2) the LATA domain of the (1000) TWS®, and the system Partial A function (10) to build (3) Partial Leg A Vector CDR with Leg A side information. Then the (4) Partial Leg A Vector CDR is sent to the Call Owner, so it can match/merge the resultant correlated Vector CDR.

Figure 48:
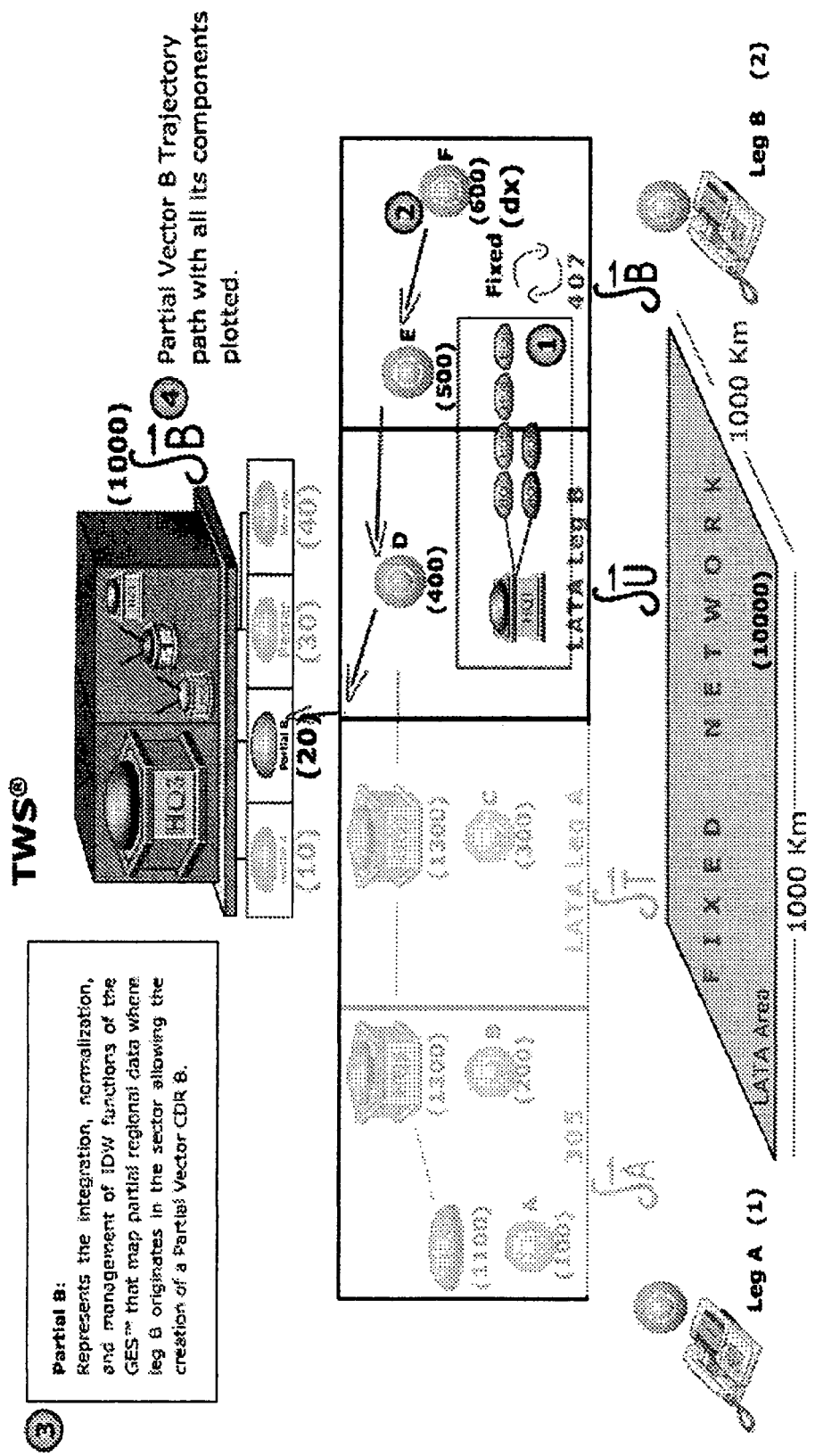

FIG. 48: The TWS® Partial B function is a schematic representation of detecting through the environment (10000) the different circuits (400), (500) and (600) of the call required to plot the trajectory, in particular Leg B side components. The system detects messages from the echo of the fixed environment (dx) that are (1) immediately converted into lingua franca messages. Then the call is determined to exceed (2) the LATA domain of the TWS® (1000), and the system Partial B function (20) to build (3) Partial Leg B Vector CDR with Leg B side information. Then the (4) Partial Leg B Vector CDR is sent to the Call Owner, so it can match/merge the resultant correlated Vector CDR.

Figure 49:
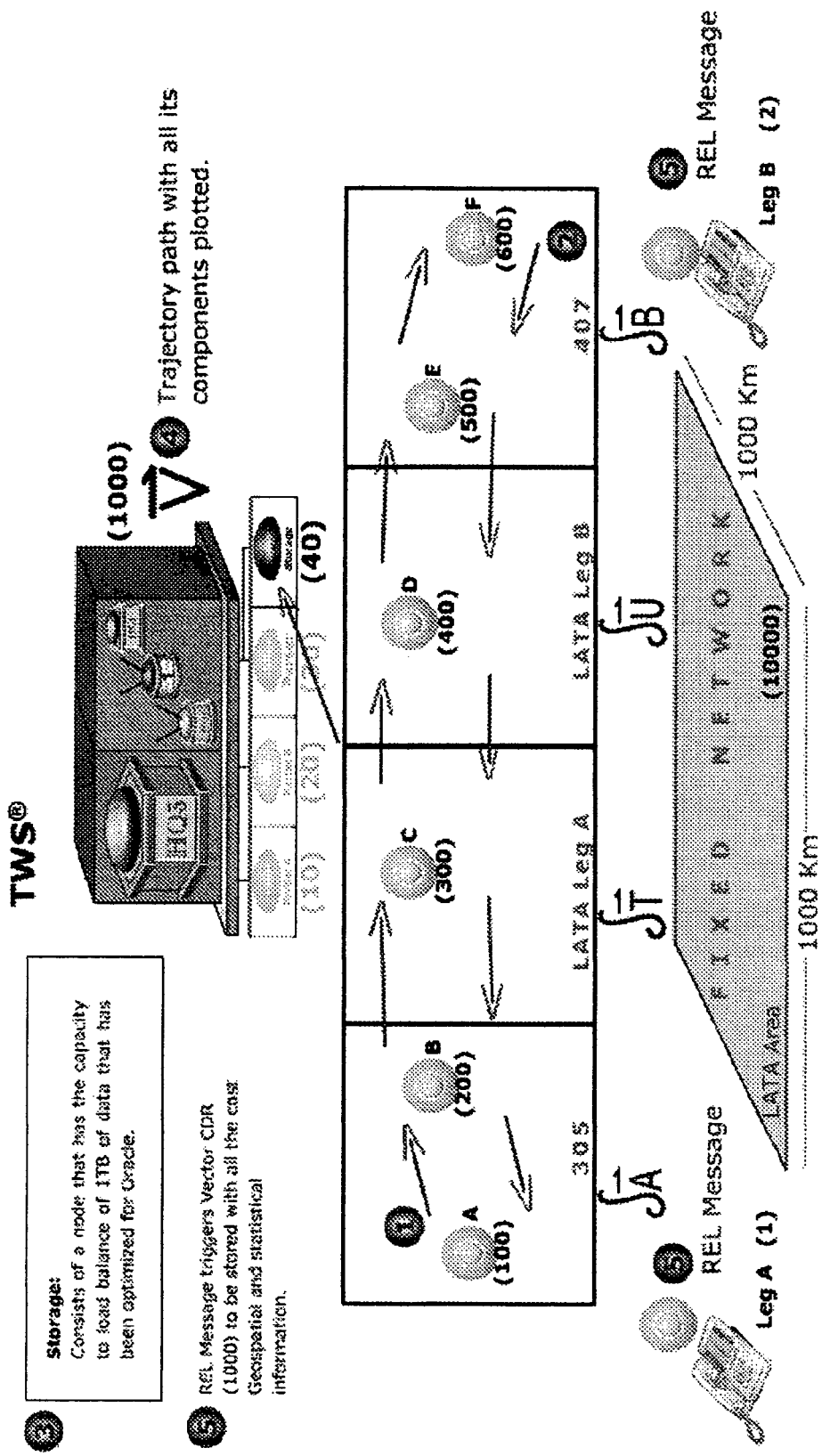

FIG. 49: The TWS® Storager function is a schematic representation of detecting through the environment (10000) all of the circuits required to map and plot the call trajectory. When a given call instantiates an (1) IAM message, it is transmitted circuit by circuit through the environment domain of a TWS® (1000) from Leg A (10), the origin, to Leg B (20), the destination. This permits the Storager function (40) to load balance the data amongst its subordinate nodes. Once (2) ACM and ANM messages are received as the NPE connects the call, the system's artificial intelligent nodes follow business rules and deductive logic to further find the missing gaps of information that permit the Call Owner to reach optimal information entropy, once the circuit information is validated and verified (3) with certitude. Each subcomponent of the call is (4) associated with cost, geospatial and statistical information required to have network wide environmental bitmap data, and is incorporated to the correlated resultant (5) Vector CDR.

Figure 50:
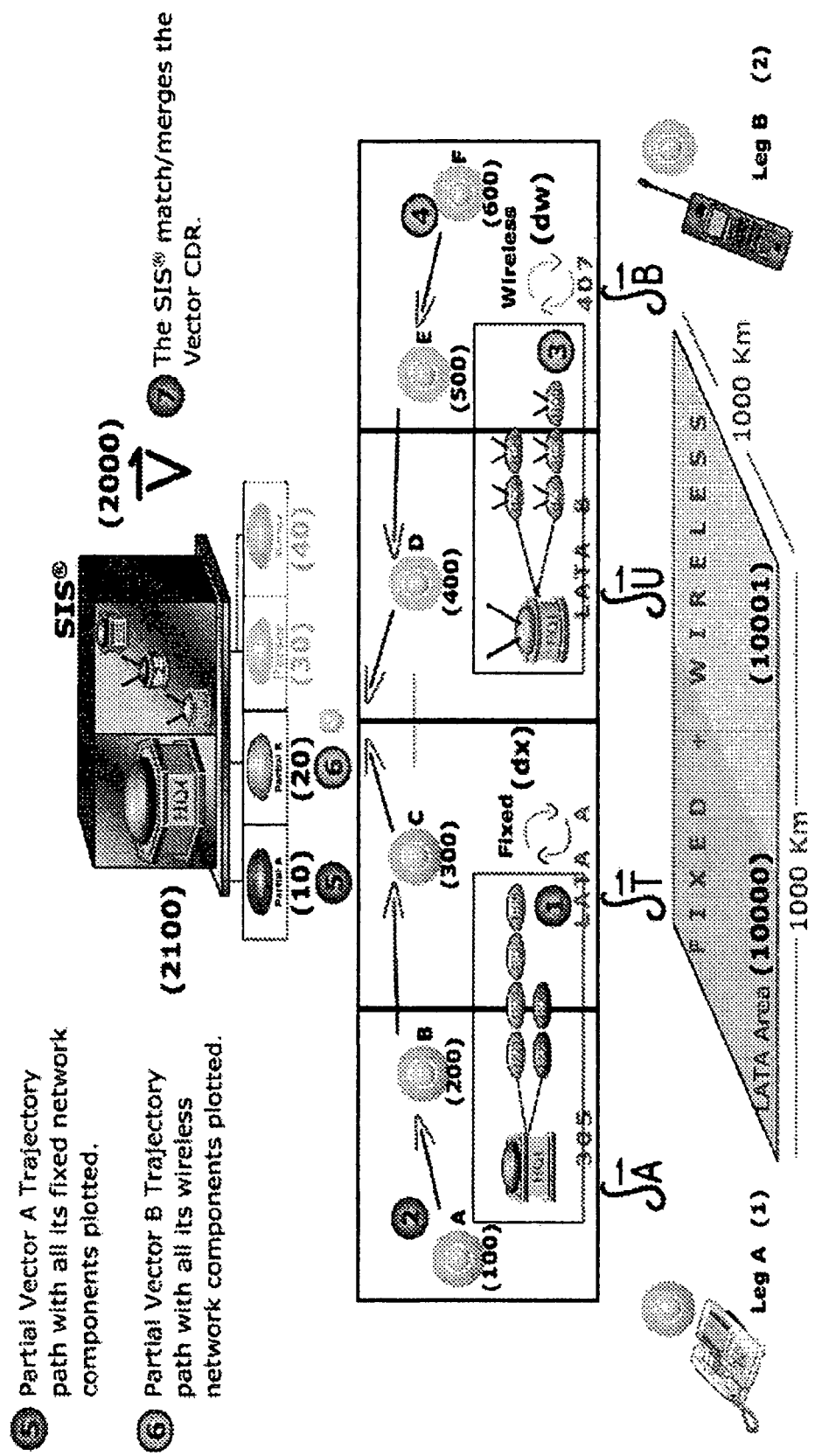

FIG. 50: The SIS® match/merges process of building a Hybrid Call is a schematic representation of detecting through the fixed/wireless environment (10000/10001) the different circuits (100), (200), (300), (400), (500) and (600) of the call required to plot the trajectory. The system detects messages of the echo of the fixed (dx) and wireless (dw) environment, and immediately converts them into lingua franca messages (1) Leg A and (3) Leg B side information. Then the call is determined to exceed (2) the fixed LATA environmental domain of the SIS® (2000), and the system Partial A function (10) to build (5) Partial Leg A Vector CDR with Leg A fixed environment side information. Then the Partial Leg A Vector CDR is forward chained to the Call Owner, so it can match/merge the resultant correlated (7) Vector CDR. At the same time, the call is determined to exceed (4) the wireless LATA environmental domain of the SIS® (2000), and the system Partial B function (20) to build (6) Partial Leg B Vector CDR with Leg B wireless environment side information. Then the Partial Leg B Vector CDR is rearward chained to the Call Owner, so it can match/merge the resultant correlated (7) Vector CDR.

Figure 51:
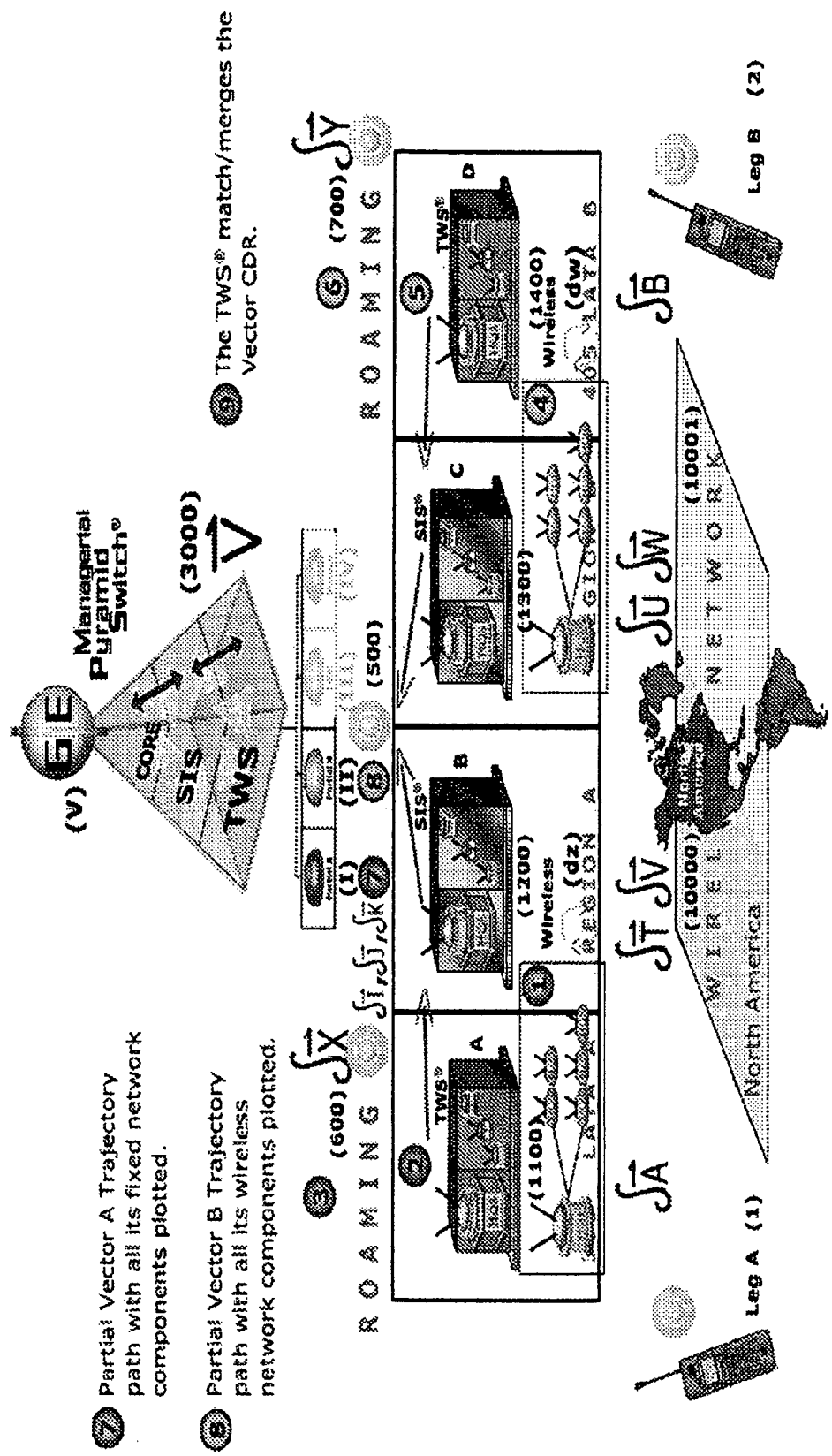

FIG. 51: The MPS® match/merge process of building a Complex Call is a schematic representation of detecting through the fixed/wireless environment (10000/10001) the different circuits (100), (200), (300), (400), (500), (600) and (700) of the call required to plot the trajectory. The system detects messages of the echo of the fixed (dx) and wireless (dw) environment, and immediately converts them into lingua franca messages (1) Leg A and (4) Leg B side information. Then the call is determined to exceed the wireless environmental domain of the MPS® (3000), and the system can match/merge (2) Leg A (I) side information from SIS® Leg A (1200), and (3) roaming information from TWS® Leg A (1100) to build (7) Partial Leg A Vector CDR with Leg A wireless environment side information. Then the Partial Leg A Vector CDR is forward chained to the Call Owner, so it can match/merge the resultant correlated (8) Vector CDR. At the same time, the call is determined to exceed the wireless environmental domain of the MPS® (3000), and the system can match/merge (5) Leg B (II) side information from SIS® Leg B (1300), and (6) roaming information from TWS® Leg B (1400) to build (8) Partial Leg B Vector CDR with Leg B wireless environment side information. Then the Partial Leg B Vector CDR is rearward chained to the Call Owner, so it can match/merge the resultant correlated (9) Vector CDR.

Figure 52:
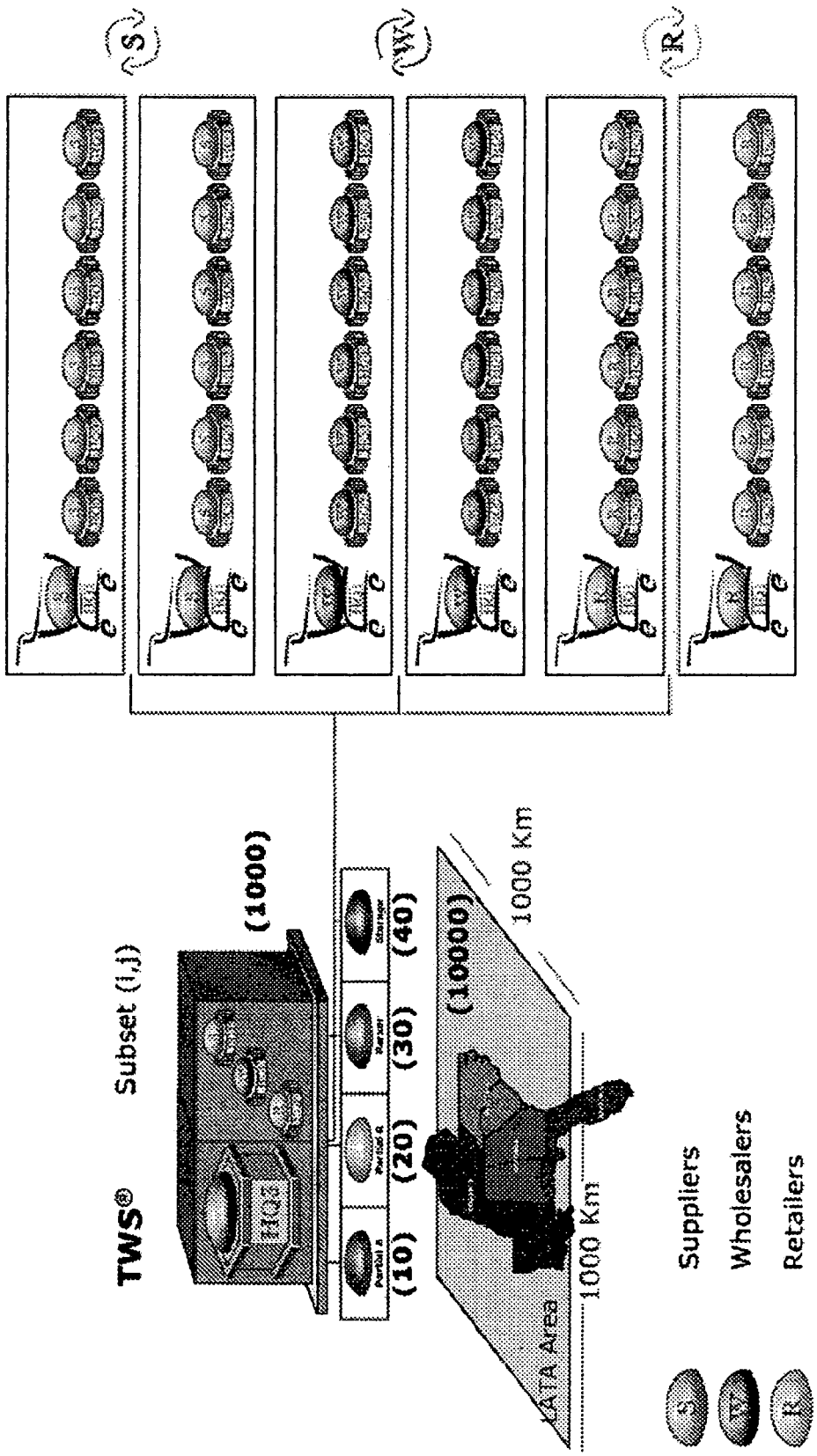

FIG. 52: UCommerce/TWS® (1000) is part of a greater cluster and controls a predefined geographical area covering a plurality of LATA (Local Access and Transport Areas) (10000).

Partial Leg A (10) and Partial Leg B (20) functions consist of Artificial Intelligence means to create Quotes, Micro, Macro, Super and Global Orders from a plurality of origination points to a common denominator UCommerce, Warehouse or destination port.

The Parser function (30) is responsible for converting all of the messages into a lingua franca standard and updating all of the $3^{rd}$ party inventory means.

The Storager function (40) is a distributed database engine that handles terabytes of information that distributes tasks to different directories, so that a plurality of Intelligent Components can analyze the latest conditions of the environment and satisfy quotes and orders with the lowest cost and time delays to the end user.

The <S> for Suppliers consists of a plurality of Intelligent Components HQ1-HQ0 that manage and control the $3^{rd}$ party inventory means of suppliers and their organizations.

The <W> for Wholesalers consists of a plurality of Intelligent Components HQ1-HQ0 that manage and control the $3^{rd}$ party inventory means of suppliers and their organizations.

The <R> for Retailers consists of a plurality of Intelligent Components HQ1-HQ0 that manage and control the $3^{rd}$ party inventory means of suppliers and their organizations.

<R>, <S> and <W> have the geographic subset (i, j) and are linked to a common denominator <U> UCommerce Warehouse H3-HQ2 that serves as Leg B final destination when merchandise is shipped from originating $3^{rd}$ parties.

The system utilizes business rules to create Vectors CDR that have a complete quote or order of an end user that is part of more complex data structures such as a macro order.

The TWS® is a subset (i, j) subordinate of a SIS® set (i) that controls a continental region, which in turn belongs to the superset (U).

The partial differential equation permits the match/merge of a plurality of quotes and orders into complex structures and also permits that each end user request be unique. Once the geospatial data is normalized, plotted, quantified and qualified, the system can use available Inventory, Shipping and Handling means to derive the optimal price.

Figure 53:
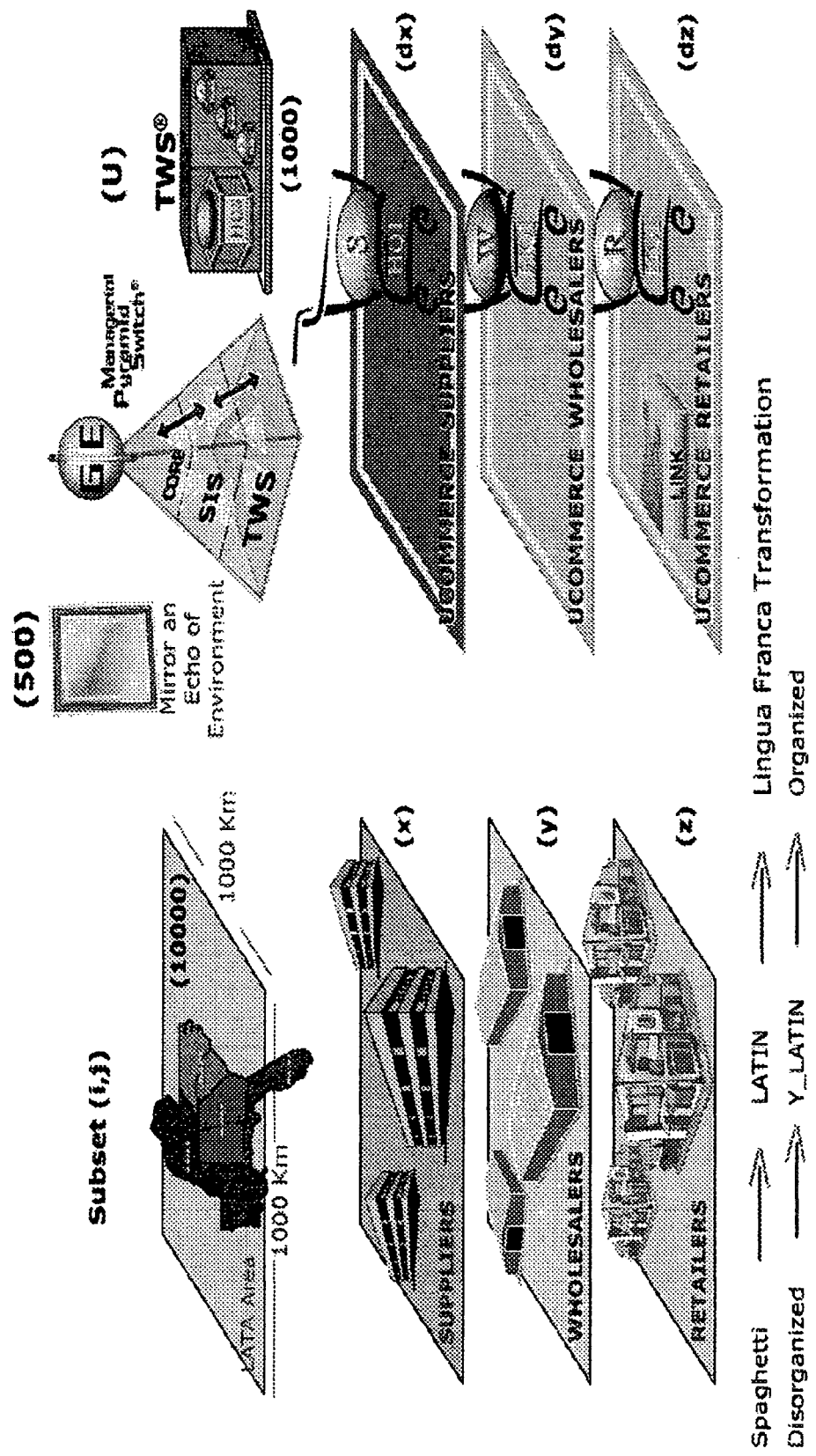

FIG. 53: Converting and Simplifying a subset (i, j), and creating a mirror of the environment (500) that is converted, standardized and transformed to remove the spaghetti phenomena of disassociated <R> Retailers, <S> Suppliers and <W> Wholesalers belonging to a geographical area (10000), in this case Southeastern USA. These $3^{rd}$ parties are managed and controlled by a particular <U> UCommerce Warehouse that regulates and rations the available inventory based on cost and need.

The system integrates an x or Retailers, y or Suppliers and z or Wholesalers, and then optimizes its inventory means into dx, dy and dz respectively that are available to a UCommerce warehouse. All of the messages from these $3^{rd}$ party inventory means are integrated and standardized as Vectors CDR that possess Leg A origin, Leg (T, U) Tandem destination and Leg B final destination points for the world wide delivery of merchandise. Using business rules, the system can purchase one item for one end user or in mass for a plurality of customers.

Figure 54:
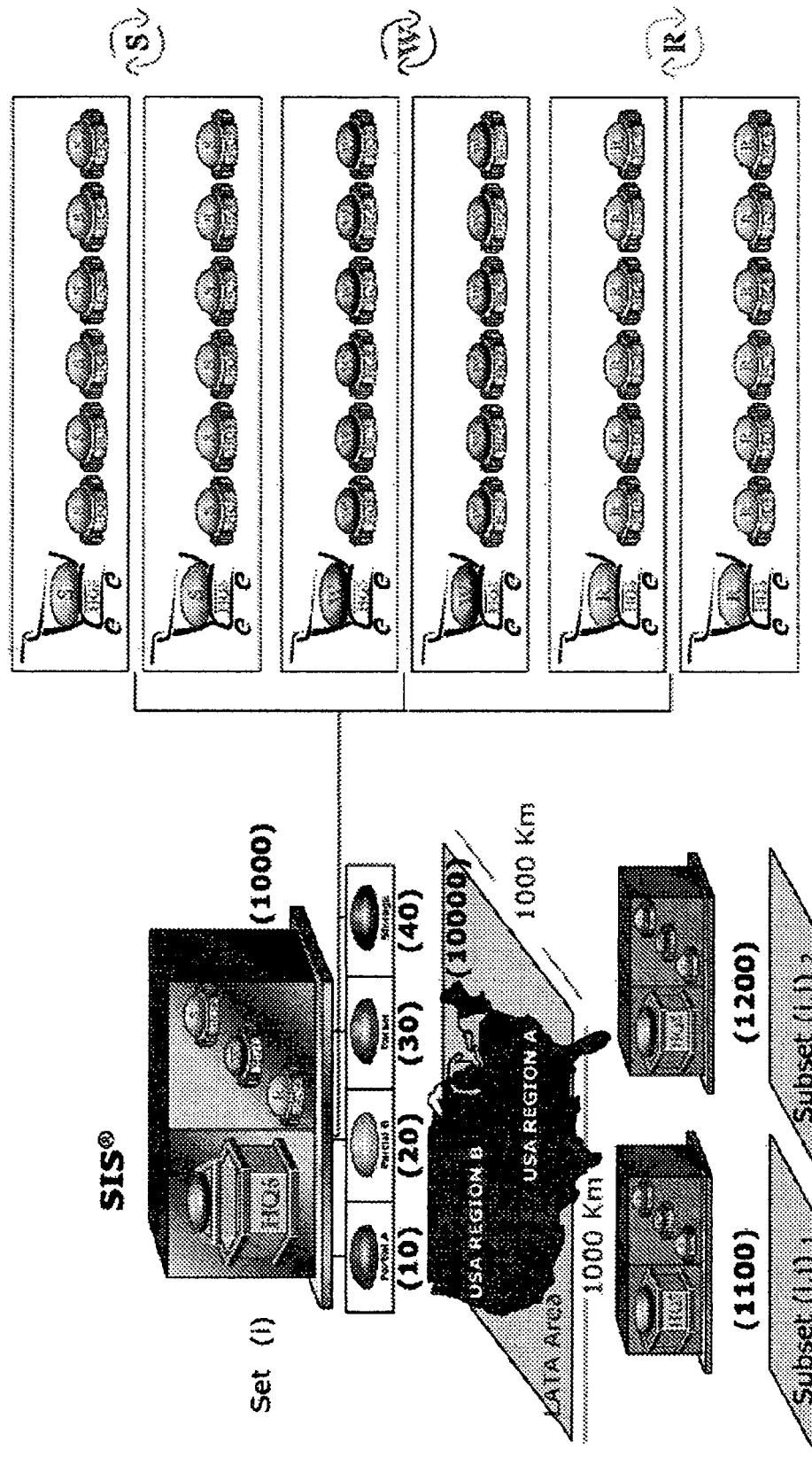

FIG. 54: UCommerce/SIS® (1000) is part of a greater cluster and controls a predefined geographical area covering a plurality of Continental Area sets (i) (10000) with a plurality of LATA Area subsets (i, j) 1 (1100) and (i, j) 2 (1200)

Partial Leg A (10) and Partial Leg B (20) functions consist of Artificial Intelligence means to create Quotes, Micro, Macro, Super and Global Orders from a plurality of origination points to a common denominator UCommerce, Warehouse or destination port.

The Parser function (30) is responsible for converting all of the messages into a lingua franca standard and updating all of the $3^{rd}$ party inventory means.

The Storager function (40) is a distributed database engine that handles terabytes of information that distribute tasks to different directories, so that a plurality of Intelligent Components can analyze the latest conditions of the environment and satisfy quotes and orders with the lowest cost and time delays to the end user.

The <S> for Suppliers consists of a plurality of Intelligent Components HQ3-HQ2 that manage and control the $3^{rd}$ party inventory means of suppliers and their organizations that belong to regions with a continent.

The <W> for Wholesalers consists of a plurality of Intelligent Components HQ3-HQ2 that manage and control the $3^{rd}$ party inventory means of suppliers and their organizations that belong to regions with a continent.

The <R> for Retailers consists of a plurality of Intelligent Components HQ3-HQ2 that manage and control the $3^{rd}$ party inventory means of suppliers and their organizations that belong to regions with a continent.

<R>, <S> and <W> have the geographic subset (i, j) and are linked to a common denominator <U> UCommerce Warehouse H5-HQ4 that serves as Leg B final destination when merchandise is shipped from originating $3^{rd}$ parties.

The system utilizes business rules to create Vectors CDR that have a complete quote or order of an end user that is part of more complex data structures such as a macro order.

SIS® set (i) that controls a continental region belongs to the superset (U) that belongs to the MPS®. The SIS® has a plurality of subordinates TWS® that consist of a plurality of Intelligent Components. Those nodes that are HQ3 or greater have IDW (Intelligent Data Warehouse) characteristics.

The partial differential equation permits the match/merge of a plurality of quotes and orders into complex structures and also permits that each end user request be unique. Once the geospatial data is normalized, plotted, quantified and qualified, the system can use available Inventory, Shipping and Handling means to derive the optimal price.

Figure 55:
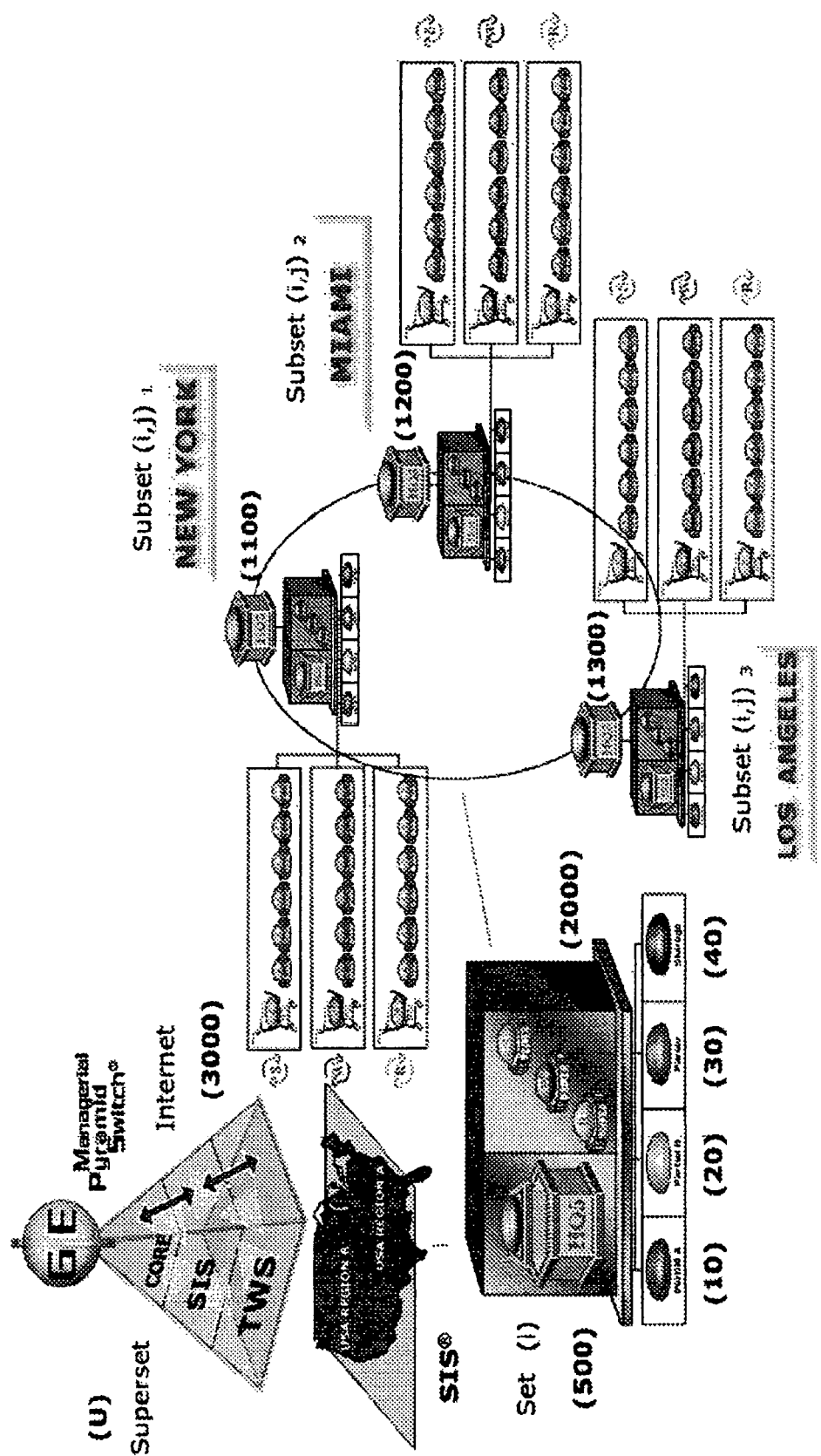

FIG. 55: UCommerce Set(x) USA is a diagram that shows how all of the inventories belong to the United States belonging to a SIS® (2000). This organization of computers has the means to interact and process transactions in parallel with its parent MPS® (3000) and the Superset (U) that has global scope. This specific organization of computers consists of a SIS® that possesses Partial A (10), Partial B (20), Parser (30) and Storager (40) functions that manage and control a plurality of subordinates (i, j) 1 (1100) situated in New York City, N.Y., (i, j) 2 (1200) situated in Miami, Fla., and (i, j) 2 situated in Los Angeles, Calif.

Each of the subordinate also possesses Partial A (10), Partial B (20), Parser (30) and Storager (40) functions that manage and control LATA Areas or Regions that match/merge regional scope transactions or the portion of the transaction under their command.

Figure 56:
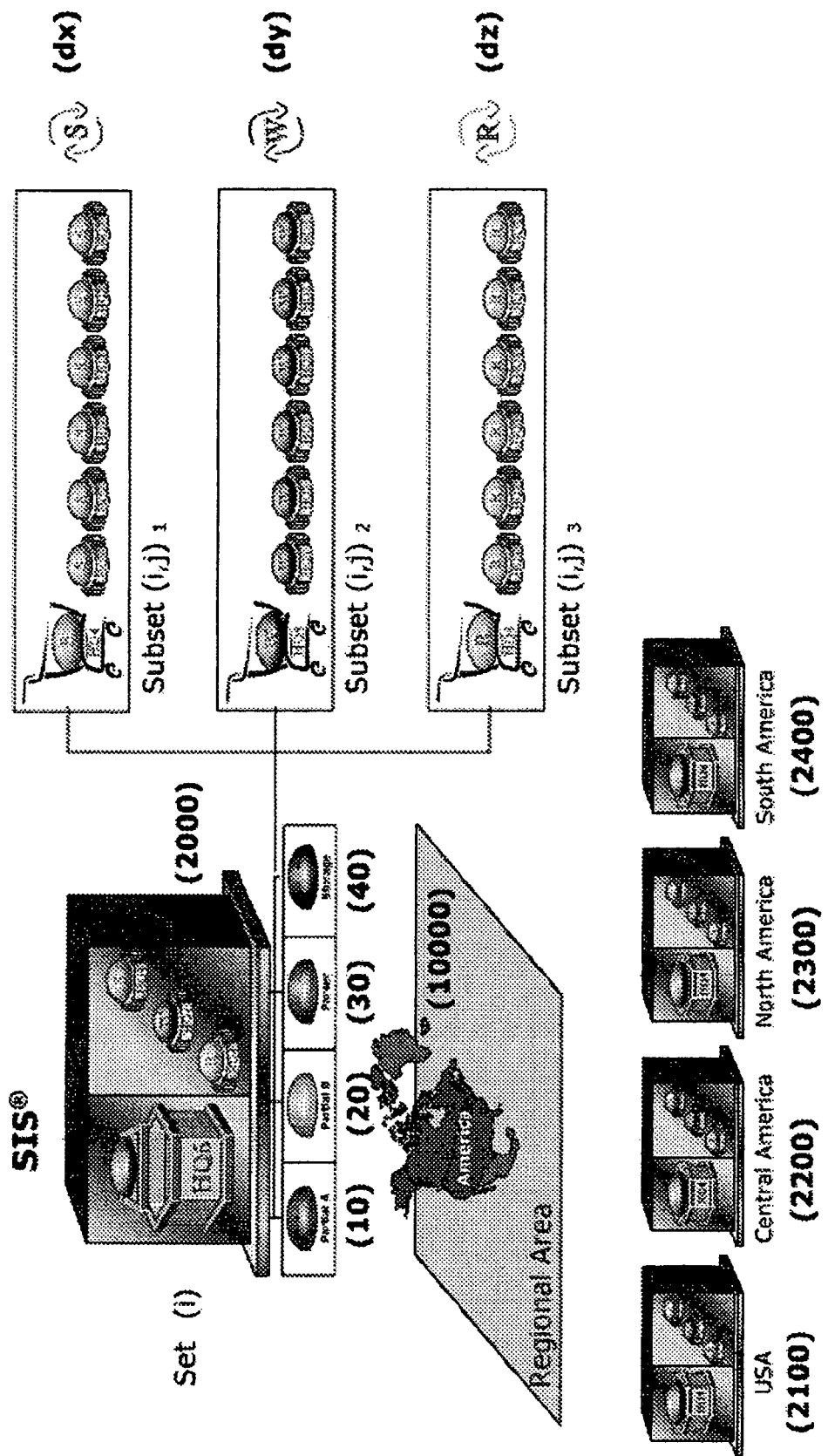

FIG. 56: is a diagram of Normalizing and Simplifying a Continent (10000) that consists of a set (i) that is managed and controlled by a SIS® (2000) that possesses a plurality of subordinates TWS® with the following regions: USA (2100), Central America (2200), North America (2300) and South America (2400). The plurality of retailers, suppliers, UCommerce warehouses and wholesalers are distributed amongst the Intelligent Components as (dx), (dy) and (dz). The system uses Environmental Bitmap files that calculate, using X_FOB and Y_CDIF methods, optimal delivery means to any point of the Continent. Each $3^{rd}$ party is managed and controlled by a particular UCommerce Warehouse TWS® that regulates and rations the available inventory based on cost and need.

Figure 57:
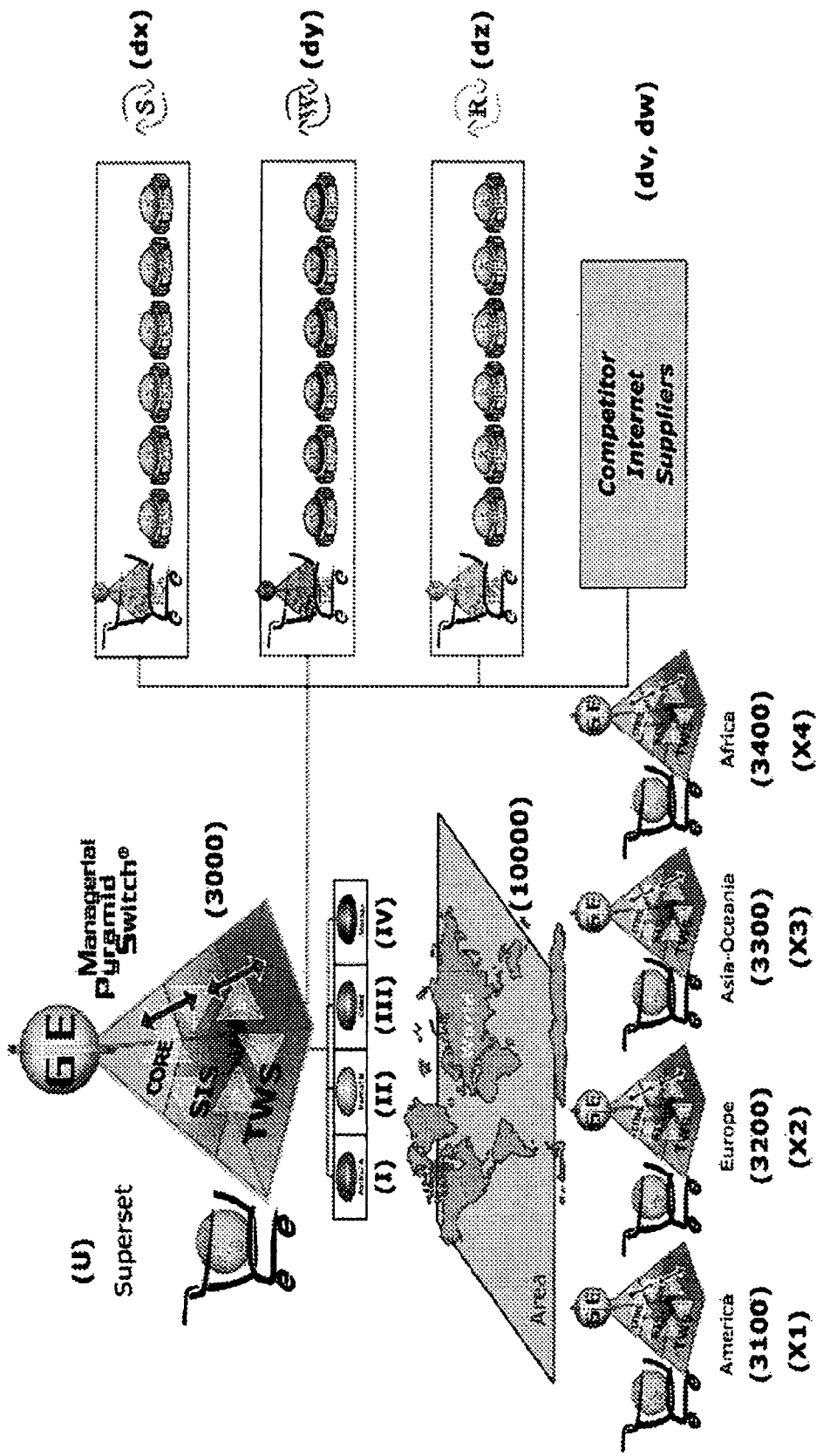

FIG. 57: is a diagram of Normalizing and Simplifying the Internet (10000) that consists of a superset (U) that is managed and controlled by a MPS® (3000) that possesses a plurality of subordinates SIS® with the following continental regions: America (3100), Europe (3200), Asia-Oceania (3300) and Africa (3400). The plurality of retailers, suppliers, UCommerce warehouses and wholesalers are distributed amongst the Intelligent Components as (dx), (dy), (dz) and are compared against Competitor Internet supplier system inventory distribution means (dv) and (dw). The system uses Environmental Bitmap files that calculate, using X_FOB and Y_CDIF methods, optimal delivery means to any point of the Continent. Each $3^{rd}$ party is managed and controlled by a particular UCommerce Warehouse TWS® that regulates and rations the available inventory based on cost and need.

Figure 58:
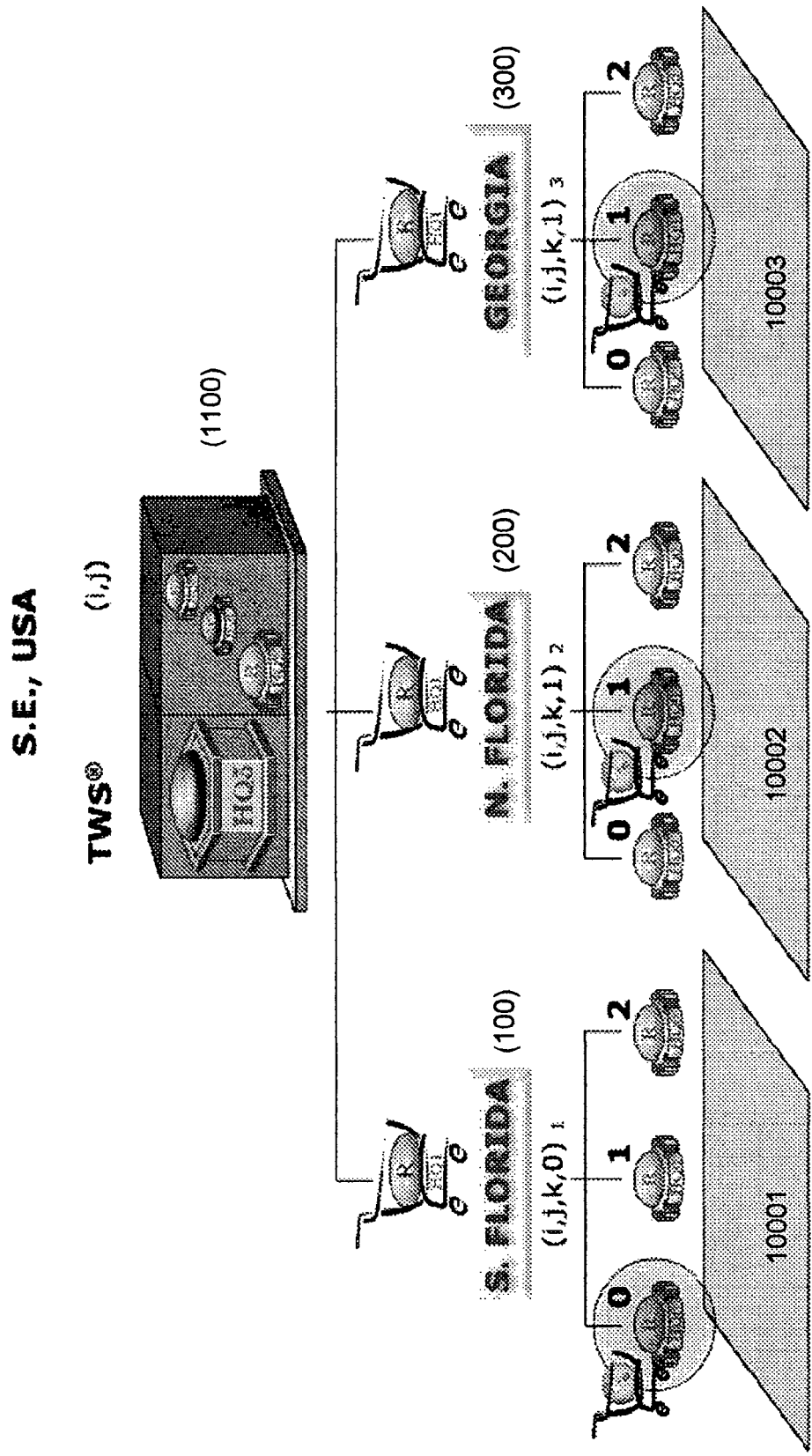

FIG. 58: is a schematic representation of how a UCommerce TWS® (1000), controlling the South East of USA, can identify the needs of a customer and search from all of the retailers belonging to the South Florida (10001), North Florida (10001) and Georgia (10002) geographical areas to find the best priced Inventory in Hand.

a) The system searches for the best price for each UCommerce local scope sector (i, j, k, 0)1 for South Florida (100), (i, j, k, 1)2 for North Florida (200) and (i, j, k, 1)3 for Georgia (300). Then the system determines the best price for the S. E. USA geographical area, in this case (i, j, k, 0)1 located in South Florida.

b) The system compares the available inventory levels of each retailer and filters out those that don't have enough Inventory In Hand to satisfy the request. In this case, the system has identified three optimal prices representing the best for each geographical area.

c) Then the system determines and uses the derived information from the Intelligent Inventory Rules Algorithms to obtain the best price at Leg B, the destination.

d) Then the program compares the best retailer price against the UCommerce warehouse prices within the S.E. USA geographical area, after calculating via X_FOB and Y_CDIF method to find the optimal route from Leg A origin to Leg B destination to dispatch products to the end user with the best weighted price, delay and reliable shipping means.

Figure 59:
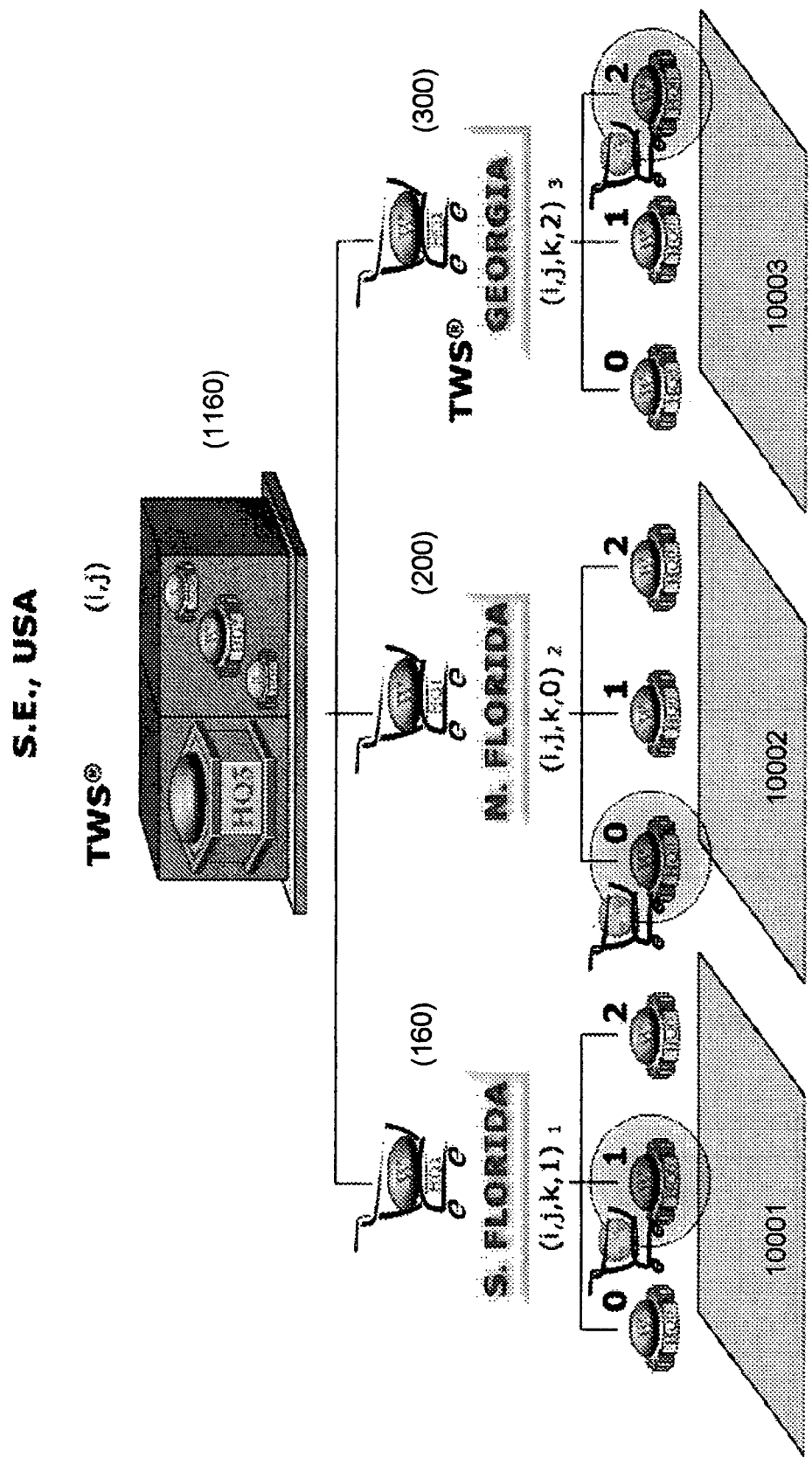

FIG. 59: is a schematic representation of how a UCommerce TWS® (1000), controlling the South East of USA, can identify the needs of a customer and search from all of the wholesalers belonging to the South Florida (10001), North Florida (10001) and Georgia (10002) geographical areas to find the best priced Inventory in Hand.

a) The system searches for the best price for each UCommerce local scope sector (i, j, k, 1)1 for South Florida (100), (i, j, k, 0)2 for North Florida (200) and (i, j, k, 2)3 for Georgia (300). Then the system determines the best price for the S. E. USA geographical area, in this case (i, j, k, 0)2 located in North Florida.

b) The system compares the available inventory levels of each wholesaler and filters out those that don't have enough Inventory In Hand to satisfy the request. In this case, the system has identified three optimal prices representing the best for each geographical area.

c) Then the system determines and uses the derived information from the Intelligent Inventory Rules Algorithms to obtain the best price at Leg B, the destination.

d) Then the program compares the best wholesaler price against the UCommerce warehouse prices within the S.E. USA geographical area, after calculating via X_FOB and Y_CDIF method to find the optimal route from Leg A origin to Leg B destination to dispatch products to the end user with the best weighted price, delay and reliable shipping means.

Figure 60:
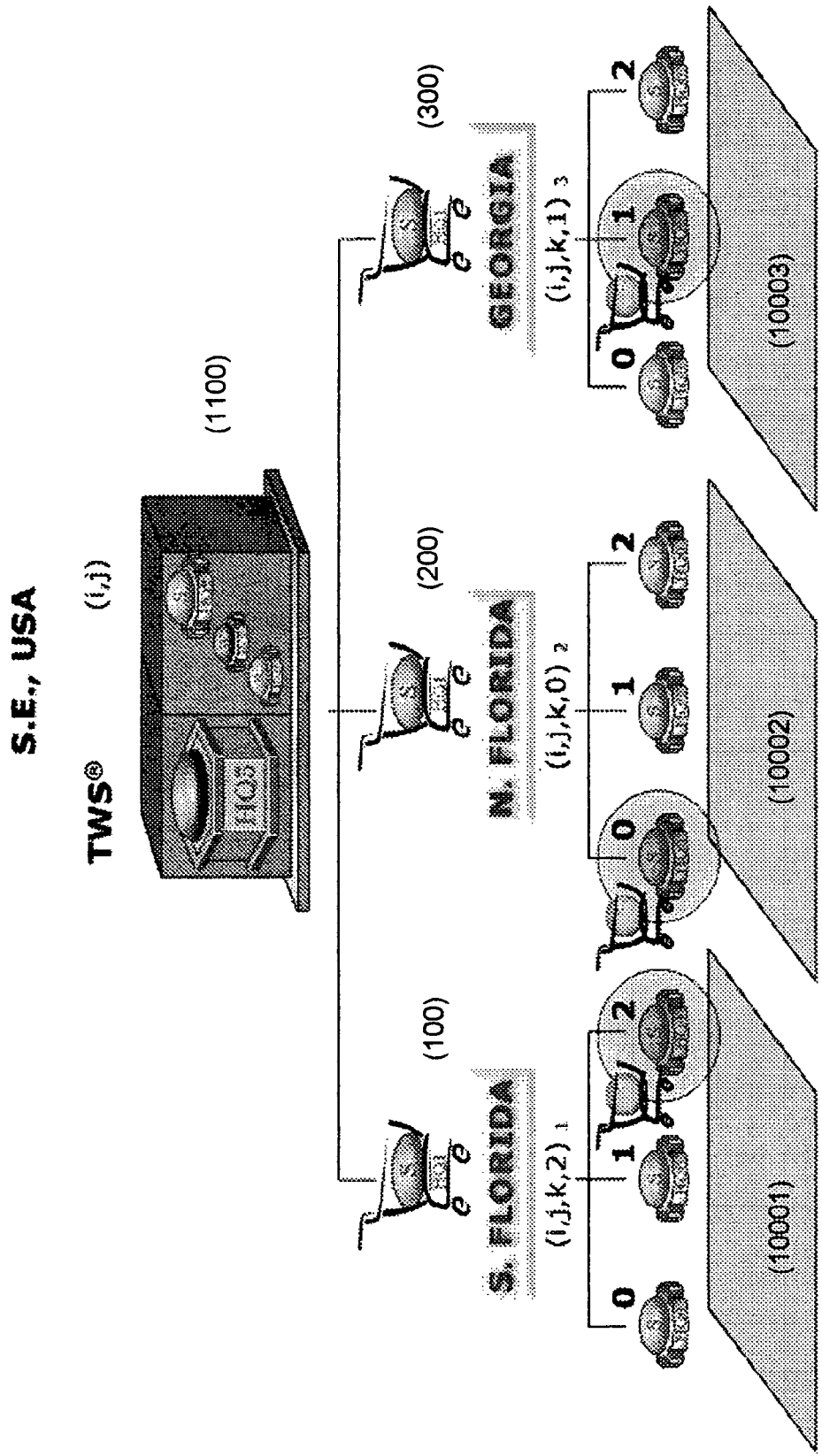

FIG. 60: is a schematic representation of how a UCommerce TWS® (1000), controlling the South East of USA, can identify the needs of a customer and search from all of the wholesalers belonging to the South Florida (10001), North Florida (10001) and Georgia (10002) geographical areas to find the best priced Inventory in Hand.

a) The system searches for the best price for each UCommerce local scope sector (i, j, k, 2)1 for South Florida (100), (i, j, k, 0)2 for North Florida (200) and (i, j, k, 1)3 for Georgia (300). Then the system determines the best price for the S. E. USA geographical area, in this case (i, j, k, 1)3 located in Georgia.

b) The system compares the available inventory levels of each supplier and filters out those that don't have enough Inventory In Hand to satisfy the request. In this case, the system has identified three optimal prices representing the best for each geographical area.

c) Then the system determines and uses the derived information from the Intelligent Inventory Rules Algorithms to obtain the best price at Leg B, the destination.

d) Then the program compares the best supplier price against the UCommerce warehouse prices within the S.E. USA geographical area, after calculating via X_FOB and Y_CDIF method to find the optimal route from Leg A origin to Leg B destination to dispatch products to the end user with the best weighted price, delay and reliable shipping means.

e) The schematic representations of FIG. 58 to FIG. 60 occur simultaneously.

Figure 61:
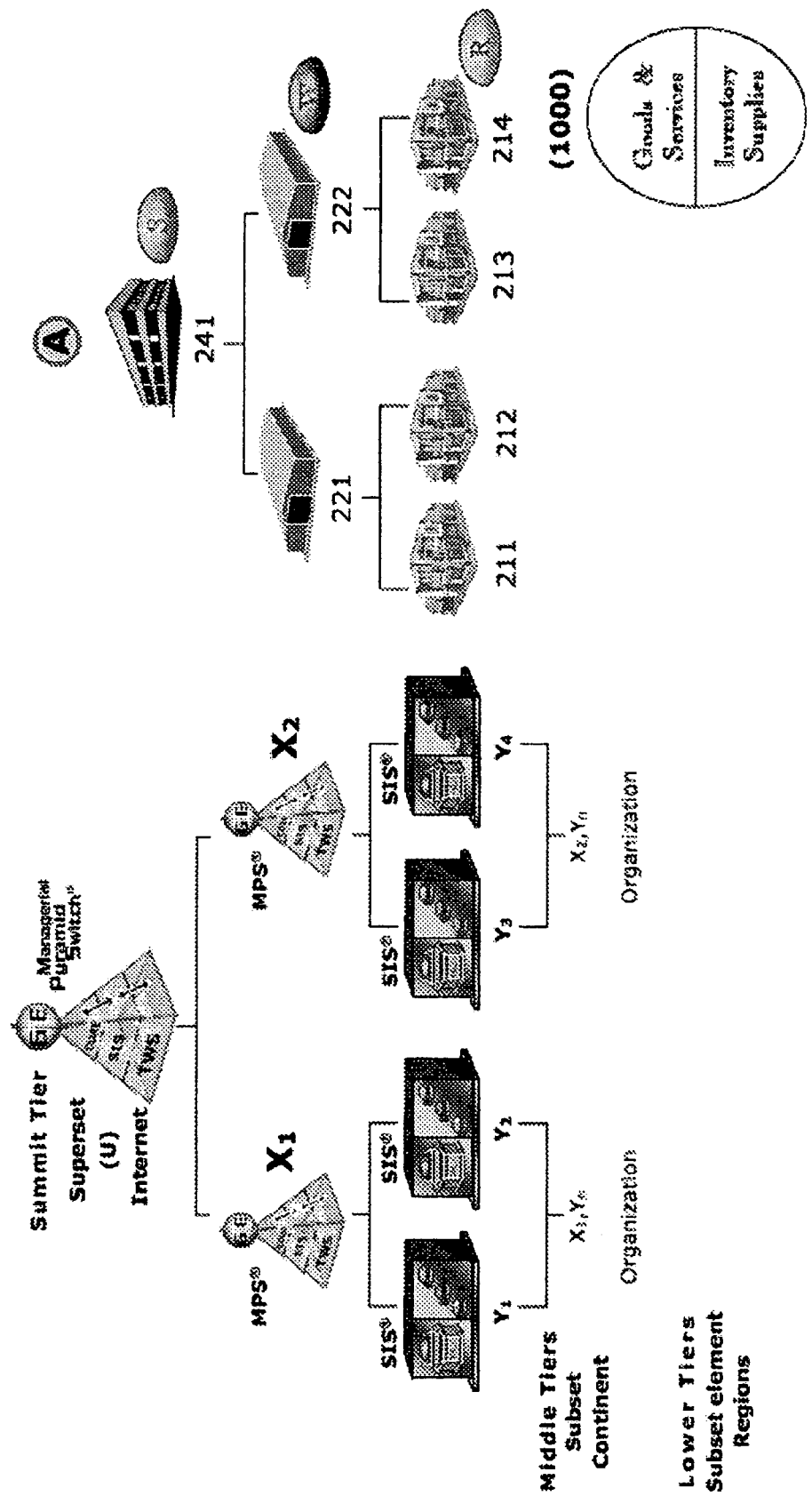

FIG. 61: is a schematic representation of how an UCommerce organization, expressed as (U) the Superset, is subdivided into Sets and Subsets.

On the left hand side, (U) is represented by the Internet scope MPS®, Sets X1 and X2 by a plurality of Continental MPS® and Subsets (X1, Y1), (X1, Y2), (X2, Y1) and (X2, Y2) by the Regional scope SIS®. Each SIS® has a plurality of subordinates TWS® that monitor and control geographical LATA areas or Area Codes.

On the right hand side, a plurality of $3^{rd}$ party retailer (211 to 214), wholesaler (221 to 222) and supplier (241) organizations are integrated to the UCommerce supplier system (1000), permitting goods and services worldwide to be distributed to the end users in optimal conditions, based on their needs.

Collectively, the Billing Engine via the Storager function of each MPS®, SIS® and TWS® stores the Information in environmental bitmap formats, so that the system has at its disposal the inventory of each $3^{rd}$ party from point A to point B as optimal based on a quantity and shipping method selected by the customer. In this case, when an end user requests a quote, the system immediately checks for each local, regional, continental and Internet scope retailer, wholesaler and supplier inventory distribution means for the best case scenario that satisfies the consumer.

Once the best case scenario is identified, the system creates a Vector CDR with Legs (A, B, U, T) with the associated cost and delays.

Figure 62:
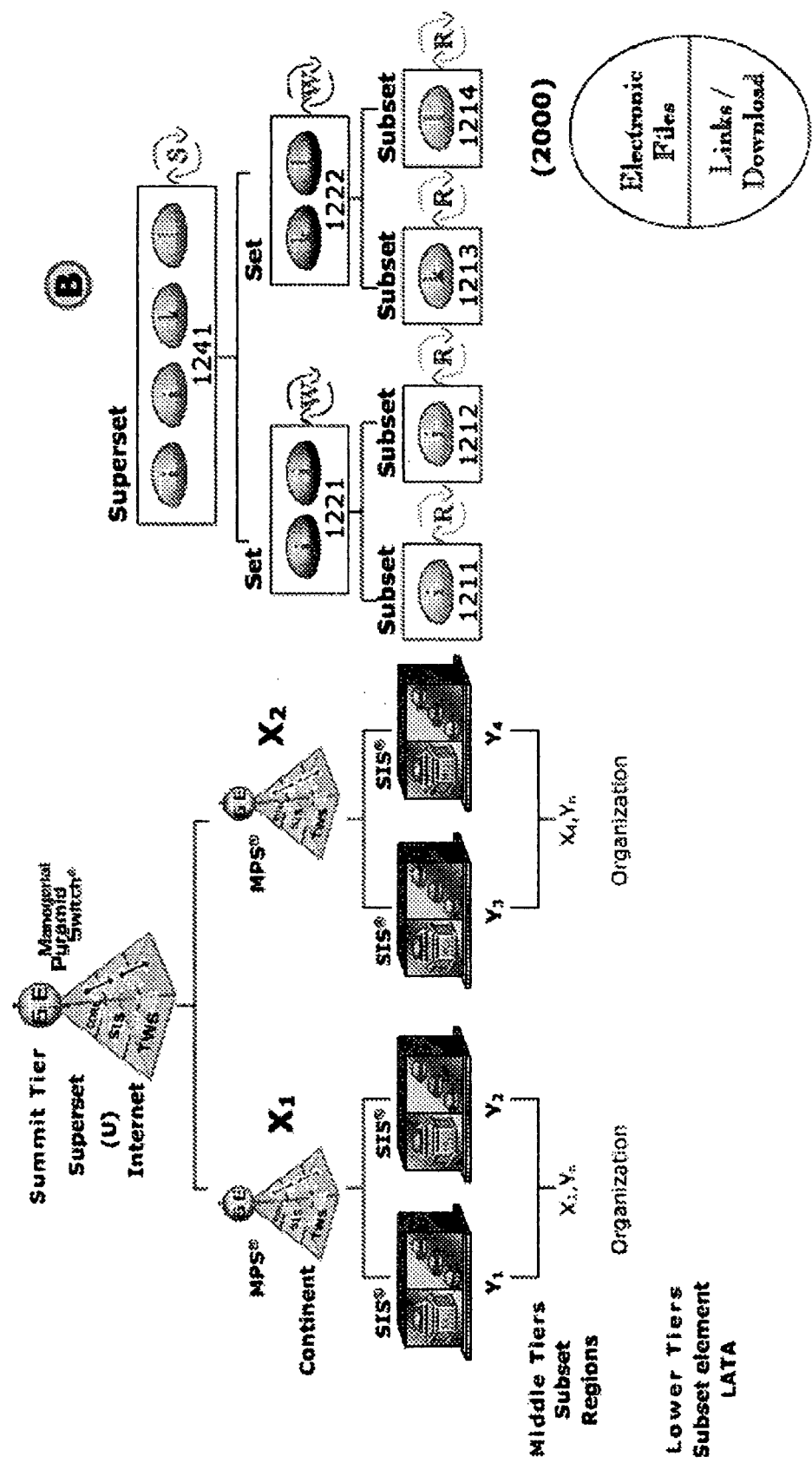

FIG. 62: is a schematic representation of how an XCommerce organization, expressed as (U) the Superset, is subdivided into Sets and Subsets. On the left hand side, (U) is represented by the Internet scope MPS®, Sets X1 and X2 by a plurality of Continental MPS® and Subsets (X1, Y1), (X1, Y2), (X2, Y1) and (X2, Y2) by the Regional scope SIS®. Each SIS® has a plurality of subordinates TWS® that monitor and control geographical LATA areas or Area Codes.

On the right hand side, the Internet links are divided into supersets (1241), sets (1221 to 1222) and subsets (1211 to 1214) that possess search engine clusters of computers that quantify and qualify the environment, and belong to the XCommerce supplier system (2000), permitting the end users to obtain Internet content in optimal conditions, based on their browser driven requests.

Collectively, the Billing Engine via the Storager function of each MPS®, SIS® and TWS® have specialized search engine clusters the Information in environmental bitmap formats, so that the system has at its disposal a mirror image of the content of the Internet. In this case, when the end user requests an Internet browser search, the system checks based on priority of each keyword contained in its request for the best case scenario that satisfies the consumer. Note: existing prior art uses the divide and conquer filtering mechanism via regular expressions to help quantify and qualify the best case scenario, whereas XCommerce utilizes Environmental Bitmaps that are derived from higher quality levels of Informational Pyramid Structures.

Once the best case scenario is identified, the system creates a list of discrete amount of responses from the highest to the lowest that are displayed in the end user's browser.

FIG. 63: is a schematic representation of the transformation of the original UCommerce technology into the Managerial Pyramid Switch® architecture. In this case, the left hand side is the system structure that UCommerce uses to distribute $3^{rd}$ party interface means within the supplier system for a continental region (10000), in this case Mexico represented by a HQ3 and subdivided into HQ2 control subdivisions, such as SE Mexico, NW Mexico and DF (Distrito Federal), controlling each supplier. Each subdivision possesses a plurality of subordinates HQ1 that control a plurality of wholesalers. Each HQ1, in turn, possesses a plurality of subordinates HQ0 that control a plurality of retailers. HQ3 to HQ0 Intelligent Components that belong to a XLDB are responsible for normalizing the information and making it readily available to the end user.

On the right hand side, consists of the new transformation of the UCommerce technology, in which all of the retailers, wholesalers and suppliers belong to a TWS® and all of the Retailers <R>, Suppliers <S> and Wholesalers <W> are working in unison as part of a cluster. The HQ3 controls the entire geographical area that possesses a plurality of subordinates TWS® (1102 to 1104) controlling SE, NW and DF subdivisions of Mexico. All of the Retailers, Suppliers and Wholesalers are arranged as groups of elements working together and continuously interacting to derive the best case scenario for the end user's needs.

Figure 64:
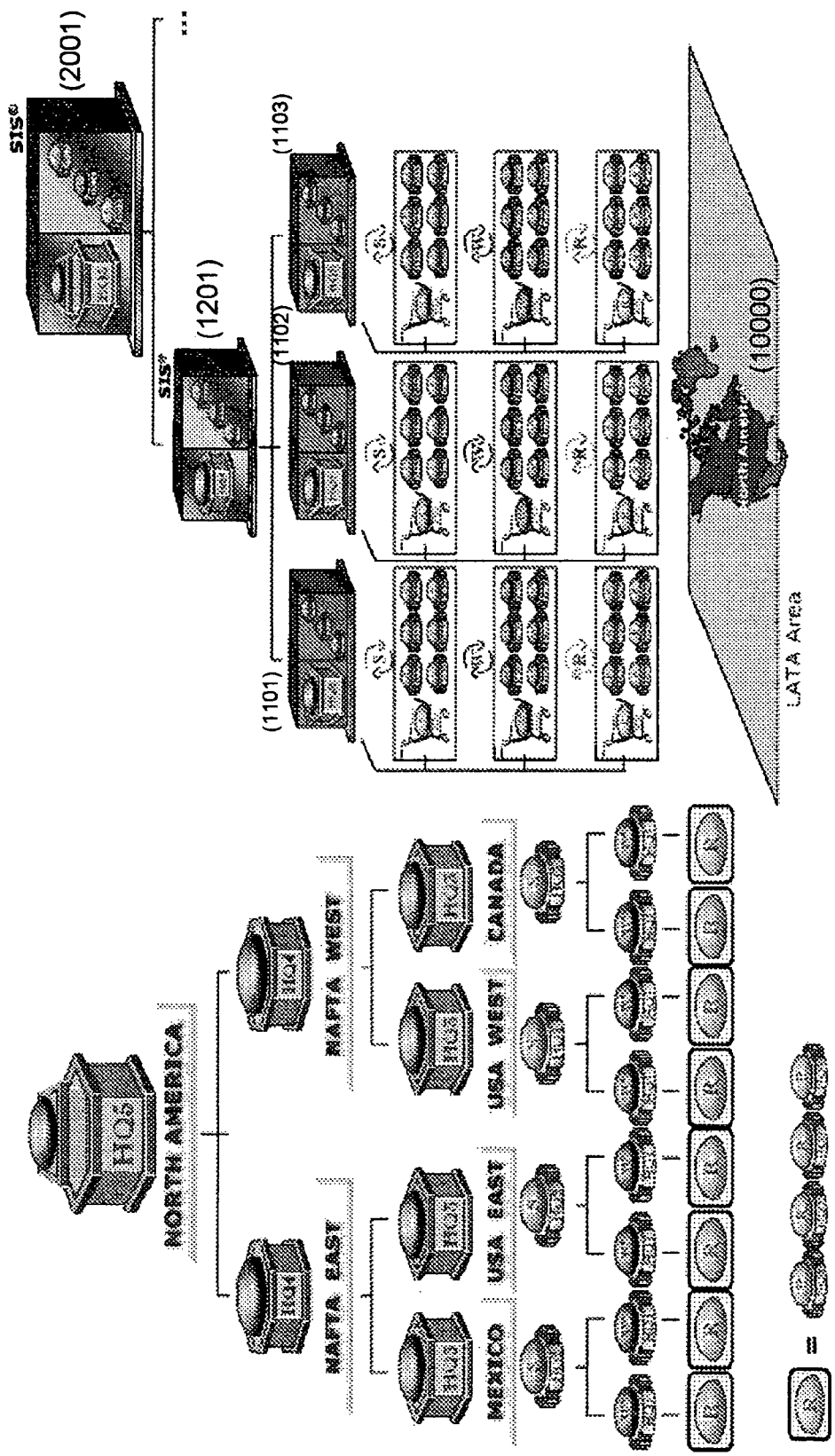

FIG. 64: is a schematic representation of the transformation of the original UCommerce technology into the Managerial Pyramid Switch® architecture.

In this case, the left hand side is the system structure that UCommerce uses to distribute $3^{rd}$ party interface means within the supplier system for a continent, in this case North America (10000) represented by a HQ5 and subdivided into HQ4, such as NAFTA East, NAFTA West, and is further subdivided into HQ3, such as Mexico, USA East, USA West and Canada. Each subdivision possesses a plurality of subordinates HQ2 to HQ0 that control a plurality of $3^{rd}$ party <R> Retailers, <S> Suppliers, <W> Wholesalers and <U> UCommerce Warehouses. HQ5 to HQ0 Intelligent Components, through means of their Intelligent Data Warehouses that are part of an XLDB are responsible for normalizing the information and making it readily available to the end user.

On the right hand side, consists of the new transformation of the UCommerce technology, in which all of the retailers, wholesalers and suppliers belong to a TWS® and all of the Retailers <R>, Suppliers <S> and Wholesalers <W> are working in unison as part of a cluster. The summit SIS® (2001) controls the entire geographical area, that possesses a plurality of subordinates SIS® (1201+) and TWS® (1101 to 1103+) controlling all of the regions of North America. In this case, the FIG. only shows the Mexico distribution, since USA East, USA West and Canada would not fit in the diagram. For simplicity, let's consider them cloned like with a single HQ4 that possesses HQ3 organizations consisting of HQ2 to HQ0 clusters.

All of the Retailers, Suppliers and Wholesalers are arranged as groups of elements working together and continuously interacting to derive the best case scenario for the end user's needs.

Figure 65:
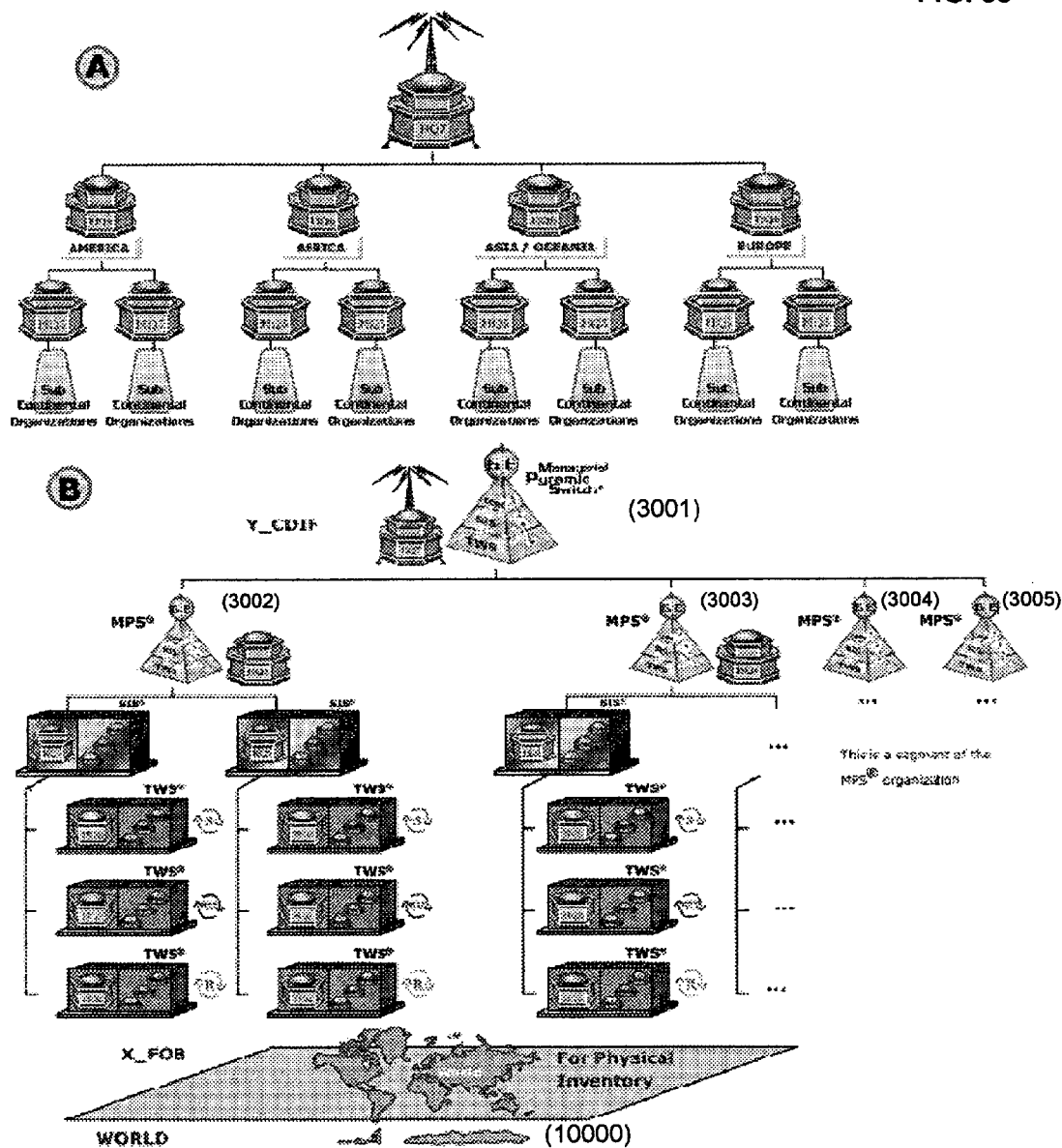

FIG. 65: is a schematic representation of the transformation of the original UCommerce technology into the Managerial Pyramid Switch® architecture. In this case, (A) is the system structure that UCommerce uses to distribute $3^{rd}$ party interface means within the supplier system for a continent, in this case the World (10000) represented by a HQ7 and subdivided into HQ6, such as Africa, America, Asia-Oceania and Europe, and is further subdivided into sub continental regions. Each sub continental region possesses a plurality of subordinates HQ5 to HQ0 that control a plurality of $3^{rd}$ parties <R> Retailers, <S> Suppliers, <W> Wholesalers and <U> UCommerce Warehouses. HQ7 to HQ0 Intelligent Components, through means of their Intelligent Data Warehouses that are part of an XLDB are responsible for normalizing the information and making it readily available to the end user.

In this case, (B) consists of the new transformation of the UCommerce technology, in which all of the suppliers, wholesalers and suppliers belong to a TWS® and all of the Retailers <R>, Suppliers <S> and Wholesalers <W> are working in unison as part of a cluster. The summit MPS® (3001) controls the entire geographical area that possesses a plurality of subordinates MPS® (3001+) that possess a plurality of SIS® organizations that have a plurality of TWS® organizations controlling all of the regions of the World.

Each TWS®, SIS® and MPS® organization creates their own Environmental Bitmap that competes each time and an end user makes a quote for goods and services. The system for each item requested by the end user identifies the best case scenario to the Leg B destination UCommerce warehouse and upon receiving notification of a purchase match/merges each item into a single quote.

Figure 66:
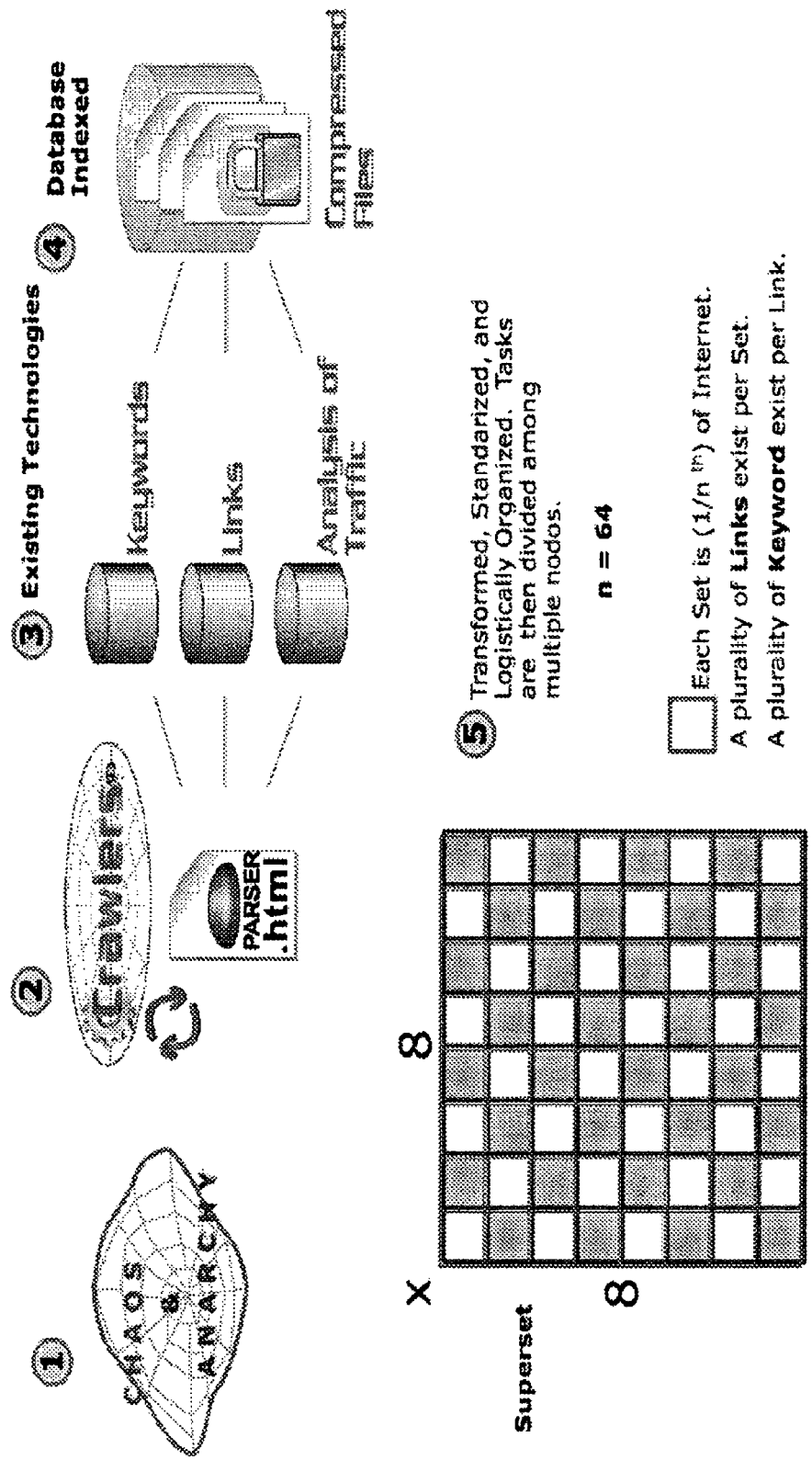

FIG. 66: is a schematic representation of cleaning the spaghetti by $3^{rd}$ parties prior art, where (1) the (U) Internet is considered chaos and anarchy. (2) Using a plurality of Web Crawlers applications that gather the content of different links and analyze each of the pages, and then further distill, transform and eliminate redundant into resulting KEYWORDS, mathematical and statistical information. Then the information is evenly distributed to a plurality of clusters using Caesar's divide and conquer tactics that divide into sets (I, J) n that possess 1/64th of the whole and in parallel work to qualify, quantify and numerically analyze each page in the (U) Superset. (3) The process of mathematically improving the Informational Entropy to certitude is by identifying the 15,000,000 KEYWORDS that are used to generate the regular expression preferred means of making UNIX C pointer binary searches. (4) Once the numerical analysis is performed, the information is stored into proprietary compressed databases that use hash lookup tables possessing a plurality of pointer addresses that optimal take advantage of the strengths of operating systems that in a nutshell store virtual (memory) and hardware data in a continuous and linear fashion. (5) After executing a database normalization, load balancing and converting the original (U) into the information entropy (U') that consists of a plurality of sets (I, J) n that concurrently have stored the information in an organized and logical manner and thus eliminated chaos and anarchy.

Figure 67:
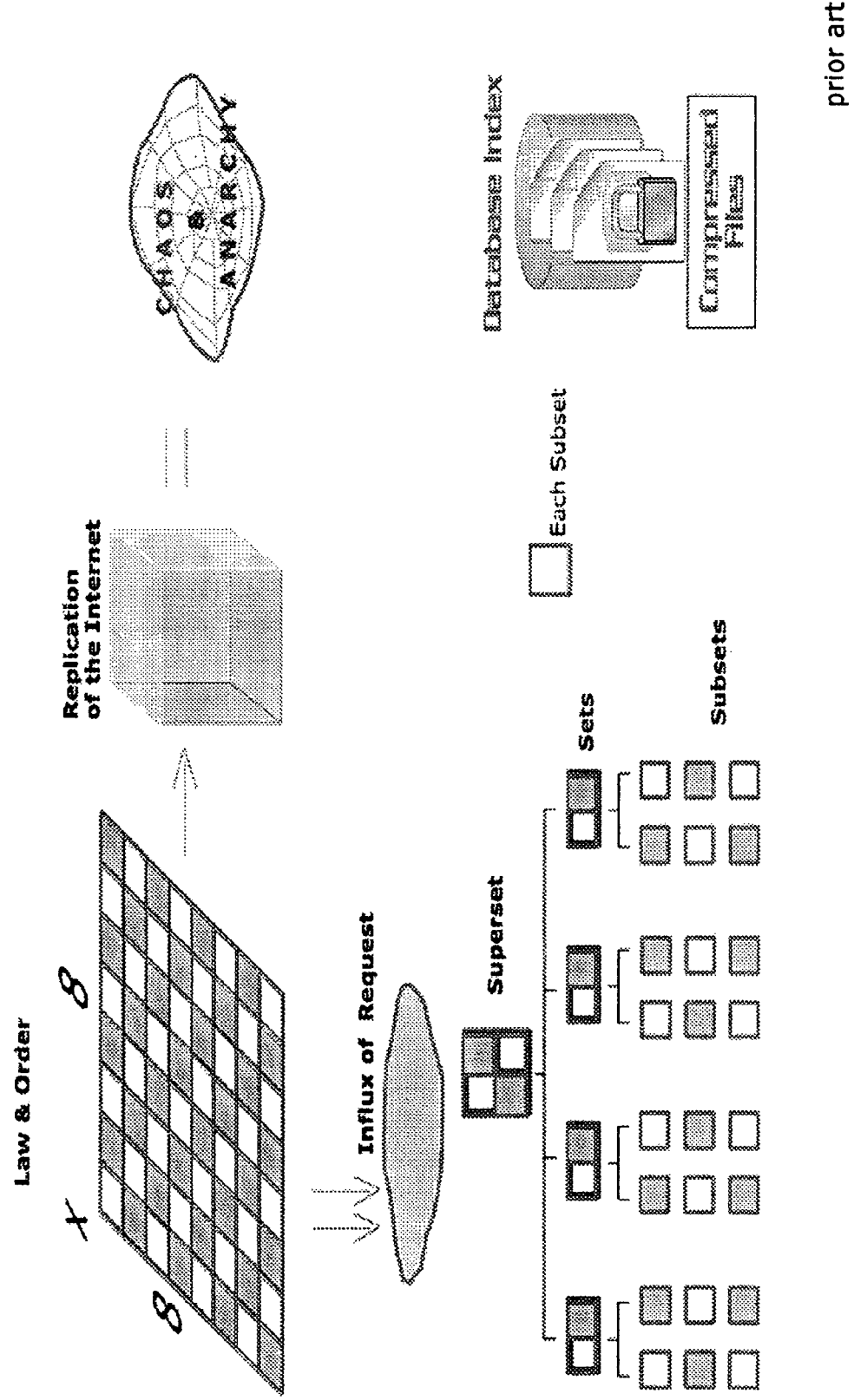

FIG. 67: is a schematic representation of Organizing and Transforming the Internet by $3^{rd}$ parties prior art, by means 64 nodes Supercomputer cluster that has eliminated Chaos and Anarchy by making a virtual replication of the Internet that is normalized, organized and changed into mathematical data. The (U) is even distributed amongst a (8×8) cluster where each node consists of sets (I, J) n that are further subdivided into subsets (I, J, K) n, that are further subdivided into groups (I, J, K, L) n of links where the system desires to obtain the optimal element (A). Each set (I, J) n possesses its own Database Index collection of compressed files. Note: (A) is the most satisfying responses to a regular expression made by an end user via a web browser.

Figure 68:
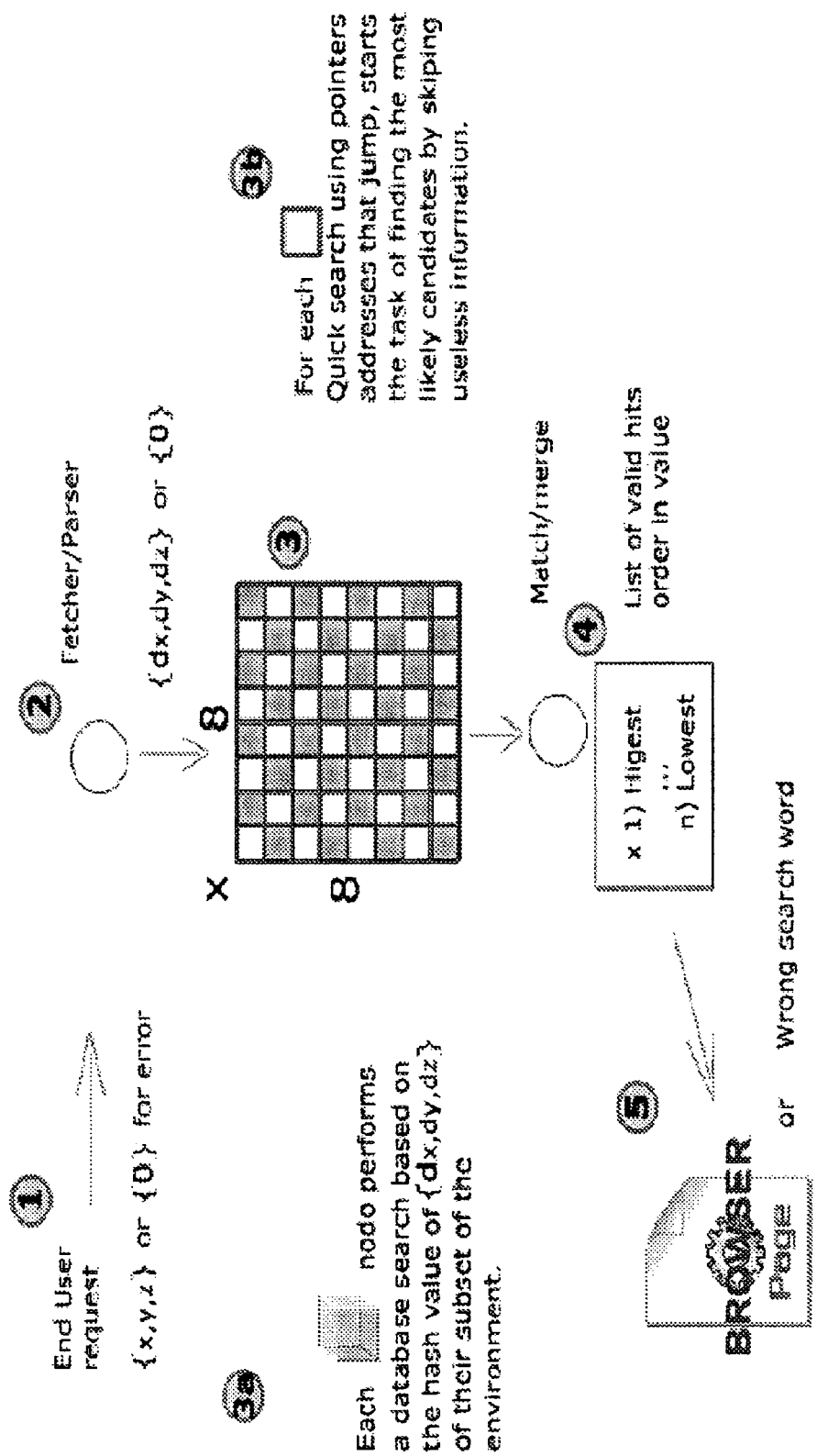

FIG. 68: is a schematic representation of a Classical Web Search by $3^{rd}$ parties prior art. (1) Each end user Web Browser search is altered into a set of elements {0, X, Y, Z} where the system compares each of them as belonging to the valid collection of KEYWORDS or an error. (2) A Fetcher/Parser modifies {0, X, Y, Z} into {dX, dY, dZ} or {0} and sends (3) a request for obtaining the optimal element (A) to each parallel running set (I, J) n cluster. (3b) Each cluster carries out a quick search using pointer addresses that jump starts the task of finding the most likely candidates by skipping useless information. As each set (I, J) n match/merges the results that possess a value greater than a predefined limited and sends them to a task handler node that sorts the in order of value and immediately responds via the Web Browser Page with an error message, most likely KEYWORD or a collection of links.

Figure 69:
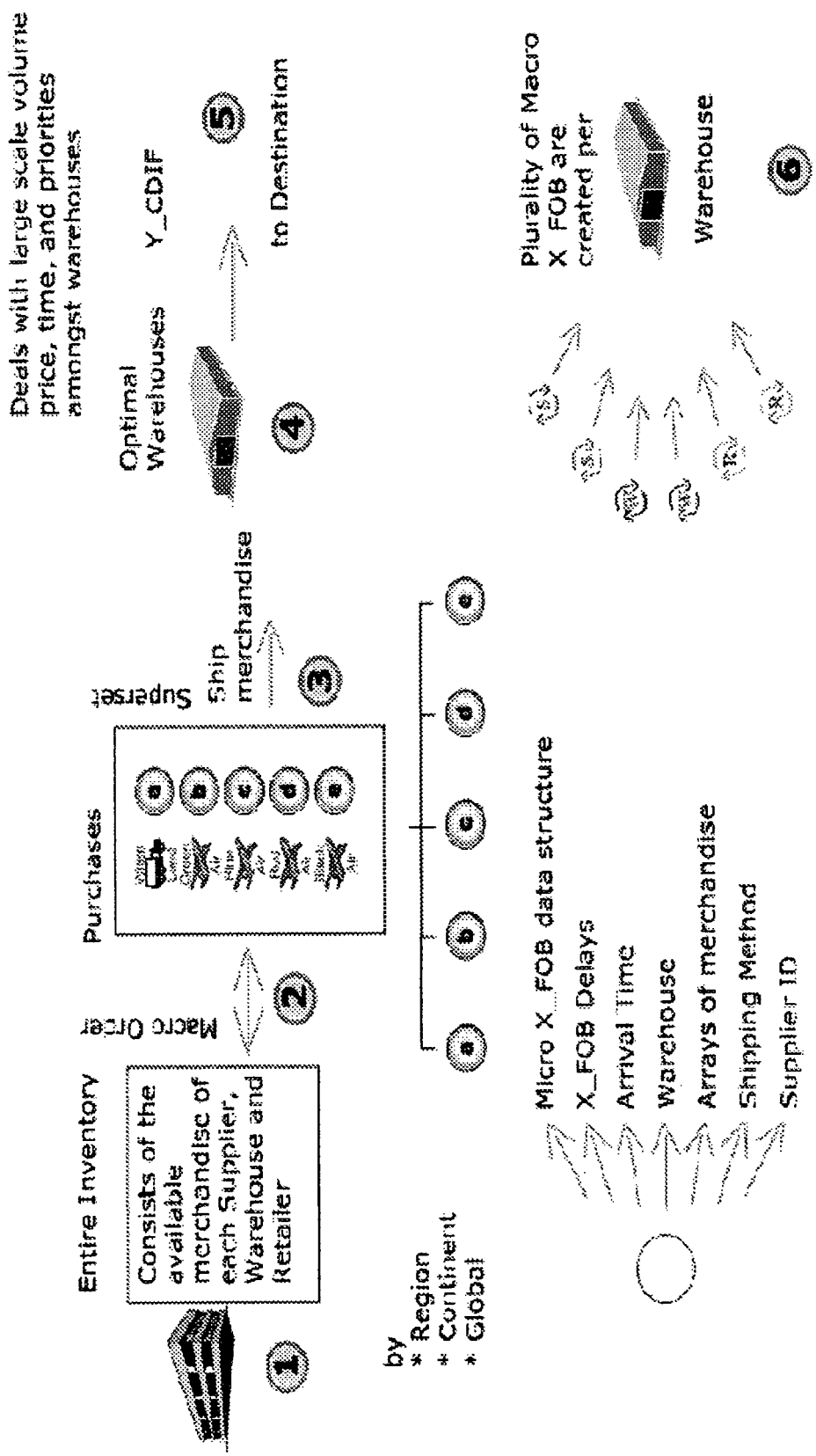

FIG. 69: is a schematic representation of Macro X_FOB Orders. (1) The supplier system has stored the entire available merchandise of each Retailer, Supplier, UCommerce Warehouse and Wholesaler by region, continent or global. (2) Each Order is distributed amongst the different system's containers with merchandise using the different transportation means (a, b, c, d, or e). Each container from Leg A, origin, to Leg B, destination, consists of a plurality of partial orders known as a Micro X_FOB data structure that possesses X_FOB delays, arrival time, destination warehouse, an array of merchandise, shipping method (air, land or sea) and a Supplier_ID that denotes the warehouse of the originating $3^{rd}$ party. (3) Collectively, the system match/merges all of the Micro X_FOB into a Superset from an originating region to an (4) optimal UCommerce warehouse, that regulates large scale volume price, time and priorities amongst warehouses. (5) The final UCommerce warehouse match/merges partial orders into a final and complete order, and then sends them through the transportation channels to the final destination. (6) Shows how from a plurality of <R> Retailers, <S> Suppliers and <W> Wholesalers, merchandise is sent to an UCommerce warehouse and the system links common denominator containers into a plurality of Macro X_FOB. For example: 5 containers full of merchandise from the same originating warehouse leave via UPS the same day and with the same transportation means to the same destination UCommerce warehouse, the system will consider them as a large container or macro order.

Figure 70:
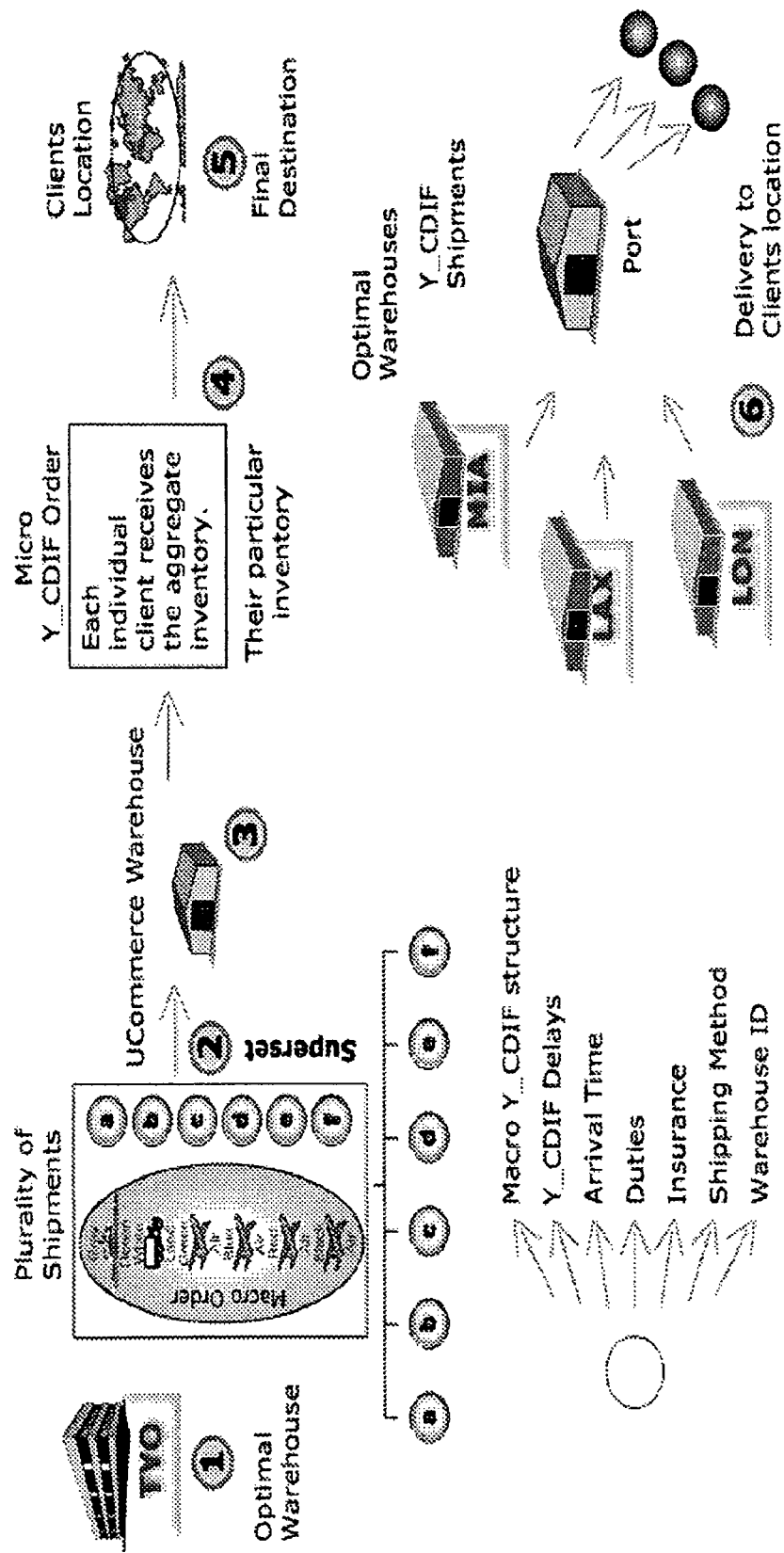

FIG. 70: is a schematic representation of a Macro Y_CDIF Order. (1) Once the merchandise has arrived to the optimal warehouse to distribute merchandise to the final destination Leg B, (2) the system match/merges a plurality of orders into a large macro order that possesses common denominator origin and final destination. Each container belonging to a Leg U optimal Warehouse and using different transportation means (a, b, c, d, e, or f). Each container from Leg A, origin, to Leg B, destination, consists of a plurality of orders known as a Macro Y_CDIF data structure that possesses Y_CDIF delays, arrival time, associated merchandise duties, insurance, shipping method (air, land or sea) and a Warehouse_ID that denotes where the system match/merges the partial orders into orders. (3) Once the merchandise arrives to the final destination UCommerce warehouse, the Macro Y_CDIF Order is broken up and distributed into order containers. Each common denominator transportation means a plurality of orders that are associated to a Micro Y_CDIF order, where each individual client receives their particular inventory from the whole. (4) Merchandise is shipped to the final destination where duties are paid and then (5) each order is sent to the final destination located in the specified client's location. (6) Shows how from a plurality of UCommerce warehouses <MIA> Miami, <LAX> Los Angeles and <LON> London merchandise is sent to a final destination port for duties clearance, and the system links common denominator containers into a plurality of Macro Y_CDIF. For example: all of the merchandise that is declared at the same time in the same final destination port belonging to a plurality of customers. Once customs are complete, the merchandise is locally shipped to the Leg B located in the specified client's location.

Figure 71:
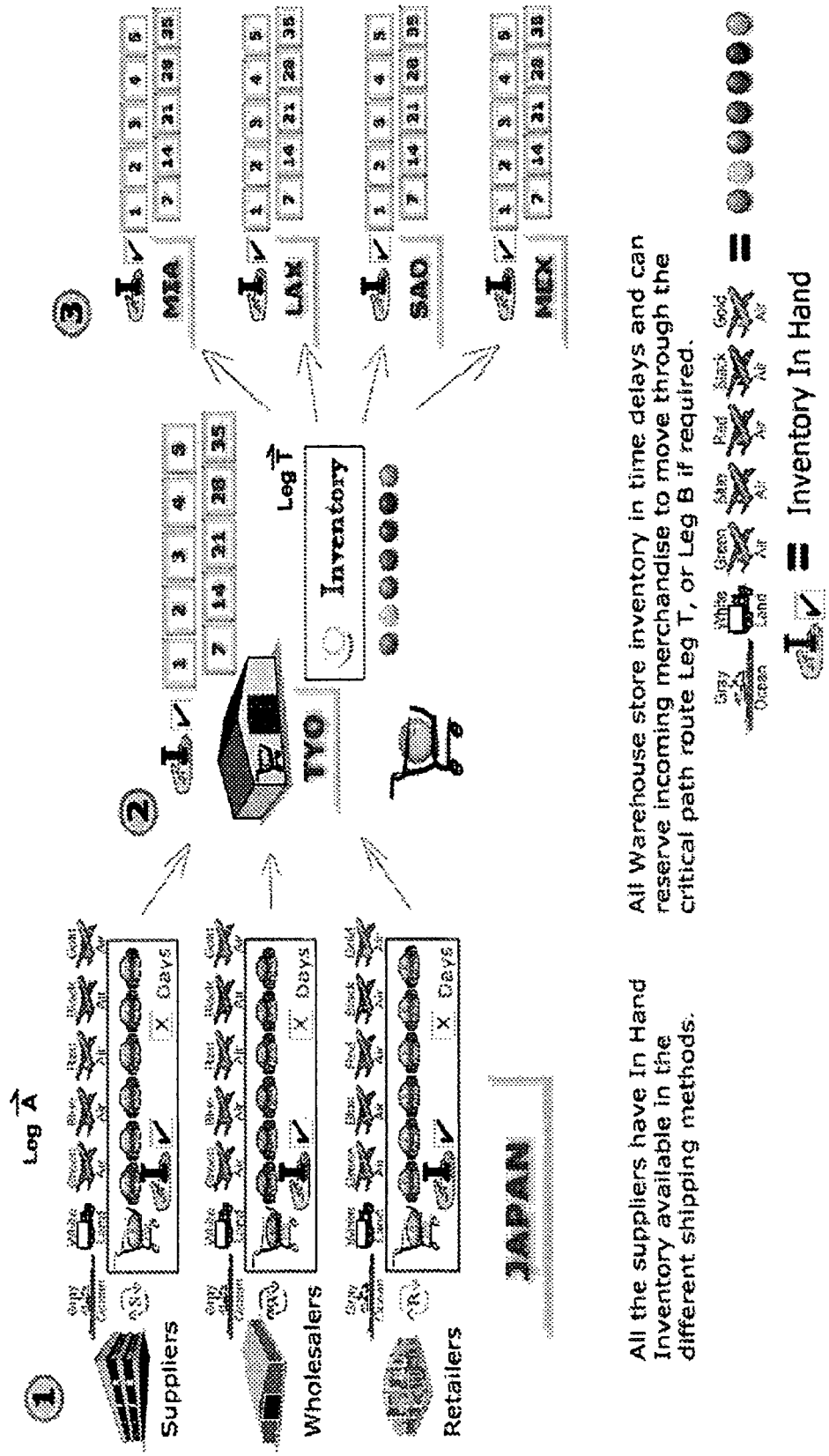

FIG. 71: is a schematic representation of the distributive matrix of Optimal X_FOB. (1) Merchandise originating from <R> Retailer, <S> Suppliers and <W> Wholesalers located in the Japan region that possesses the common denominator <TYO> Tokyo UCommerce warehouse with a plurality of transportation means A (Grey Label Ocean), B (White Label Land), C (Air Green Label), D (Air Blue Label), E (Air Red Label) and F (Air Black Label). Each Leg A $3^{rd}$ party possesses Inventory In Hand and a queue of incoming merchandise as manufactured or received by their own distribution means and is sent (2) to the Leg T<TYO> that creates a Macro X_FOB of all of the containers being shipped to its location. (3) Once the merchandise arrives to the Leg T warehouse, the merchandise is shipped to the optimal UCommerce warehouse such as <MIA> Miami, USA, <LAX> Los Angeles, USA, <SAO> Sao Paulo, Brazil, and <MEX> Distrito Federal, Mexico.

Figure 72:
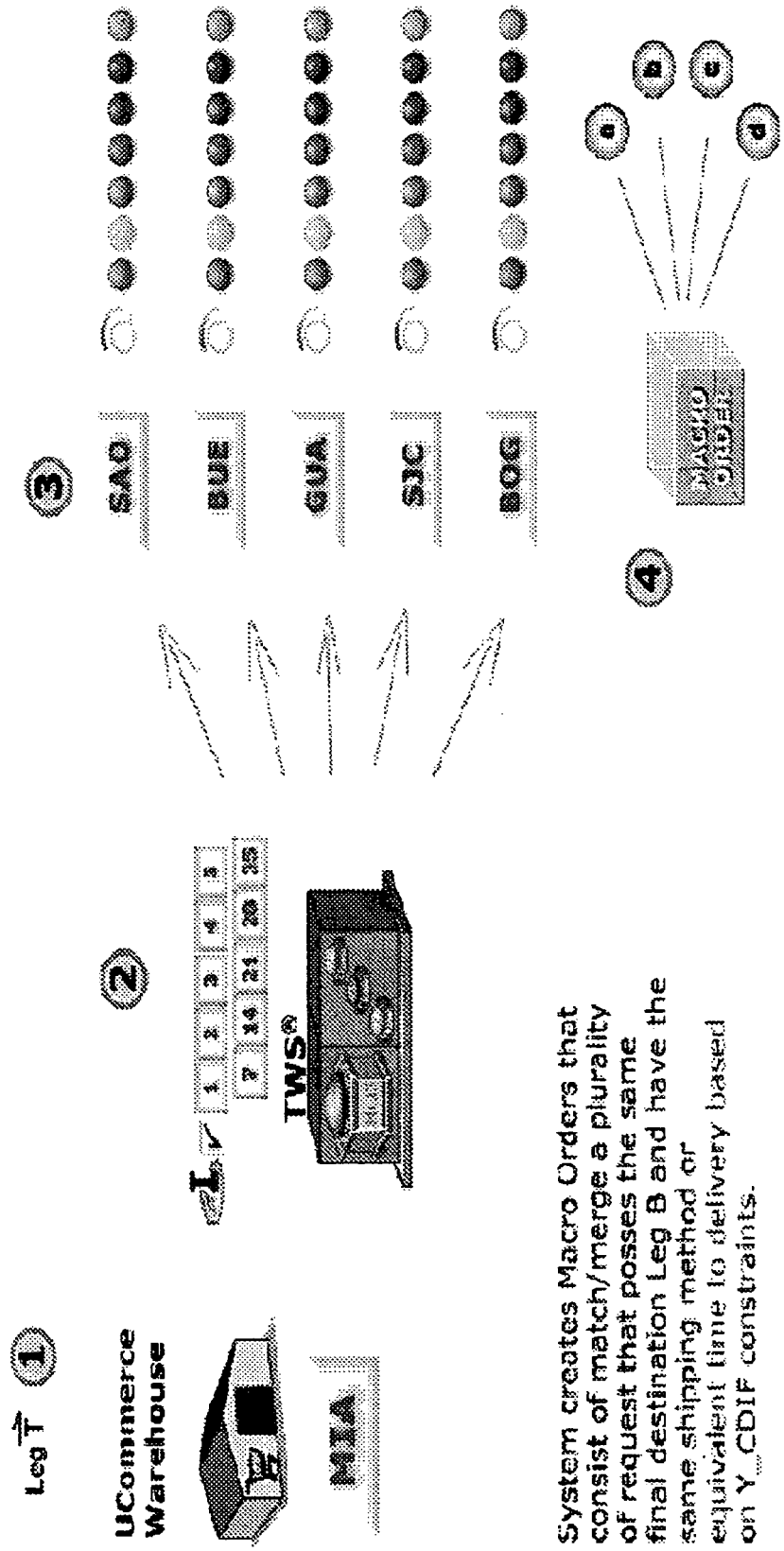

FIG. 72: is a schematic representation of the distributive matrix of optimal Y_CDIF performed by a TWS®. (1) Leg T the optimal UCommerce warehouse distribution means is managed by a (2) TWS® that stores merchandise as Inventory In Hand or in queue with a delay of 1, 2, 3, 4, 5 7, 14, 21, 28 or 35 ranges of days. The system creates a plurality of Macro Order Y_CDIF Orders that possess Air, Land, Sea and Time dimensions to a plurality of destination points <SAO> Sao Paulo, Brazil, <BUE> Buenos Aires, Argentina, <GUA> Guatemala City, Guatemala, <SJC> San Jose, Costa Rica, or <BOG> Bogotá, Colombia. (4) Each Y_CDIF macro order merchandise dimension is nationalized via customs and then they are shipped to the specified client's location.

Figure 73:
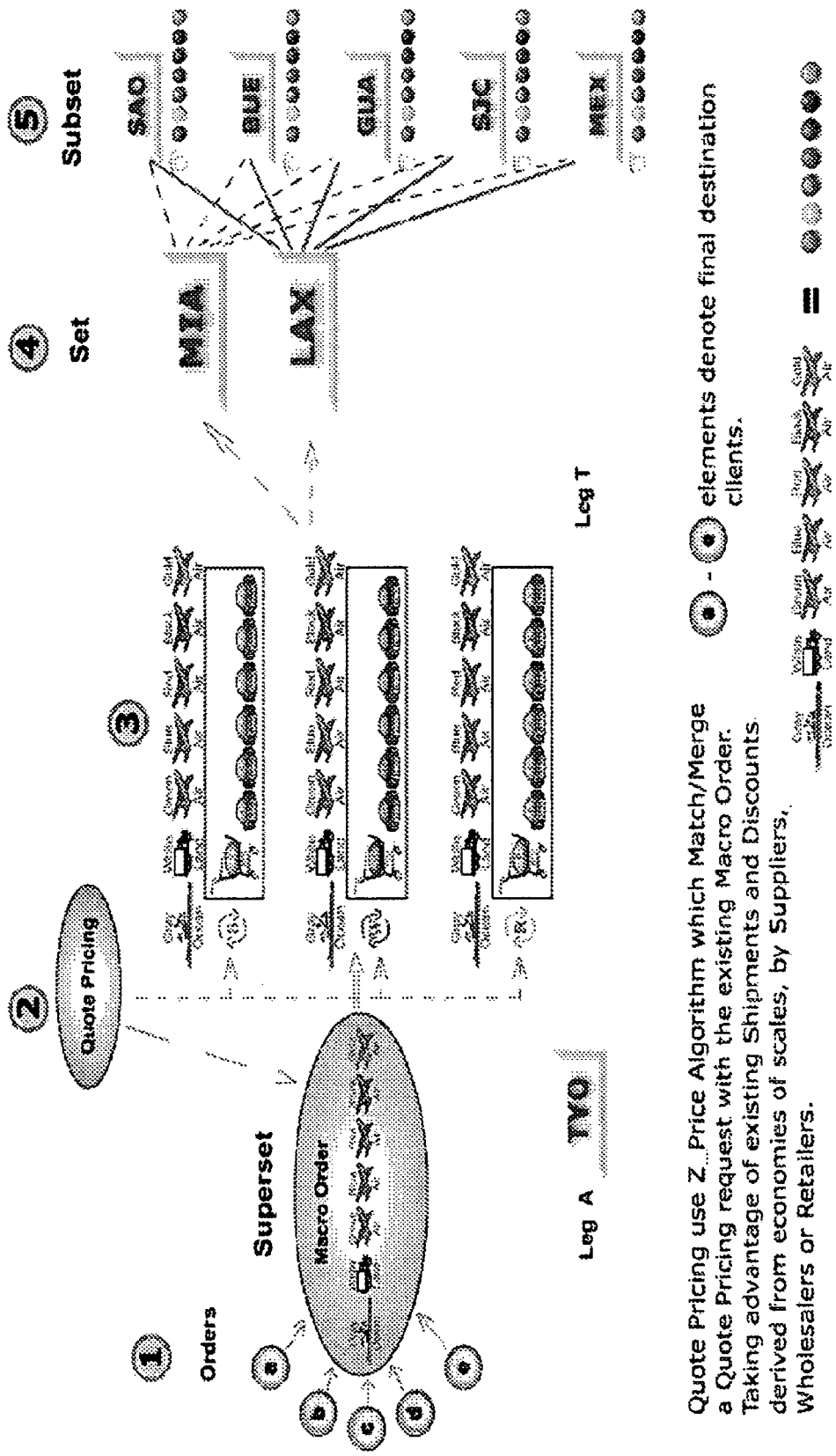

FIG. 73: is a schematic representation of the Z_PRICE Match/Merge process, where incoming queued merchandise is incorporated with real time online sales quotes to maximize cost efficiencies. (1) An X_FOB Macro Superset of merchandise exists from a plurality of <R> Retailers, <S> Suppliers and <W> Wholesalers that belong to the Japan region and that are in the process of being shipped via air, land and sea to the <TYO> Tokyo, Japan Leg A UCommerce warehouse. Assigning transportation time dimensions of arrival, departure and cost to each partial Vector from $3^{rd}$ parties to Leg A, will permit the supplier to optimize each existing container to lower purchase discount rates and minimize transportation cost per item. The supplier system assigns prorated cost to each line item of a quote, and determines the system's lowest cost which comprises of the distribution means of participating $3^{rd}$ parties <R>, <S> and <W>. The information is stored in Environmental Bitmap formats based on Product_ID, Warehouse_ID and Shipping Method. A plurality of shipments that have as a common denominator a (4) Leg T warehouse such as <MIA> Miami, Florida or <LAX> Los Angeles, Calif., both in the USA as sets, and their destination points (5) Leg B such as points <SAO> Sao Paulo, Brazil, <BUE> Buenos Aires, Argentina, <GUA> Guatemala City, Guatemala, <SJC> San Jose, Costa Rica, or <BOG> Bogotá, Colombia as subsets or Macro Y_CDIF Orders. (5) Each Y_CDIF macro order merchandise dimension is nationalized via customs and then they are shipped to the specified client's location.

Figure 74:
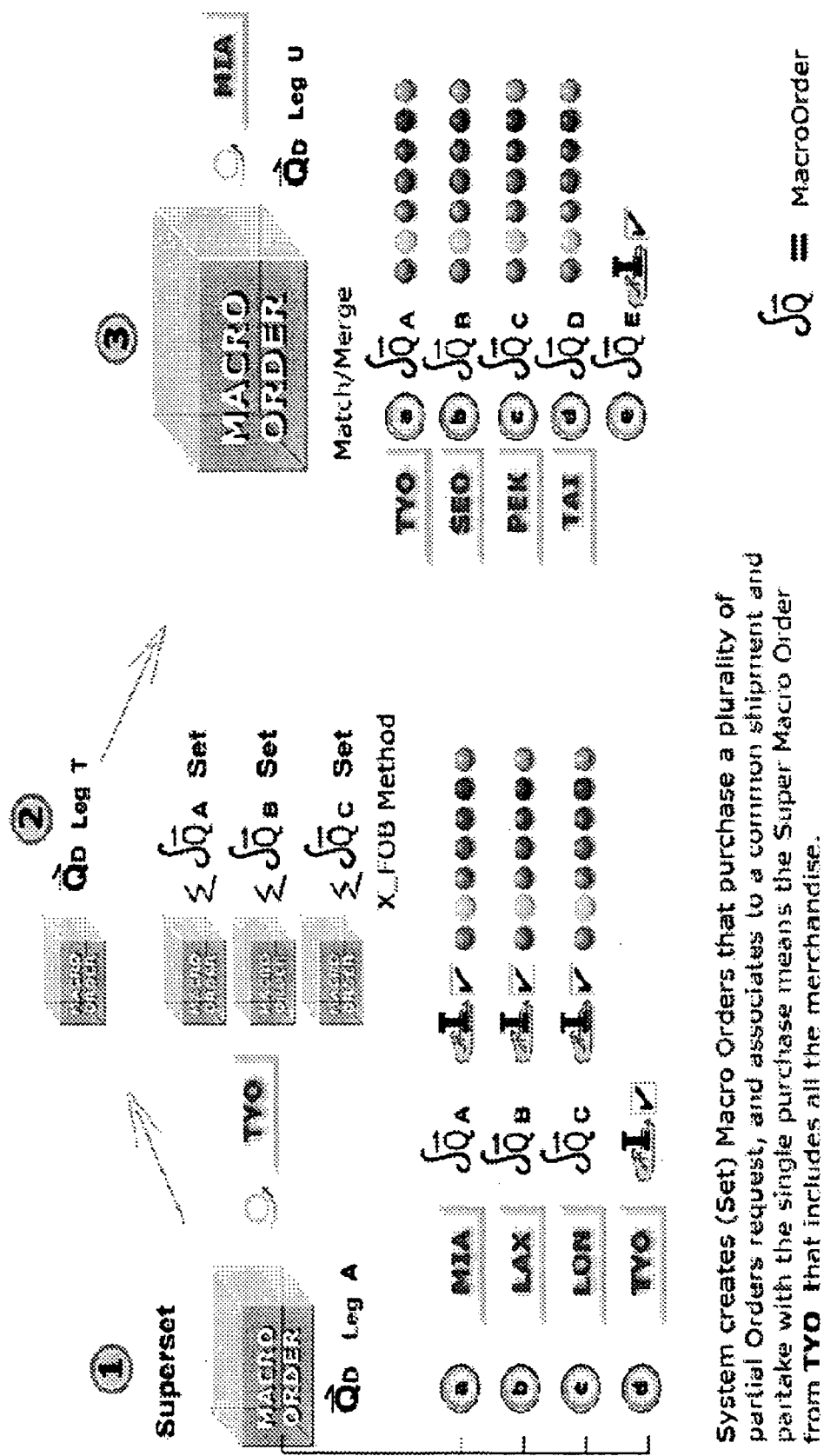

FIG. 74: is a schematic representation of Lump Sum Z_PRICE Purchases derived from the supplier, that match/merges a plurality of quotes and buys the collectively as a single Order. (1) The system match/merges a plurality of quotes from a massive amount of end users utilizing the supplier system. For example: using for continental UCommerce warehouses such as <MIA> Miami, Florida, <LAX> Los Angeles, Calif., <LON> London, United Kingdom, and <TYO> Tokyo, Japan, that exist as air, land and sea dimensions that have X_FOB delays, are associated and broken down in as partial orders that are eventually match/merged in the optimal UCommerce warehouse, that possesses further route dimensions of incoming dimensions from other supplier distribution means already in progress, such as <TYO> Tokyo, Japan, <SEO> Seoul, Korea, <PEK> Peking, Communist China, or <TAI> Taipei, China, as an in route Y_CDIF macro order that are traveling to the their (3) final destination port and upon being nationalized distributed as distinct orders to the specified client's location.

Figure 75:
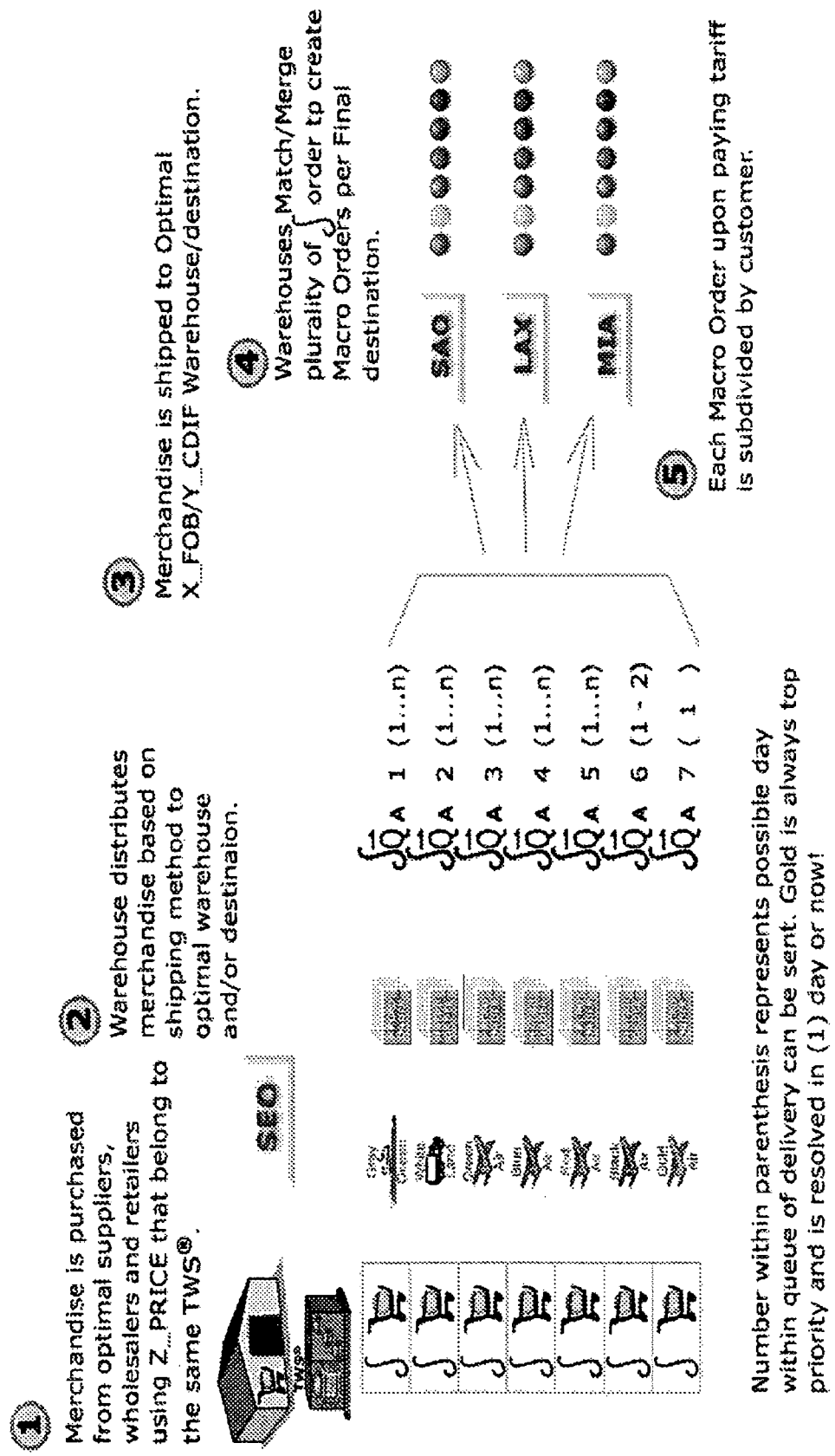

FIG. 75: is a schematic representation of an aggregate Z_PRICE Transportation matrix that consists (1) of a plurality of merchandise monitored and controlled by a TWS® that were purchased via the Z_PRICE method. (2) The warehouse distributes the merchandise based on the air, land, sea and X_FOB time dimensions from Leg A and is shipped optimal to (3) Legs (T, U) as X_FOB or Y_CDIF Macro Orders. (4) The plurality of incoming X_FOB/Y_CDIF Macro Orders is match/merged to the optimal UCommerce warehouse. (5) Once, the system creates large containers of merchandise to be shipped and nationalized at the final destination ports, and then its partition large containers into individualized containers belonging to an end user.

Figure 76:
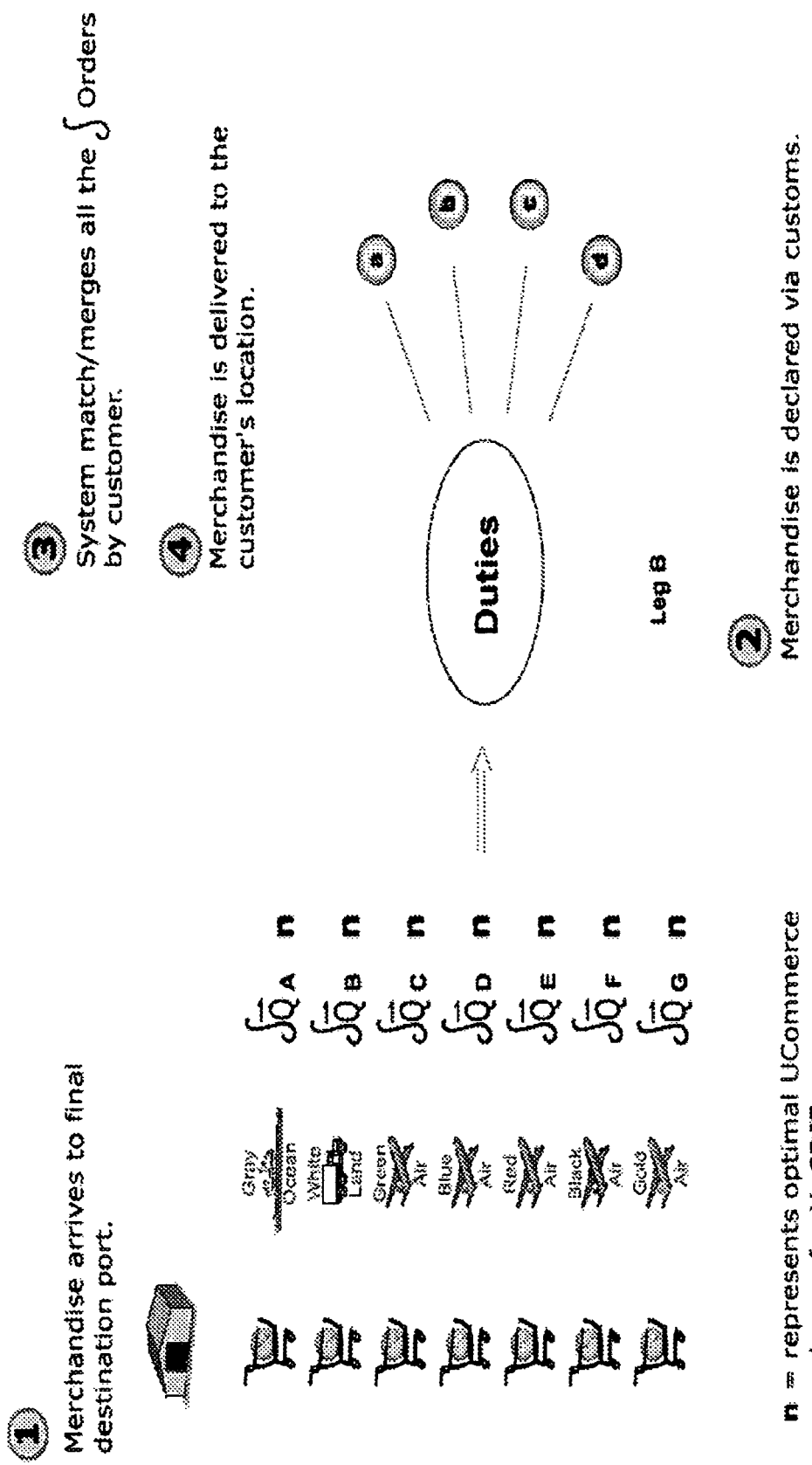

FIG. 76: is a schematic representation of the distribution of goods via Z_PRICE. (1) As merchandise arrives to the final destination port, the system match/merges them as a single order with a plurality of large containers, and then (2) nationalizes them through customs. (3) The match/merge of large containers of merchandise into smaller containers possessing all of the merchandise of each customer as a single order that is transported to the specified client location (A), (B), (C) and (D). Note: specified client locations may force a container to be broken into small containers, in the case where delivery instructions request a plurality of delivery sites.

Figure 77:
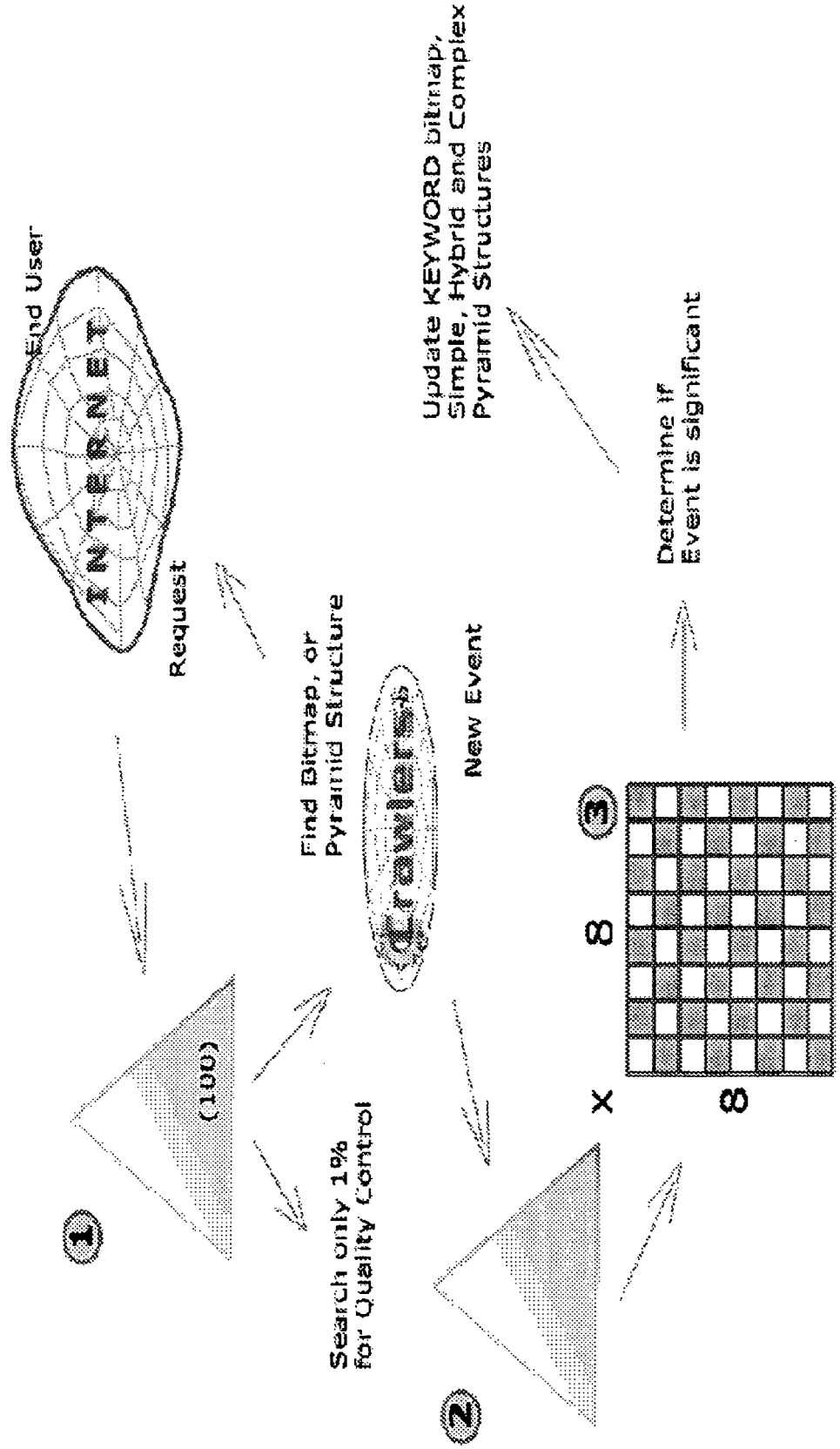

FIG. 77: is a schematic representation of an Interface to Browser overview using the XCommerce technology. The (100) supplier system analyzes the content of the Internet by analyzing, distilling, eliminating redundancy, converting, transforming and standardizing it into a lingua franca geospatial data. (1) The supplier system receives requests from end users in the Internet, and the system determines the optimal solution by checking the environmental bitmap information of each KEYWORD. (2) The inventory of information is updated by Web Crawlers that measure the quality of each page belonging to a link as each new event is detected. (3) The cluster of nodes comprises a Supercomputer, analyzes the new event, determines if the event is significant and then updates the Environmental Bitmaps Inventories based on KEYWORDS and KEYWORDS Groups.

Figure 78:
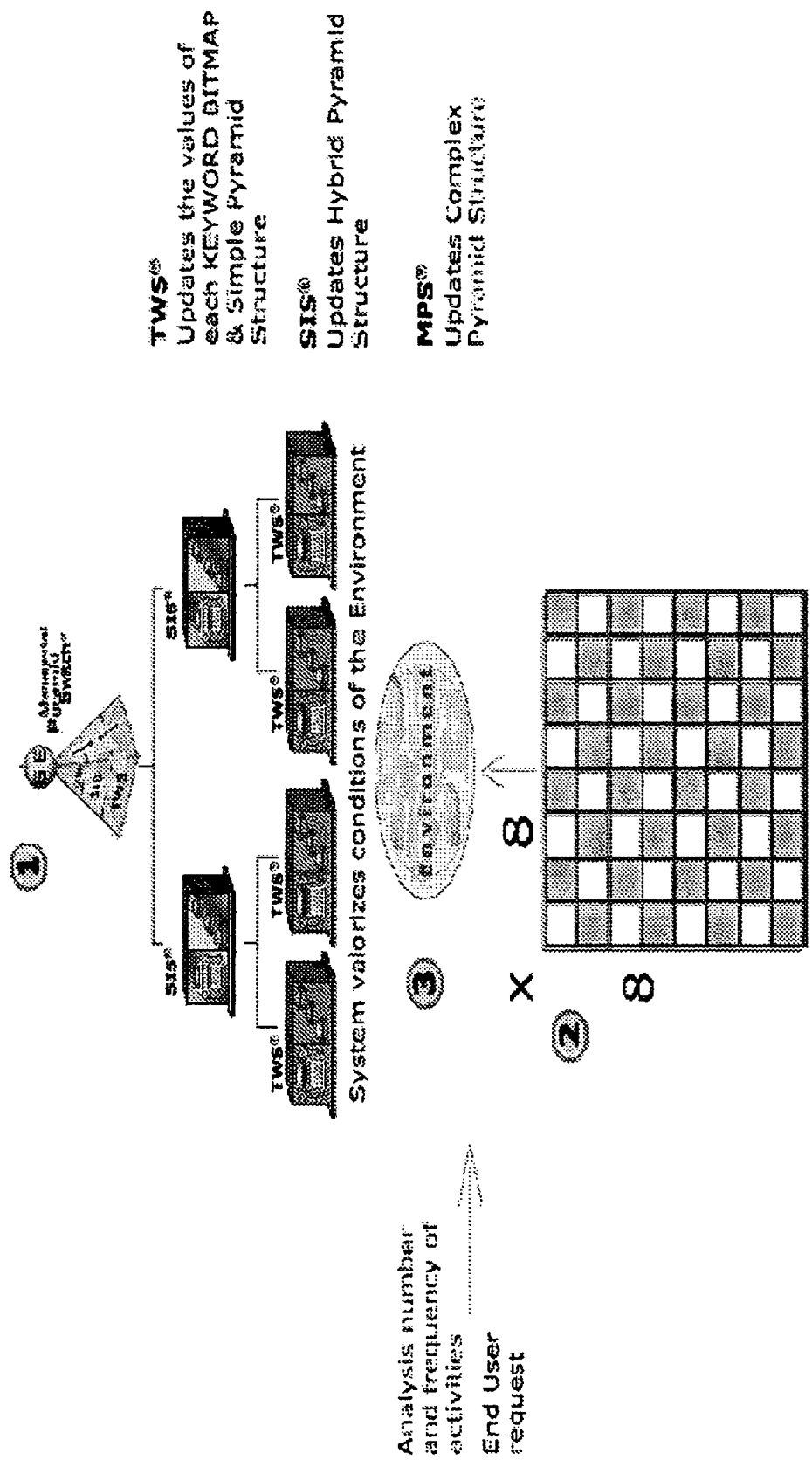

FIG. 78: is a schematic representation of WEB_RANK Updates. This is the process of integrating existing $3^{rd}$ party web browsers with the XCommerce technology. In this case, an HQ7 to HQ0 hierarchical organization is used to cover the Internet that has a global scope. (1) The supplier system consists of a three tier Managerial Pyramid Architecture, where the HQ0 to HQ2 creates a single or group based Environmental Bitmap. First, the lower tier has a plurality of TWS® responsible for generating Simple Pyramid Structures, and works in conjunction with its subordinates to identify KEYWORDS collections known as Simple Joins, Blocks, Walls and Ceiling that permit a clearer understanding of the value of the content of each link and its associate pages. Second, the Middle tier has a plurality of SIS® responsible for generating Hybrid Pyramid Structures, and works in conjunction with its subordinate TWS® organizations to identify KEYWORDS collections known as Hybrid Joins, Blocks, Walls and Ceiling that permit a clearer understanding of the value of the content of each link and its associate pages. Third, the Summit tier has a plurality of MPS® responsible for generating Complex Pyramid Structures, and works in conjunction with its subordinate TWS® organizations to identify KEYWORDS collections known as Complex Joins, Blocks, Walls and Ceiling that permit a clearer understanding of the value of the content of each link and its associate pages.

At the same time the MPS® has an interface to a (2) browser engines cluster or $3^{rd}$ party Supercomputer (8×8) that analyzes the content of the (3) environment or the Internet, and has the capacity of retrieving the most valuable responses for each KEYWORD regular expression request made by an end user. In other words, the MPS® interacts with a browser engine cluster to create single or groups of KEYWORDS Environmental Bitmaps which are the basis for developing the higher structures. In this case, the HQ0 to HQ2 are responsible for not just simulating and mimicking the Network Platform Equipment (or Browser Engine individual nodes) of the environment, but for communicating and working together with them. The supplier system, in order to work in real time, must first create the environmental bitmaps and the higher structure Environmental Bitmaps process that can take one or two months, at which point both technologies are integrated and synchronized as is hereinafter referred as XCommerce.

Figure 79:
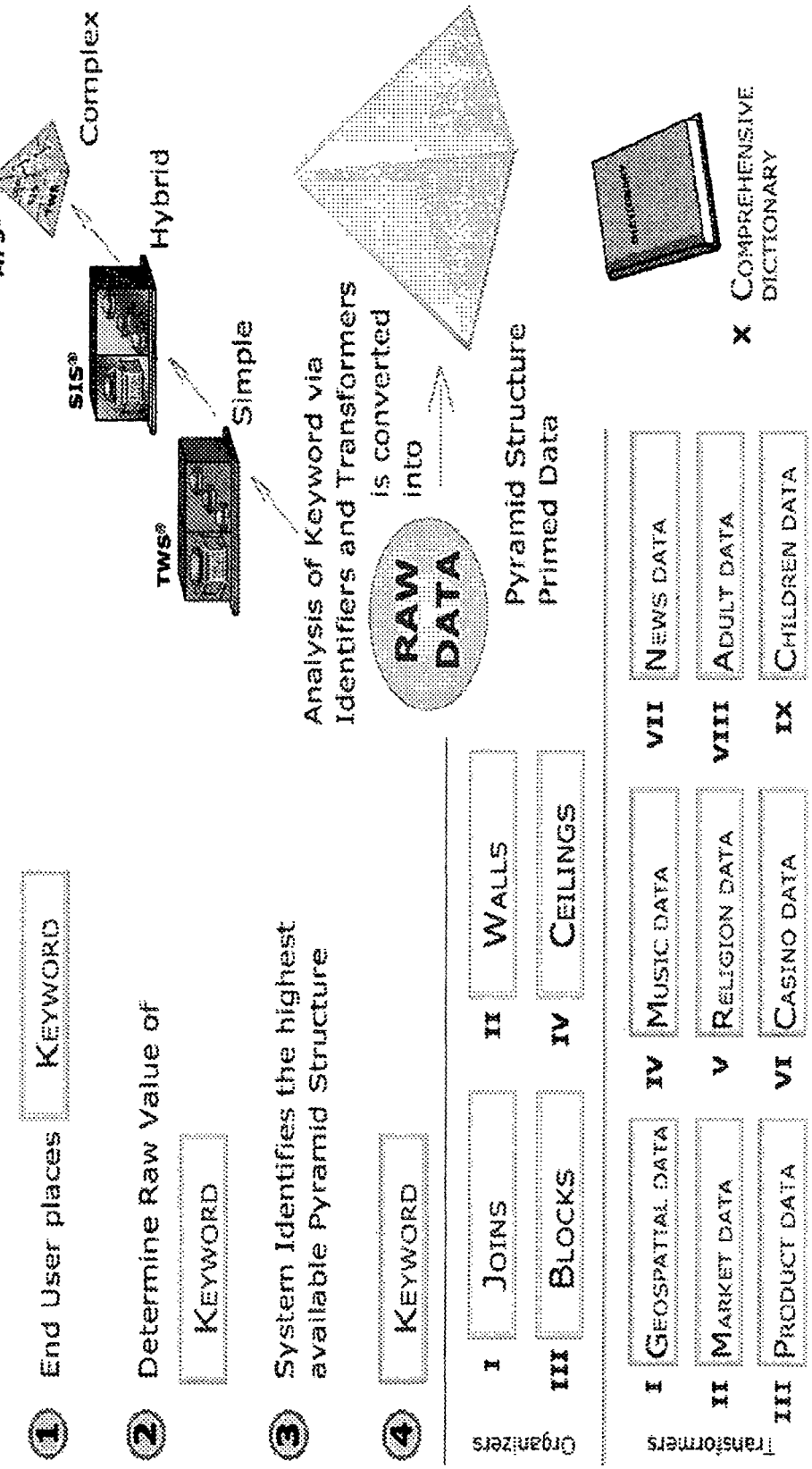

FIG. 79: is a schematic representation of how the Browser Identifies the Highest Match. (1) The end users place a single or group of KEYWORDS regular expression. (2) The system identifies the raw value of the KEYWORDS which is expressed from 0 to 15, where 0 is a very broad result of over 1,000,000,000 (or billion) and 15 is a very narrow result with at most 10 instances. Sometimes, they satisfy and most often they don't, and this is the craving need that this technology resolves. Instead of using the classical method of using a Browser Engine to search each time for KEYWORDS Regular Expression, the system precalculates the inquires as part of the Environmental Bitmap for single or group of KEYWORDS. (3) Based on the Regular Expression of KEYWORDS, the system identifies the highest available Pyramid Structure. For Browser Engines an event begins when an end user makes a request, and for XCommerce an event begins when a mathematically significant change in the environment is detected. (4) The system associates for each KEYWORD a weighted probability of also containing Simple Joins, Blocks, Walls and Ceilings that can be further associated with collections of transformers such as geospatial data, market, product, music, religious, casino, news, adult, children and dictionary data. For example, the word Miami can be associated with Dade County, State of Florida, USA, or America and with 305 and 786 Areas Codes, and a plurality of zip codes. The MPS® technology uses ANI or telephone #'s and zip codes belonging to a Local Access and Transport Areas (LATA) distribution of geographic areas as per Doctorial Dissertation and 6,614,813.

Figure 80:
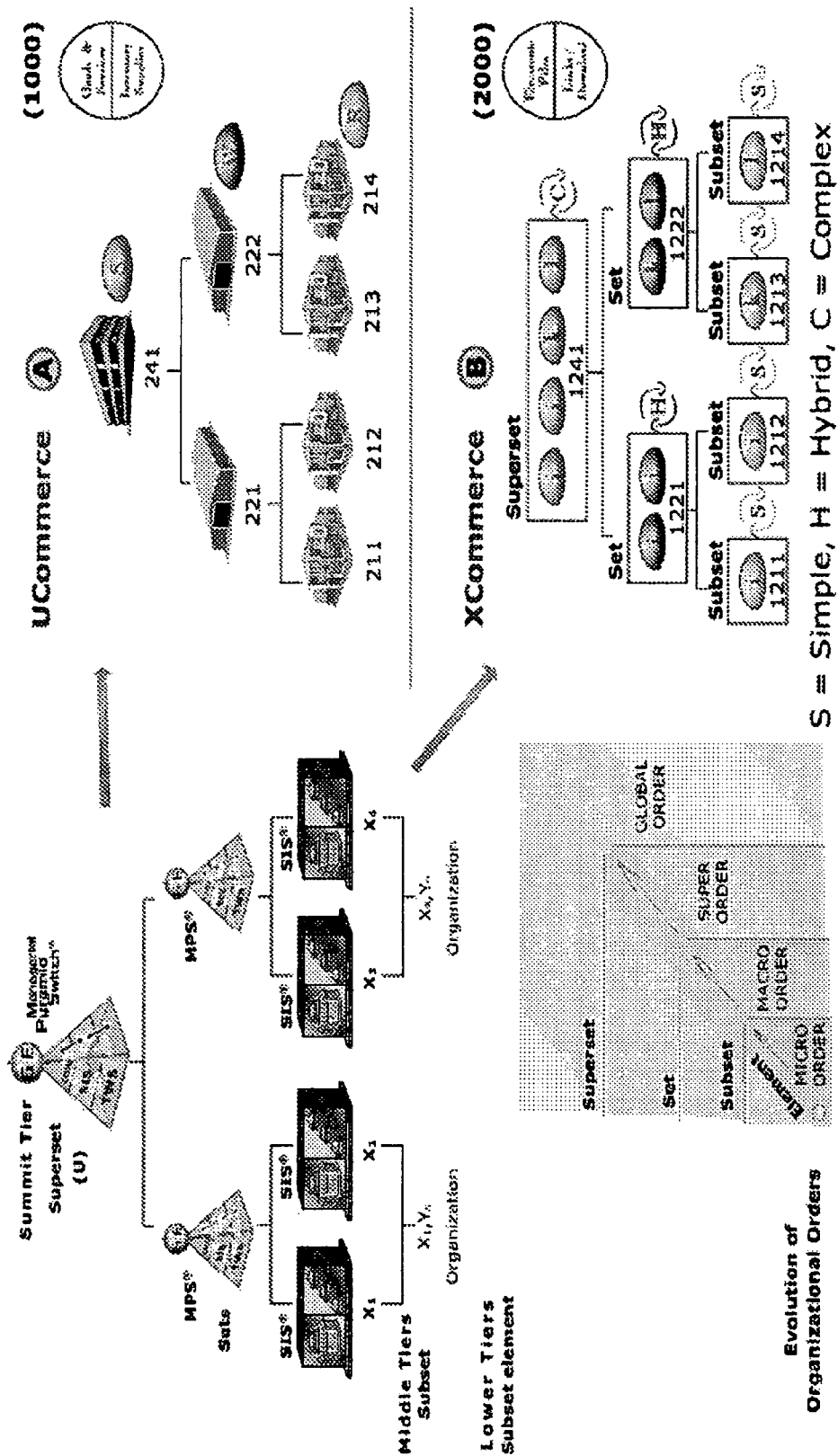

FIG. 80: is a schematic representation of the UCommerce overview that permits the inventory control of physical and electronic merchandise. The left hand side consists of a Managerial Pyramid Switch® Architecture that organizes the globe as a superset (U) and is further logically partitioned into sets, subsets and elements. These concepts are the basis for Micro, Macro, Super and Global Orders. In this case, a Micro Order is all of the traffic belonging to a specific element, such as an UCommerce warehouse, a Macro Order is all of the traffic belonging to a specific subset such as a Continental Region, a Super Order is all of the traffic belonging to a specific set such as a Continent, and finally a Global Order consists of all of the traffic belonging to the Superset.

(A) consists of a classical UCommerce configuration of (241) Suppliers, (221, 222) Wholesalers and (211 to 214) Retailers $3^{rd}$ parties, making (1000) goods and services available to the supplier system. (B) consists of the logical and geospatial distribution of the content of the Internet (U) based on KEYWORDS magnitude and transformed into Simple, Hybrid and Complex Pyramid Structures.

Figure 81:
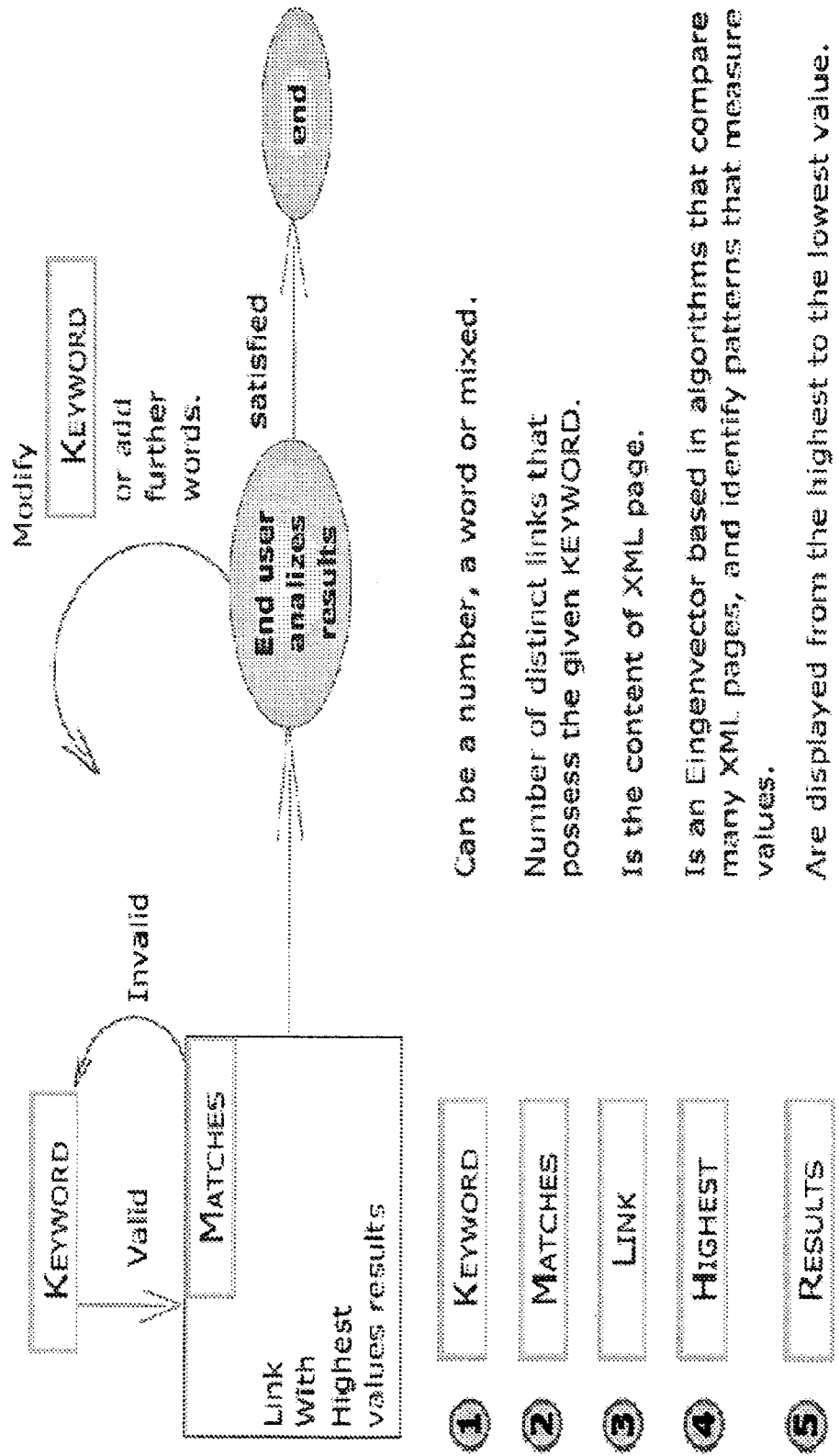

FIG. 81: is a schematic representation of using a Browser Engine that uses existing Browser Engines. (1) The system must validate a KEYWORD regular expression hereinafter simply KEYWORD as being valid. If invalid requests another word or supplies most likely candidates to the end user. (2) The system identifies the distinct amount of links and pages that match the KEYWORD. (3) The system identifies the content of each link. (4) The Browser Engine using Eigenvector algorithms determines the value of each link and its associate pages. (5) The system displays the highest valued results. This process requires the Browser Engine to utilize each of its nodes to search within their domain the best results and then consolidate them using mathematical filters, all as a single list that is the displayed at a browser.

Figure 82:
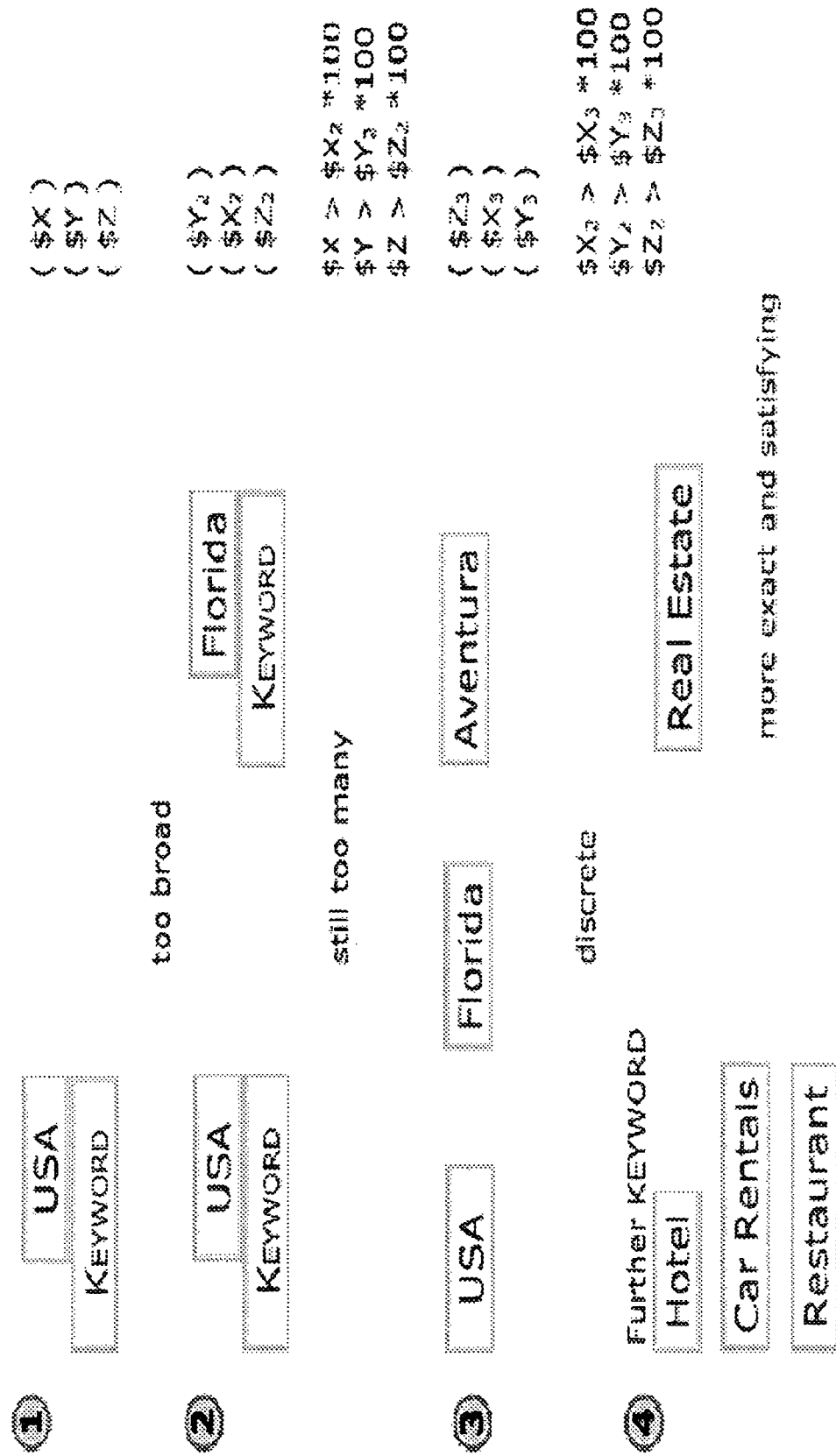

FIG. 82: is a schematic representation of Fine Tuning a Search using $3^{rd}$ party Browser Engines. (1) An end user makes an original KEYWORD request using USA, the result based on the $3^{rd}$ party Browser Engine $X, $Y and $Z differs but ranges between 500 million to 1 billion replies. The response to the end user is too broad and thus meaningless. (2) An end user improves the regular expression by adding USA and FLORIDA that creates results of $X2, $Y2 and $Z2 that range between 5 and 10 million replies and are still broad. (3) The end user narrows the search by using the KEYWORDS USA, FLORIDA and AVENTURA that creates results of $X3, $Y3 and $Z3 that range between 500,000 and 1 million replies and are more concise. (4) The end user narrows the search by using the KEYWORDS USA, FLORIDA, AVENTURA and RESTAURANTS that creates results of $X4, $Y4 and $Z4 that range between 5,000 and 10,000 replies. Results can be measured as objects. $X3 is the basis for Simple Pyramid Structures. $X4 is the basis for Hybrid Pyramid Structures. Note: (not included in the FIG.) If the end user narrows the search even further by using the KEYWORDS USA+FLORIDA+AVENTURA+RESTAURANTS+ARGENTINIAN that creates results of $X5, $Y5 and $Z5 that range between 50 and 100 replies that are the basis for Complex Pyramid Structures. These regular expressions are based on Caesar's Divide and Conquer strategies, whereas XCommerce in Environmental Bitmaps based on weight values algorithms.

Figure 83:
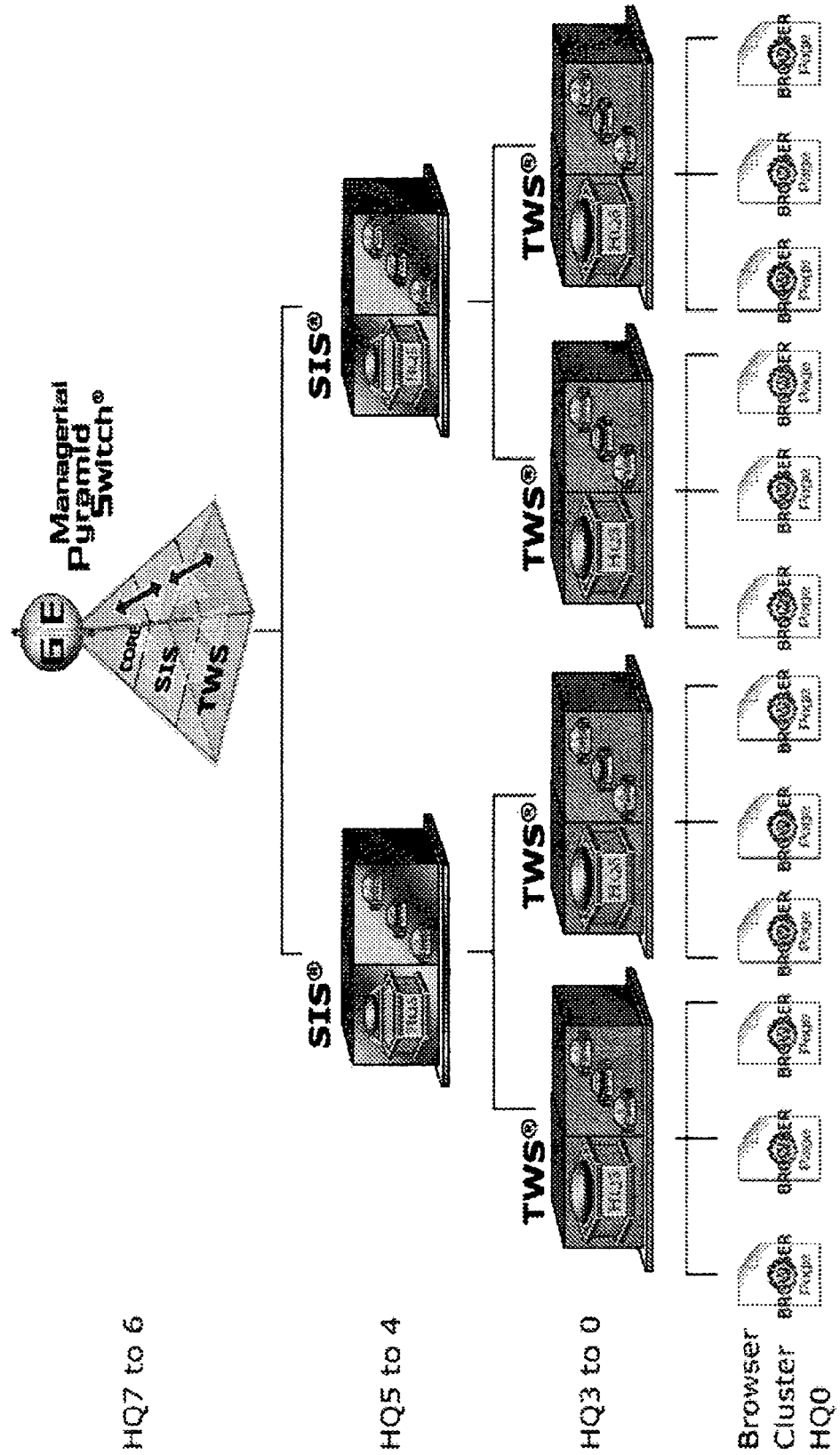

FIG. 83: is a schematic representation of the Distribution of XCommerce. As a global Managerial Pyramid Switch® Architecture, the system is divided into three tiers from top to bottom: 1) MPS® HQ7 to HQ6 manages, controls and through lateral synergy live statistics of end users activities, volumes and patterns of behavior, creates Complex Pyramid Structures and handles all of the financial interaction with $3^{rd}$ parties. 2) SIS® HQ5 to HQ4 delivers Optimal Value Advertisement instead of Target Advertisement and creates Hybrid Pyramid Structures. 3) TWS® HQ3 to HQ0 controls a plurality of HQ1 to HQ0 that interact with the Environment comprising a plurality of Browser Engine Supercomputers (8×8) that help to identify, valorize and quantify KEYWORD, and then create Simple Pyramid Structures.

Figure 84:
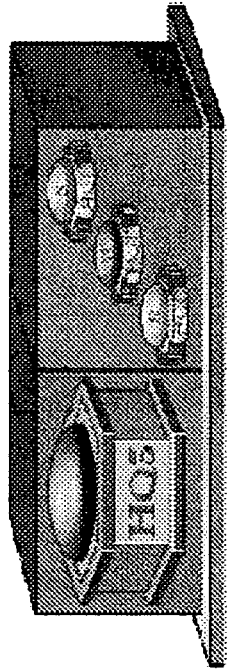

FIG. 84: is a schematic representation of Fine Tuning a Search using XCommerce. (1) An end user makes a KEYWORD Regular Expression and the system using the content of the Environmental Bitmaps Inventory responds to the end user. In this case, a request does NOT trigger a search and find event with the Browser Engine Supercomputer (8×8). Furthermore each <HQ0> cluster is responsible for valorizing each KEYWORD; <HQ1> controls common denominator pairs of KEYWORD; <HQ2> controls common denominator quad KEYWORD groups and, <HQ3> controls Simple Pyramid KEYWORD structures. Overall, the TWS® organization performs the lion shares of the computational task of administrating and gathering information from the environment.

Figure 85:
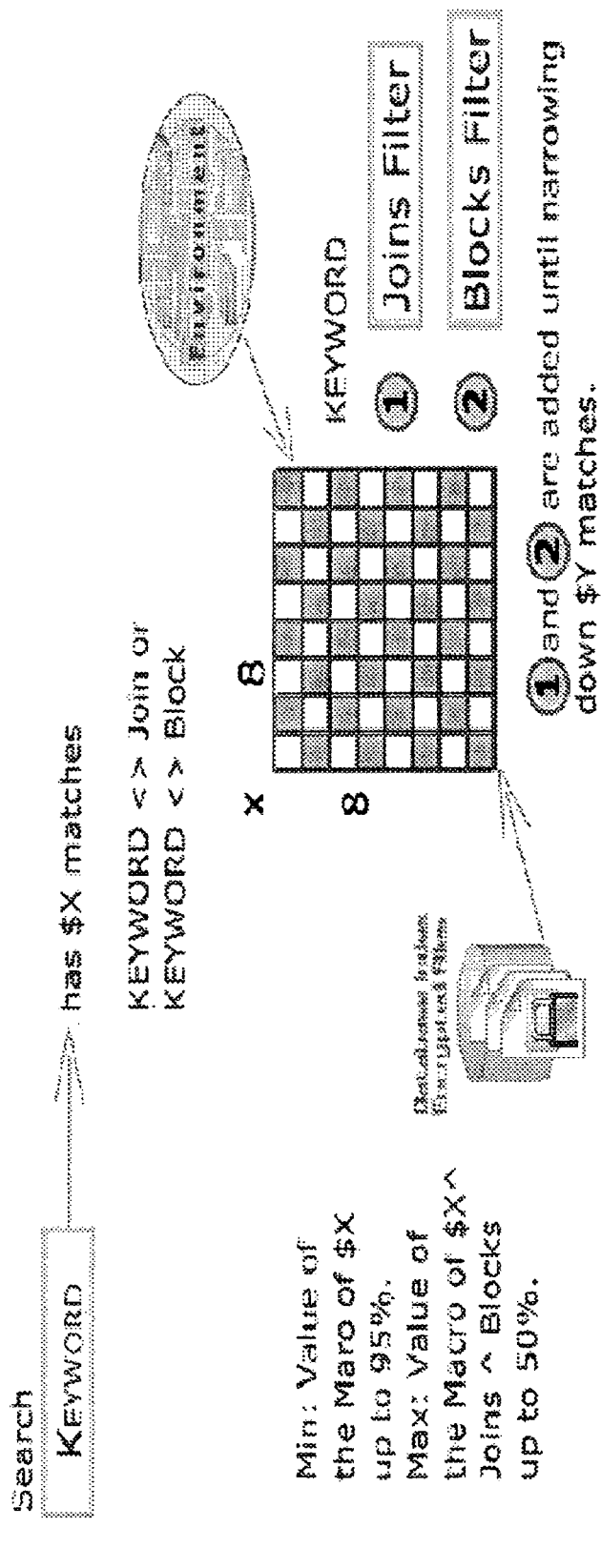

FIG. 85: is a schematic representation of Optimizing KEYWORD Quality. An end user makes a request using English language KEYWORDS. Each KEYWORD collection consists of a plurality of common denominator verbs, nouns, prepositions, adverbs, adjectives and other English semantics. For a KEYWORD Search that has $X matches expressed a number greater than 10,000,000 by the environment, the system has pre parsed the content of each and identified their value based on (1) Join and (2) Block collection of KEY- WORD filters that are associated until a minimum of 5% or a maximum of 50% is diluted. Each object contains one million logical cells. (3) Configuring each page having pairs, quad and octal collections of KEYWORD as belonging to a cell, and then using (4) Gamma functions the $X of each cell the value is normalized to exactly 1,000,000 responses by associating then to quad or octal collection of groups of KEYWORDS, even though $X number of replies in fact exist. It's like saying all of the pages that possess an octal collection of KEYWORD group of Join and Block belong to as one cell out of one million. The objective of this process is using math and the English language semantics, the system normalizes each page to belong to one cell. Should $X be less than one million, the gamma function will allow that a KEYWORD collection to possess more than one cell instead of just one. In any case, when everything is said and done exactly, 1,000,000 cells exist for a Simple Pyramid Structure based on English language semantics. Note: the working XCommerce was original fine tuned using English and Spanish, so that the system could readily import other languages.

FIG. 86: is a schematic representation of Using Math to Balance an Object. An end user makes a request using English language KEYWORDS. Each KEYWORD collection consists of a plurality of common denominator verbs, nouns, prepositions, adverbs, adjectives and other English semantics. For a KEYWORD Search that has $X matches expressed a number greater than 10,000,000 by the environment, the system has pre parsed the content of each and identified their value based on (A) Join and Block collections KEYWORD filters. Should $X be less than one million, the gamma function will allow that a KEYWORD collection to possess more than one cell instead of just one. The owner of the KEYWORD Intelligent Component uses WALL collections KEYWORD to further subdivide cells. Using math, the system determines the highest value Wall that should possess exactly 100 cells and one or more Walls that possess the next 9900 highest valued cells. The quality of the English semantics is measured.

Figure 87:
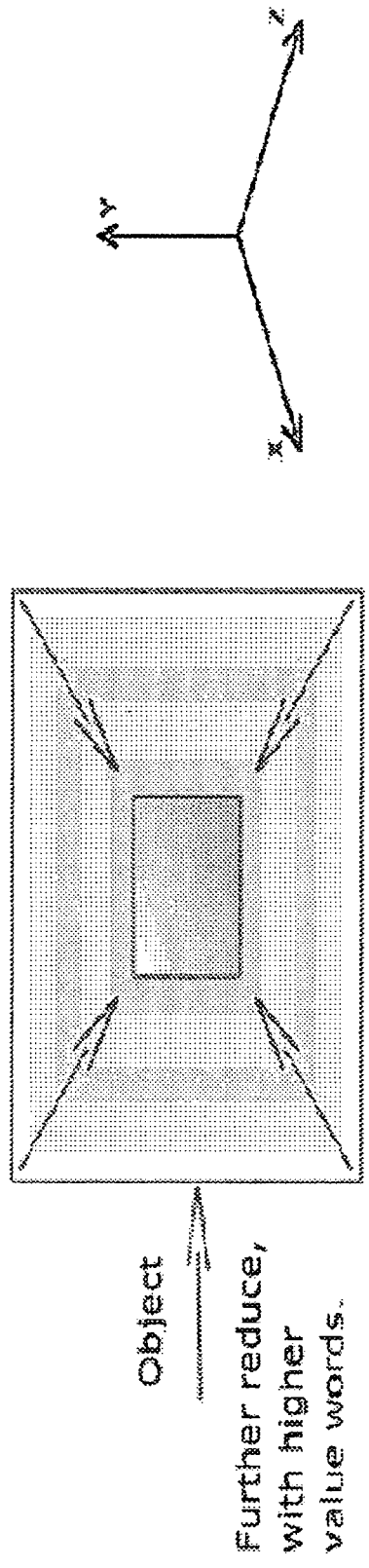

FIG. 87: is a schematic representation of Optimizing Keyword Quality by converting the object into a 3D geospatial structure. (1) The system performed Join and Block collection KEYWORD filtering. (2) The system using Wall collection KEYWORD was able to further subdivide the $X matches expressed in millions of raw requests as per FIG. 85. (3) XCommerce creates 3D compartments by using Ceiling collections KEYWORD filters, meaning that within a wall and each cell there existing some higher order attributes of the English language that help identify the optimal element (A) response of the superset (U). The Ceiling collection of KEYWORD filtering further reduces the number of building blocks to 500,000, where each block consists of 2 cells one on top of the other. The 500,000 cells that are in the bottom are the least satisfying results based on the Browser Engine valorization and the English language semantics. Yes, Browser Engine valorization is also used since the system must use site quality, number of hits and other Data Warehousing Business Intelligence statistics to help quantify and qualify an optimal element (A).

Figure 88:
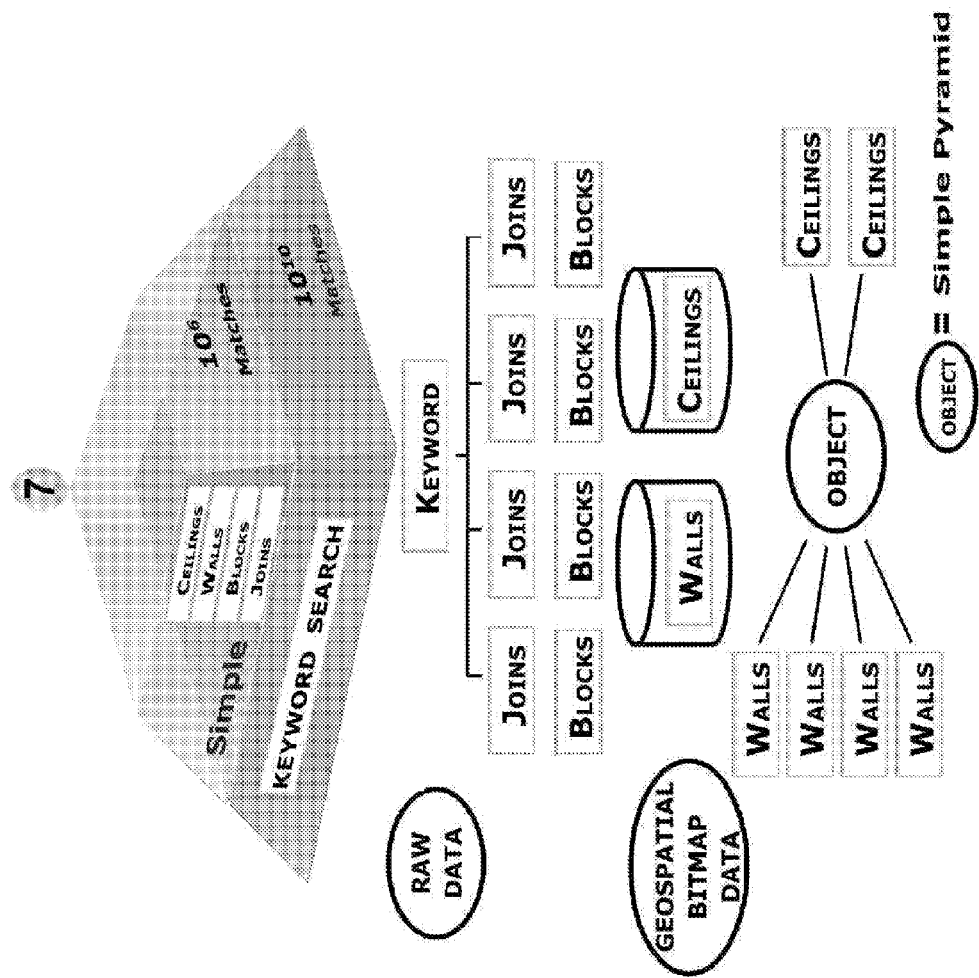

FIG. 88: is a schematic representation of a Simple Pyramid Structure. An end user makes a request using English language KEYWORDS. Each KEYWORD collection consists of a plurality of common denominator verbs, nouns, prepositions, adverbs, adjectives and other English semantics. For a KEYWORD Search that has $X matches expressed from the environment, the system has pre parsed the content and stored it into the TWS® XLDB Database Engine. The information is logical distributed, based on Simple Join and Block collection of KEYWORD filters, and further quantified and qualified by Simple Wall and Ceiling collection of KEYWORD. Simple Joins and Blocks help create cells, and Simple Walls and Ceiling create blocks that help construct 3D objects where the highest object is within the Pyramid Structure and the greatest the quality. At the top of the Egyptian pyramid we can find the Pharaon, in this case, the optimal element (A) consists of the TOP 10,000 responses. Since the TOP 10,000 response is still too broad, further mathematical and semantical analysis is required via the Hybrid Pyramid Structure that further dilutes the object to the TOP 100, and the Complex Pyramid Structure reaches Informational Entropy and is able to identify the optimal element (A) and the remainder TOP 10.

Figure 89:
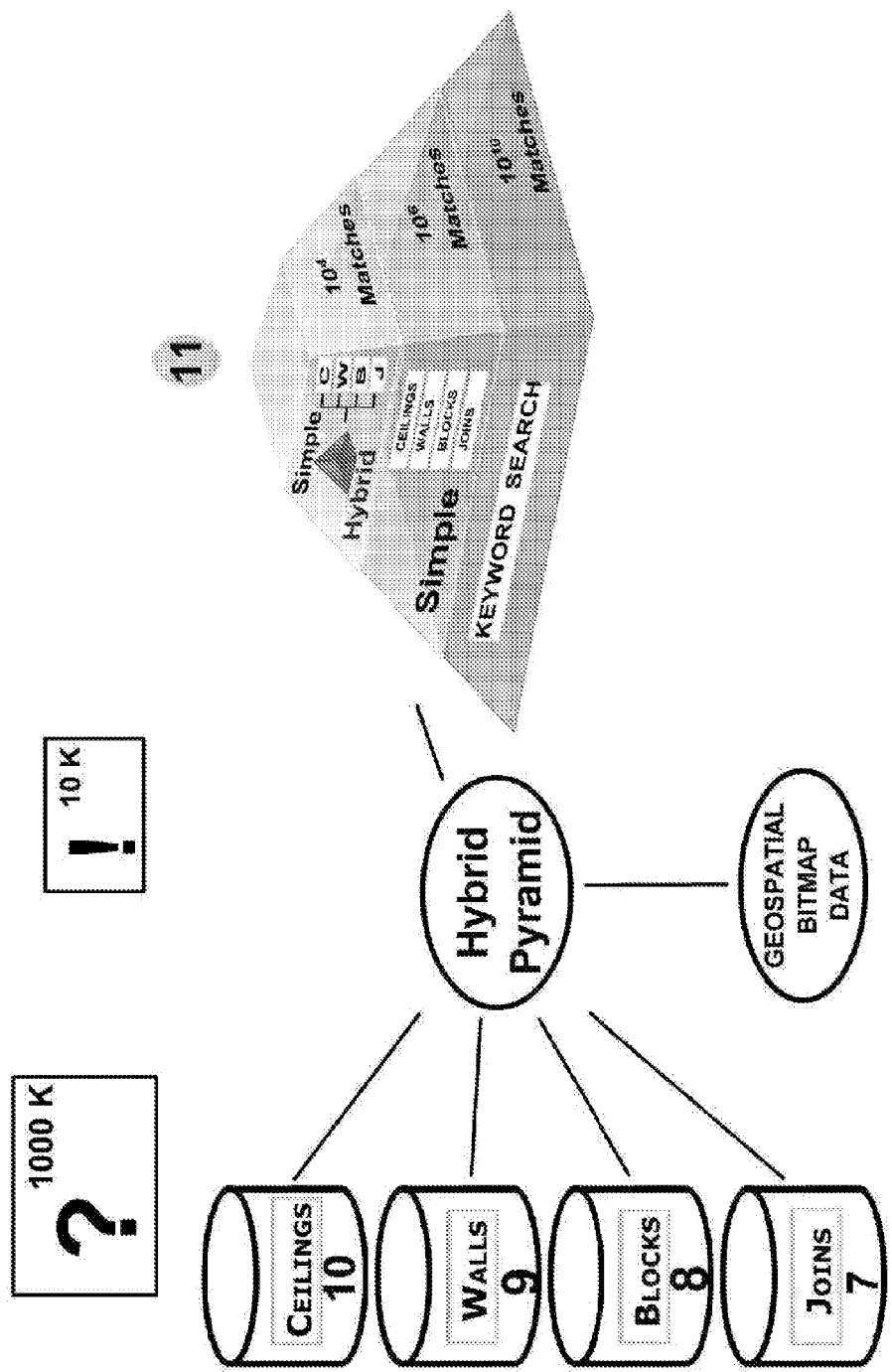

FIG. 89: is a schematic representation of a Hybrid Pyramid Structure. An end user makes a request using English language KEYWORDS. Each KEYWORD collection consists of a plurality of common denominator verbs, nouns, prepositions, adverbs, adjectives and other English semantics. For a KEYWORD Search that has $X matches expressed from the environment, the system has pre parsed the content and stored it into the TWS® XLDB Database Engine, and converted it into a Simple Pyramid Structure of 1,000,000 cells. The information is logical distributed, based on Hybrid Join and Block collection of KEYWORD filters, and further quantified and qualified by Hybrid Wall and Ceiling collection of KEYWORD to reach the TOP 10,000. At the top of the Hybrid Pyramid Structure with magnitude of 11, we can find the TOP 100 most satisfy results. Since the TOP 100 response is still too broad, further mathematical and semantical analysis is required via the Complex Pyramid Structure reaches Informational Entropy and is able to identify the optimal element (A) and the remainder TOP 10. Note: Joins collection KEYWORD have a magnitude of 7, Blocks collection of KEYWORD have a magnitude of 8, Walls collection of KEYWORD have a magnitude of 9, and Ceiling collections of KEYWORD have a magnitude of 10.

Figure 90:
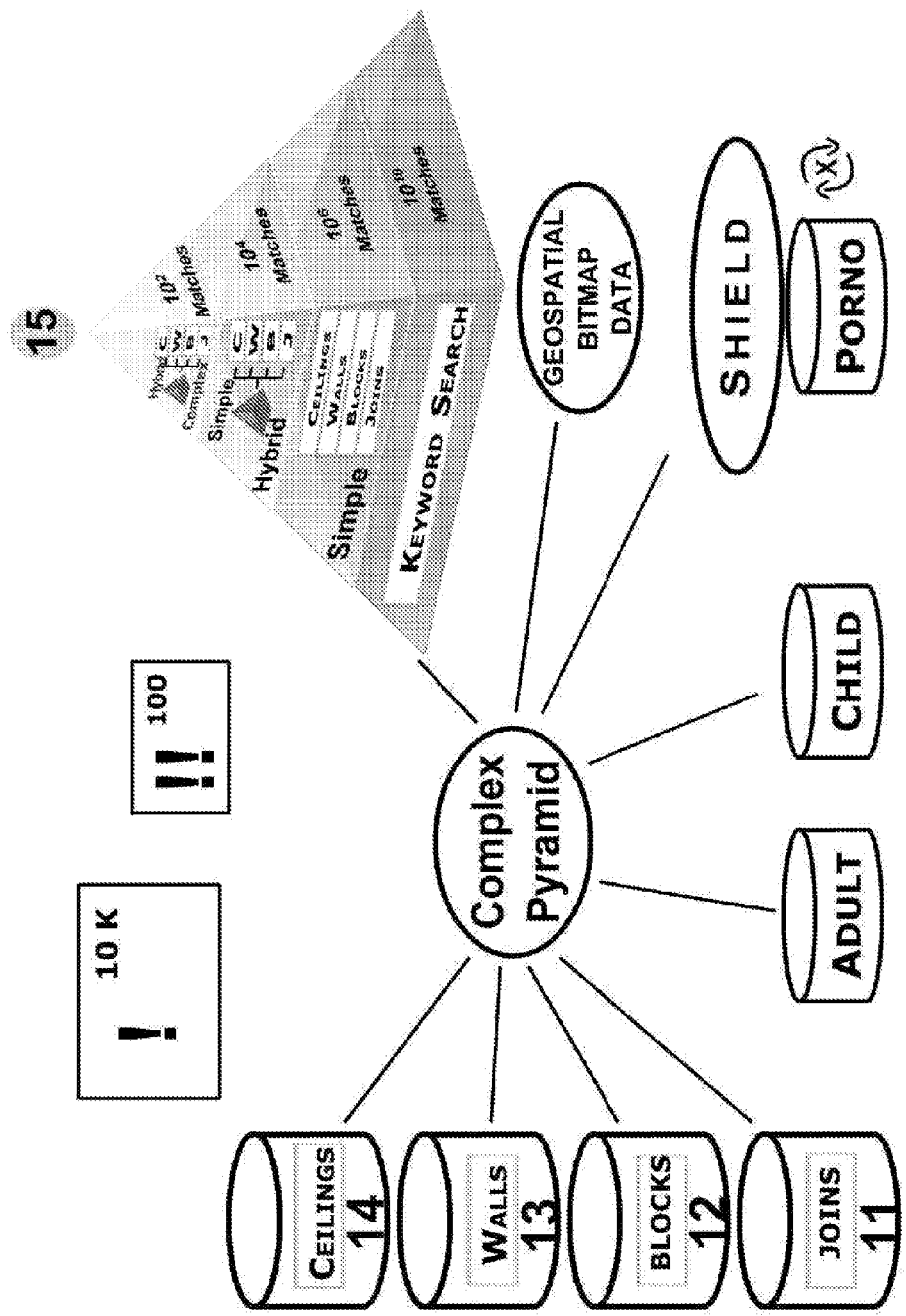

FIG. 90: is a schematic representation of a Complex Pyramid Structure. An end user makes a request using English language KEYWORDS. Each KEYWORD collection consists of a plurality of common denominator verbs, nouns, prepositions, adverbs, adjectives and other English semantics. For a KEYWORD Search that has $X matches expressed from the environment, the system has pre parsed the content and stored it into the TWS® XLDB Database Engine, and converted it into a Simple Pyramid Structure of 1,000,000 cells. The information is logical distributed, based on Hybrid Join and Block collection of KEYWORD filters, and further quantified and qualified by Hybrid Wall and Ceiling collection of KEYWORD to reach the TOP 10,000. At the top of the Hybrid Pyramid Structure with magnitude of 11, we can find the TOP 100 most satisfy results. Since the TOP 100 response is still too broad, further mathematical and semantical analysis is required via the Complex Pyramid Structure reaches Informational Entropy and is able to identify the optimal element (A) and the remainder TOP 10 by using Complex Joins, Blocks, Walls and Ceiling collections. At the top of the Complex Pyramid Structure with magnitude of 15, we can find the TOP 10 most satisfy results. Note: Joins collection of KEYWORD have a magnitude of 11, Blocks collection of KEYWORD have a magnitude of 12, Walls collection of KEYWORD have a magnitude of 13, and Ceiling collections of KEYWORD have a magnitude of 14.

Figure 91:
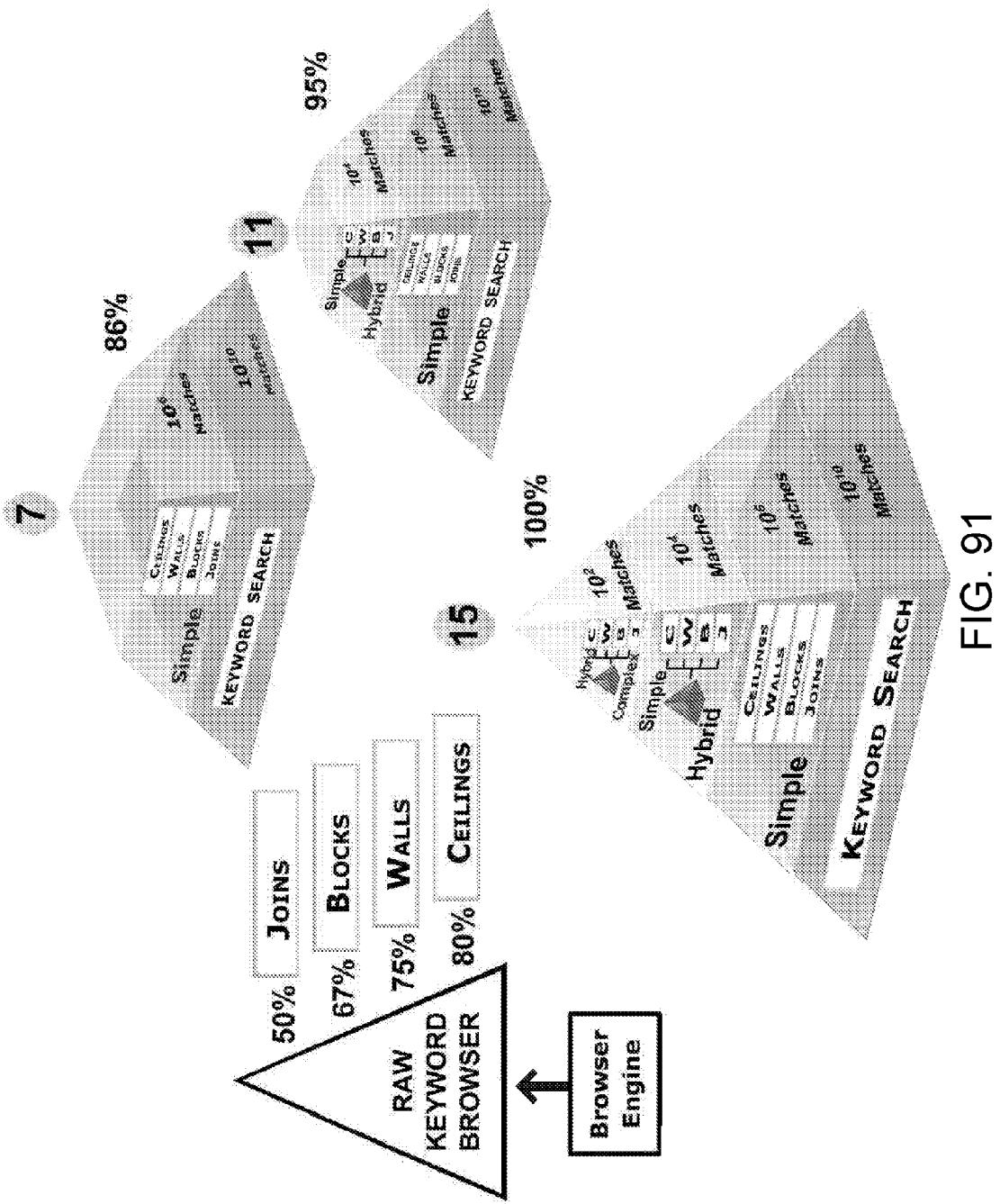

FIG. 91: is a schematic representation of Informational Entropy. An end user makes a request using English language KEYWORDS. (0) $X responses are obtained by a Browser Engine using Caesar's Divide and Conquer based Eigenvector programming. (1) After using Simple Join Collections of KEYWORD, the quality and English value is 50%. (2) After using Simple Blocks Collections of KEYWORD, the quality is 67% and the content is considered to be proper English. (3) After using Simple Walls Collections of KEYWORD, the quality is 75% and is grouped in cells. (4) After using Simple Ceilings Collections of KEYWORD, the quality is 80% and is grouped in blocks. (5) The Simple Pyramid Structure has filtered, validated and verified the quality of the English language value that is 86%, and has measured through relational association common denominator groups that help elucidate ties breakers in the difficult of finding the optimal element (A) of the Superset (U). (6) The Hybrid Pyramid Structure has filtered, validated and verified the quality of the geospatial data value that is 95%, and has linked each block the different DATA collections groups to further refine and polish the results that help elucidate ties breakers in the difficult of finding the optimal element (A) of the Superset (U). (7) The Complex Pyramid Structure has filtered, validated and verified the quality of the Business Intelligence patterns and statistical analysis of end users' satisfaction to real Informational Entropy of 100%, which has identified the optimal element (A) of the Superset (U). (8) The Simple, Hybrid and Complex Pyramid Structures have $X responses, 1,000,000 cells and 500,000 building blocks each regardless of the original magnitude of the KEYWORD.

Figure 92:
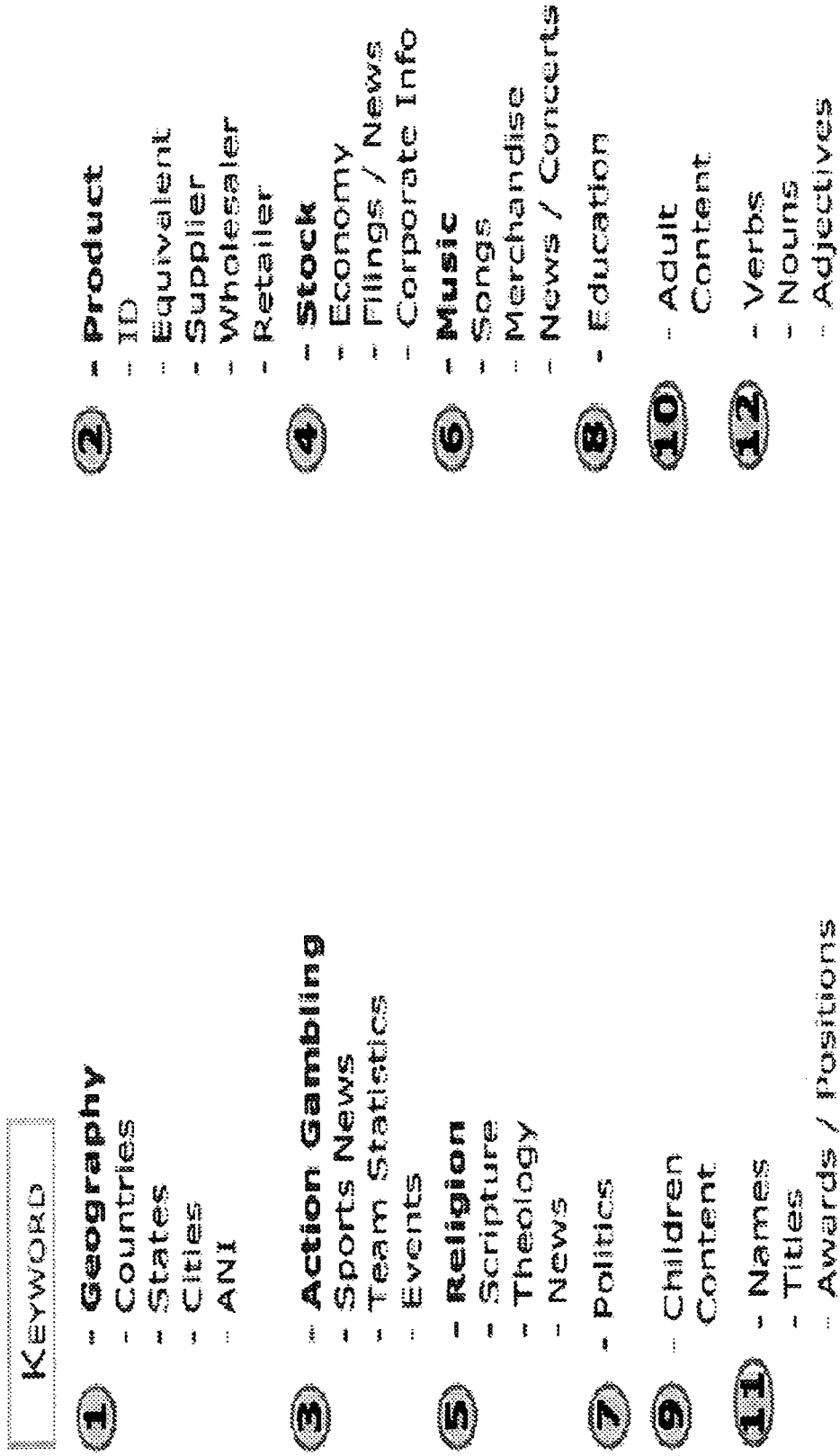

FIG. 92: is a table of Sample DATA collections used by the XCommerce technology to help build Simple, Hybrid and Complex Pyramid Structures. In particular, (10) Adult content carefully monitored and sites propagating Spam are quarantined and those having Viruses are blocked.

FIG. 93: is a schematic representation of Using Math to Balance a Hybrid Pyramid. An end user makes a request using English language KEYWORDS. Each KEYWORD collection consists of a plurality of common denominator verbs, nouns, prepositions, adverbs, adjectives and other English semantics. For a KEYWORD Search that has $X matches by the environment, the system creates basic cells and building blocks via Simple Joins, Blocks, Walls and Ceilings that have helped to create an object with exact characteristics, thanks to weight Gamma functions of 1,000,000 cells and 500,000 building blocks. (A-C) The system identifies the raw magnitude of the KEYWORD and maps the content of the Simple Pyramid Structure as the foundation of the Middle Tier of the higher Information Entropy object that has 10,000 cells or 5,000 building blocks with the TOP 10 and TOP 100 most satisfying responses to the end user. The quality of the English content is measured.

FIG. 94: is a schematic representation of Using Math to Balance a Complex Pyramid. An end user makes a request using English language KEYWORDS. Each KEYWORD collection consists of a plurality of common denominator verbs, nouns, prepositions, adverbs, adjectives and other English semantics. For a KEYWORD Search that has $X matches by the environment, the system creates basic cells and building blocks via Simple Joins, Blocks, Walls and Ceilings that have helped to create an object with exact characteristics, thanks to weight Gamma functions of 1,000,000 cells and 500,000 building blocks. The system creates a higher Informational Entropy object by using Hybrid Joins, Blocks, Walls and Ceilings that have helped to create an object with exact characteristics, thanks to weight Gamma functions of 10,000 cells and 5,000 building blocks, and a Pyramid consisting of a foundation and a middle tier. (A-C) The system identifies the raw magnitude of the KEYWORD and maps the content of the Simple and Hybrid Pyramid Structure as the foundation of the Summit Tier of the higher Information Entropy object that has 100 cells or 50 building blocks with the TOP 1 and TOP 10 most satisfying responses to the end user. The quality of the HTML content and links to other places is measured.

Figure 95:
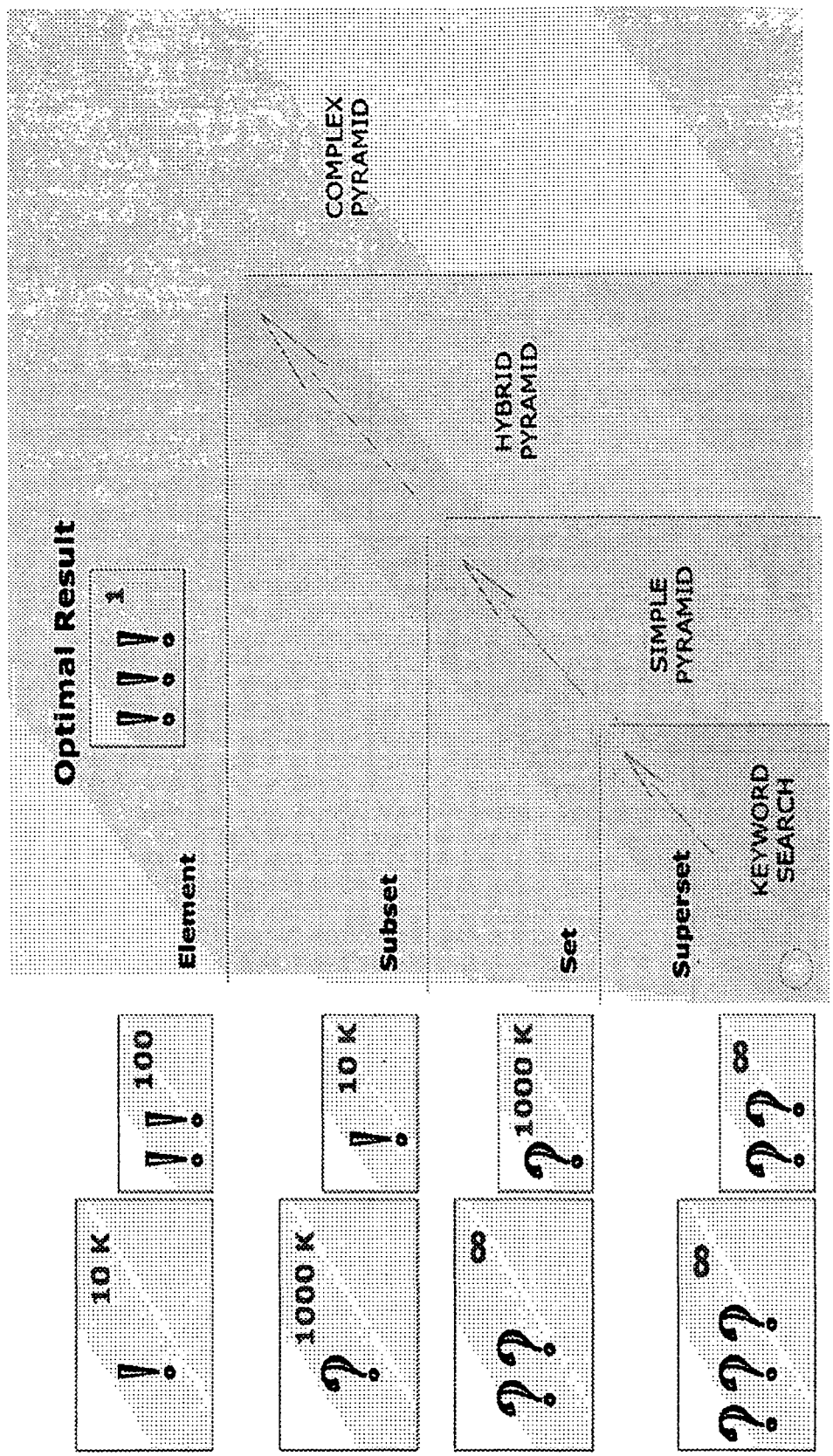

FIG. 95: is a schematic representation of Deriving Information Entropy. This example uses chess notation, where (???) is a blunder, (!) is a good move and (!!!) a superb move. In this case, raw Browser Engine filters out the information of the Internet or Superset that is considered to be (???) and improves it to (?? to !).

(1) When the original magnitude <=10,000,000,000 responses, the process of identifying basic English constructs of the contents help narrow down the size of the set to <=100,000,000, which is too broad and thus is measured as (??). (2) When the original magnitude <=10,000,000 responses, the process of identifying the English language semantics and geospatial characteristics of the contents help narrow down the size of the set to 1,000,000, which is too broad and thus is measured as (?). (3) When the original Browser Engine magnitude <=100,000 and is less than responses, the process of identifying the English language and geospatial characteristics of the contents help narrow down the size of the set to 10,000, which is broad and thus is measured as (!). (4) When the original Browser Engine magnitude <=100 and is less than responses, the process of identifying the English language structure and a system understanding of the content of each page helps narrow down the size of the set to 10, which contains 'la crème de la crème' and thus is measured as (!!). (5) From the discrete set of 10 by using Business Intelligence, the optimal element (A) of the Superset is derived and thus is measured as (!!!). The process of identifying the optimal element (A) is the basis of the W_PAGE method.

DETAILED DESCRIPTION OF THE SYSTEM ARCHITECTURE

The parallel clustered multi-tiered Supercomputer consists of a plurality of nodes, where each one is programmed with Artificial Intelligence software programs, commercially known as Intelligent Components or IC, to perform processing power predefined and ad hoc tasks based, that must be logistical rationalized based on the requirements derived from the environment.

The cluster is also known as the Superset (U). The cluster is divided into three geospatial tiers: a) Global, b) Regional, and c) local possessing specialized Data Mitigation, Network Trending, Provisioning, 'Data Mart' and Business Intelligence functionality relying on a sharable Extreme Large Data Base (XLDB) tier. Each of the nodes or IC is assigned a geospatial area of coverage range from 0, small geographical areas, to 7, the world, a managerial hierarchy system denoted as HQ. Each Intelligent Component possesses the following characteristics and functions:

a) Data base means with real time information of the inventory and the latest prices of retailers, suppliers, wholesalers and UCommerce warehouses that will give customers products and services delivered door to door at the optimal price and time. The system will consider the world as a single supra macro region, and thus the consumer will readily have available same ocean, land and air cargo such as blue, red and black label services from local, regional or global products and services. This method offers small and large customers the ability to locally buy and sell worldwide merchandise, thus allowing them to compete anywhere in the world without the need of storing physical inventory.

b) Total Quality Management or TQM functionality that analyzes and identifies product, quality and service designed to determine customer satisfaction and perceived value.

c) Data Manipulation or DM process consists of gathering, reading, priming and inserting Network Platform Equipment transactions into a structured format that can be used for billing, call routing and vectoring, fault management, fraud detection and network statistics.

d) Management Information Systems or MIS methods that organize, transform, distribute and replicate organizational detailed and summarized lingua franca information created by each transactional processes and activities, are transformed and organized into a relational manner from the environment.

e) Expert Information Systems or EIS mechanism permits business intelligence software to evaluate information in a structured way for decision makers, such as the CEO and a president of an organization, to understand where and why things happen in an organization. With this information, the visionaries of an organization can make tactical adjustments and strategic course corrections.

f) Inventory Control means depending on the Intelligent Component's assigned managerial hierarchical geospatial area of coverage assignment as Local, Regional or Global.

All of the Intelligent Components work collectively and independently from each other, and still simultaneously perform the task analyzing, evaluating, gathering and processing information from the environment in real time, or from the moment of incipiency of receiving the fuzzy logic piece of information that triggers new and updates pending activities or tasks. The cluster of computers must be subdivided into a superset, set, subset and element, grouping the following Managerial Pyramid Switch® architecture with local, regional, global and informational sub cluster partitioning to help build three geospatial tiers:

The Summit Tier or Managerial Pyramid Switch® or MPS® Information Portal HQ7 coordinates the Data Mart cluster used for Business Intelligence and Invoicing that work with Crusader Technology Software via the Internet that allows users to have access to their business and personal information in real time. The system analyzes each Crusader Technology Software interaction to better understand what the client values in order to keep the subscriber satisfied. HQ6 is the master node of the cluster (U) that has control of all of the financial institutions interfaces, human resources and Network Platform Equipments of an organization. Consequently, each Intelligent Component has the four cluster configurations as follows: HQx ([I], [J], [K]y, [T]), where x ranges from 0, local, to 7, global geospatial scope, [I] Global (Superset), [J] Region (Set), [K] Local (subset), y denotes the element, and [T] XLDB or Data Mart Cluster.

The Middleware Tier or Synergy Interface Switch® or SIS® controls UCommerce warehouses based on continent HQ5, continental region HQ4 or LATA (Local Access and Transport Districts) HQ3.

The Lower Tier or Team Work Switch® or TWS® controls a plurality of points of presence based on the organization suppliers HQ2, warehouses HQ1 or retailers HQ0. These HQ2 to HQ0 collectively constitute the workhorse of the system, and Intelligence has control of users' requests and replies to the system. These Intelligent Components coordinate and synchronize the entire billing, provisioning and TQM functionality requests and replies. They also have the ability to interact with $3^{rd}$ parties organizations and supply them with a summary of all of the data they have processed.

Virtually simulate $3^{rd}$ parties organization functionality by storing via software interface, district via TWS®, region via SIS® or globally via MPS® to reduce the need of having to rely on the centralized mainframe. Each Intelligent Component or Intelligent Data Warehouse must only synchronize the latest inventory once every predefined cycle, and then the artificial intelligence programming will optimize and maximize its organizational management logistics. The nodes of the system will interact directly with the provisioning and physical or queued inventory of each member of a $3^{rd}$ party distribution means.

Intelligent Components can request to members of the same group or Team Work Switch® any excess buffer resources to complete a task (lateral synergy). Members of a TWS® can coordinate the resources of any parent and their subordinates to complete a task. Members of different regional cluster can synergistically collaborate to process tasks via Synergy Interface Switch® and perform worldwide tasks thanks to the summit cluster or Managerial Pyramid Switch®.

Intelligent Components can be programmed to behave and to be the substitute of one or more nodes in performing organizational tasks, so that collectively the 'HIVE' works as a Super Intelligent Component engulfing a global supplier system. The supplier system has specialized interaction means with the environment that gather, distill, analyze and then standardize and convert the raw information into primed lingua franca data, which in turn is quantified, qualified, organized and transformed, so that Information Entropy is achieved and consequently the chaos and anarchy or 'Spaghetti Phenomena' is eliminated.

Collectively, multiple Intelligent Components work together to parallel and simulate an existing organization that possesses an UCommerce supplier system.

Each primed lingua franca message by the system has a single version of the truth vector trajectory that assigns a discrete amount of Intelligent Components, so they can communicate amongst themselves or members of the organization and the Internet clients. Based on the vector trajectory, each message has an owner and the path of all of the participating Intelligent Components required to process a given activity, so they can communicate amongst themselves via forward and rearward chaining. Proactively, the human resources of the organization use business intelligence software that can send parameters to the master node of each TWS® (subset), SIS® (set) and MPS® (superset) that permits humans to control, coordinate and synchronize directly their network. The software sends the parameters to a single or plurality of clusters, so they can optimally analyze, assign, calculate, distribute, prioritize and weight the rate of messages and timing limitations for the next queue of incoming messages, based on the conditions of the environment and historical trends.

Each Intelligent Component is also an independent working entity or an element of a given superset, set or subset, grouping with the following characteristics:

a) HQ3 and higher are also Intelligent Data Warehouses, performing data warehouse functions, and are programmed to monitor and control multiple nodes. They act as virtual simulation of the organization. HQ2, HQ1 and HQ0 that are designed to remove redundancy, geospatially distribute activities, and to correlate and update information.

b) Intelligent Components are programmed to valorize with supply side economics the limited resources and capacities of the network with their parents, peers and subordinates (lateral and vertical synergy), so that the system does not tax the capacity of the existing network in real time.

c) Intelligent Components are programmed to immediately create, plot and update purchase orders as soon as new messages from the environment are processed.

d) Intelligent Components analyze the latest environmental conditions to manage and organize the flow of information within their organization, from predefined point A to point B routes to avoid clogs and saturation maximize throughput, and assign and prioritize cluster nodes via synergy that have substantial buffer resources since unused resources are considered waste or garbage, which is the independent variable that is directly related in creating the 'Spaghetti Phenomena'.

e) Thus, network traffic is analyzed by supersets, sets, subsets, groups of elements and by element domain, based on the known latest working conditions of each Intelligent Component, network routing traffic patterns and throughput limitation of each given domain. The TWS®, SIS® and MPS® perform the non obvious task of removing complexity in order to be a real time system by eliminating data redundancy, filtering, quantifying, qualifying data as good or garbage, and minimizing waste before beginning to transmit the data through the managerial hierarchy system.

f) Intelligent Components are programmed to eliminate the 'Spaghetti Phenomena' at the point of attack, so that the system can reach Information Entropy at the organizational level which is a necessary condition to be considered a real time invention.

g) Intelligent Data Warehouses stabilize the flow of financial conditions, criteria, inventories, shipping cost and tariffs required for billing, and update to the Information System or XLDB Data Mart with transactional statistics that are made available to the rest of the Intelligent Components to better optimize resources and available bandwidth.

h) Each Intelligent Component is programmed to be autonomous, and through means of the managerial hierarchy and synergy, can work in parallel with others to function as a single unit. They process all of the information forming a virtual instance organizational environment.

i) The members of the hierarchical management pyramid analyze, update, monitor, control, validate, verify and administer information that in turn eliminates the 'Spaghetti Phenomena', which in turn permits Informational Entropy once primed data has balance, harmony and proportion. This fact alone removes the need for a central mainframe and also shows that garbage in equals to garbage out and that raw data derived from the chaos and anarchy of the environment is meaningless, and that the real time solution consists of simultaneously synchronizing the workload (MIS), optimizing throughput (Engineering), proactively satisfying clients demands (TQM) and updating human intelligence with good information (EIS); and the fact that they are all of the required or mandatory at once is not obvious in nature.

j) Each Intelligent Component has its own location identification means, one said summit parent simulation computer being located at each of a plurality of subordinates. Depending on the size of the network, the architecture of how computers are linked together might require a plurality of scopes, each with its own parent and subordinate. For the purposes of this invention, retailers, wholesalers and suppliers are available. Furthermore, each node must belong to the main cluster or 'HIVE', and to a geospatial specific domain local, regional or global cluster.

Every single activity and purchase order is made in parallel, starting from the point of origin and ending at the point of destination, and by rearward chaining of routing vector information through the simulation network to the point of origin. The Managerial Pyramid Switch® Architecture provides a computer network system which plots a purchase order providing the lowest prices and the best terms and conditions available for that transaction at that moment, and a request is initiated and continues in real time as the activity progresses.

The Managerial Pyramid Switch® Architecture provides such a computer network, which minimizes bandwidth usage by performing, cleaning, standardizing, organizing and transforming the raw data from the 'Spaghetti Phenomena' or Legacy System environment, so that UCommerce supplier system can analyze and evaluate the best usage network resources to satisfy the needs of the customers in the following manner:

a) The 'HIVE' administers, coordinates, controls, mimics, manages the live network and also reflects a concurrent and parallel working simulation of the live network call routing activities and transactions.

b) The heart of the system is the business intelligence TQM functions that make sure to predict when a customer becomes dissatisfied to immediately avoid churn, and also enable the supplier system to bill and manage the follow of money in real time.

c) The three clusters of tiers belonging to the managerial hierarchy update their subordinate components by sending only summarized information packets to their organizational subordinates. Consequently, these updates facilitate network wide information in real time to each intelligent component, so that the decisions are based on facts, and not lookup tables or hard coded predefined routing patterns. This is the basis for the development of the two new methods: Z_PRICE and W_RANK.

d) The different clusters or switches can avoid bottlenecks within their organization by assigning cost to each activity and limiting the resource. Each Intelligent Component has at its disposal to perform tasks and the ability to find and use available buffer resources by less taxed members of the group, and load balances the demand on the organization's resources, as per scenarios and business cases with regard to particular situations (SNAFU) or dire conditions contemplated by management. The system works always at maximal throughput and can only use emergency reserved resources on its own when the fault is serious enough to cause customer dissatisfaction; and a human resource has not acted to the problem within the predefined time allocated for a response.

e) The 'HIVE' is an open architecture which operates in conjunction with the Legacy System and its associated technologies, so that existing equipment is not wasted and the cost of updating is minimized.

f) Parent components are responsible for assigning tasks with time limitations to their subordinates.

g) When two or more independent variables exist, a plurality of subordinate members can take ownership of a plurality of circuits of a transaction and then send the partial Vector CDR information to the assigned transactional owner, so it can gather all of the circuits information and then match/merge the billing entity or purchase order.

Detailed Description of the UCommerce Technology

The 'HIVE' System is derived from a Genesis Engine Supercomputer™ Architecture that consists of a system built using a particular configuration. To begin the system, is constructed from a pair of network links that are parallel clustered to form a Supercomputer (100) which monitors and controls the Internet represented in Fig. X as (1) Inbound messages and (2) Outbound messages from the environment (50), meeting at a junction point in the form of an organization that has external contact with the outside world via the Internet. The Supercomputer is divided into several tiers for a better distribution and efficiency of the workload. The system (100) can be divided by the summit tier (141) or Managerial Pyramid Switch® that is a Superset cluster grouping that is parent of all of the components. The middle tier (121-122) or Synergy Interface Switch® is a set cluster grouping that manages and controls all of the middleware activities for the interacting financial institutions, retailers, suppliers and wholesalers, and also helps the parent (141) component to coordinate and manage all of the available resources. Each middle tier (121-122) manages multiple lower tier Intelligent Components (101-104) or Team Work Switch®, that is a subset cluster group. Each group consists of a plurality of nodes or elements that can perform the following:

a) Receive and send messages and transactions for all of the activities performed by human resources and end users that interface with the system (100).

b) Update all of the end users that communicate with the system with the latest shipping cost formulas, geographical location of retailers, suppliers, system warehouses, wholesalers and product lines from the different manufacturers.

c) Match/merge the activities of multiple end users with regards to the same supplier to afford the best competitive rate via economy of scale discounts where applicable.

d) Have a hierarchical structure that is geospatial in nature and helps facilitate the interaction with the human resources, financial transactions and clients' demands. Where each HQ is assigned a value from 0 (local) to 7 (global) denotes its authority, position, power and responsibility within the 'HIVE'. For example, HQ7 interacts with all of the customers. The HQ7 interacts with the outside world environment, preferably with the management of the supplier system, in particular via data warehousing and business intelligence software. Whereas a simple HQ0 interacts, monitors and controls the activities of one or more end users within a local geographical area. Thus, not all of the Intelligent Components are identical, even though they have the same intrinsic characteristics and functions.

e) Have delegation of command, by means of lateral synergy where a subordinate creates a virtual instance of its immediate superior, and acts and functions in the same manner as its supervisor, including the same delegated authority and responsibility within the hierarchy. For example, a network has a major system failure at the regional level, and particular Synergy Interface Switch® subordinates and their end users are unable to communicate with the rest of the organization to get wholesaler or supplier prices. The least taxed Team Work Switch® will behave temporarily as the SIS® and will temporary approve, verify and validate as a partial transaction a given activity with the maxi cost algorithm as if the entire organization was still visible and fully operational. Once the network communication is restored, the TWS® notifies its supervisors all of their activities and then each supervisor reviews the activities validated SIS® with the mini cost algorithm. Then the SIS® makes the appropriate validation of inventory, pricing and transportation, and rearward chains the missing gaps of information with certitude to its subordinates that will continue interacting amongst themselves until all of the information has been successfully updated and validated.

f) The 'HIVE' is the main cluster that is used to give a heart beat to all of the concurrently working nodes of the clusters, as is also known as the Superset.

g) The summit tier of nodes is commercially known as MPS®, that monitors all of the activities of the environment and is responsible for training its subordinates of the most effective and efficient manner to present conditions. The system assigns priorities and rations available resources, forcing its subordinates to share resources and work together, primarily, by promoting shunting resources from nodes having larger buffers to process the activity. In a nutshell, these nodes control, coordinate, manage and monitor the Internet or the superset (U). The MPS® performs the following:

Coordinates the activities of the subscriber software driven requests. ii) Analyzes, gathers and identifies consumer personal information and purchasing patterns of behavior. iii) Allows an organization to have a personalized yet secure interaction with the public. iv) Manages end users' requests and replies while determining their level of satisfaction with regards to TQM functions. v) Communicates with the outside of the environment via the Internet.

h) The middle tier of nodes is commercially known as SIS® that monitors all of the activities of a given region of the environment and is responsible for training its subordinates of the most effective and efficient manner to present conditions. This tier controls and is responsible for the actual inventory, and makes financial decisions using mini cost algorithms. These elements gather information and study patterns of purchasing and production behavior and faults, and then make on their own ad hoc optimized logistics reports that are submitted to the managers of the supplier organizations. This "inverted or reverse" ad hoc query does not hog the resources of the network, since the system builds the report on its own by summarizing the reports of its subordinates and then sending them to the user. In a nutshell, these nodes control, coordinate, manage and monitor a geographical region of the Internet or the set, where U=(I, J, K). The SIS® manages and controls the logistical flow of transportation and queuing of delivery of goods and services from an UCommerce warehouse to the destination. The SIS® merges multiple end users' requests as one to have better bargaining power and lower costs to the consumer via economies of scale.

i) The lower tier of nodes is commercially known as TWS® that monitors all of the activities of a given partition of the environment, such as a geographic area of coverage of a LATA (local access and transport area), cleans, standardizes, organizes and transforms the raw data of the environment into a lingua franca. The TWS® validates and verifies each end user request and reply, and is assigned an ownership of several end users. This tier at incipiency determines the origin, tandem and destination of the transaction. By means of the data mining activities of the client software, the system updates and keeps the end users profile current. In a nutshell, these nodes control, coordinate, manage and monitor a subset of the Internet by modeling a plurality of retailers, suppliers and wholesalers organization points of presence, and have the means to interact directly with their provisioning systems.

X_FOB method: The UCommerce client software uses stored media devices or downloaded compressed file structures with critical data that allows the end user to perform optimized searches. The client will take advantage of lookup tables stored in memory or open files with a product list to determine which products are valid. Then the system opens the data specification files and all of the static data is displayed in the Graphical User Interface (GUI). The system subdivides a search and then disseminates the request. The client analyzes the request using the fuzzy logic and then breaks it into several partial commands by suppliers. Each partial request is sent to the supplier system and replied to the client that is responsible for merging and integrating each of the partial commands to a single version of the truth. The system will prioritize each available product based on UCommerce shipment value and overall net price. Once the client gets the updated price, it adds the domestic shipment when Inventory is not available. X_FOB penalizes the FOB price based on the number of days the product is away from the C&F port. X_FOB stands for delay free FOB price. X_FOB is primarily concerned with the optimal distribution of goods and services from Leg A to UCommerce warehouse Leg T or Leg U, using Ocean, Land and Cargo transportation services, where delivery is preferred in days.

Y_CDIF method: The software uses stored media devices or downloaded compressed file structures with critical data that allows the client to perform optimized searches. The client will take advantage of lookup tables stored in memory or open files with a product list to determine which products are valid. Then the system opens the data specification files and all of the static data is displayed in the Graphical User Interface (GUI). The system subdivides a search and then disseminates the request. The client analyzes the request using the fuzzy logic and then breaks it into several partial commands by suppliers. Each partial request is sent to the supplier system and replied to the client that is responsible for merging and integrating each of the partial commands to a single version of the truth. Once the system has assigned a X_FOB price for a given product, the end user selects a C&F international shipping method via Air White, Green, Blue, Red and/or Black Label express mail services. The International shipment charge if any is added to the FOB price per unit. The system then calculates the Air shipment method expressed in hours to further adjust the FOB price+International Shipment+Value Added Duties. In other words, the system will penalize or make more expensive the Y_CDIF price of a product due to greater time delay requirements to deliver products to the consumer. Y_CDIF stands for delay free CDIF door-to-door service. Y_CDIF is primarily concerned with the optimal distribution of goods and services from Leg A, Leg T or Leg U to destination Leg B, after paying cargo, duties and insurance, and using Cargo and Express shipment transportation services where delivery is preferred in hours, taking into account cost as constraint. Y_CDIF Gold is a rush service, when the client requires merchandise ASAP, where cost is a secondary constrain and time the primary, and immediate service is optimal.

X_FOB and Y_CDIF are a way to calculate the quality and versatility of a transport route from Leg A to Leg B Warehouse that ranges from optimal a 10 and weakest a −4. Leg A is the origin, Leg B is the destination, Leg T is an UCommerce warehouse residing in the same continent that Leg A does, and Leg U is a UCommerce warehouse residing in the same continent that Leg B does. To determine the value, the UCommerce software determines the following: 1) merchandise is already in a warehouse Inventory In Hand, 2 & 3) Industrial Basis for Leg A and Industrial Basis for Leg B country by using a lookup table, 4) Domestic shipment modifier based on the country, 5) Leg A and Leg B are in the same region, and 6) Intercontinental modifiers based on Leg A and Leg B continents. X_FOB does not calculate inventory in hand, where as Y_CDIF Gold has priority to the merchandise and is immediately sent.

X_FOB Routing: Each Intelligent component, TWS®, SIS® and MPS® determines, for each point of presence warehouse, the best continental-regional warehouse for sending merchandise FOB or C&F. The supplier also assigns the best FOB price via X_FOB method and then determines the C&F destination ports to send goods and services. When making calculations, the client uses the geographical UCommerce Warehouse by default. Alternatively, the end user can select a different path from the critical path and the system will make the appropriate calculation. The client software will immediately monitor and track the critical path, and the end user will define path and warn any time delays and cost differences.

Y_CDIF Routing: The supplier system determines the best path to send CDF merchandise via Y_CDIF method, and the end user only has to specify where they want the goods and services delivered. Every time the system detects a significant change in inventory for a given product, the system will update all of the clients of the newly derived critical paths for delivering good and services.

X_FOB and Y_CDIF Restocking: After each purchase, each TWS®, SIS® and MPS® determines how to replenish Inventory In Hand levels and purchase optimal levels of merchandise to maintain the minimum amount of inventory in stock at the lowest cost to the system. X_FOB restocks in ocean, land or cargo transportation methods, whereas Y_CDIF uses green, blue or red labels. Y_CDIF Gold uses red or black labels.

UCommerce Searches: The client software must require from the end user a supplier before making a search. Once the end user selects the valid supplier for a given product, the system can start the partial search commands that are sent to each TWS®, SIS® and MPS® that using X_FOB and Y_CDIF methods create optimal transportation cost from Leg X to Leg Y. When the supplier system responds from the active memory information of each Intelligent Component, the client merges all of the partial commands to a single version of the truth. The Intelligent Component does not make a SQL command request instead of the Intelligent Component has control of the inventory, and is responsible for managing and coordinating the flow of information sent to it to be processed by the different clients. Once the information is made to the Intelligent Component, it will match/merge optimal routes in its entirety or partially until the best satisfying means of delivery are obtained.

UCommerce Pickups: The end user can also request the shipping only through the UCommerce method supplier system. The end user delivers at the nearest authorized agents the goods with the original cost, so that the system can generate the quote for the duties and expenses at the final destination. Each order confirmation uses an authorized agent that accepts the goods to be shipped in behalf of the client, and then sends them to the final destination via C&F, CDF or CDIF as the client selected.

UCommerce Restocking: When making a search for C&F, CIF, CDF and CDIF, the system calculates X_FOB and Y_CDIF until the warehouse has enough Inventory In Hand to satisfy the order. Thus if an end user requested quote demands for a quantity of items that exceeds available Inventory In Hand, the system will do the following: 1) Requests the missing Inventory via X_FOB and Y_CDIF restocking means. 2) Then merchandise will receive the appropriate time delay for availability in the system. 3) Ideally, the system will request all of the missing merchandise from the manufacturer as one consolidated order, since the merchandise will not leave until all of the units are available. 4) All of the FOB quotes from UCommerce Warehouse offer X_FOB Inventory In Hand with the corresponding restocking delay. 5) All of the C&F, CDF and CDIF quotes will offer both X_FOB and Y_CDIF to the final destination port with the corresponding restocking delay, whereas Y_CDIF Gold makes available the actual Inventory In Hand with no delay.

X_FOB Inventory Control Bitmaps: Each TWS®, SIS® and MPS® creates a X_FOB real time Inventory control tables that allow subordinate Intelligent Components to monitor a specific geographic area to store several bitmaps of information such as: 1) Availability, 2) Quantity In Hand, 3) Highest Quantity, 4) Best Price, 5) Most Reliable route, and 6) transportation means.

Y_CDIF Inventory Control Bitmaps: Each TWS®, SIS® and MPS® creates a Y_CDIF real time Inventory control tables that allow subordinate Intelligent Components to monitor a specific geographic area to store several bitmaps of information. The bitmaps consist of 0 and 1 to notify which supplier carries a specific product in the Available field. The In Hand consists of a number of 2 to the n−1 power in hexadecimal form 0 to 32758 products in hand. The highest bitmap is a hexadecimal value that calculates how much inventory a specific supplier has where F means unlimited. The best Price and Most Reliable bitmaps sort with ranking which supplier offers the best service to the end user. These numbers are updated after each change in inventory to reflect the latest optimal prices and paths. These bitmaps have preprocessed all of the mathematical calculations with the best case inventory and logistical flow for a given item using X_FOB and Y_CDIF guidelines, eliminating the need for end users' software components to have to do the calculations or bog down the system with unnecessary queries.

Detailed Description of the Search Engine technology

Search Engine Supercomputers: Several Search Engines exist in the lucrative market of delivering valorized content via the Internet, such as Ask, Altavista, Google, MSN and Yahoo, to name a few, that are based on large scale Supercomputers of thousands of CPU (U) that are subdivided into groups (sets) and clusters (subsets) of 64 specialized nodes or elements that a lightning speed identifies the best satisfying response for a given parameters of regular expressions. Note: clusters of 64 nodes distribution tend to be the most cost/efficiency arrangement based on the magnitude of the superset (UI). These search engines perform millions of daily searches and lion share of the responses occur in less than 0.1 seconds.

XCommerce: Is an Inventory Control system similar to UCommerce, where the distribution of goods and services is expanded to include electronic links and their corresponding html content. Since the browser entities are a very lucrative endeavor and enjoy long term stream of revenues due in part to the teachings of mass media Target Advertisement from the Berkeley's University professor Dr. Goldhaber. Note: this technology will use Optimal Value Advertisement that takes into account economies of scale, limited advertisement budgets and mathematical algorithms to maximize customers' satisfaction.

Browsers Gather Information: The (UI) or the Internet Universe Superset contains all of the information that is obtained by web crawlers that are programmed to scan predefined subdivision of the chaos and anarchy environment, and in return then as geospatial data with balance, harmony and proportion, so that a cluster of 64 CPU can divide and conquer its content. Each node has 1/n links or content of the Internet. These nodes parse the information with a plurality of regular expressions designed to identify common denominator patterns of alphanumeric characters that are hereinafter referred as KEYWORDS. Each unique IP Address is considered a link that is comprised by a plurality of HTML web pages with content, hereinafter referred as PAGES. The cluster, using a dictionary of valid Keywords and databases of LINK values, helps populate the multi independent variables associated with solving the Eigenvector most satisfying solution based on the known content (UI).

Browsers Standardize Information: The browsers gather the information from the environment as begin rationalizing and standardizing the raw mountains of meaningless data into the essence of the matter that mathematical explains with quantifiable values what is good, bad or redundant. As each HTML is parsed, the browser detects Keywords and compares the historical LINK information (X, Y, Z,) preserved in a Data Warehouse. Then the system uses eigenvectors based on algorithms to normalize, quantify and qualify as statistical distribution that permits which discrete group of PAGES (I, J, K,) or elements of the Superset (UI) is the most satisfying response to the end user inquiry.

Browsers Organized Information: Now, that the information has been normalized and standardized, the cluster can correlate the data to eliminate bad or incomplete information and through the process of simplification remove the lion share of data which is redundant, leaving only exact data that is highly useful and unique. As each link is extracted and valorized for content value of its subordinate PAGES, the system places signature values such as (I) KEYWORD, (J) Frequency, (K) LINGUISTIC WORD PATTERNS, (X) LINK Value, (Y) Reliability and (Z) Popularity, with a mini set or micro universe of the browsers (UB) limitations to a discrete number of responses n, where the cluster cherry picks the discrete sorted by valuing the resultant of the maximized Eigenvector (UB) with (I, J, K, X, Y, Z,) characteristics that respond to a simple regular expression inquiry. LINGUISTIC WORD PATTERN valorization method is explained in the new art concerning XCommerce.

Browsers Transform Information: As the content of a HTML is converted into Keywords and WORD PATTERNS values, all of a sudden, the raw meaningless data can be expressed as the primed correlated single version of the truth vector based data with (I, J, K, X, Y, Z,) independent variables, to name a few. Where (I, J, K,) are the independent variables that analyze the KEYWORD content as it refers to a group of logically organized words, used to communicate a message that has been translated into a lingua franca mathematical language that is not confounded. Furthermore, possessing (X, Y, Z,) that independent variables that are used to normalize links within the scope of particular sets, that belong to the superset UI that is relational and dimensioned based on quality, popularity, product and satisfaction patterns of behavior.

Browsers Analyze Information: (Data Mart) means that they reduce complexity and augment Keywords, LINGUISTIC WORD PATTERNS and LINKS values.

Browsers Evaluate Information: (Business Intelligence) allowing the human intelligence to better understand the environment as it relates to each customer.

Browsers Identify Customers: (from Universal to Particular) understanding that personalized means of advertisement have a greater significant impact on persuading an individual to satisfy a craving need.

Browsers Target Advertisements: (paying the bills) corporate advertiser must be able to use the Internet as a new method to reach the public that is better than traditional mass media technology.

Browsers Corporate Sponsors Value: (cost justifying with results) a personalized relationship between the corporate sponsors and customers is generated. This bond of trust and confidence facilitates sales.

UCommerce Business Rules 2006

Rule 1: UCommerce versions I and II always try to minimize delays, duties and costs to service the customer with the best product and the door to door service. As a business, UCommerce also applies discounts to individual, small, medium and large scale corporations to promote and reward volume purchasing. Discount formulas are therefore beyond the scope of this document, since they are considered to be trade secrets nevertheless for completeness we acknowledge that they do exist.

Rule 2: For an emergency mission critical spare part GOLD, label is king by using reserved Inventory In Hand, hands on management supervision and the highest assignable priority.

Rule 3: UCommerce version I is an optimal condition where clients purchase merchandise via the direct option or pick up directly FOB merchandise from an UCommerce warehouse, and they have selected for immediate purchase, and for the rest UCommerce version II, starting from Rule 4, may identify more satisfying solutions.

Rule 4: All of the orders made by UCommerce as a Superset.

Rule 5: All of the orders made by a specific warehouse as a set.

Rule 6: Each route of orders made to a warehouse as a subset.

Rule 7: Each order belonging to a route as an element.

Rule 8: Each element of the superset can be an independent variable X_FOB or Y_CDIF.

Rule 9: Each X_FOB element can be an independent variable Ocean, Land and Cargo that possesses minimal surcharges and dynamical cost based on weight and purchase value.

Rule 10: The supplier system calculates profit per unit based on the least probable discount level for a day, week, month or year, depending on the $3^{rd}$ party sales structure.

Rule 11: The supplier system always derives the same profit for the same product when it sells one unit or the entire inventory of a given $3^{rd}$ party inventory.

Rule 12: When a $3^{rd}$ party threshold for a greater discount is realized for a predefined interval of time, the discount is credit to the end users in a prorated manner.

Rule 13: Each Y_CDIF element can be an independent variable GREEN, BLUE, RED, BLACK and GOLD labels with dynamical cost based on weight and purchase value.

Rule 14: A plurality of orders originated from distinctly situated $3^{rd}$ parties warehouses being transported to a common denominator UCommerce warehouse destination are associated as a Macro Order that consists of a group of elements.

Rule 15: UCommerce is considered single end users that purchases in behalf of all of its customers.

Rule 16: UCommerce immediately replenishes Inventory In Hand merchandise sold in GOLD or BLACK label.

Rule 17: UCommerce purchases directly to the $3^{rd}$ parties and negotiates the best discounts based on economies of sales, pre production purchases and pre arrival to a FTZ sellout.

Rule 18: The end user can assign to the system Y_CDIF purchasing parameters that are used during the decision process of creating Macro Orders.

Rule 19: The system programming exclusively purchases merchandise via X_FOB for the supplier system.

Rule 20: Leg A is shipping merchandise from $3^{rd}$ party retailer, supplier and wholesaler to an UCommerce Warehouse.

Rule 21: Leg B is shipping merchandise door to door to the end user from the UCommerce supplier system.

Rule 22: Leg T is the intercontinental transport of merchandise from one UCommerce warehouse to another one.

Rule 23: Leg U is the shipment to the final destination port where merchandise must be declared.

Rule 24: Each transportation method has a weight and volume restriction. The system closes a container once 85%+ is reached.

Rule 25: The supplier system distributes merchandise based on priority GOLD, BLACK, RED, BLUE, GREEN, WHITE (Cargo or Land) and GREY (Ocean).

Rule 26: Y_CDIF has priority over X_FOB of the same label.

Rule 27: Each dimension of a Leg X is considered a partial Vector. For Leg A, partial vectors are named after the originated $3^{rd}$ party, city and country is located. Example: KOYO, Tokyo, Japan.

Rule 28: For Legs (T, U, V) partial vectors are named after the UCommerce warehouse city abbreviation. Example: UCommerce TYO=Tokyo.

Rule 29: The system purchases Y_CDIF on demand as per client's instructions, and then calculates the optimal route. For direct orders, rule 3 applies.

Rule 30: The system purchases Y_CDIF twice a day or as discretionary events are identified.

Rule 31: The system purchases X_FOB at discretionary events are identified.

Rule 32: The system analyzes, compares and coordinates pending X_FOB and Y_CDIF quotes in queue, based on containers weight and volume restrictions, delays, clogs and purchasing patterns, associated merchandise monetary value and transportation means that can help instantiate a discretionary interval.

Rule 33: Leg A, Leg T or Leg U Macro Order can have both X_FOB and Y_CDIF elements since the distribution merchandise based on priority.

Rule 34: A Macro Order consists of match/merging a plurality of common denominator routes that have the same Leg A, Leg T, Leg U or Leg B, as to reduce the cost of transportation and simplify, at the point, the complexity of moving massive amounts of inventory.

Rule 35: A Macro Order must also satisfy the time interval criteria of each order and can express it in days, such 1, 2, 3, 4, 5, 7, 10, 15, 20, 30 and 45 business days. Business days are based on US calendars.

Rule 36: The system identifies common inventory suppliers in a geospatial coverage area belonging to an UCommerce warehouse, and takes advantage of the condition of the environment, such as buffer space of transportation containers.

Rule 37: The system has an internal cost for opening a new container that has to be filled with merchandise, and will prefer to fill an existing container to reach the 85% capacity that automatically closes the container and immediately triggers shipping.

Rule 38: The UCommerce lower tier match/merges each Macro Order that possesses the traffic to point X to point Y belonging to a regional scope or subset level of the domain.

Rule 39: The UCommerce middle tier match/merges a plurality of regional scope Macro Orders to create a Super Order that has a continental scope or set level of the domain.

Rule 40: The UCommerce summit tier match/merges a plurality of continental scope Super Orders to create a Global Order that has a global scope or superset level of the domain.

Rule 41: Each Macro, Super and Global order has a plurality of dimensions, such as time intervals to open and close particular purchasing events, queue and capacity parameters, discretionary events, labels transportation flow, X_FOB, Y_CDIF, restocking, and BLACK and GOLD Label.

Rule 42: The UCommerce summit tier, with global scope, will be converted into a MPS® that manages and controls the worldwide traffic through a plurality of Global Orders.

Rule 43: The UCommerce middle tier, with continental scope, will be converted into a SIS® that manages and controls the continental traffic through a plurality of Super Orders.

Rule 44: The UCommerce lower tier, with regional scope, will be converted into a TWS® that manages and controls the continental traffic through a plurality of Macro Orders.

Rule 45: The 'CORE' node of each MPS®, SIS® and TWS® is responsible for generating the Global, Super and Macro Orders.

Rule 46: The 'Parser' function of each MPS®, SIS® and TWS® is responsible for updating, gathering, analyzing and distilling significant portions of the environment.

Rule 47: The 'Storager' function is responsible for updating, normalizing, validating and verifying the information into the XLDB 'Data Mart', so the human resources of the organization can use it for business intelligence.

Rule 48: Intelligent Components, controlling the activities and inventory of a $3^{rd}$ party, can create a localized micro order that can control special conditions, promotions, transportation means and containers with pre sold merchandise that belong to them until sold.

Rule 49: The Partial Leg A is responsible for creating, ordering, synchronizing and match/merging all of the orders in queue into the UCommerce owned Micro, Macro, Super and Global orders, once they are requested and updated until they reach the different points of the trajectory.

Rule 50: The Partial Leg B is responsible for verifying, controlling, distributing and storing the Micro, Macro, Super and Global orders that have arrived into a UCommerce warehouse into the appropriate end user Order, so that they can dispatch to the final destination.

Rule 51: The system creates purchases based on discretionary events to calculate optimal price bitmap inventory tables, known as Z_PRICE. The system tries to identify cost reduction at a point of the trajectory from origin to destination, and must adhere to known limitations such as transportation flow, warehousing and human resources capabilities that quickly create complexity. As shown, in other inventions complexity is a geometrically growing cost. The UCommerce supplier system lowers discretionary events frequency once the complexity level exceeds 1, which is the level where Informational Entropy exists absent of a tax burden.

Guidelines for Z_PRICE

Rule 52: Using the Managerial Pyramid Switch® architecture, the environment is subdivided into global, regional and sector geospatial areas, based on Area Codes with an eight hierarchical levels HQ7 to HQ0 organization.

Rule 53: The lower tier consists of a TWS® with four hierarchical levels, HQ3 to HQ0, that handle all of the Retailer, Supplier, UCommerce and Wholesaler warehouse organization purchasing and traffic synchronization within sector geospatial areas, where each organization, based on their complexity, is assigned to distinct ownerships, such as HQ0 small, HQ1 medium, HQ2 large organizations and HQ3 UCommerce continental regions or sectors.

Rule 54: The middle tier consists of a SIS® with two hierarchical levels, HQ5 to HQ4, that handle all of the purchasing and traffic synchronization within a continental region geospatial area.

Rule 55: The summit tier consists of a MPS® with two hierarchical levels, HQ7 to HQ6, that handle all of the purchasing and traffic synchronization for the worldwide geospatial area.

Rule 56: The system consists of a parallel cluster Supercomputer with artificial intelligence programming that gives a heart beat to each node. The Supercomputer or 'HIVE' consists of a plurality of managerial hierarchical Intelligent Components that possess programming that enables each node to perform complex tasks, while the summit tier supervisor assigns, coordinates, controls, prioritizes and synchronizes the logistical flow of information with throughput capacity limitations, network latency cost and transactional weighted time intervals to avoid saturation.

Rule 57: The 'HIVE' is considered a superset that is subdivided into subsets, sets and elements. The MPS® tier manages the superset, the SIS® tier manages a set, the TWS® tier manages a subset, and specific nodes manage elements such Retailer, Supplier, UCommerce and Wholesaler organizations.

Rule 58: The superset HQ7-HQ6 global Data Mart controls, coordinates, manages, optimizes and synchronizes the flow and profit for the system's inventory via domain data.

Rule 59: Each set HQ5-HQ4 Extreme Large Database (XLDB) Data Mart controls, coordinates, manages, optimizes and synchronizes the flow and profit for the system's inventory via regional data.

Rule 60: Each subset HQ3 Very Large Database (VLDB) Data Mart controls, coordinates, manages, optimizes and synchronizes the flow and profit for the system's inventory via local data.

Rule 61: Each element HQ2-HQ0 controls, coordinates, manages, optimizes and synchronizes the inventory, storage and transportation for each participating $3^{rd}$ party.

Rule 62: For large multinational distribution means, HQ6 and HQ4 will match/merge global and regional scope activities.

Rule 63: The system consolidates all of the orders and pre sold and critical inventory levels to make direct purchases to $3^{rd}$ parties twice a day. Macro_Order_Begin is performed at the beginning of the day and Macro_Order_End appends business day transactions. This rule applies for Micro, Super and Global Orders that must harmonize all of the transactions into universal time and take into account different business hours.

Rule 64: The system gathers, standardizes, organizes and transforms into lingua franca each $3^{rd}$ party point of presence, where all of the transactions are preferably quoted in USD.

Rule 65: Each order is converted into geospatial vectors, where Leg A is the origin, Leg B the destination, and Leg T and U are transport shipment segments. The system creates a plurality of optimal matrices of Z_PRICE inventories based on X_FOB and Y_CDIF independent variables, which mandate that the match/merge process of all of the end users and $3^{rd}$ party orders is best described in Partial Vectors, which have containers, time delays, transportation and profit methods.

Rule 66: The system profit method is created by each TWS®, SIS® and MPS®. The Mini Cost algorithm profit margin is made flexible to encapsulate the maximal amount of inventory with a common P/U.

Rule 67: The profit method takes into account instantiating new containers of shipping merchandise.

Rule 68: Partial Leg A consists of moving merchandise to an UCommerce warehouse from a plurality of $3^{rd}$ party points of presence.

Rule 69: Partial Leg B consists of delivering merchandise to the client via FOB, C&F and CDIF methods.

Rule 70: Partial Legs (T, U) consist of moving merchandise amongst merchandise.

Rule 71: The summation of all of the Partial Vectors derives a resultant Vector.

Z_PRICE Rules

Rule 72: Z_PRICE is a bitmap system that enables optimal large scale sales. 1) Where each warehouse has several transportation queues with goods in route, 2) the system assigns the discount rates of purchasing large quantities of merchandising, and 3) the minimum weight and its associated cost of shipping has to be diluted by maximizing containers' capacities.

Rule 73: Z_PRICE is made not piecemeal item by item, instead, the system purchases the inventory by Retailer, Supplier, UCommerce and Wholesaler, using X_FOB and Y_CDIF means.

Rule 74: Each Order is an independent billing entity that can belong to micro, macro, super or global orders.

Rule 75: Once an end user selects the merchandise, the system match/merges to consolidate the demand for merchandise, and then utilizes optimal cost P/U and most efficient container management.

Rule 76: When using Z_PRICE, the system considers the merchandise to belong to the end user once it arrives to the final UCommerce warehouse.

Rule 77: Z_PRICE can use Inventory in Hand, swap or barter similar merchandise amongst micro, macro, super and global orders to optimize traffic.

Rule 78: Common denominator shipments originating from a plurality of $3^{rd}$ parties to an UCommerce warehouse, are linked together to a given delay interval and associated to the appropriate Partial Leg A Vectors.

Rule 79: Common denominator shipments, originating from an UCommerce warehouse to be distributed to a plurality of end users door to door, are linked together to a given delay interval and associated to the appropriate Partial Leg B Vectors.

Rule 80: Z_PRICE method possesses algorithms that are programmed to generate multi dimensional bitmaps that deplete optimally available inventories in $3^{rd}$ parties.

Rule 81: End users, purchasing with the Z_PRICE, receive an estimated P/U Quote that using business intelligence calculates with probability the final prorated cost.

Rule 82: End users receive a better P/U at the cost, sacrificing an optimally available direct purchase.

Rule 83: Each UCommerce warehouse can purchase merchandise for Inventory In Hand to maximize containers, using Business Intelligence purchase patterns that predict future purchase streams of multi time intervals and transportation methods.

Rule 84: Electronic Files, Internet links and the associated HTML content can be standardized, organized and transformed into geospatial information that can be valorized using Z_PRICE, like bitmaps, known as W_RANK.

Rule 85: W_RANK uses eigenvectors to identify the value of each link and its content, and the supplier system must normalize this information into a compatible Partial Vector CDR method that is based on Partial Differential Equations. The lion share of the conversion and normalization is done by the specialized programming of the 'HIVE', commercially known as the LATIN, which gathers, distills and analyzes the spaghetti of the environment by mapping, standardizing, organizing and transforming the information into logical groups and sets to make them compatible.

Rule 86: Each node belonging to the supplier system 'HIVE' will receive the additional programming and functionalities to process in parallel UCommerce and XCommerce methods.

Rule 87: A Quote Search and Browser Search query responses are considered transactional objects derived from end users with a discrete amount of items that the system must optimally satisfy.

Web Browser System

Intro to Existing Technologies

Rule 88: The end users content to the Internet and obtain information from the web host Supercomputer via a proprietary interface that creates requests based on mathematical valorized methods, using regular expression parameters to obtain content.

Rule 89: The web host Supercomputer is ideally subdivided into sub clusters.

Rule 90: A sub cluster is composed of a plurality of nodes that possess programming means to search, find, identify and valorize its subset of the domain.

Rule 91: A master node for each sub cluster match/merges the responses of its subordinates based on synergistic proprietary intellectual property guidelines.

Rule 92: The web host Supercomputer must integrate Browser Engine, Shopping Cart, Advertisement means and Business Intelligence to identify what satisfies the consumer.

Rule 93: The web host Supercomputer brings law and order to the chaos and anarchy of the Internet. The Internet is considered a $4^{th}$ generation Telecommunications network of 2,000,000,000 subscribers and an independent geospatial superset.

Rule 94: Browser Engine (E), Shopping Cart (S), Advertisement means (A), Billing (B) and Business Intelligence (I) are considered informational functions of the superset.

Rule 95: The superset consists of thousands of nodes that are distributed into sets of parallel working clusters, possessing the (A, B, E, I, S,) informational functions that are physically and often geographically separated for redundancy and greater fault tolerance.

Rule 96: Each set is further partitioned into subsets possessing a plurality of sub clusters, ideally and for simplicity to this document of a configuration of 8 by 8 or 64 nodes.

The System

W_RANK Basic Characteristics

Rule 97: Each node is an element belonging to a superset, set, subset and sub cluster or group configuration.

Rule 98: XCommerce uses W_RANK, the environmental bitmap of optimal inventory that measures the Internet content based on quality, quantity, reliability and security values. The Internet is considered a Superset (U) that can consist of a plurality of sets, subsets, groups and basic elements.

Rule 99: Each link is considered to be a container that has a plurality of pages.

Rule 100: Each page consists of a plurality of valid words that are used to measure the value of each page in the Internet.

Rule 101: End users can use a valid word or Keyword to make a broad search of the content of the Internet that has the same characteristics of an Order.

Rule 102: Advanced Keyword Searches consist of associating valid words and operands to form a group set that has the same characteristics of a Micro Order.

Rule 103: Each cluster has a hash table for the most valuable results of a Keyword Search, in addition, the hash table contains the pointer address of location within the compressed files possessing the content of the Internet. The hash table contains information of the domain of each node.

Rule 104: The Master node possesses a hash table for the entire Internet that helps derive the filtering parameters to instantiate a query response.

Rule 105: The system uses Eigenvectors to quantify and qualify with mathematical formulas Advanced Keyword Searches, so the system can derive an optimal discrete query response. The Master node match/merges the response of each node and then correlates into a single list.

Rule 106: The first Keyword is considered primary, the second one secondary, the third one tertiary, and so forth. A primary Keyword has a higher weighted value than a secondary one, and so forth.

Rule 107: The system match/merges an Advanced Keyword Search or a Regular Expression instantiates the equivalent of a Micro Order container.

Rule 108: The system categories the magnitude of each Keyword from 0 to 15, where 0 is vague expressed in billions of responses, and 15 unique.

Rule 109: The system for each Keyword creates three structures: Simple, Hybrid and Complex Pyramids that gather, distill, analyze, organize and transform the content into geospatial bitmap data.

Rule 110: A Simple Pyramid search consists of a container that possesses the equivalent of exactly 1,000,000 optimal query responses that resemble a resultant Macro Order after match/merging a plurality of Partial Vector Set Searches.

Rule 111: A Hybrid Pyramid search consists of a container that possesses the equivalent of exactly 10,000 optimal query responses that resemble a resultant Super Order after match/merging a plurality of Partial Vector Set Searches.

Rule 112: A Complex Pyramid search consists of a container that possesses the equivalent of exactly 100 optimal query responses that resemble a resultant Global Order after match/merging a plurality of Partial Vector Set Searches.

Rule 113: A plurality of Advanced Keyword Searches uses magnitude 0 to 6 words to derive the most valuable weighted 1,000,000 query responses that make up a Simple Pyramid search with a relative weighted magnitude of 7.

Rule 114: A plurality of Simple Pyramid structure searches and Keywords of magnitude 6 to 9 are used to derive the most valuable weighted 10,000 query responses that make up a Hybrid Pyramid search with a relative weighted magnitude of 11.

Rule 115: A plurality of Hybrid Pyramid structure searches and Keywords of magnitude 10 to 13 are used to derive the most valuable weighted 100 query responses that make up a Complex Pyramid search with a relative weighted magnitude of 15.

Rule 116: The system must first identify the magnitude of each valid word.

Rule 117: A valid word with a magnitude of 2 or more is considered a Keyword. Thus a set of characters and their associated magnitudes help define the process of converting it into geospatial bitmap data.

Rule 118: The system then creates for each Keyword a Simple Pyramid Search.

Rule 119: The system then creates for each Keyword a Hybrid Pyramid Search.

Rule 120: The system then creates for each Keyword a Complex Pyramid Search.

W_RANK Pyramid Search Characteristics

Rule 121: When the end user makes a single word request for a Keyword Search with a word with a magnitude of 0, 1, 2; the system at random replaces the search with a magnitude 5 Keyword.

Rule 122: Magnitude 3 Keyword is considered a Simple Pyramid Join.

Rule 123: Magnitude 4 Keyword is considered a Simple Pyramid Block.

Rule 124: Magnitude 5 Keyword is considered a Simple Pyramid Wall.

Rule 125: Magnitude 6 Keyword is considered a Simple Pyramid Ceiling.

Rule 126: Magnitude 7 Keyword is considered a Hybrid Pyramid Join.

Rule 127: Magnitude 8 Keyword is considered a Hybrid Pyramid Block.

Rule 128: Magnitude 9 Keyword is considered a Hybrid Pyramid Wall.

Rule 129: Magnitude 10 Keyword is considered a Hybrid Pyramid Ceiling.

Rule 130: Magnitude 11 Keyword is considered a Complex Pyramid Join.

Rule 131: Magnitude 12 Keyword is considered a Complex Pyramid Block.

Rule 132: Magnitude 13 Keyword is considered a Complex Pyramid Wall.

Rule 133: Magnitude 14 Keyword is considered a Complex Pyramid Ceiling.

Rule 134: The process of converting a simple Keyword into a Pyramid Search structure is the process of transforming raw confounded and worthless information into primed standardized geospatial bitmap data. W_RANK method takes into account the human capacity to measure and understand quality for discrete quantities, such 10 to 100 responses.

Rule 135: A Keyword that is transformed into geospatial bitmap data will possess a higher magnitude value. W_RANK method takes into account the human nature that considers time as money, whereas it can be amusing to have a query response with millions responses, they don't want to have to distill, analyze and find on their own the most valuable answer.

Lingua Franca Standard

Rule 136: The system reads the entire content of the Superset (U) and determines for each link the valid languages, such as English, French, Germany or Spanish, to name a few. The algorithm then determines the language of each page belonging to a link.

Rule 137: A link can have a plurality of valid languages associated to it.

Rule 138: A Keyword is compared against a language identifier dictionary and also to corporate, technological and mathematical geospatial libraries.

Rule 139: A Keyword can belong to a plurality of languages.

Rule 140: The system uses Keyword Validation filtering that distills the words inside each Page, based on magnitude 0 to 6 Keywords or Simple Pyramid Structure 1) Joins, 2) Blocks, 3) Walls, and 4) Ceilings. The weighted algorithm ranks the content of the document versus a given language standard from 0 to 10000.

Rule 141: Pages that have a value less than the language limit are not considered to belong to that language.

Rule 142: Pages that have a value greater than the language limit and below the language structural limit are confounded. 0 Pages are eliminated from the process.

Rule 143: The system reads the content of a Page to derive basic linguistic and geospatial characteristics.

Rule 144: The system performs a Keyword Value filtering that distills the words inside each Page based on magnitude 7 to 10 Keywords or Hybrid Pyramid Structure 1) Joins, 2) Blocks, 3) Walls, and 4) Ceilings.

Rule 145: The system performs a Keyword Quality filtering that distills the words inside each Page based on magnitude 11 to 14 Keywords or Complex Pyramid Structure 1) Joins, 2) Blocks, 3) Walls, and 4) Ceilings.

Rule 146: The Keyword Value and Keyword Quality filtering algorithms results are converted into environmental bitmap data from the point of view of a subset U, where the common denominator element is the primary Keyword.

Rule 147: The Keyword Validation mechanism identifies if the data belongs to a language and if it is valid or invalid.

Rule 148: The Keyword Value mechanism identifies if the content is bad, fair or good.

Rule 149: The Keyword Quality mechanism identifies if the content is best, fair or good.

EXAMPLES

Example #1

A Macro Order permits the supplier system to have the capacity to partially match/merge the contents of several distinct orders belonging to a plurality of end users to take advantage of economies of scale.

Let's suppose that a given product, such as HD TV, is sold in massive scale 20,000 units per day and its supplier is located in Japan. For the purchase of a single HD TV, the P/U X_FOB TYO is $699 and P/U Y_CDIF is $999 ($699 FOB (TYO)+$100 Shipping TYO-MIA via Ocean=$150 customs+$50 UCommerce Shipping and Handling with delivery in 4 weeks.

Buying in bulk 20,000 units, the supplier X_FOB price to UCommerce TYO is $549 (or $699 minus 20% discount)

The product weight is 20#. Thus, the UCommerce by purchasing in behalf of the 20,000 end users with common denominator Leg A TYO and Leg T Miami, can create two Macro Orders that offer optimal P/U to the end users:

1) Macro Order Leg A has a X_FOB Price UCommerce TYO of $549, significantly reducing the cost to the end user by $150.

2) Macro Order Leg T has a Y_CDIF Price UCommerce MIA of:

a) GRAY LABEL P/U $684 ($549 FOB (TYO)+$100 Ocean+$100 customs+$35 UCommerce S&H) with delivery in 4 weeks.

b) WHITE LABEL P/U $699 ($549 FOB (TYO)+$115 Cargo+$100 customs+$35 UCommerce S&H) with delivery in 2 weeks.

c) GREEN LABEL P/U $724 ($549 FOB (TYO)+$130 Cargo+$115 customs+$35 UCommerce S&H) with delivery in 1 week.

d) BLUE LABEL P/U $734 ($549 FOB (TYO)+$140 Cargo+$115 customs+$35 UCommerce S&H) with delivery in 4 to 5 days.

e) RED LABEL P/U $749 ($549 FOB (TYO)+$155 Cargo+$115 customs+$35 UCommerce S&H) with delivery in 2 to 3 days.

f) BLACK LABEL P/U $774 ($549 FOB (TYO)+$180 Cargo+$115 customs+$35 UCommerce S&H) with delivery in 2 days.

g) GOLD LABEL P/U $789 ($549 FOB (TYO)+$180 Cargo+$115 customs+$50 UCommerce S&H) with delivery in 2 days.

Thus, the end users significantly lower their aggregate cost of FOB or CDIF costs, and with optional shorter time delays and improved services (GOLD LABEL) if required.

Example #2

Z_PRICE permits an end user the best price door to door. For example, an end user living in Sao Paolo Brazil wants to purchase a single HD TV. If the end user purchases a single item via direct method, the cost would be P/U X_FOB TYO $699, P/U X_FOB MIA $949 and P/U Y_CDIF SAO $1,249. Instead, the end user allows each UCommerce system and method to find the best price based on time delays:

1) Macro Order Leg A has a X_FOB Price UCommerce TYO of $549, significantly reducing the cost to the end user by $150.

2) Macro Order Leg T has a X_FOB Price UCommerce MIA of $699.

3) Macro Order Leg T has a X_FOB Price UCommerce LAX of $689.

4) Macro Order Leg T has a X_FOB Price UCommerce MEX of $704.

5) Macro Order Leg T has a X_FOB Price UCommerce BUE of $784.

6) Macro Order Leg T has a Y_CDIF Price UCommerce SAO of $919.

Z_Price rates the best price door to door as follows:

a) GRAY LABEL P/U $899 ($549 FOB (TYO)+$200 Ocean+$100 customs+$50 UCommerce S&H) with delivery in 6 weeks.

b) WHITE LABEL P/U $924 ($549 FOB (TYO)+$225 Cargo+$100 customs+$35 UCommerce S&H) with delivery in 4 weeks.

c) GREEN LABEL P/U $834 ($699 FOB (MIA)+$100 Cargo+$35 UCommerce S&H) with delivery in 2 weeks.

d) BLUE LABEL P/U $844 ($704 FOB (MEX)+$105 Cargo+$35 UCommerce S&H) with delivery in 1 week.

e) RED LABEL P/U $839 ($689 FOB (LAX)+$125 Cargo+$35 UCommerce S&H) with delivery in 2 to 3 days.

f) BLACK LABEL P/U $899 ($784 FOB (BUE)+$80 Cargo+$35 UCommerce S&H) with delivery in 1 day.

g) GOLD LABEL P/U $914 ($879 FOB (SAO)+$35 UCommerce S&H) with immediate delivery.

Note: c)-g) X_FOB/Y_CDIF pricing has already taken into account $115 for customs' declarations since the merchandise is handled via Free Trade Zones.

Example #3

Classical Divide and Conquer Browser Search: is a description of how to use the present $3^{rd}$ party prior art to derive an optimal query response.

For example, an end user wants to find out the World Cup Final match between France and Italy, in Germany Jul. 9, 2006:

1) Let's assume the end user did not go directly to a favorite sports site that has previously stored in his browser.

2) The end user requests the KEYWORD {WORLD} that has 2,500,000,000 responses.

3) The end user requests the KEYWORD {WORLD, CUP} that has 35,000,000 responses.

4) The end user requests the KEYWORD {WORLD, CUP, FIFA} that has 16,000,000 responses.

5) Note: 2)-4) the browser will suggest the use www.fifa.com still the end user must find the information within, easy during the tournament, not 6 months after the fact when League Tournaments, Olympic, Women World Cup soccer event dominate the spotlight.

6) The Simple Pyramid Structure validates and filters out {WORLD, CUP, FIFA} 16,000,000 responses minus 90 redundancy or pork equals 1,600,000 responses, still the end user is not satisfied since over a million responses exist or is not impressed using 1) www.favoritesite.com or 5) www.fifa.com, using the KEYWORD regular expression {WORLD, CUP, FIFA}, and English language only.

7) The end user adds the KEYWORD {GERMANY} that has 2,000,000 responses.

8) The end user adds the KEYWORD {ITALY} that has 1,000,000 responses.

9) The end user requests the KEYWORD {CHAMPION} that has 500,000 responses. Fact Italy is the FIFA Germany 2006 World CUP Champion. This logically eliminates the need to use France since they are runners up and any news making reference to the final in future tense.

10) The Hybrid Pyramid Structure validates and filters out {GERMANY, ITALY, CHAMPION} 500,000 responses minus 50 redundancy or pork equals 250,000 responses.

11) The end user adds the KEYWORD {RED} that has 250,000 responses.

12) The end user adds the KEYWORD {GOLD} that has 75,000 responses.

13) The end user requests the KEYWORD {PENALTY} that has 25,000 responses. Fact Z. Z. was given a red card and ejected from the game, he was also awarded the Golden Ball award for being the best tournament player, and his team France lost the final in penalty kicks.

14) The Hybrid Pyramid Structure that validates and filters out {RED, GOLDEN, PENALTY} 25,000 responses minus 50 redundancy or pork equals 12,500 responses.

Example #4

Pyramid Structures Browser Search Analysis

The XCommerce supplier system is responsible for creating the Informational Pyramid Structures for FIFA content, which includes the World Cup and League Tournaments.

Simple Pyramid algorithms of Joins, Blocks, Walls and Ceiling to create 1,000,000 cells:

World is a Join with magnitude 0 and is a location.

Cup is a Join with magnitude 0 and is an object.

FIFA is a Block with magnitude 2 and is a company.

Hybrid Pyramid algorithms of Joins, Blocks, Walls and Ceiling to create 10,000 cells:

Germany is a Join with magnitude 1 and is a country and geospatial. Italy is a Join with magnitude 1 and is a country and geospatial.

Champion is a Block with magnitude 2.

Red is a Join with magnitude 0 and is a color.

Gold is a Join with magnitude 1 and is a color.

Penalty is a Join with magnitude 1.

World and Cup regular expression have a magnitude 0 or 1 and thus are not considered Keywords, whereas FIFA with a magnitude 2 is.

{WORLD, CUP} have a magnitude of 2 and thus are or considered a KEYWORD.

{WORLD, CUP, FIFA, GERMANY} have a magnitude of 3.

{WORLD, CUP, FIFA, GERMANY, ITALY} have a magnitude of 6.

{WORLD, CUP, FIFA, GERMANY, ITALY, CHAMPION} have a magnitude of 7. {WORLD, CUP, FIFA, GERMANY, ITALY, CHAMPION, RED} have a magnitude of 8.

{WORLD, CUP, FIFA, GERMANY, ITALY, CHAMPION, RED, GOLD} have a magnitude of 10.

{WORLD, CUP, FIFA, GERMANY, ITALY, CHAMPION, RED, GOLD, PENALTY} have a magnitude of 11.

Based on the Simple Pyramid Structure constructs, the system top objects consists of the following:

Uruguay 1930, Uruguay, Argentina, Stabile

Italy 1934, Italy, Czechoslovakia, Meazza, Schiavo

France 1938, Italy, Hungary, Piola, Leonidas

Brazil 1950, Uruguay, Brazil, Schaffino, Ademir

Switzerland 1954, Germany, Hungary, Kocsis

Sweden 1958, Brazil, Sweden, Pele, Fontaine

Chile 1962, Brazil, Czechoslovakia, Garrincha, Vava

England 1966, England, Germany, Robinson, Eusebio

Mexico 1970, Brazil, Italy, Riva, Pele, Muller

Germany 1974, Germany, Netherlands, Muller, Cruyff, Lato

Argentina 1978, Argentina, Netherlands, Kempes, Filiol

Spain 1982, Italy, Germany, Rossi, Rummenigge

Mexico 1986, Italy, Germany, Maradona, Platini, Lineker

Italy 1990, Germany, Argentina, Schilaci, Maradona, Baggio

USA 1994, Brazil, Italy, Romario, Baggio, Salenco, Stoitchkov

France 1998, France, Brazil, Ronaldo, Zidane, Suker

Corea+Japan 2002, Brazil, Germany, Ronaldo, Kahn

Germany 2006, Italy, France, Zidane, Cannavaro, Buffon

RSA 2010, n/a

Thus using the player collection, for example Diego Armando Maradona, can be associated as a player that played for Boca Juniors, Argentina, Barcelona, Spain and Napoli, Italy.

In particular, Zidane can be associated as a player that played for Bordeaux in France, Juventus in Italy and Real Madrid in Spain.

Boca Juniors, Real Madrid and Napoli are members of the Teams collections.

Both Maradona and Zidane won the Adidas Golden Ball® 1986 and 2006 respectively.

Complex Pyramid algorithms of Joins, Blocks, Walls and Ceiling to create 100 cells:

{WORLD, CUP, FIFA, GERMANY, ITALY, CHAMPION, RED, GOLD, PENALTY, ZIDANE, BUFFON, CANNAVARO, SHAKIRA} have a magnitude of 15.

Example #5

Is a comparative analysis of $3^{rd}$ parties Browser Search Engines versus the W_RANK.

The Basic Keyword search {WORLD, CUP, FIFA} versus the Simple Pyramid Structure.

The End user begins the Divide and Conquer process of placing enough words until the Browser Engine responds with a satisfying response.

{WORLD} generates 2.5 billion responses.

{WORLD, CUP} generates 35 million responses.

{WORLD, CUP, FIFA} generates 16 million responses.

The Simple Pyramid Structure for {WORLD, CUP, FIFA} is a process that logically associates other valuable common denominator KEYWORDS to derive to the optimal element.

1) {WORLD, CUP, FIFA} consists of 2.5 billion links that are placed into 1,000,000 Building blocks cells.

2) The System uses Simple Joins, Blocks, Walls and Ceilings English Semantics to further valorize each of the links and to associate them to belong to one cell. Thus the 1,000,000 cells have the 2.5 billion responses.

a) Forbidden, Spam, Viral and Porn sites with cookie traps have a value of 0.000000000001 b) Duplicates have a value of 0.0000000001 c) Links that fail the Simple Join test have a value of 0.00000001 d) Links that fail the Simple Block test have a value of 0.000001 e) Links that fail the Simple Wall test have a value of 0.0001 f) Links that fail the Simple Ceiling test have a value of 0.01 g) Links that pass the Simple Join to Ceiling test have a value of 1 h) Links that pass the KEYWORD {WORLD, CUP, FIFA} 1,000,000 i) Links that pass the KEYWORD {~WORLD, CUP, FIFA} 250,000 j) Links that pass the KEYWORD {WORLD, ~CUP, FIFA} 500,000 k) Links that pass the KEYWORD {WORLD, CUP, ~FIFA} 50,000 l) Links that pass the KEYWORD {~WORLD, ~CUP, FIFA} 100,000 m) Links that pass the KEYWORD {~WORLD, CUP, ~FIFA} 50,000 n) Links that pass the KEYWORD {WORLD, ~CUP, ~FIFA} 10,000

Note: 2) to 9) consists of a preprocessed task done to all of the pages of the Internet having a given language content, in this case English.

As per Examples 3 and 4 only FIFA is a KEYWORD.

Primary word is WORLD. Secondary word is CUP. Tertiary word is FIFA.

The Intermediate Keyword search {WORLD, CUP, FIFA, GERMANY, ITALY, CHAMPION} versus the Hybrid Pyramid Structure.

The End user begins the Divide and Conquer process of placing enough words until the Browser Engine responds with a satisfying response.

3) {WORLD, CUP, FIFA, GERMANY} generates 2 million responses.

4) {WORLD, CUP, FIFA, GERMANY, ITALY} generates 1 million responses.

5) {WORLD, CUP, FIFA, GERMANY, ITALY, CHAMPION} generates 500,000 responses.

The Hybrid Pyramid Structure for {WORLD, CUP, FIFA, GERMANY, ITALY, CHAMPION} is a process that logically associates other valuable common denominator KEYWORDS to derive to the optimal element.

6) {WORLD, CUP, FIFA} consists of 2.5 billion links that are placed into 1,000,000 Building blocks cells.

7) The System uses Hybrid Joins, Blocks, Walls and Ceilings English Semantics by paragraph to further valorize each of the links and then associate them to belong to one cell. Thus the 10,000 cells have the 2.5 billion responses.

a) Links having a value of less than 1 belong to 1 cell.

b) Links having a value of less than 10 belong to 3 cells.

c) Links having a value of less than 100 belong to 3 cells.

d) Links having a value of less than 1,000 belong to 3 cells.

e) Links having a value of less than 10,000 belong to 10 cells.

f) Links having a value of less than 50,000 belong to 10 cells.

g) Links having a value of less than 125,000 belong to 30 cells.

h) Links having a value of less than 250,000 belong to 40 cells.

i) Links having a value greater than 500,000 belong to 9900 cells.

j) Links that pass {SIMPLE+GERMANY, ITALY, CHAMPION}×16 k) Links that pass {SIMPLE+GERMANY, ~ITALY, CHAMPION}×8 l) Links that pass {SIMPLE+~GERMANY, ITALY, CHAMPION}×6 m) Links that pass {SIMPLE+GERMANY, ITALY, ~CHAMPION}×6 n) Links that pass {SIMPLE+~GERMANY, ~ITALY, CHAMPION}×4 o) Links that pass {SIMPLE+GERMANY, ~ITALY, ~CHAMPION}×3.

p) Links that pass {SIMPLE+~GERMANY, ITALY, ~CHAMPION}×2.

q) Links that fail a discrete* Hybrid Join test have a multiplier of 0.7070707 r) Links that fail a discrete* Hybrid Block test have a multiplier of 0.7070707 s) Links that fail a discrete* Hybrid Wall test have a multiplier of 0.7070707 t) Links that fail a discrete* Hybrid Ceiling test have a multiplier of 0.7070707

The pages that the system measured having a weighted value >=500,000 such as {WORLD, CUP, FIFA} or {WORLD, ~CUP, FIFA} are valid.

{WORLD, CUP, FIFA}={SIMPLE} or {SIMPLE PYRAMID}

As per Examples 3 and 4 only CHAMPION is a KEYWORD. For the second filter, the Primary word is GERMANY. Secondary word is ITALY. Tertiary word is CHAMPION.

A discrete* test is based on the unique number of words in a given page. The system match/merges common denominator 1 to 256 Hybrid Joins, Blocks, Walls and Ceilings out of the most likely 1024 comparisons.

8) The System uses Complex Joins, Blocks, Walls and Ceilings Data and Geospatial data by content to further valorize each of the links and then associate them to belong to one cell. Thus the 100 cells have the 2.5 billion responses.

a) Links having a value of less than 1,000 belong to 1 cell.

b) Links having a value of less than 10,000 belong to 1 cell.

c) Links having a value of less than 100,000 belong to 1 cell.

d) Links having a value of less than 250,000 belong to 3 cells.

e) Links having a value of less than 500,000 belong to 4 cells.

f) Links having a value greater than 1,000,000 belong to 90 cells.

9) The pages that the system measured having a weighted value >=3,000,000 such as {WORLD, CUP, FIFA, GERMANY, ITALY, CHAMPION} or {HYBRID} or {HYBRID PYRAMID} combinations are valid.

a) Links that pass {HYBRID+RED, GOLD, PENALTY}×16 b) Links that pass {HYBRID+RED, GOLD, ~PENALTY}×8 c) Links that pass {HYBRID+RED, ~GOLD, PENALTY}×5.6 d) Links that pass {HYBRID+~RED, GOLD, PENALTY}×4.2 e) Links that pass {HYBRID+~RED, ~GOLD, PENALTY}×4 f) Links that pass {HYBRID+~RED, GOLD, ~PENALTY}×2.8.

g) Links that pass {HYBRID+~RED, ~GOLD, PENALTY}×2.

h) Links that fail a discrete* Complex Join test have a multiplier of 0.7070707 i) Links that fail a discrete* Complex Block test have a multiplier of 0.7070707 j) Links that fail a discrete* Complex Wall test have a multiplier of 0.7070707 k) Links that fail a discrete* Complex Ceiling test have a multiplier of 0.7070707

As per Examples 3 and 4 none are KEYWORDS. For the third filter, the Primary word is RED. Secondary word is GOLD. Tertiary word is PENALTY.

A discrete* test is based on the unique number of words in a given page. The system match/merges common denominator 1 to 256 Complex Joins, Blocks, Walls and Ceilings out of the most likely 1024 comparisons.

10) Finally, after the system has match/merged the Complex Pyramid Switch, the system identifies the highest satisfying KEYWORD to further valorize each of the links and then associate them to belong to the TOP ten cell. Thus, the 11 cells have the 2.5 billion responses.

The pages that the system measured having a weighted value >=10,000,000 such as {WORLD, CUP, FIFA, GERMANY, ITALY, CHAMPION, RED, GOLD, PENALTY} or {COMPLEX} or {COMPLEX PYRAMID} combinations are valid.

a) Links that pass {ZIDANE}×2
b) Links that pass {BUFFON}×2
c) Links that pass {CANNAVARO}×2
d) Links that pass {SHAKIRA}×2

Example #6

Shows how the W_RANK differs from the $3^{rd}$ party browser engines.

When the end user makes a request such as {WORLD, CUP, FIFA}, the query requires the (8×8) cluster to perform an eigenvector search to derive the highest valued replies to the end user.

Whereas, W_RANK identifies the HQ1 owner of the FIFA KEYWORD Environmental Bitmap Pyramid Structure for the result, without performing any calculations, since the data within the supplier system is current.

Finally, W_RANK uses a weighted algorithm instead a Regular Expression filtering mechanism (or Caesar's Divide and Conquer) strategy as shown in the Examples 3 to 5.

What is claimed is:

1. A method for simulating the entire superset of potential valid keyword regular expression requests constructed during an Internet browser search and converting the result sets into Environmental Bitmap data to enable efficient and accurate searching without requiring Browser Engine supercomputer cluster searching capabilities, the method comprising the steps of:

defining a searchable environment;

subdividing and arranging the searchable environment into a managerial hierarchy resembling a pyramid structure;

providing a keyword database containing all of the recognized words for a given language;

measuring the relative occurrence of each of said recognized words within the searchable environment and assigning a quantitative value to each said recognized word, establishing a minimum word value associated with vague terms and establishing a maximum word value associated with unique terms, wherein said vague terms are defined as terms having the highest quantity of occurrences of the term in the searchable environment and unique terms are defined as terms having the lowest quantity of occurrences of the term in the searchable environment;

providing a link database of searchable Internet web pages, wherein the searchable Internet web pages are provided within the searchable environment;

analyzing the content of each of said Internet web pages based upon a set of predetermined semantic guidelines for said language and assigning a relative quantitative value to each of said Internet web pages based on said analysis;

quantifying and qualifying the content of each of said Internet web pages based on a comparison of said content with a plurality of predefined individual word collections, each word in a particular one of said word collections sharing a common assigned value;

creating an Environmental Bitmap Pyramid Structure, wherein the pyramid structure arranges words in hierarchical groupings, being arranged via a probabilistic weighted value of each of said Internet web pages wherein, an environmental bitmap is defined as a summary analysis of the best fit web pages for a given partition of the searchable environment;

an Environmental Bitmap Pyramid Structure is defined as a having at least two of the following layers:

a keyword search returning an estimated $10^{10}$ matches, a simple layer refinement returning an estimated $10^6$ matches, a hybrid layer refinement returning an estimated $10^4$ matches, a complex layer refinement returning an estimated $10^2$ matches, an optimal layer refinement returning the optimal match, and wherein the subject layers corresponding to said managerial hierarchical subpartition for a given keyword search;

a probabilistic weighted value is a weighted magnitude respective to the number of occurrences of a search pattern identified within each web page belonging to each said subject layers, the weighted magnitude having a lowest magnitude, a highest magnitude, and a series of values therebetween, wherein the lowest magnitude is associated with the lowest certainty and precision and the highest magnitude is associated with the highest certainty and precision of the search pattern within the subject layers;

gathering, correlating and distilling the content of each of said subject layers to match and merge its own vector data record with its own environmental bitmap using at least one common denominator keyword as the independent variable;

determining the relative magnitude of each web page of said subject layers based on said analysis and the results of said quantifying and qualifying, and assigning a relative magnitude to each of said common denominator page clusters; and determining and presenting the optimal results of the requested search by utilizing refining steps provided in the Environmental Bitmap Pyramid Structure.

2. A method as recited in claim 1, further comprising, the step of determining the relative magnitude of each web page of the subject layers, the steps of:

receiving an Internet keyword search request comprising a plurality of keywords, converting each keyword into a numerical magnitude, and arranging said keywords in order of magnitude (highest to lowest);

comparing the terms of said keyword search request with said bitmap information to determine a final weighted magnitude of each of said Internet web pages;

distilling those pages that exceed a predefined numeric threshold; and displaying said pages in said user's browser in order of weighted magnitude, from highest to lowest.

3. A method as recited in claim 1, further comprising the step of replacing and substituting a plurality of dependent variables obtained from the predefined individual word collections with common denominator page clusters.

4. A method as recited in claim 3, wherein the step of creating an Environmental Bitmap Pyramid Structure, further comprises the steps of:

gathering, analyzing, and distilling a common denominator cluster of words;

adding new keywords until a simple layer refinement is reached, creating a Simple Pyramid Object having a predefined magnitude, wherein the Simple Pyramid Object is constructed by adding at least one additional, independent variable; and replacing the common denominator cluster of words obtained from a language semantics analysis with the most accurate and precise Simple Pyramid Objects.

5. A method as recited in claim 4, wherein the step of replacing the common denominator cluster of words further comprises adding at least one additional dependent variable.

6. A method as recited in claim 4, wherein the step of creating an Environmental Bitmap Pyramid Structure further comprising the steps of:

gathering, analyzing, and distilling the common denominator cluster of words and Simple Pyramid Objects via the addition of new keywords until a hybrid layer refinement is reached creating a Hybrid Pyramid Object having a predefined magnitude, wherein the Hybrid Pyramid Object is created via the addition of at least one additional independent variable that is geo spatial data; and replacing common denominator cluster of words and Simple Pyramid Objects with the most accurate and precise Hybrid Pyramid Objects.

7. A method as recited in claim 6, wherein the step of replacing further comprising adding at least one additional dependent variable.

8. A method as recited in claim 4, wherein the step of creating an Environmental Bitmap Pyramid Structure further comprises the steps of:

gathering, analyzing, and distilling the common denominator cluster of words, Simple Pyramid Objects, and Hybrid Pyramid Objects, until their magnitudes reach the predefined magnitude of a complex layer refinement creating a Complex Pyramid Object, wherein the Complex Pyramid Object is constructed by adding at least one additional independent variable; and replacing common denominator clusters of words and Simple and Hybrid Pyramid Objects with the most accurate and precise Complex Pyramid Objects.

9. A method as recited in claim 8, wherein the step of replacing further comprising adding at least one additional dependent variable.

10. A method as recited in claim 4, wherein the step of creating an Environmental Bitmap Pyramid Structure further comprises the steps of:

gathering, analyzing, and distilling the common denominator cluster of words and Simple, Hybrid and Complex Pyramid Objects, until a said optimal refinement layer that is also referred to as the Optimal Element Object is created, wherein the said optimal refinement layer is constructed by adding at least one additional independent variable; and replacing common denominator clusters of words and Simple, Hybrid and Complex Pyramid Objects with the most accurate and precise Optimal Element Object.

11. A method as recited in claim 1, the method further comprising a step of providing the searchable Internet web pages within each said subject layers.

* * * * *